US012225127B2

(12) United States Patent
Tsitrin et al.

(10) Patent No.: US 12,225,127 B2
(45) Date of Patent: Feb. 11, 2025

(54) ADDRESS VERIFICATION, SEED SPLITTING AND FIRMWARE EXTENSION FOR SECURE CRYPTOCURRENCY KEY BACKUP, RESTORE, AND TRANSACTION SIGNING PLATFORM APPARATUSES, METHODS AND SYSTEMS

(71) Applicant: FMR LLC, Boston, MA (US)

(72) Inventors: Vladimir Tsitrin, Acton, MA (US); Gang Cheng, Nashua, NH (US)

(73) Assignee: FMR LLC, Boston, MA (US)

( * ) Notice: Subject to any disclaimer, the term of this patent is extended or adjusted under 35 U.S.C. 154(b) by 262 days.

(21) Appl. No.: 17/719,344

(22) Filed: Apr. 12, 2022

(65) Prior Publication Data

US 2022/0321340 A1 Oct. 6, 2022

Related U.S. Application Data

(63) Continuation-in-part of application No. 16/421,442, filed on May 23, 2019, now Pat. No. 10,992,469, (Continued)

(51) Int. Cl.

*H04L 9/08* (2006.01)
*G06F 21/60* (2013.01)
(Continued)

(52) U.S. Cl.

CPC .......... *H04L 9/0894* (2013.01); *G06F 21/602* (2013.01); *G06F 21/6218* (2013.01); (Continued)

(58) Field of Classification Search

CPC ... H04L 9/0894; H04L 9/0825; H04L 9/0838; H04L 9/3234; H04L 9/50; G06F 21/602; G06F 21/6218

See application file for complete search history.

(56) References Cited

U.S. PATENT DOCUMENTS 6,202,068 B1 3/2001 Kraay et al.
6,959,382 B1 * 10/2005 Kinnis ................. H04L 9/3247 713/168

(Continued)

FOREIGN PATENT DOCUMENTS

CA 2870844 A1 5/2015
CA 2843034 A1 8/2015

(Continued)

OTHER PUBLICATIONS

NPL Search History (Year: 2024).*

(Continued)

*Primary Examiner* — Samson B Lemma
*Assistant Examiner* — Richard W Cruz-Franqui
(74) *Attorney, Agent, or Firm* — Hanchuk Kheit LLP.; Walter G. Hanchuk

(57) ABSTRACT

The Address Verification, Seed Splitting and Firmware Extension for Secure Cryptocurrency Key Backup, Restore, and Transaction Signing Platform Apparatuses, Methods and Systems ("SFTSP") transforms contract deployment request, transaction signing request, key backup request, key recovery request inputs via SFTSP components into contract deployment response, transaction signing response, key backup response, key recovery response outputs. A contract deployment request message datastructure is obtained. Owner key identification parameters are determined. An owner public key is determined using the owner key identification parameters. An owner address is generated using the owner public key. A salt value is generated. A contract address for the smart contract is calculated as a function of the deployment factory address, the salt value, the contract code, and the owner address. An owner private key is determined using the owner key identification parameters (Continued)

EXEMPLARY SFTSP ARCHITECTURE and used to sign the contract address. A contract deployment data datastructure is provided.

13 Claims, 56 Drawing Sheets

Related U.S. Application Data which is a continuation-in-part of application No. 15/984,280, filed on May 18, 2018, now Pat. No. 10,778,439, which is a continuation-in-part of application No. 15/898,224, filed on Feb. 15, 2018, now Pat. No. 10,644,885, which is a continuation-in-part of application No. 15/486,243, filed on Apr. 12, 2017, now Pat. No. 11,488,147, said application No. 15/984,280 is a continuation-in-part of application No. 15/456,461, filed on Mar. 10, 2017, now Pat. No. 10,461,940, and a continuation-in-part of application No. 15/210,813, filed on Jul. 14, 2016, now abandoned, said application No. 15/898,224 is a continuation-in-part of application No. 15/210,781, filed on Jul. 14, 2016, now abandoned, and a continuation-in-part of application No. 15/210,807, filed on Jul. 14, 2016, and a continuation-in-part of application No. 15/210,817, filed on Jul. 14, 2016, and a continuation-in-part of application No. 15/210,795, filed on Jul. 14, 2016, now abandoned, and a continuation-in-part of application No. 15/210,821, filed on Jul. 14, 2016, now abandoned, and a continuation-in-part of application No. 15/209,709, filed on Jul. 13, 2016, and a continuation-in-part of application No. 15/209,714, filed on Jul. 13, 2016, now Pat. No. 10,339,523, and a continuation-in-part of application No. 15/209,701, filed on Jul. 13, 2016, now abandoned, and a continuation-in-part of application No. 15/019,926, filed on Feb. 9, 2016, now abandoned, and a continuation-in-part of application No. 14/963,165, filed on Dec. 8, 2015, now Pat. No. 10,504,179, and a continuation-in-part of application No. 14/799,229, filed on Jul. 14, 2015, now abandoned, and a continuation-in-part of application No. 14/799,242, filed on Jul. 14, 2015, now abandoned, and a continuation-in-part of application No. 14/799,282, filed on Jul. 14, 2015, now abandoned, and a continuation-in-part of application No. PCT/US2016/042169, filed on Jul. 13, 2016.

(60) Provisional application No. 62/509,011, filed on May 19, 2017, provisional application No. 62/273,450, filed on Dec. 31, 2015, provisional application No. 62/273,452, filed on Dec. 31, 2015, provisional application No. 62/273,449, filed on Dec. 31, 2015, provisional application No. 62/273,447, filed on Dec. 31, 2015, provisional application No. 62/273,453, filed on Dec. 31, 2015.

(51) Int. Cl.

| | |
|---|---|
| ***G06F 21/62*** | (2013.01) |
| ***H04L 9/00*** | (2022.01) |
| ***H04L 9/32*** | (2006.01) |

(52) U.S. Cl.

CPC .......... *H04L 9/0825* (2013.01); *H04L 9/0838* (2013.01); *H04L 9/3234* (2013.01); *H04L 9/50* (2022.05); *H04L 2209/56* (2013.01)

(56) References Cited

U.S. PATENT DOCUMENTS 8,848,053 B2 9/2014 Scanlon
9,076,290 B2 7/2015 Griffin
9,082,113 B2 7/2015 Shea et al.
9,087,326 B2 7/2015 Shea et al.
9,098,190 B2 8/2015 Zhou
9,098,387 B1 8/2015 Curtis et al.
9,098,874 B2 8/2015 Chandra et al.
9,117,341 B2 8/2015 Marantelli
9,122,749 B2 9/2015 Elmore et al.
9,129,338 B2 9/2015 Liu
9,129,339 B2 9/2015 Liu
9,135,616 B2 9/2015 Hirson et al.
9,135,787 B1 9/2015 Russell
9,144,742 B1 9/2015 Curtis et al.
9,153,088 B2 10/2015 Spencer, II
9,160,717 B2 10/2015 Bhanoo et al.
9,451,030 B2 9/2016 Schunder
2003/0191709 A1 10/2003 Elston
2003/0217258 A1* 11/2003 Bade .................. H04L 63/0485 713/150
2006/0004670 A1* 1/2006 McKenney .......... G06Q 20/382 705/64
2006/0236384 A1 10/2006 Lindholm
2007/0215695 A1 9/2007 Trane
2008/0064333 A1 3/2008 Hymes
2009/0106125 A1 4/2009 Rock
2010/0031024 A1* 2/2010 Hayes .................. H04L 9/3263 380/42
2010/0185504 A1 7/2010 Rajan
2012/0158586 A1 6/2012 Ganti
2014/0052994 A1* 2/2014 Sabin .................. H04L 9/0894 713/176
2014/0074497 A1 3/2014 Griffin
2014/0188691 A1 7/2014 Blank
2014/0195415 A1 7/2014 Broberg
2015/0018084 A1 1/2015 Gatto
2015/0120472 A1 4/2015 Abaye
2015/0195099 A1 7/2015 Imes
2015/0205929 A1 7/2015 Brama
2015/0206106 A1 7/2015 Yago
2015/0206240 A1 7/2015 Baker
2015/0213008 A1 7/2015 Orsini et al.
2015/0213351 A1 7/2015 Wyatt
2015/0213419 A1 7/2015 Lyons et al.
2015/0213437 A1 7/2015 Wyatt
2015/0220717 A1* 8/2015 Shin ...................... G06V 20/80 726/28
2015/0220892 A1 8/2015 Allen
2015/0220928 A1 8/2015 Allen
2015/0227897 A1 8/2015 Loera
2015/0227898 A1 8/2015 Ballout
2015/0227913 A1 8/2015 Ballout
2015/0245084 A1 8/2015 Downing et al.
2015/0248672 A1 9/2015 Bayer et al.
2015/0254640 A1 9/2015 Cassano et al.
2015/0254768 A1 9/2015 Menon et al.
2015/0261269 A1 9/2015 Bruscoe
2015/0262137 A1 9/2015 Armstrong
2015/0262138 A1 9/2015 Hudon
2015/0262139 A1 9/2015 Shtylman
2015/0262140 A1 9/2015 Armstrong
2015/0262141 A1 9/2015 Rebernik et al.
2015/0262168 A1 9/2015 Armstrong
2015/0262171 A1 9/2015 Langschaedel et al.
2015/0262172 A1 9/2015 Rebernik
2015/0262173 A1 9/2015 Durbin et al.
2015/0262176 A1 9/2015 Langschaedel et al.
2015/0262251 A1 9/2015 Knobel
2015/0269538 A1 9/2015 Stanchfield
2015/0269539 A1 9/2015 MacGregor et al.
2015/0269541 A1 9/2015 MacGregor et al.
2015/0269570 A1 9/2015 Phan
2015/0271183 A1 9/2015 MacGregor et al.
2015/0278820 A1 10/2015 Meadows

(56) References Cited

U.S. PATENT DOCUMENTS

| | | | | |
|---|---|---|---|---|
| 2015/0286995 | A1 | 10/2015 | Korosec | |
| 2015/0287026 | A1 | 10/2015 | Yang et al. | |
| 2015/0294308 | A1 | 10/2015 | Pauker et al. | |
| 2015/0294424 | A1 | 10/2015 | Hakim | |
| 2015/0294425 | A1 | 10/2015 | Benson | |
| 2015/0302357 | A1 | 10/2015 | Chandra | |
| 2015/0302400 | A1 | 10/2015 | Metral | |
| 2015/0302401 | A1 | 10/2015 | Metral | |
| 2015/0302441 | A1 | 10/2015 | Katsuyama et al. | |
| 2015/0302446 | A1 | 10/2015 | Park et al. | |
| 2015/0324764 | A1* | 11/2015 | Van Rooyen | G06Q 20/02 705/69 |
| 2015/0324789 | A1* | 11/2015 | Dvorak | H04L 9/3297 705/67 |
| 2015/0379510 | A1* | 12/2015 | Smith | G06F 21/64 705/71 |
| 2016/0019522 | A1 | 1/2016 | Granbery | |
| 2016/0073279 | A1 | 3/2016 | Johnsson | |
| 2016/0086175 | A1 | 3/2016 | Finlow-Bates | |
| 2016/0210632 | A1 | 7/2016 | Li | |
| 2019/0026146 | A1* | 1/2019 | Peffers | G06F 9/5044 |

FOREIGN PATENT DOCUMENTS

| | | | |
|---|---|---|---|
| CA | 2845648 | A1 | 9/2015 |
| EP | 2820797 | A1 | 1/2015 |
| EP | 2831823 | A1 | 2/2015 |
| EP | 2874112 | A1 | 5/2015 |
| EP | 2896001 | A1 | 7/2015 |
| WO | 2008065345 | A1 | 6/2008 |
| WO | 2012142521 | A2 | 10/2012 |
| WO | 2013078990 | A1 | 6/2013 |
| WO | 2014201059 | A1 | 12/2014 |
| WO | 2015004820 | A1 | 1/2015 |
| WO | 2015016356 | A1 | 2/2015 |
| WO | 2015024129 | A1 | 2/2015 |
| WO | 2015051692 | A1 | 4/2015 |
| WO | 2015058282 | A1 | 4/2015 |
| WO | 2015059669 | A1 | 4/2015 |
| WO | 2015077378 | A1 | 5/2015 |
| WO | 2015085393 | A1 | 6/2015 |
| WO | 2015095761 | A1 | 6/2015 |
| WO | 2015106285 | A1 | 7/2015 |
| WO | 2015113519 | A1 | 8/2015 |
| WO | 2015116998 | A2 | 8/2015 |
| WO | 2015120606 | A1 | 8/2015 |
| WO | 2015134890 | A1 | 9/2015 |
| WO | 2015135018 | A1 | 9/2015 |
| WO | 2015142765 | A1 | 9/2015 |
| WO | 2015143068 | A1 | 9/2015 |
| WO | 2015144971 | A1 | 10/2015 |
| WO | 2015148725 | A2 | 10/2015 |
| WO | 2016025990 | | 2/2016 |

OTHER PUBLICATIONS

Third party submission filed in related U.S. Appl. No. 14/799,242.

"Developer Guide —Bitcoin", Anonymous, May 11, 2015, pp. 1-48.

"On the Privacy Provisions of Bloom Filters in Lightweight Bitcoin Clients", Arthur Gervais et al, International Association For Cryptologic Research, vol. 20141013:202348, Oct. 2014, pp. 1-11.

"Making Sense of Data II, A practical Guide to Data Visualization, Advanced Data Mining Methods and Applications", Glenn Hyatt et al., download from http://www.safanbooksonline.com/library/view/making-sense-of/9780470222805/00 co, Oct. 28, 2018.

European Search Report, dated Feb. 13, 2019 for EP Application No. 16825146.0.

"Crytocurrencies, smart contracts, and artificial intelligence", Steve Omohundro, Dec. 19, 2014, AI Matters, ACM vol. 1, No. 2.

"Smart Oracles: A Simple, Powerful Approach to Smart Contracts? Codius/codius WiKi? GitHub", Jul. 17, 2014, https://github.com/codius/codius/wiki/Smart-Oracles:-A-Simple,-Powerful-Approach-to-Smart-Contracts.

"Distributed Consensus Technologies in Crytocurrency Applications", Francisco Rivera, Jul. 15, 2014.

"Blockchain Electronic Vote Contents", Pierre Noizat et al., Apr. 29, 2015.

Supplementary Search Report dated May 27, 2019 for EP Application No. 16825146.

International Search Report for PCT/US2016/042169 mailed Oct. 5, 2016.

* cited by examiner

EXEMPLARY SFTSP ARCHITECTURE

EXEMPLARY SFTSP ARCHITECTURE

EXEMPLARY SFTSP DEPLOYMENT DIAGRAM

EXEMPLARY SFTSP DEPLOYMENT DIAGRAM

EXEMPLARY SFTSP SINGLE HSM USE CASE

EXEMPLARY SFTSP DUAL HSM USE CASE

EXEMPLARY SFTSP DUAL HSM USE CASE

EXEMPLARY SFTSP DATA FLOW

EXEMPLARY SFTSP DATA FLOW

EXEMPLARY SFTSP DATA FLOW

EXEMPLARY SFTSP SECURE FIRMWARE TRANSACTION SIGNING (SFTS) COMPONENT

EXEMPLARY SFTSP TRANSACTION SERVER TRANSACTION SIGNING (TSTS) COMPONENT

EXEMPLARY SFTSP SECURE FIRMWARE TRANSACTION SIGNING (SFTS) COMPONENT

EXEMPLARY SFTSP DATA MODEL

EXEMPLARY SFTSP DATA MODEL

EXEMPLARY SFTSP AUTHENTICATION MODEL

EXEMPLARY SFTSP AUTHENTICATION USE CASE

EXEMPLARY SFTSP KEY BACKUP MODEL

EXEMPLARY SFTSP KEY BACKUP DATA FLOW

EXEMPLARY SFTSP KEY BACKUP DATA FLOW

EXEMPLARY SFTSP BACKUP UTILITY KEY BACKUP (BUKB) COMPONENT

EXEMPLARY SFTSP SECURE FIRMWARE KEY BACKUP (SFKB) COMPONENT

Evaluation Only. Created with Aspose.Words. Copyright 2003-2017 Aspose Pty Ltd.

| | |
|---|---|
| Secret Share Name: | SEED_SSHARE_KS003_HW_1_0 |
| Keyset ID: | KS003 |
| Wallet Type: | HOT |
| Seed Index: | 1 |
| Secret Share Index: | 0 |

EXEMPLARY SFTSP SCREENSHOT

EXEMPLARY SFTSP SEED SHARES GEOGRAPHIC DISTRIBUTION MODEL

EXEMPLARY SFTSP SEED SHARES IMPLEMENTATION CASE

FIGURE 17

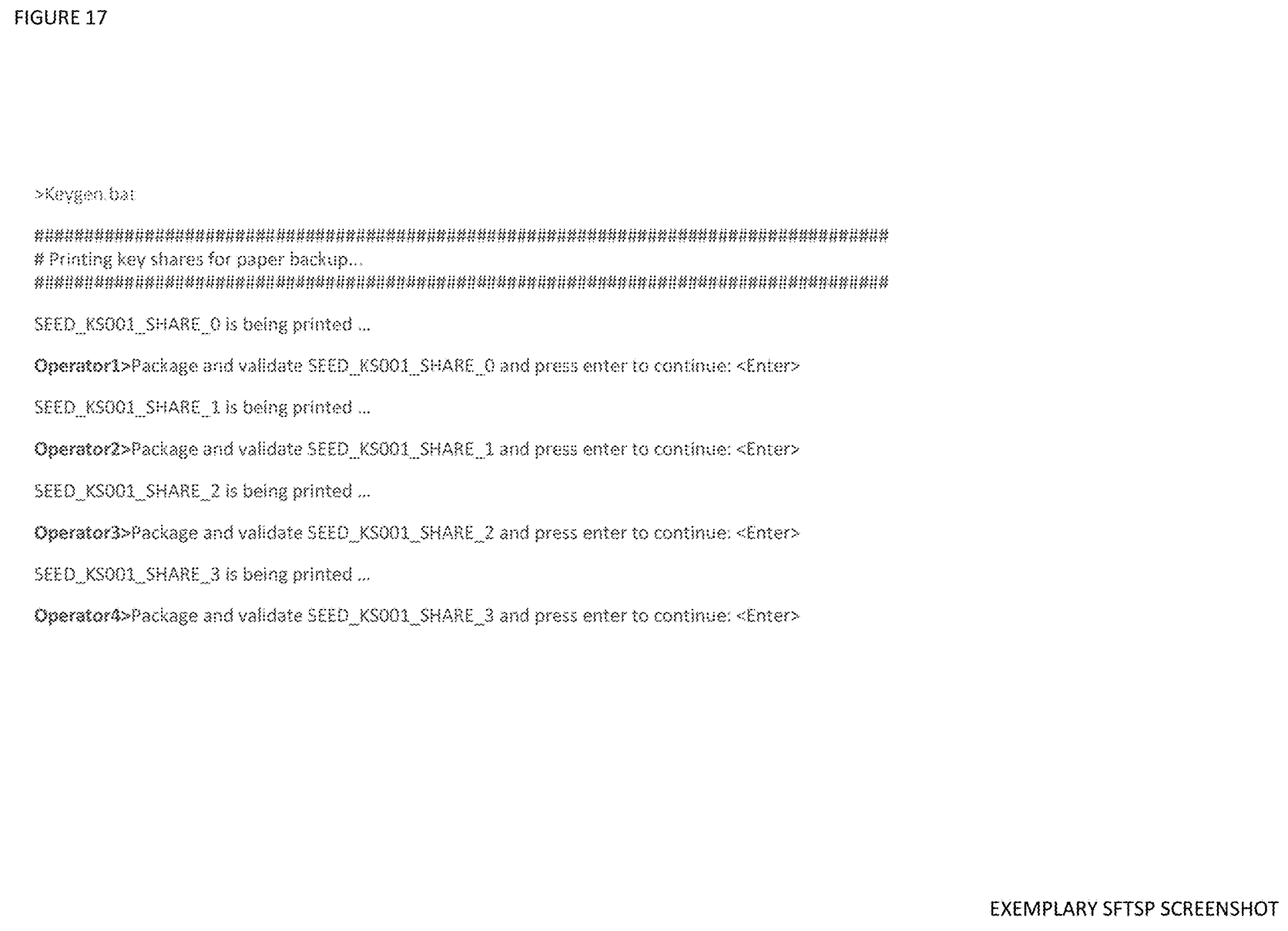

```
>Keygen.bat

##########################################################################################
# Printing key shares for paper backup...
##########################################################################################

SEED_KS001_SHARE_0 is being printed ...

Operator1>Package and validate SEED_KS001_SHARE_0 and press enter to continue: <Enter>

SEED_KS001_SHARE_1 is being printed ...

Operator2>Package and validate SEED_KS001_SHARE_1 and press enter to continue: <Enter>

SEED_KS001_SHARE_2 is being printed ...

Operator3>Package and validate SEED_KS001_SHARE_2 and press enter to continue: <Enter>

SEED_KS001_SHARE_3 is being printed ...

Operator4>Package and validate SEED_KS001_SHARE_3 and press enter to continue: <Enter>
```

EXEMPLARY SFTSP SCREENSHOT

EXEMPLARY SFTSP KEY RECOVERY MODEL

EXEMPLARY SFTSP KEY RECOVERY DATA FLOW

EXEMPLARY SFTSP RECOVERY UTILITY KEY RECOVERY (RUKR) COMPONENT

EXEMPLARY SFTSP SECURE FIRMWARE KEY RECOVERY (SFKR) COMPONENT

FIGURE 22

```
>Keyrecover.bat

################################################################################################
# Recovering key materials from backup shares...
################################################################################################

Recovering seed SEED_KS001_1

Entering secret share 1 out of 2...

Operator1> Enter secret share index: 0

Operator1> Enter secret share value:
0738D75A7D65886E88FBFBC207D7DB3EA16D59D086046D2A842008943E867FFC831B57B0F3649E897B
F28F48EF278EE8D4AA1FE123E85C5A6E5ADA67D82AE2A2DB

Operator2> Enter secret share index again: 0

Operator2> Enter secret share value again:
0738D75A7D65886E88FBFBC207D7DB3EA16D59D086046D2A842008943E867FFC831B57B0F3649E897B
F28F48EF278EE8D4AA1FE123E85C5A6E5ADA67D82AE2A2DB

Entering secret share 2 out of 2...

Operator1> Enter secret share index: 1

Operator1> Enter secret share value:
CB1CDCD5988C8A272058D659FBBE9C6D2F899AD1F3936888A26ABD1C8C6E63AB2C2B179ED2D0A3E21
349642576AFB0E8908D3F5735127D04DC4F28D8737C601212

Operator2> Enter secret share index again: 1

Operator2> Enter secret share value again:
CB1CDCD5988C8A272058D659FBBE9C6D2F899AD1F3936888A26ABD1C8C6E63AB2C2B179ED2D0A3E21
349642576AFB0E8908D3F5735127D04DC4F28D8737C601212

Generating secret shares for seed: SEED_KS001_1

Validating secret shares for seed: SEED_KS001_1
```

EXEMPLARY SFTSP SCREENSHOT

FIGURE 23

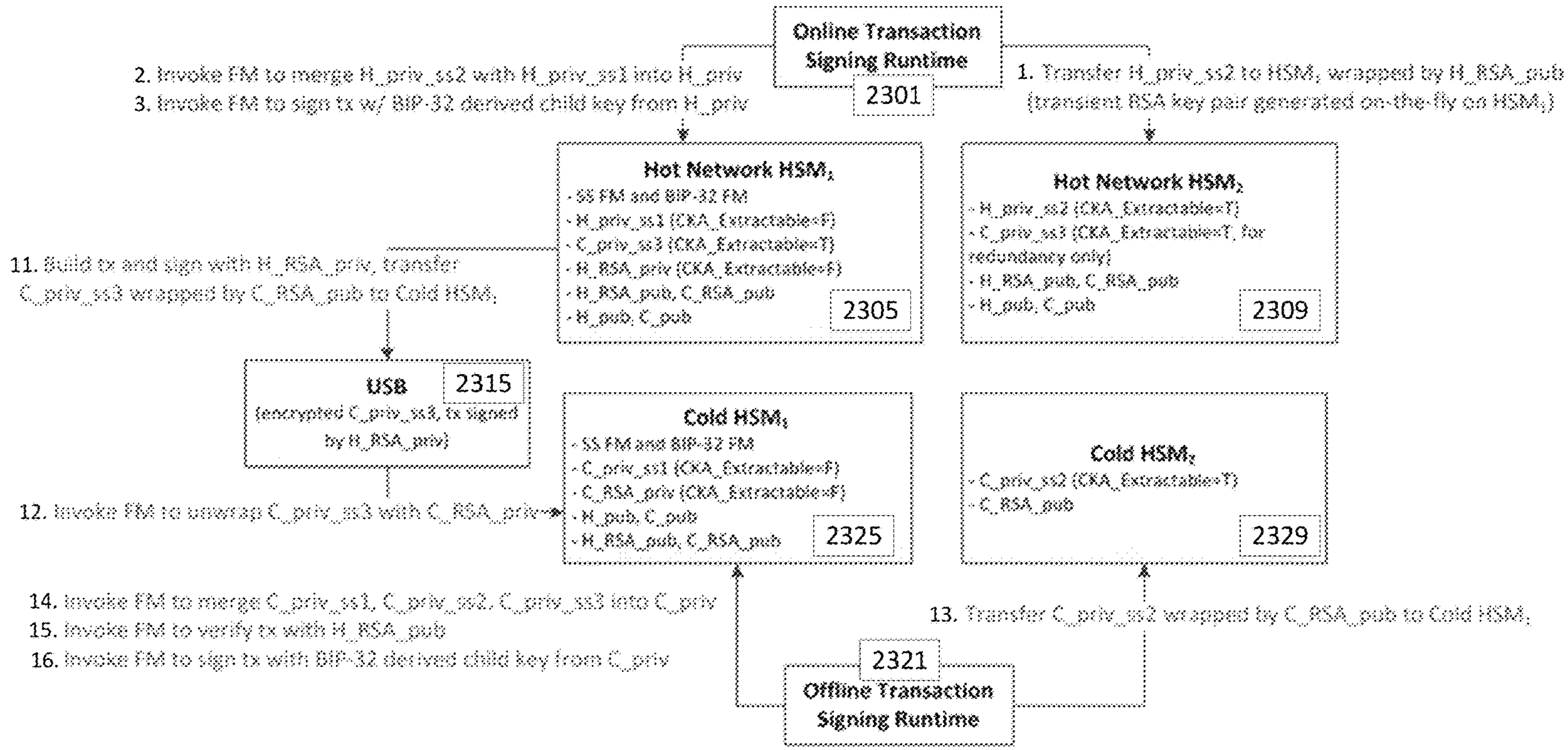

Key objects in hot storage (2-of-2)
- H_priv: hot master private key. Split into shares: H_priv_ss1 & H_priv_ss2
- H_pub: hot master public key (no share)
- H_RSA_priv & H_RSA_pub: transit hot RSA wrapping key pair for key share transfer

Key objects in cold storage (3-of-3)
- C_priv: cold master private key. Split into shares: C_priv_ss1, C_priv_ss2, C_priv_ss3
- C_priv_ss1, C_priv_ss2: offline cold private key shares
- C_priv_ss3: online cold private key share
- C_pub: cold master public key (no share)
- C_RSA_priv & C_RSA_pub: cold RSA wrapping key pair for key share transfer

Runtime signing steps
- 1-3: Online transactions with key shares in hot storage
- 11-16: Offline transactions with key shares in hot & cold storage

EXEMPLARY SFTSP ARCHITECTURE

EXEMPLARY SFTSP DATA FLOW

EXEMPLARY SFTSP DATA FLOW

EXEMPLARY SFTSP TRANSACTION SERVER TRANSACTION SIGNING (TSTS) COMPONENT

EXEMPLARY SFTSP SECURE FIRMWARE TRANSACTION SIGNING (SFTS) COMPONENT

EXEMPLARY SFTSP DATA FLOW

External Storage 2708
Offline TSS Server 2712
First Cold HSM 2714
Second Cold HSM 2716
Cold SFTS Module 2718
9
Transferable Data 2753
10
FTSTS Component 2757
11
Master Key Share Request Message 2761
12
Master Key Share Response Message 2765
13
Offline TS Request Message 2769
14
Cold SFTS API Call 2773
15
CSFTS Component 2777
16
Cold SFTS Response Data 2781
17
Offline TS Response Message 2785
18
Signed Transaction 2789
EXEMPLARY SFTSP DATA FLOW

EXEMPLARY SFTSP DATA FLOW

EXEMPLARY SFTSP ONLINE TRANSACTION SERVER TRANSACTION SIGNING (NTSTS) COMPONENT

EXEMPLARY SFTSP HOT SECURE FIRMWARE TRANSACTION SIGNING (HSFTS) COMPONENT

EXEMPLARY SFTSP OFFLINE TRANSACTION SERVER TRANSACTION SIGNING (FTSTS) COMPONENT

EXEMPLARY SFTSP COLD SECURE FIRMWARE TRANSACTION SIGNING (CSFTS) COMPONENT

EXEMPLARY SFTSP ARCHITECTURE

EXEMPLARY SFTSP CONTRACT DEPLOYMENT ARCHITECTURE

EXEMPLARY SFTSP CONTRACT DEPLOYMENT DATA FLOW

EXEMPLARY SFTSP CONTRACT DEPLOYMENT DATA FLOW

EXEMPLARY SFTSP TRANSACTION SERVER CONTRACT DEPLOYMENT (TSCD) COMPONENT

EXEMPLARY SFTSP SECURE FIRMWARE CONTRACT DEPLOYMENT (SFCD) COMPONENT

EXEMPLARY SFTSP TRANSACTION SIGNING ARCHITECTURE

Client 3802
TSS Server 3806
Database 3810
HSM 3814
SFTS Module 3818
1
Transaction Signing (TS) Request 3821
2
TSCTS Component 3825
3
Contract Data Retrieve Request 3829
4
Contract Data Retrieve Response 3833
5
TS Request Message 3837
6
SFCTS API Call 3841
7
SFCTS Component 3845
8
SFCTS Response Data 3849
EXEMPLARY SFTSP CONTRACT TRANSACTION SIGNING DATA FLOW

EXEMPLARY SFTSP CONTRACT TRANSACTION SIGNING DATA FLOW

EXEMPLARY SFTSP TRANSACTION SERVER CONTRACT TRANSACTION SIGNING (TSCTS) COMPONENT

EXEMPLARY SFTSP SECURE FIRMWARE CONTRACT TRANSACTION SIGNING (SFCTS) COMPONENT

ADDRESS VERIFICATION, SEED SPLITTING AND FIRMWARE EXTENSION FOR SECURE CRYPTOCURRENCY KEY BACKUP, RESTORE, AND TRANSACTION SIGNING PLATFORM APPARATUSES, METHODS AND SYSTEMS

PRIORITY CLAIM

Applicant hereby claims benefit to priority under 35 USC § 120 as a continuation-in-part of U.S. patent application Ser. No. 16/421,442, filed May 23, 2019, entitled "Seed Splitting and Firmware Extension for Secure Cryptocurrency Key Backup, Restore, and Transaction Signing Platform Apparatuses, Methods and Systems"; and which in turn claims benefit to priority under 35 USC § 120 as a continuation-in-part of: U.S. patent application Ser. No. 15/984,280, filed May 18, 2018, entitled "Seed Splitting and Firmware Extension for Secure Cryptocurrency Key Backup, Restore, and Transaction Signing Platform Apparatuses, Methods and Systems"; and which in turn:

- claims benefit to priority under 35 USC § 119 as a non-provisional conversion of U.S. provisional patent application Ser. No. 62/509,011, filed May 19, 2017, entitled "Secure Firmware Transaction Signing Platform Apparatuses, Methods and Systems";
- claims benefit to priority under 35 USC § 120 as a continuation-in-part of U.S. patent application Ser. No. 15/898,224, filed Feb. 15, 2018, entitled "Firmware Extension for Secure Cryptocurrency Key Backup, Restore, and Transaction Signing Platform Apparatuses, Methods and Systems"; and which in turn:
  - claims benefit to priority under 35 USC § 120 as a continuation-in-part of U.S. patent application Ser. No. 15/456,461 filed Mar. 10, 2017, entitled "Secure Firmware Transaction Signing Platform Apparatuses, Methods and Systems";
  - claims benefit to priority under 35 USC § 120 as a continuation-in-part of U.S. patent application Ser. No. 15/210,813, filed Jul. 14, 2016, entitled "Crypto Key Recovery and Social Aggregating, Fractionally Efficient Transfer Guidance, Conditional Triggered Transaction, Datastructures, Apparatuses, Methods and Systems"; and which in turn claims benefit to priority under 35 USC § 119 as a non-provisional conversion of U.S. provisional patent application Ser. No. 62/273,447, filed Dec. 31, 2015, entitled "Social Aggregating, Fractionally Efficient Transfer Guidance, Conditional Triggered Transaction, Datastructures, Apparatuses, Methods and Systems", U.S. provisional patent application Ser. No. 62/273,449, filed Dec. 31, 2015, entitled "Social Aggregating, Fractionally Efficient Transfer Guidance, Conditional Triggered Transaction, Datastructures, Apparatuses, Methods and Systems", U.S. provisional patent application Ser. No. 62/273,450, filed Dec. 31, 2015, entitled "Social Aggregating, Fractionally Efficient Transfer Guidance, Conditional Triggered Transaction, Datastructures, Apparatuses, Methods and Systems", U.S. provisional patent application Ser. No. 62/273,452, filed Dec. 31, 2015, entitled "Social Aggregating, Fractionally Efficient Transfer Guidance, Conditional Triggered Transaction, Datastructures, Apparatuses, Methods and Systems", U.S. provisional patent application Ser. No. 62/273,453, filed Dec. 31, 2015, entitled "Social Aggregating, Fractionally Efficient Transfer Guidance, Conditional Triggered Transaction, Datastructures, Apparatuses, Methods and Systems";

- claims benefit to priority under 35 USC § 120 as a continuation-in-part of: U.S. patent application Ser. No. 15/210,817, filed Jul. 14, 2016, entitled "Crypto Voting and Social Aggregating, Fractionally Efficient Transfer Guidance, Conditional Triggered Transaction, Datastructures, Apparatuses, Methods and Systems"; and which in turn claims benefit to priority under 35 USC § 119 as a non-provisional conversion of: U.S. provisional patent application Ser. No. 62/273,447, filed Dec. 31, 2015, entitled "Social Aggregating, Fractionally Efficient Transfer Guidance, Conditional Triggered Transaction, Datastructures, Apparatuses, Methods and Systems", U.S. provisional patent application Ser. No. 62/273,449, filed Dec. 31, 2015, entitled "Social Aggregating, Fractionally Efficient Transfer Guidance, Conditional Triggered Transaction, Datastructures, Apparatuses, Methods and Systems", U.S. provisional patent application Ser. No. 62/273,450, filed Dec. 31, 2015, entitled "Social Aggregating, Fractionally Efficient Transfer Guidance, Conditional Triggered Transaction, Datastructures, Apparatuses, Methods and Systems", U.S. provisional patent application Ser. No. 62/273,452, filed Dec. 31, 2015, entitled "Social Aggregating, Fractionally Efficient Transfer Guidance, Conditional Triggered Transaction, Datastructures, Apparatuses, Methods and Systems", U.S. provisional patent application Ser. No. 62/273,453, filed Dec. 31, 2015, entitled "Social Aggregating, Fractionally Efficient Transfer Guidance, Conditional Triggered Transaction, Datastructures, Apparatuses, Methods and Systems";
- claims benefit to priority under 35 USC § 120 as a continuation-in-part of: U.S. patent application Ser. No. 15/210,807, filed Jul. 14, 2016, entitled "Smart Rules and Social Aggregating, Fractionally Efficient Transfer Guidance, Conditional Triggered Transaction, Datastructures, Apparatuses, Methods and Systems"; and which in turn claims benefit to priority under 35 USC § 119 as a non-provisional conversion of: U.S. provisional patent application Ser. No. 62/273,447, filed Dec. 31, 2015, entitled "Social Aggregating, Fractionally Efficient Transfer Guidance, Conditional Triggered Transaction, Datastructures, Apparatuses, Methods and Systems", U.S. provisional patent application Ser. No. 62/273,449, filed Dec. 31, 2015, entitled "Social Aggregating, Fractionally Efficient Transfer Guidance, Conditional Triggered Transaction, Datastructures, Apparatuses, Methods and Systems", U.S. provisional patent application Ser. No. 62/273,450, filed Dec. 31, 2015, entitled "Social Aggregating, Fractionally Efficient Transfer Guidance, Conditional Triggered Transaction, Datastructures, Apparatuses, Methods and Systems", U.S. provisional patent application Ser. No. 62/273,452, filed Dec. 31, 2015, entitled "Social Aggregating, Fractionally Efficient Transfer Guidance, Conditional Triggered Transaction, Datastructures, Apparatuses, Methods and Systems", U.S. provisional patent application Ser. No. 62/273,453, filed Dec. 31, 2015, entitled "Social Aggregating, Fractionally Efficient Transfer Guidance, Conditional Triggered Transaction, Datastructures, Apparatuses, Methods and Systems";

claims benefit to priority under 35 USC § 120 as a continuation-in-part of: U.S. patent application Ser. No. 15/210,795, filed Jul. 14, 2016, entitled "Social Aggregating, Fractionally Efficient Transfer Guidance, Conditional Triggered Transaction, Datastructures, Apparatuses, Methods and Systems"; and which in turn claims benefit to priority under 35 USC § 119 as a non-provisional conversion of: U.S. provisional patent application Ser. No. 62/273,447, filed Dec. 31, 2015, entitled "Social Aggregating, Fractionally Efficient Transfer Guidance, Conditional Triggered Transaction, Datastructures, Apparatuses, Methods and Systems", U.S. provisional patent application Ser. No. 62/273,449, filed Dec. 31, 2015, entitled "Social Aggregating, Fractionally Efficient Transfer Guidance, Conditional Triggered Transaction, Datastructures, Apparatuses, Methods and Systems", U.S. provisional patent application Ser. No. 62/273,450, filed Dec. 31, 2015, entitled "Social Aggregating, Fractionally Efficient Transfer Guidance, Conditional Triggered Transaction, Datastructures, Apparatuses, Methods and Systems", U.S. provisional patent application Ser. No. 62/273,452, filed Dec. 31, 2015, entitled "Social Aggregating, Fractionally Efficient Transfer Guidance, Conditional Triggered Transaction, Datastructures, Apparatuses, Methods and Systems", U.S. provisional patent application Ser. No. 62/273,453, filed Dec. 31, 2015, entitled "Social Aggregating, Fractionally Efficient Transfer Guidance, Conditional Triggered Transaction, Datastructures, Apparatuses, Methods and Systems";

claims benefit to priority under 35 USC § 120 as a continuation-in-part of: U.S. patent application Ser. No. 15/210,821, filed Jul. 14, 2016, entitled "Crypto Captcha and Social Aggregating, Fractionally Efficient Transfer Guidance, Conditional Triggered Transaction, Datastructures, Apparatuses, Methods and Systems"; and which in turn claims benefit to priority under 35 USC § 119 as a non-provisional conversion of: U.S. provisional patent application Ser. No. 62/273,447, filed Dec. 31, 2015, entitled "Social Aggregating, Fractionally Efficient Transfer Guidance, Conditional Triggered Transaction, Datastructures, Apparatuses, Methods and Systems", U.S. provisional patent application Ser. No. 62/273,449, filed Dec. 31, 2015, entitled "Social Aggregating, Fractionally Efficient Transfer Guidance, Conditional Triggered Transaction, Datastructures, Apparatuses, Methods and Systems", U.S. provisional patent application Ser. No. 62/273,450, filed Dec. 31, 2015, entitled "Social Aggregating, Fractionally Efficient Transfer Guidance, Conditional Triggered Transaction, Datastructures, Apparatuses, Methods and Systems", U.S. provisional patent application Ser. No. 62/273,452, filed Dec. 31, 2015, entitled "Social Aggregating, Fractionally Efficient Transfer Guidance, Conditional Triggered Transaction, Datastructures, Apparatuses, Methods and Systems", U.S. provisional patent application Ser. No. 62/273,453, filed Dec. 31, 2015, entitled "Social Aggregating, Fractionally Efficient Transfer Guidance, Conditional Triggered Transaction, Datastructures, Apparatuses, Methods and Systems";

claims benefit to priority under 35 USC § 120 as a continuation-in-part of U.S. patent application Ser. No. 14/799,282, filed Jul. 14, 2015, entitled "Point-to-Point Transaction Guidance Apparatuses, Methods and Systems";

claims benefit to priority under 35 USC § 120 as a continuation-in-part of U.S. patent application Ser. No. 14/799,242, filed Jul. 14, 2015, entitled "Point-to-Point Transaction Guidance Apparatuses, Methods and Systems";

claims benefit to priority under 35 USC § 120 as a continuation-in-part of U.S. patent application Ser. No. 14/799,229, filed Jul. 14, 2015, entitled "Point-to-Point Transaction Guidance Apparatuses, Methods and Systems";

claims benefit to priority under 35 USC § 120 as a continuation-in-part of U.S. patent application Ser. No. 14/963,165, filed Dec. 8, 2015, entitled "Social Aggregated Fractional Equity Transaction Partitioned Acquisition Apparatuses, Methods and Systems";

claims benefit to priority under 35 USC § 120 as a continuation-in-part of U.S. patent application Ser. No. 15/019,926, filed Feb. 9, 2016, entitled "Computationally Efficient Transfer Processing and Auditing Apparatuses, Methods and Systems";

claims benefit to priority under 35 USC § 120 as a continuation-in-part of U.S. patent application Ser. No. 15/209,701, filed Jul. 13, 2016, entitled "Point-to-Point Transaction Guidance Apparatuses, Methods and Systems";

claims benefit to priority under 35 USC § 120 as a continuation-in-part of U.S. patent application Ser. No. 15/209,709, filed Jul. 13, 2016, entitled "Point-to-Point Transaction Guidance Apparatuses, Methods and Systems";

claims benefit to priority under 35 USC § 120 as a continuation-in-part of U.S. patent application Ser. No. 15/209,714, filed Jul. 13, 2016, entitled "Point-to-Point Transaction Guidance Apparatuses, Methods and Systems";

claims benefit to priority under 35 USC § 120 as a continuation-in-part of Patent Cooperation Treaty application serial no. PCT/US16/42169, filed Jul. 13, 2016, entitled "Computationally Efficient Transfer Processing, Auditing, and Search Apparatuses, Methods and Systems";

claims benefit to priority under 35 USC § 120 as a continuation-in-part of U.S. patent application Ser. No. 15/210,781, filed Jul. 14, 2016, entitled "Computationally Efficient Transfer Processing, Auditing, and Search Apparatuses, Methods and Systems";

claims benefit to priority under 35 USC § 120 as a continuation-in-part of U.S. patent application Ser. No. 15/486,243, filed Apr. 12, 2017, entitled "Computationally Efficient Transfer Processing, Auditing, and Search Apparatuses, Methods and Systems,".

The entire contents of the aforementioned applications are herein expressly incorporated by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address information technology, and more particularly, include Address Verification, Seed Splitting and Firmware Extension for Secure Cryptocurrency Key Backup, Restore, and Transaction Signing Platform Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Bitcoin is an open source software application and a shared protocol. It allows users to anonymously and instantaneously transact Bitcoin, a digital currency, without needing to trust counterparties or separate intermediaries. Bitcoin achieves this trustless anonymous network using public/private key pairs, a popular encryption technique.

BRIEF DESCRIPTION OF THE DRAWINGS

Appendices and/or drawings illustrating various, non-limiting, example, innovative aspects of the Address Verification, Seed Splitting and Firmware Extension for Secure Cryptocurrency Key Backup, Restore, and Transaction Signing Platform Apparatuses, Methods and Systems (hereinafter "SFTSP") disclosure, include:

FIG. 17 shows a screenshot diagram illustrating embodiments of the SFTSP;

FIG. 22 shows a screenshot diagram illustrating embodiments of the SFTSP;

FIG. 23 shows an exemplary architecture for the SFTSP;

Figure 1A:
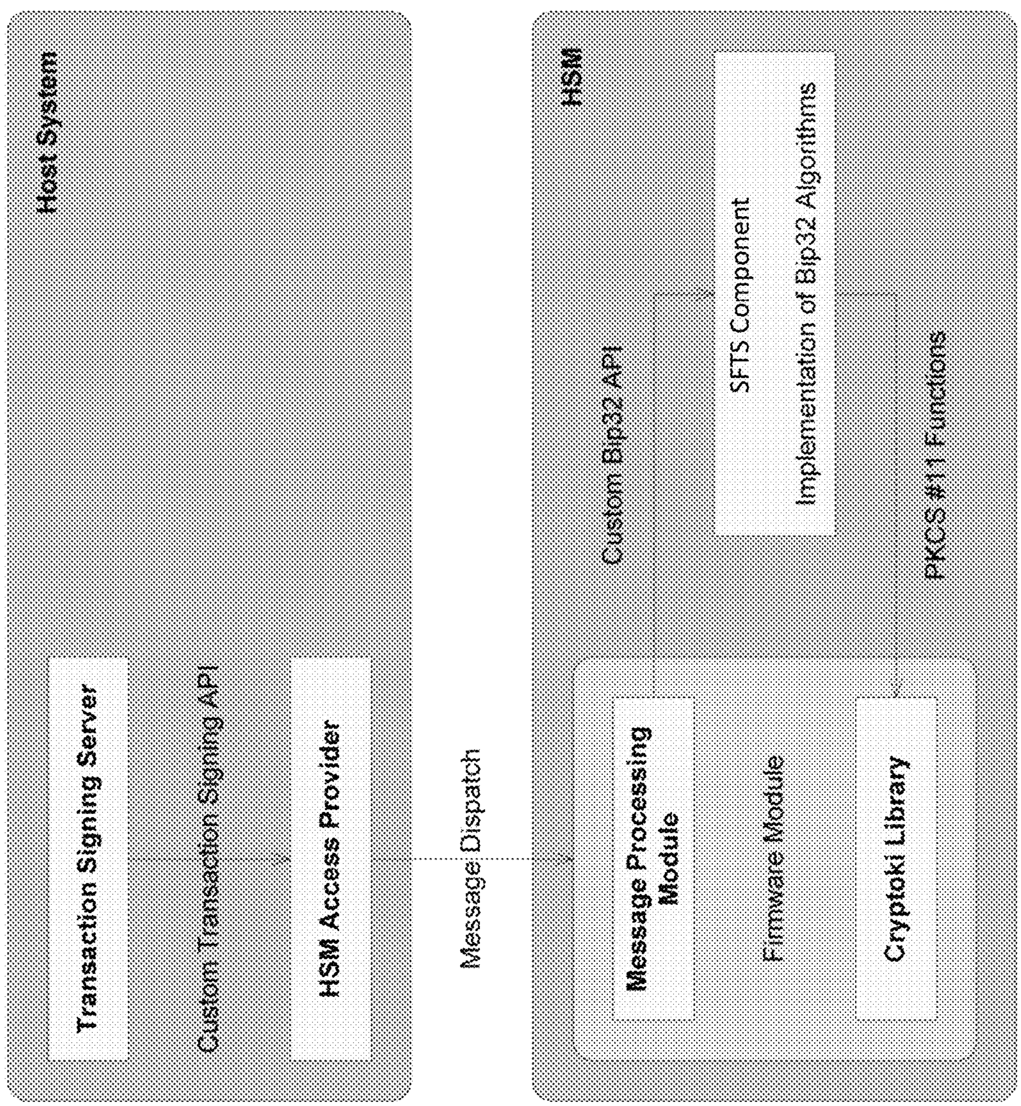
FIGS. 1A-B show exemplary architectures for the SFTSP.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citation and/or reference numbers are not necessarily sequences but rather just example orders that may be rearranged and other orders are contemplated.

DETAILED DESCRIPTION

The Address Verification, Seed Splitting and Firmware Extension for Secure Cryptocurrency Key Backup, Restore, and Transaction Signing Platform Apparatuses, Methods and Systems (hereinafter "SFTSP") transforms contract deployment request, transaction signing request, key backup request, key recovery request inputs, via SFTSP components (e.g., SFTS, BUKB, SFKB, RUKR, SFKR, TSTS, NTSTS, HSFTS, FTSTS, CSFTS, TSCD, SFCD, TSCTS, SFCTS, etc. components), into contract deployment response, transaction signing response, key backup response, key recovery response outputs. The SFTSP components, in various embodiments, implement advantageous features as set forth below.

Introduction

Cryptocurrency (e.g., Bitcoin, Ethereum) funds and appropriate operations on them are intrinsically linked to asymmetric cryptography keys: funds are received at addresses based on public keys and spent using private keys that confirm ownership. Non-trivial Bitcoin wallet implementations operate multiple keys for the following reasons:

a) Operations are published on the Blockchain and become publicly visible
b) Reuse of receiving addresses allows data analysis that leads to identification of actively used addresses with significant funds and compromises the privacy of cryptocurrency transactions
c) An enterprise-hosted wallet structure usually utilizes different accounts for different organizational units and for different purposes A The use of independent keys for each operation, purpose, or organizational unit, aka flat wallets, makes both backing up keys and securing keys very complicated. In order to address this issue, Bitcoin improvement proposal #32 (Bip32) describes a deterministic algorithm that allows the building of a tree of private/public key pairs from a single secret seed (e.g., master key) and allows creation and management of hierarchical deterministic wallets instead of flat ones. Accordingly, by following Bip32:

a) Mapping of addresses for organizational units, particular operations, or purposes to transaction signing keys is done in a predictable manner
b) Securing of persistent keys is reduced to securing the seed
c) Backup and recovery procedures are simplified because the whole hierarchy of keys can be restored from the seed A reliable way (e.g., one of the most secure ways) to store information (e.g., crypto keys) securely is inside a FIPS 140-2-certified hardware security module (HSM) appliance that provides tamper-proof storage of sensitive information. There is no external access to the dynamic memory inside a HSM, and, in some implementations, any attempts to physically access the tamper-proof storage may trigger complete deletion of stored information.

Current industry implementations of wallet and key management systems for secure wallets utilize a (e.g., software-based) Transaction Signing Server (TSS) to implement key derivation and transaction signing procedures. This creates a security threat because private keys, including the master key, are created in TSS memory, where, as the memory of a TSS server does not have strict physical boundaries, they can be stolen by an attacker. Multiple known memory attacks, such as Direct Memory Access (e.g., steal sensitive information directly from the memory) and Core Dump (e.g., cause a system crash and steal information from the memory dump generated during the crash) exist, and, despite existing protective measures and practices, the risk of private keys being stolen from the TSS memory (e.g., by malicious insiders) remains high. Additionally, as there is no reliable way to identify such unauthorized memory access and key theft, keys may be stolen and used at a later time when fund losses associated with those keys are significant.

Further, as cryptographic funds are tightly coupled with cryptographic keys, the loss or theft of keys is identical to the loss of funds. In case of hierarchical deterministic wallets, loss or theft of seeds is identical to the loss or theft of funds associated with keys that can be derived from these seeds. This means that seeds should be backed up reliably and securely. Even though multiple backup copies of HSM devices storing seeds may be created, it is desirable to have distributed hard copies of keys (e.g., paper printouts, metal engravings), which provide means to recover keys in case of severe disasters when not only HSM devices but whole data centers may become unavailable. Regular hardcopies of seeds suffer from the following weaknesses:

a) If stolen, they provide full seeds to an attacker
b) In order to be printed, seeds are extracted from HSMs into a computer's memory in the plain text format and can be stolen using memory targeting attacks
c) While being recovered from hard copies, seeds are processed in a computer's memory in the plain text format and can be stolen using memory targeting attacks
d) While being distributed from one location to another or recovered from hard copies, seeds can be copied and even memorized by the operational staff Thus, even though seeds or private keys may not be exposed outside of HSM during regular cryptographic operations, during key generation, key backup and restore operations, since master seeds have to exist outside of HSM for a period of time before being deposited into bank safety box for safe backup store, there exist attack vectors and seed materials can be compromised.

In one additional embodiment, the SFTSP includes Deterministic Derivation of Cryptocurrency Signing Keys with Split Master Seed and Enforcement of M-of-N Authentication Policy. This supports the SFTSP with innovations in Bitcoin, Ethereum and Blockchain, new service and product offerings in cryptocurrency. It includes splitting Bitcoin or Ethereum master private key into multiple key shares (e.g., into two halves) when stored in FIPS 140-2 Level 3 HSM appliances to achieve combined BIP-32 hierarchical deterministic key derivation for transaction signing and M-of-N authentication enforcement on HSMs. In one implementation, two paired HSMs may be utilized such that a first HSM storing a first master key share receives an encrypted second master key share from a second HSM whose access is controlled by M-of-N authentication policy, and the first HSM decrypts the second master key share and recovers the master private key from the two master key shares. This technique is applied to a Bitcoin cold storage key vault and fund transfer implementation to protect master private keys from physical and/or software key theft and to enforce MofN (e.g., 2-person rule) security policy with regard to accessing the transaction signing capability on HSM.

In one additional embodiment, the SFTSP may be utilized to provide multi-signature support and/or the same secure storage protection as multiple keys for Externally Owned Account (EOA) transactions on Ethereum blockchain. Previously, to support more secure multiple signatures as in Bitcoin, Ethereum smart-contracts have been used. Any smart contract multi-sig implementation carries inherent risk of fund loss and is known to be subject to various attacks, because potential code bugs and vulnerabilities could be introduced in contract Solidity code. Two well-known examples of these types of attacks are Parity Wallet Multi-sig hack and DAO hack. The SFTSP achieves the same secure store with multiple keys in a multi-sig wallet but does so without having the risk of a smart contract to secure Ethereum transactions.

In one additional embodiment, the SFTSP may be utilized to provide wallet address verification for Ethereum multi-sig wallets. Standard EIP-1014 addresses depend only on the contract's bytecode and address of the deploying contract factory. The SFTSP also adds the dependency on keys, controlling multi-signature wallets. The SFTSP may include a deployment procedure of Ethereum multi-signature smart contracts that creates a dependency among addresses of deployed contracts and their owners' public keys, and a verification procedure of proving the legitimacy of wallet addresses owned by the parties controlling owners' key pairs. Thus, the SFTSP increases the level of protection of Ethereum multi-sig wallets by linking wallets' addresses to the existing key infrastructure. In one implementation, the following approach may be utilized:

1. Modify the wallet deployment procedure to make a wallet address dependent on its owners' public keys.
2. Sign wallet addresses with the same owners' private keys as m-sig.
3. Validate wallet addresses during transaction signing:
   Submit wallet address's requests for transactions, involving a particular source and/or destination wallet, along with its signatures obtained in Step 2.
   Validate wallet address's signatures using key materials controlled at the key storage and proceed with signing only if the signatures are valid.
   Require the same number of address signatures as required by the appropriate wallet configuration.

This approach may provide multi-signature enforcement for both transaction signing on transfer of assets and validation of addresses, centrally controlled by the key management and transaction signing system.

SFTSP

FIG. 1A shows an exemplary architecture for the SFTSP. In FIG. 1A, a TSS utilizes a custom transaction signing API via a HSM Access Provider (e.g., a module used to communicate with a HSM) to request transaction signing by a HSM (e.g., Gemalto's SafeNet HSM). The HSM may receive such requests via a message processing module of the HSM's firmware, and respond with signed transactions.

The HSM's firmware module is extended to include a secure firmware transaction signing (SFTS) module, which includes a SFTS component and/or other components (e.g., SFKB, SFKR, HSFTS, CSFTS) and an implementation of Bip32 algorithms. In some implementations, the SFTS module may utilize PKCS #11 API (e.g., via a Cryptoki Library) for message signing and hash generation. In some implementations, the SFTS module may implement high precision mathematical operations either ad hoc or using open source libraries (e.g., OpenSSL). In one embodiment, utilizing an HSM extended with a SFTS module to implement key derivation and transaction signing procedures improves security of hierarchical deterministic wallets.

Figure 1B:
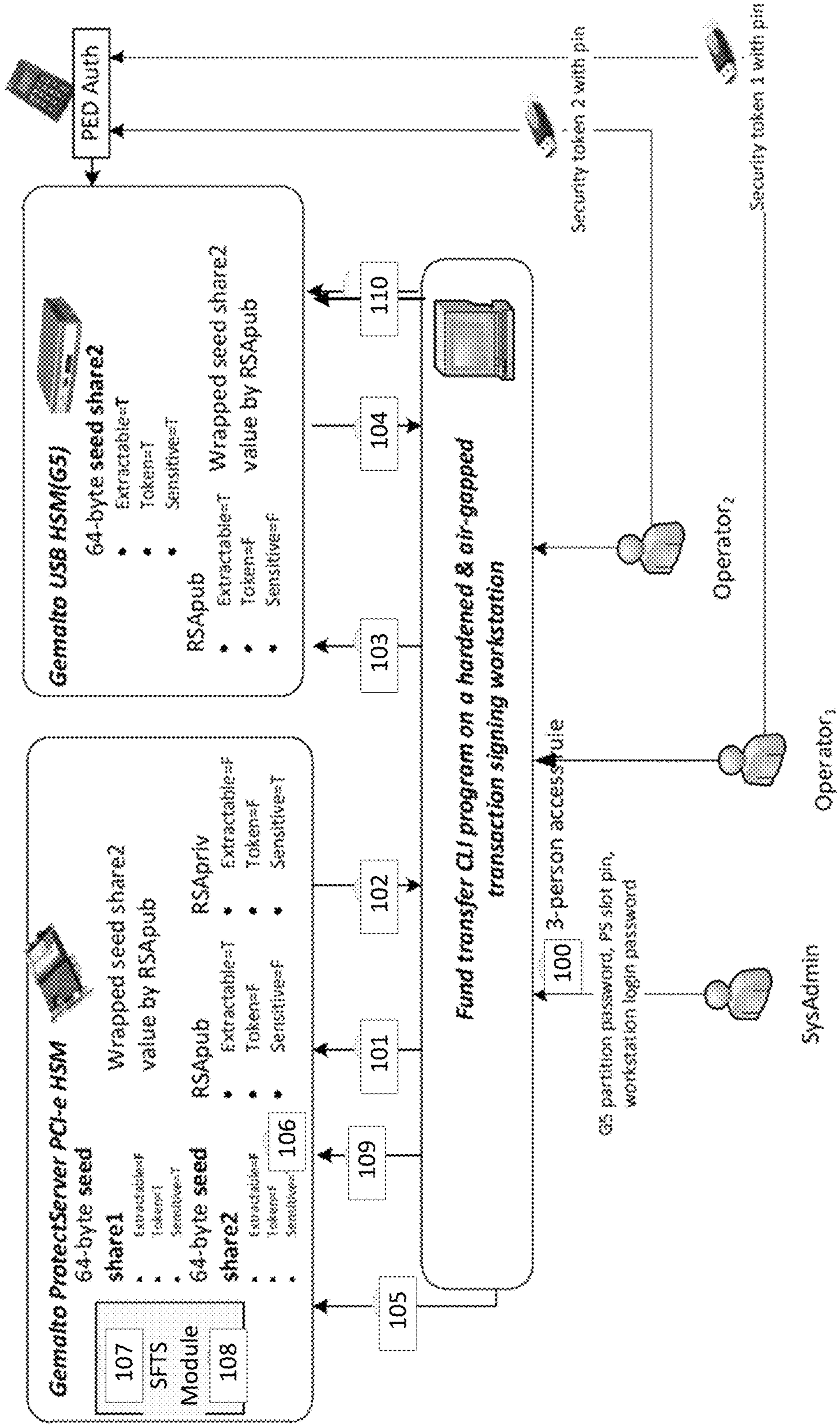

FIG. 1B shows an exemplary architecture for the SFTSP. As shown in FIG. 1B, two master private key (or seed) shares of a master private key (e.g., a 64-byte seed) were generated (e.g., via Shamir's Secret Sharing) and stored on HSMs. Seed share one (e.g., a 64-byte seed share) was generated and/or stored (e.g., with proper attributes) on Gemalto's ProtectServer PCI-e HSM. Seed share two (e.g., a 64-byte seed share) was generated and/or stored (e.g., with proper attributes) on Gemalto's G5 USB HSM. In one implementation, the following PKCS #11 key object attributes may be set:

CKA_EXTRACTABLE=whether a seed share is extractable from and can be wrapped out of HSM CKA_TOKEN=whether a seed share is a permanent or a transient/session object on HSM CKA_SENSITIVE=whether a seed share is readable (e.g., can be revealed in plaintext) outside of HSM For example, attributes for seed share one may be set to make seed share one sensitive and not exportable. In another example, attributes for seed share two may be set to make seed share two sensitive but exportable.

In one implementation, each seed share may be backed up (e.g., using a key backup model described with regard to FIG. 10) and may be recovered independently of other seed shares.

At 100, in order to sign a transaction (e.g., to execute a fund transfer CLI program to transfer funds from a cold wallet to a hot wallet), multiple (e.g., three) operators may have to be present (e.g., physically present) to authenticate to a TSS and/or the HSMs. For example, a system administrator (e.g., SysAdmin) may have to provide a TSS login password, and/or PCI-e HSM slot pin, and/or USB HSM partition password. In another example, two operators (e.g., $Operator_1$ and $Operator_2$) may have to be authenticated to the USB HSM (e.g., via 2-factor authentication process with the first factor being a physical security token and the second factor being a PIN) via an authentication entry device (e.g., a PED) to enforce MofN security policy for exporting seed share two, and/or to the PCI-e HSM (e.g., via a PIN), and/or to the TSS (e.g., via a password).

At 101, an RSA key pair (e.g., a RSA public key RSApub, and a RSA private key RSApriv) may be generated on the PCI-e HSM as wrapping/unwrapping keys. At 102, the public key RSApub may be exported from the PCI-e HSM to RAM of the TSS for the fund transfer CLI program. At 103, the fund transfer CLI program may import the public key RSApub into the USB HSM. At 104, the USB HSM may wrap (e.g., encrypt) seed share two with the wrapping key RSApub and export the wrapped seed share two to RAM of the TSS for the fund transfer CLI program. At 105, the fund transfer CLI program may import the wrapped seed share two into the PCI-e HSM. At 106, the PCI-e HSM may unwrap (e.g., decrypt) the wrapped seed share two with the unwrapping key RSAPriv back to its original byte materials. Proper attribute settings for the unwrapped seed share two may be set. At 107, a method such as Shamir's Secret Sharing may be utilized (e.g., via a SFTS module) to recover the master private key (e.g., from seed share one and seed share two) for BIP-32 hierarchical deterministic key derivation (e.g., via the SFTS module). At 108, the transaction may be signed using the BIP-32 derived private key (e.g., via the SFTS module).

In one implementation, key materials other than seed share one on PCI-e HSM and seed share two on USB HSM are deleted from memory when a session is over (e.g., when the transaction is signed). At 109, RSApub, RSApriv, wrapped seed share two, unwrapped seed share two, the recovered master private key, and the BIP-32 derived private key may be deleted from memory of PCI-e HSM. At 110, RSApub and wrapped seed share two may be deleted from memory of USB HSM and/or TSS.

Figure 2A:
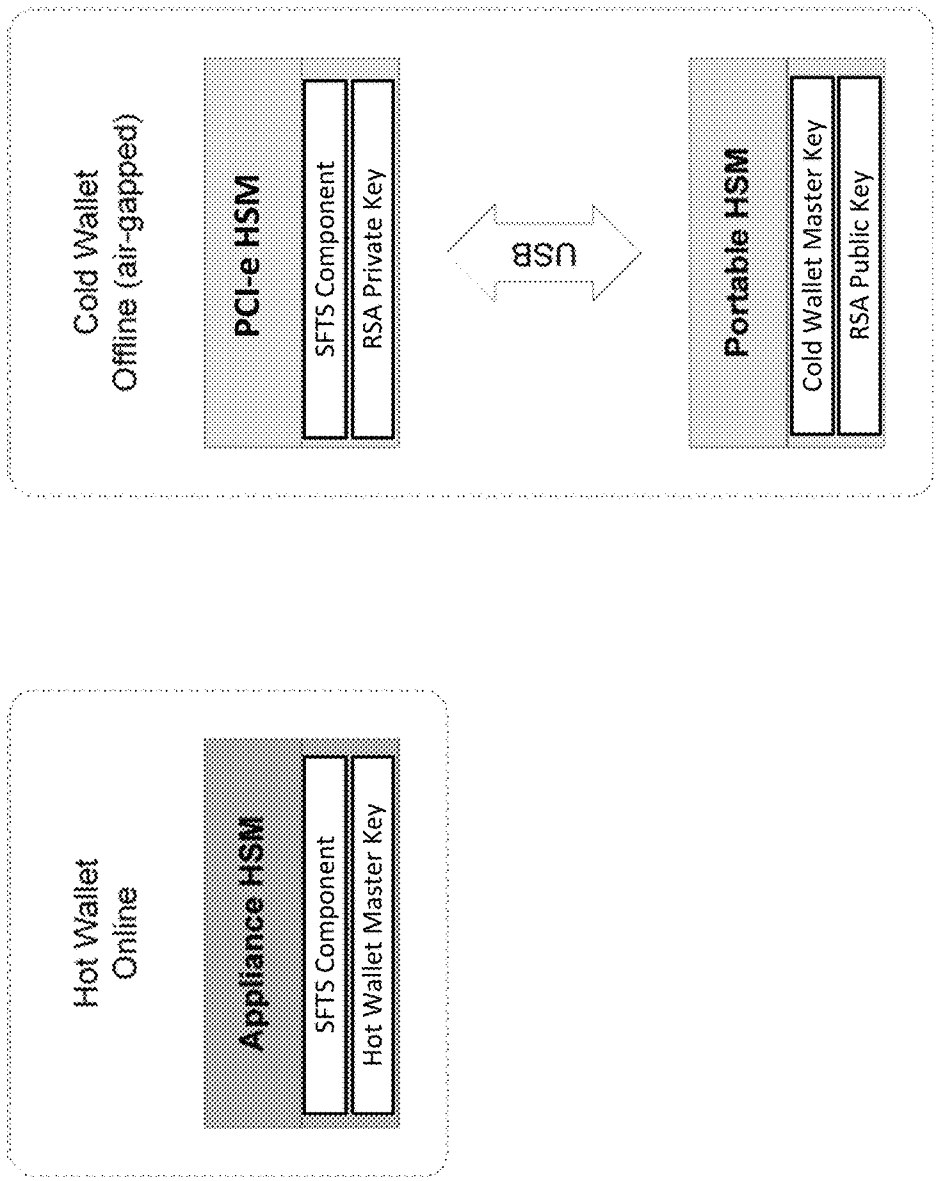
FIGS. 2A-B show exemplary deployment diagrams for the SFTSP.

FIG. 2A shows an exemplary deployment diagram for the SFTSP. In FIG. 2A, a deployment diagram for hot and cold storages of funds (e.g., wallets) is shown. A hot wallet (e.g., holding a small amount of funds for online purchases) is using an online network appliance HSM hosting both a hot wallet master private key and a SFTS component A cold wallet (e.g., holding the majority of funds offline), is using an offline (e.g., PCI-e) HSM hosting a SFTS component and a RSA private key used for decrypting a cold wallet master private key retrieved from a portable HSM. The portable (e.g., USB-connected) HSM hosts the cold wallet master private key and the RSA public key matching the RSA private key stored in the offline (e.g., PCI-e) HSM.

In some embodiments, the SFTSP may protect addresses used for receiving funds in transactions between paired cold and hot wallets. These addresses are derived from master keys in a similar way as the derivation of private keys used for transaction signing. Accordingly, these addresses may be protected if transaction composition code uses addresses generated directly from a HSM to transfer funds between cold and hot wallets.

Figure 2B:
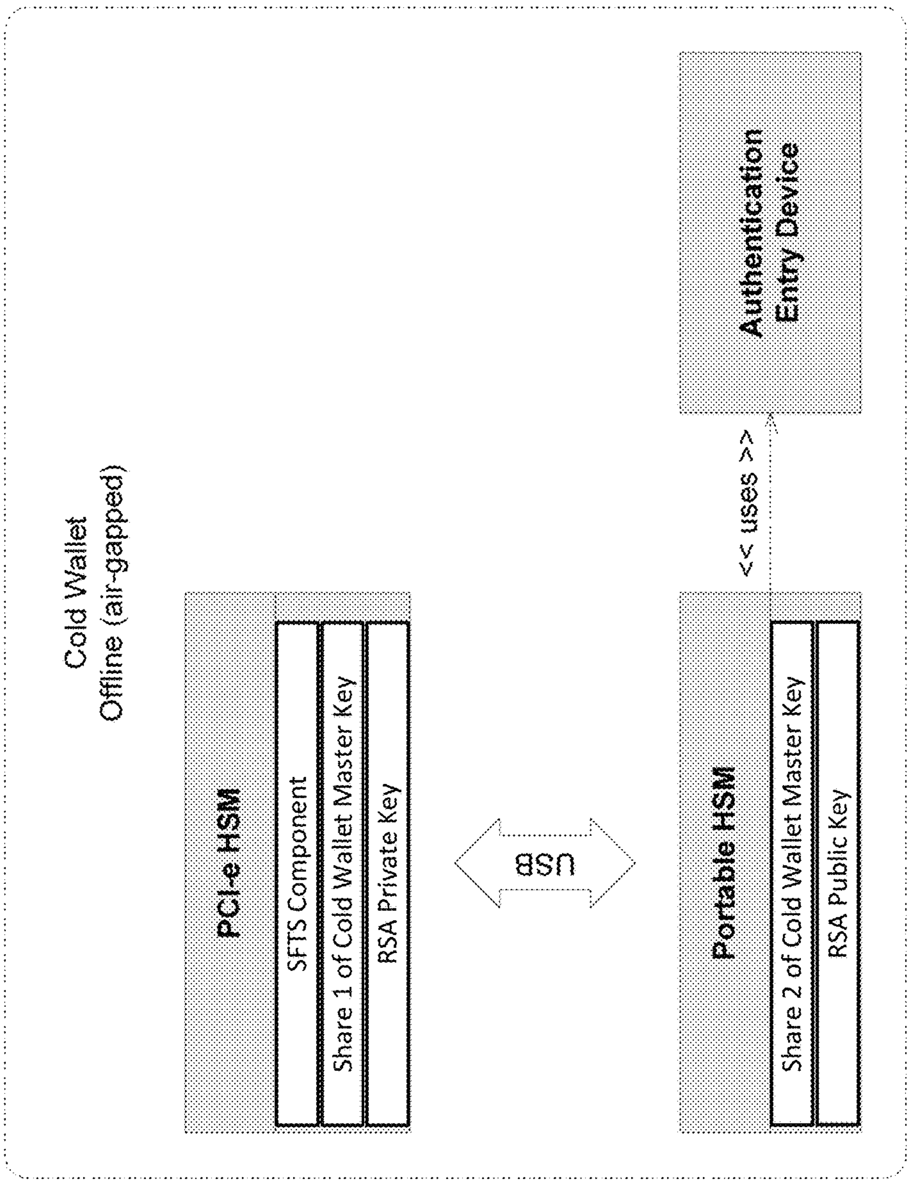

FIG. 2B shows another exemplary deployment diagram for the SFTSP. In FIG. 2B, a deployment diagram for cold storages of funds is shown. A cold wallet (e.g., holding the majority of funds offline), is using an offline (e.g., PCI-e) HSM hosting a SFTS component, a first cold wallet master private key share, and a RSA private key used for decrypting a second cold wallet master private key share retrieved from a portable HSM. The portable (e.g., USB-connected) HSM hosts the second cold wallet master private key share and the RSA public key matching the RSA private key stored in the offline (e.g., PCI-e) HSM. The portable HSM uses an authentication entry device (e.g., a PED) to enforce MofN security policy for exporting the second cold wallet master private key share.

Figure 3:
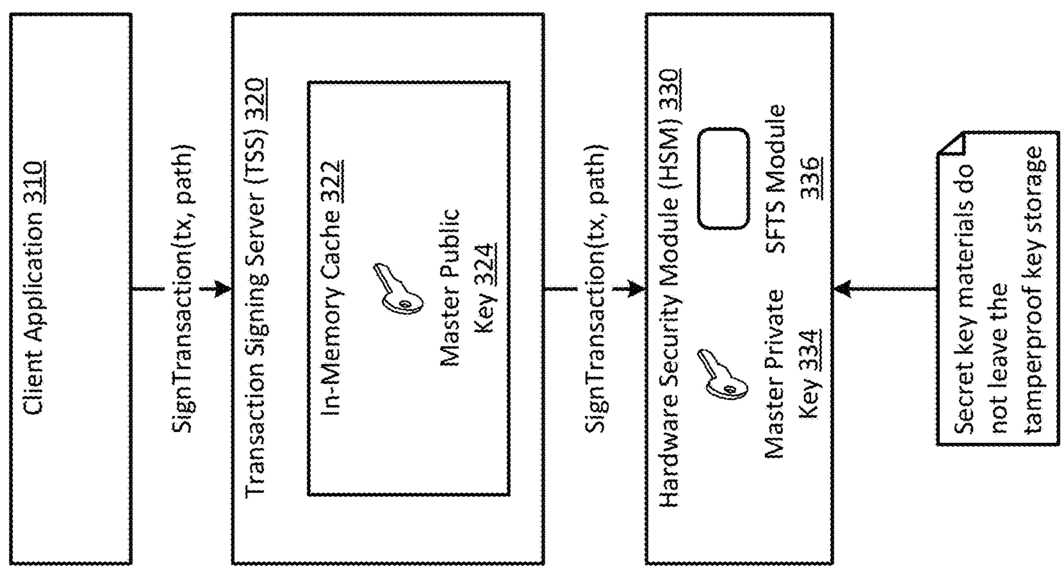
FIG. 3 shows an exemplary single HSM use case for the SFTSP.

FIG. 3 shows an exemplary single HSM use case for the SFTSP. For example, this use case may be utilized for a hot wallet. In FIG. 3, a client application 310 (e.g., utilized by a user via a client device) may send a transaction signing request (e.g., including transaction data to sign and a keychain path to be used for Bip32 key derivation) to a TSS 320. The TSS may include an in-memory cache 322 that stores a master public key 324. For example, the TSS may provide the master public key to the client application, if requested.

The TSS may forward the transaction signing request to a HSM 330. For example, the HSM may be a network-attached HSM. The HSM's tamper-proof storage (e.g., the HSM's firmware) may store a master private key (e.g., an ECDSA private key) 334 and a SFTS module 336. The HSM may utilize the master private key and the SFTS module to sign the transaction, and may respond with a signed transaction (e.g., ECDSA signature in Distinguished Encoding Rules (DER) format). Sensitive operations, such as key derivation and transaction signing, are implemented inside the HSM appliance and master secret key materials do not leave the tamper-proof storage. Tamper-proof storage ensures that secret information is inaccessible to an attacker and that any attempted attack is detected and reported to the appropriate operational group.

Figure 4A:
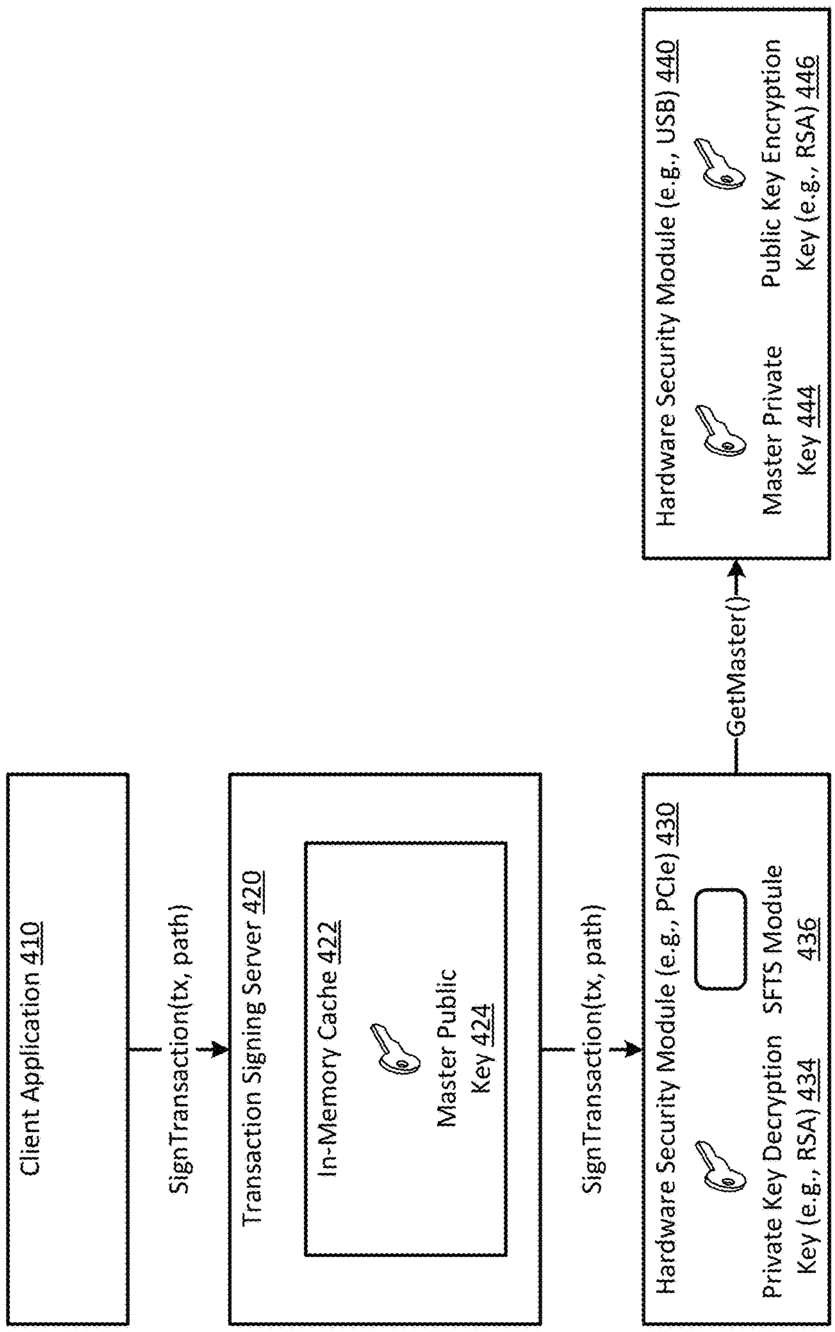
FIGS. 4A-B show exemplary dual HSM use cases for the SFTSP.

FIG. 4A shows an exemplary dual HSM use case for the SFTSP. For example, this use case may be utilized for a cold wallet (e.g., corresponding to the cold wallet shown in FIG. 2A). In FIG. 4A, a client application 410 (e.g., utilized by a user via a client device) may send a transaction signing request (e.g., including transaction data to sign and a keychain path to be used for Bip32 key derivation) to a TSS 420. The TSS may include an in-memory cache 422 that stores a master public key 424. For example, the TSS may provide the master public key to the client application, if requested.

The TSS may forward the transaction signing request to a first HSM 430. For example, the first HSM may be a PCIe HSM (e.g., installed in a TSS (e.g., machine)). The first HSM's tamper-proof storage (e.g., the first HSM's firmware) may store a private key decryption key (e.g., an RSA private key) 434 and a SFTS module 436.

The first HSM may send a get master request to a second HSM 440. For example, the second HSM may be a portable USB HSM. The second HSM's tamper-proof storage (e.g., the second HSM's firmware) may store a master private key (e.g., an ECDSA private key) 444 and a public key encryption key (e.g., an RSA public key that corresponds to the RSA private key stored in the first HSM's tamper-proof storage) 446. In one embodiment, the second HSM may include a split credentials PIN entry device (PED) to provide for multiple-person (e.g., M-of-N) user access rule for HSM activation and/or operation (e.g., 2-of-3 operation enforcement that allows access to the master private key if at least two out of three people provide their separate credentials to the second HSM). See FIGS. 8 and 9 for additional details regarding M-of-N authentication.

The second HSM may encrypt the master private key using the public key encryption key (e.g., associated with the first HSM), and may respond to the get master request by returning the encrypted master private key to the first HSM. The first HSM may decrypt the master private key using the private key decryption key, may utilize the decrypted master private key and the SFTS module to sign the transaction, and may respond with a signed transaction (e.g., ECDSA signature in DER format). Sensitive operations, such as key derivation and transaction signing, are implemented inside the first HSM appliance and secret key materials are encrypted when transferred between the two HSMs.

Figure 4B:
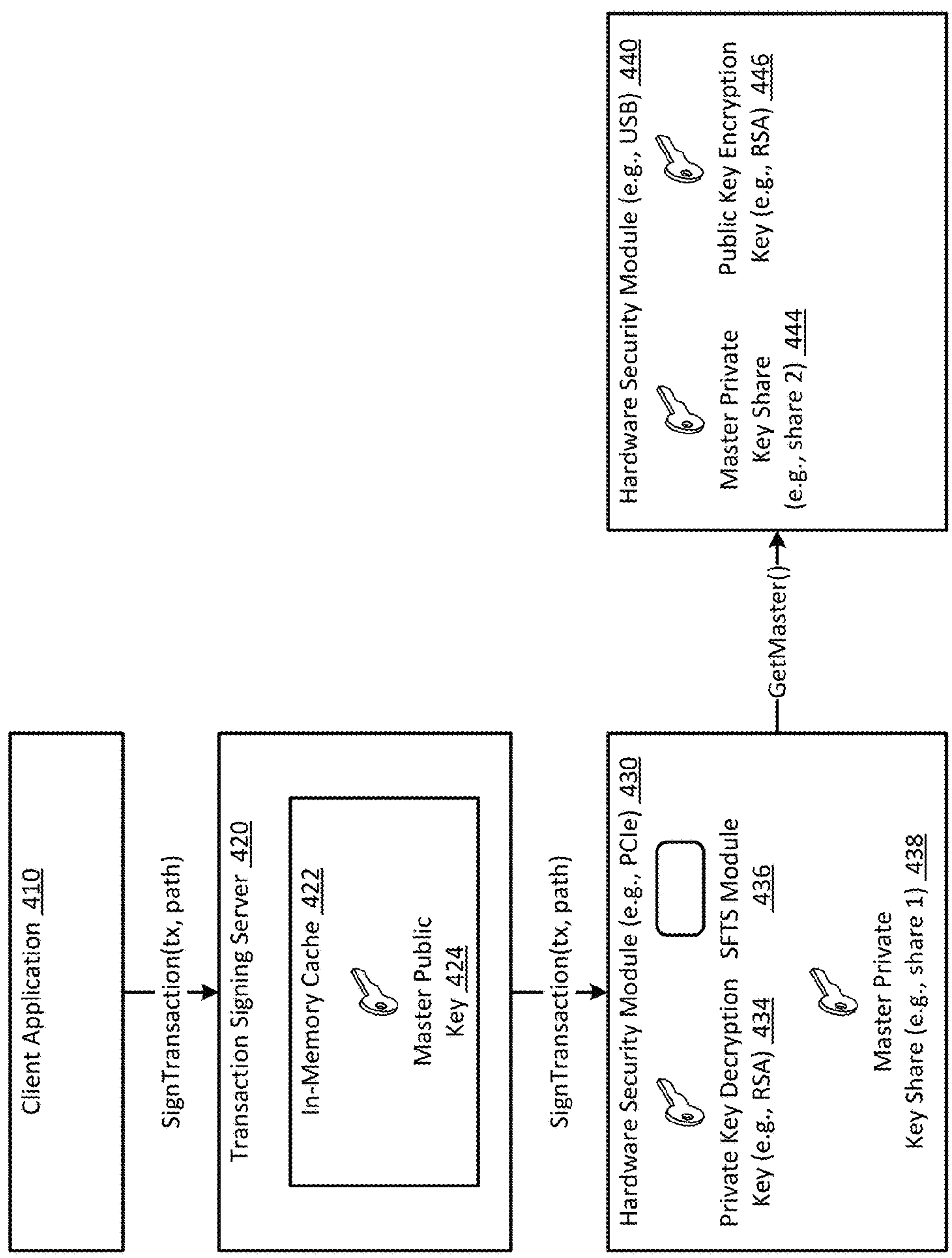

FIG. 4B shows an exemplary dual HSM use case for the SFTSP. For example, this use case may be utilized for a cold wallet (e.g., corresponding to the cold wallet shown in FIG. 2B). In FIG. 4B, a client application 410 (e.g., utilized by a user via a client device) may send a transaction signing request (e.g., including transaction data to sign and a keychain path to be used for Bip32 key derivation) to a TSS 420. The TSS may include an in-memory cache 422 that stores a master public key 424. For example, the TSS may provide the master public key to the client application, if requested.

The TSS may forward the transaction signing request to a first HSM 430. For example, the first HSM may be a PCIe HSM (e.g., installed in a TSS (e.g., machine)). The first HSM's tamper-proof storage (e.g., the first HSM's firmware) may store a private key decryption key (e.g., an RSA private key) 434, a SFTS module 436, and a first master private key share (e.g., an ECDSA private key share) 438.

The first HSM may send a get master request to a second HSM 440. For example, the second HSM may be a portable USB HSM. The second HSM's tamper-proof storage (e.g., the second HSM's firmware) may store a second master private key share (e.g., an ECDSA private key share) 444 and a public key encryption key (e.g., an RSA public key that corresponds to the RSA private key stored in the first HSM's tamper-proof storage) 446. In one embodiment, the second HSM may include a split credentials PIN entry device (PED) to provide for multiple-person (e.g., M-of-N) user access rule for HSM activation and/or operation (e.g., 2-of-3 operation enforcement that allows access to the second master private key share if at least two out of three people provide their separate credentials to the second HSM). See FIGS. 8 and 9 for additional details regarding M-of-N authentication.

The second HSM may encrypt the second master private key share using the public key encryption key (e.g., associated with the first HSM), and may respond to the get master request by returning the encrypted second master private key share to the first HSM. The first HSM may decrypt the second master private key share using the private key decryption key, may utilize the decrypted second master private key share, the first master private key share, any other master private key share(s) (e.g., in implementations where the master private key is split into more than two shares and retrieved from multiple portable HSMs (e.g., to reassemble the master private key from three shares)), and the SFTS module to sign the transaction, and may respond with a signed transaction (e.g., ECDSA signature in DER format). Sensitive operations, such as key derivation and transaction signing, are implemented inside the first HSM appliance and secret key materials are encrypted when transferred between the two HSMs.

Figure 5A:
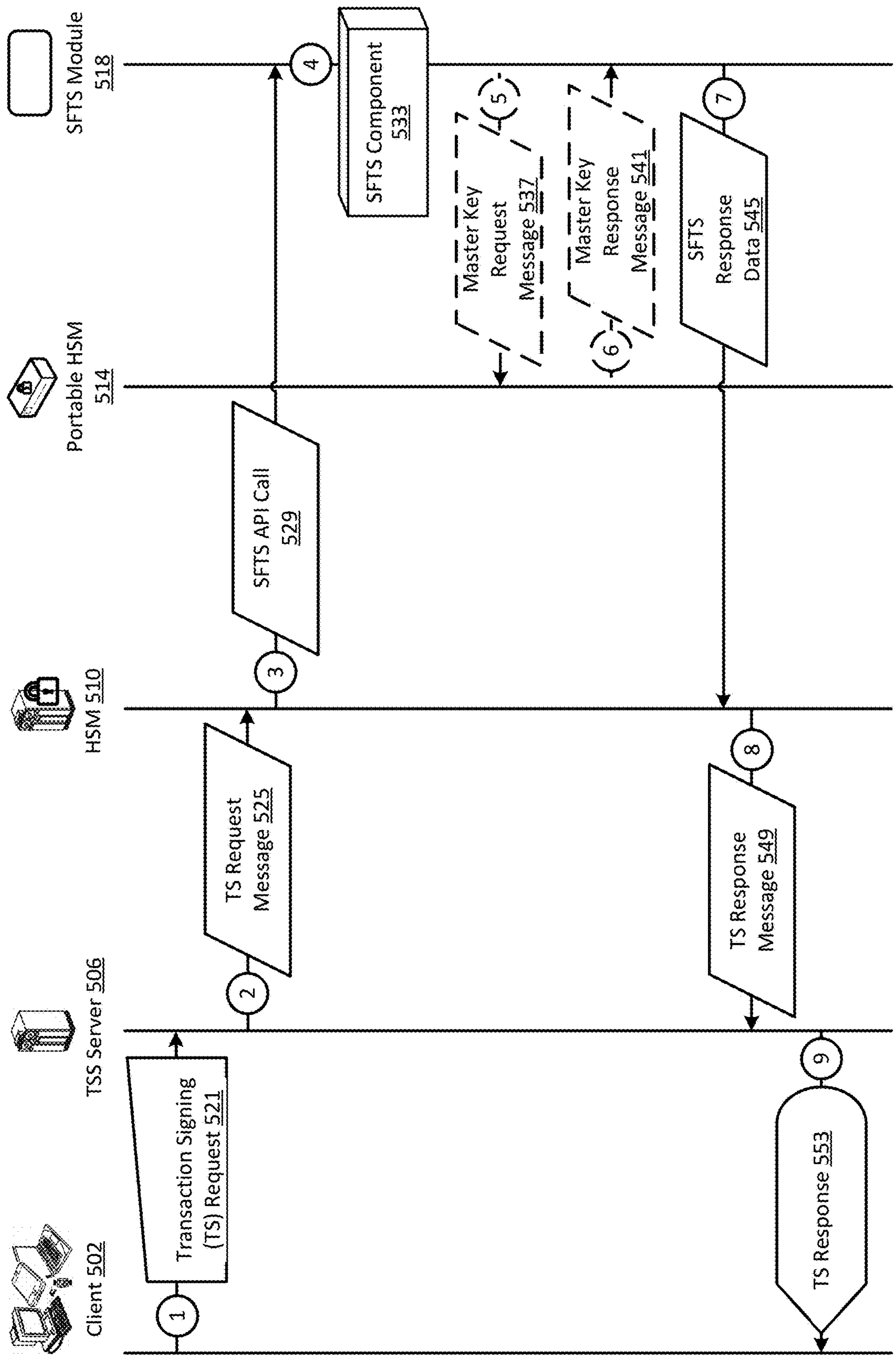
FIG. 5A shows a datagraph diagram illustrating embodiments of a data flow for the SFTSP.

FIG. 5A shows a datagraph diagram illustrating embodiments of a data flow for the SFTSP. In FIG. 5A, dashed lines indicate data flow elements that may be more likely to be optional. In FIG. 5A, a client 502 may send a transaction signing (TS) request 521 to a TSS server 506 to request that a transaction be signed. For example, the client may be a desktop, a laptop, a tablet, a smartphone, and/or the like that is executing a client application. In one implementation, the TS request may include data such as a request identifier, user authentication data, a request type (e.g., sign message hash, get address hash), a wallet identifier, a transaction identifier, a transaction hash, a keychain path, and/or the like. In one embodiment, the client may provide the following example TS request, substantially in the form of a (Secure) Hypertext Transfer Protocol ("HTTP(S)") POST message including eXtensible Markup Language ("XML") formatted data, as provided below

```
POST /authrequest.php HTTP/1.1
Host: www.server.com
Content-Type: Application/XML
Content-Length: 667
<?XML version = "1.0" encoding = "UTF-8"?>
<auth_request>
  <timestamp>2020-12-31 23:59:59</timestamp>
  <user_accounts_details>
    <user_account_credentials>
      <user_name>JohnDaDoeDoeDoooe@gmail.com</account_name>
      <password>abc123</password>
      //OPTIONAL <cookie>cookieID</cookie>
      //OPTIONAL <digital_cert_link>www.mydigitalcertificate.com/
JohnDoeDaDoeDoe@gmail.com/mycertifcate.dc</digital_cert_link>
      //OPTIONAL <digital_certificate>_DATA_</digital_certificate>
    </user_account_credentials>
  </user_accounts_details>
  <TS_request>
```

-continued

```
    <request_identifier>I D_request_1</request_identifier>
    <request_type>SIGN_TRANSACTION</request_type>
    <wallet_identifier>ID_Wallet1</wallet_identifier>
    <transaction_identifier>ID_transaction_1</transaction_identifier>
    <transaction_hash>256-bit hash value to be signed</transaction-
_hash>
    <keychain_path>m/0/0/1/0</keychain_path>
  </TS_request>
</auth_request>
```

The TSS server may send a TS request message 525 to a HSM 510 to request that the HSM sign the transaction. In one implementation, the TS request message may be sent via a HSM Access Provider and may include data such as a request identifier, a request type (e.g., sign message hash, get address hash), a wallet identifier, a transaction hash, a keychain path, and/or the like. For example, the TSS server may provide the following example TS request message, substantially in the form of a HTTP(S) POST message including XML-formatted data, as provided below:

```
POST /TS_request_message.php HTTP/1.1
Host: www.server.com
Content-Type: Application/XML
Content-Length: 667
<?XML version = "1.0" encoding = "UTF-8"?>
<TS_request_message>
  <request_identifier>ID_request_2</request_identifier>
  <request_type>SIGN_TRANSACTION</request_type>
  <wallet_identifier>ID_Wallet1</wallet_identifier>
  <transaction_hash>256-bit hash value to be signed</transaction_hash>
  <keychain_path>m/0/0/1/0</keychain_path>
</TS_request_message>
```

The HSM may make a SFTS API call 529 to a SFTS module 518 to request that the SFTS module sign the transaction. In one implementation, the SFTS API call may include data such as a request type (e.g., sign message hash, get address hash), a wallet identifier, a transaction hash, a keychain path, and/or the like.

Data provided in the SFTS API call may be used by a secure firmware transaction signing (SFTS) component 533 to sign the transaction (e.g., to generate an ECDSA signature in DER format). See FIG. 6A for additional details regarding the SFTS component.

In some embodiments, the SFTS module may send a master key request message 537 to a portable HSM 514 to request a master private key (e.g., for a specified wallet) from the portable HSM. In one implementation, the master key request message may include data such as a request identifier, a calling HSM identifier, a wallet identifier, and/or the like. For example, the SFTS module may provide the following example master key request message, substantially in the form of a HTTP(S) POST message including XML-formatted data, as provided below:

```
POST /master_key_request_message.php HTTP/1.1
Host: www.server.com
Content-Type: Application/XML
Content-Length: 667
<?XML version = "1.0" encoding = "UTF-8"?>
<master_key_request_message>
  <request_identifier>ID_request_3</request_identifier>
  <calling_HSM_identifier>ID_HSM_1</calling_HSM_identifier>
  <wallet_identifier>ID_Wallet1</wallet_identifier>
</master_key_request_message>
```

The portable HSM may provide the encrypted master private key to the SFTS module via a master key response message 541.

The SFTS module may send SFTS response data 545 to the HSM in response to the SFTS API call. In one implementation, the SFTS response data may include an ECDSA signature in DER format.

The HSM may send a TS response message 549 to the TSS server (e.g., via a HSM Access Provider). In one implementation, the TS response message may include data such as a response identifier, a transaction signature, and/or the like. For example, the HSM may provide the following example TS response message, substantially in the form of a HTTP(S) POST message including XML-formatted data, as provided below:

```
POST /TS_response_message.php HTTP/1.1
Host: www.server.com
Content-Type: Application/XML
Content-Length: 667
<?XML version = "1.0" encoding = "UTF-8"?>
<TS_response_message>
   <response_identifier>ID_response_2</response_identifier>
   <transaction_signature>ECDSA signature in DER
format</transaction_signature>
</TS_response_message>
```

The TSS server may send a TS response 553 to the client. In one implementation, the TS response may include data such as a response identifier, a transaction identifier, a transaction signature, and/or the like. For example, the TSS server may provide the following example TS response, substantially in the form of a HTTP(S) POST message including XML-formatted data, as provided below:

```
POST /TS_response.php HTTP/1.1
Host: www.server.com
Content-Type: Application/XML
Content-Length: 667
<?XML version = "1.0" encoding = "UTF-8"?>
<TS_response>
   <response_identifier>ID_response_1</response_identifier>
   <transaction_identifier>ID_transaction_1</transaction_identifier>
   <transaction_signature>ECDSA signature in DER
format</transaction_signature>
</TS_response>
```

Figure 5B:
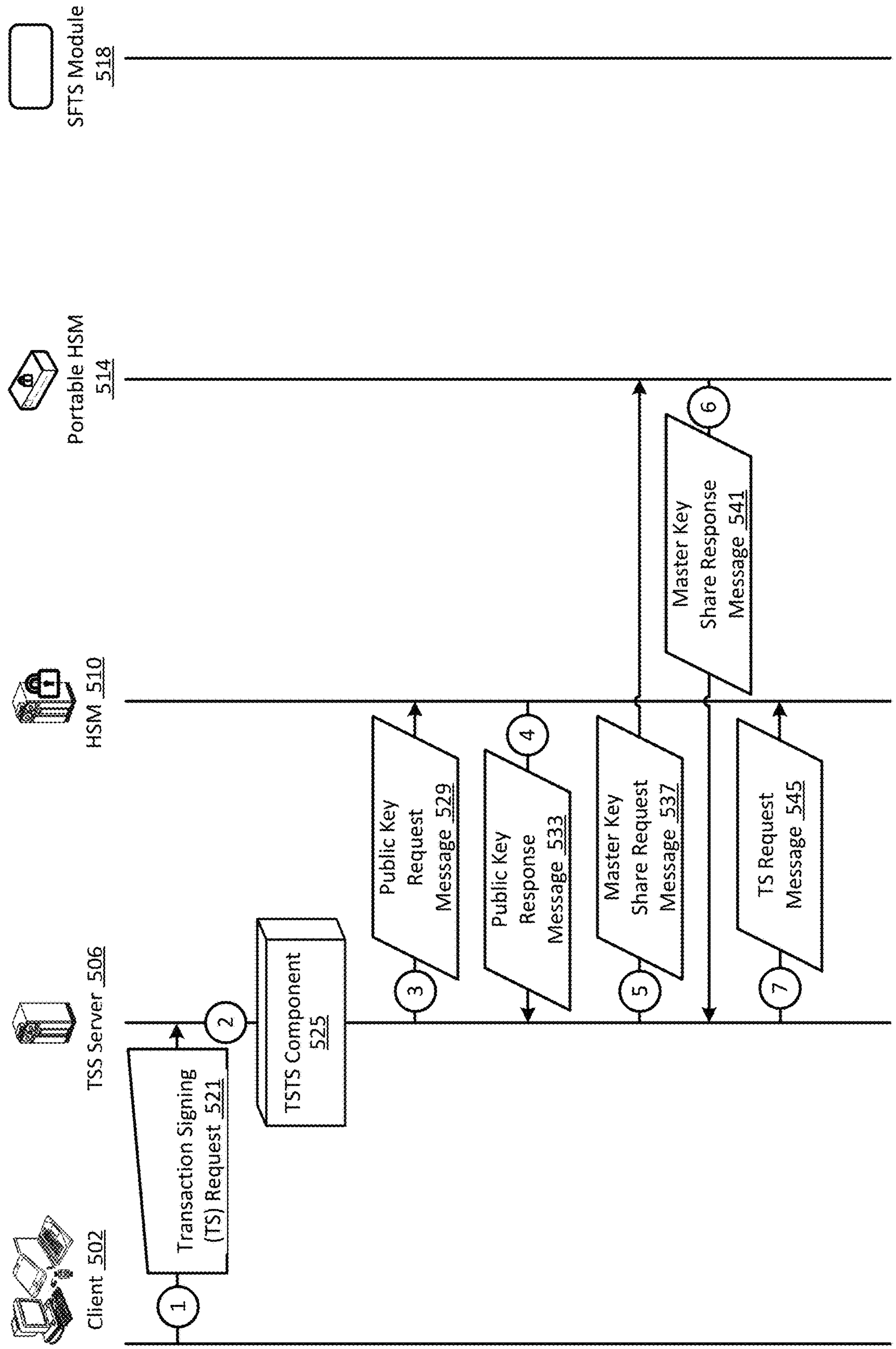
FIGS. 5B-C show a datagraph diagram illustrating embodiments of a data flow for the SFTSP.
Figure 5:
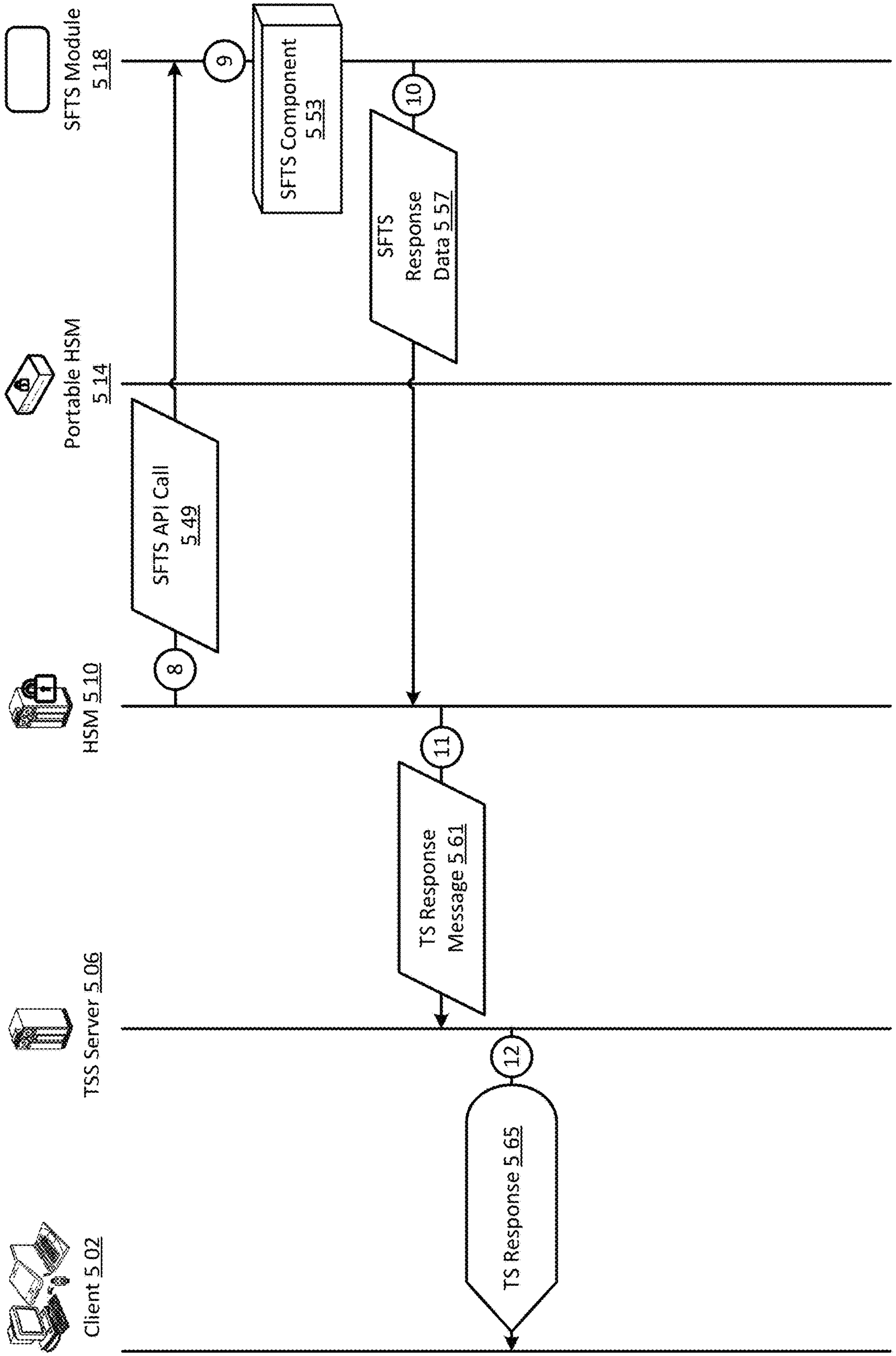

FIGS. 5B-C show a datagraph diagram illustrating embodiments of a data flow for the SFTSP. In FIGS. 5B-C, a client 502 may send a transaction signing (TS) request 521 to a TSS server 506 to request that a transaction be signed. For example, the client may be an air-gapped desktop, a laptop, a tablet, a smartphone, and/or the like that is executing a client application. In one implementation, the TS request may include data such as a request identifier, user authentication data, a request type (e.g., sign message hash, get address hash), a wallet identifier, a transaction identifier, a transaction hash, a keychain path, and/or the like. In one embodiment, the client may provide the following example TS request, substantially in the form of a HTTP(S) POST message including XML-formatted data, as provided below:

```
POST /authrequest.php HTTP/1.1
Host: localhost
Content-Type: Application/XML
Content-Length: 667
<?XML version = "1.0" encoding = "UTF-8"?>
```

-continued

```
<auth_request>
   <timestamp>2020-12-31 23:59:59</timestamp>
   <user_accounts_details>
      <user_account_credentials>
         <user_name>JohnDaDoeDoeDoooe@gmail.com</account_name>
         <password>abc123</password>
         //OPTIONAL <cookie>cookieID</cookie>
         //OPTIONAL <digital_cert_link>www.mydigitalcertificate.com/
JohnDoeDaDoeDoe@gmail.com/mycertifcate.dc</digital_cert_link>
         //OPTIONAL <digital_certificate>_DATA_</digital_certificate>
      </user_account_credentials>
   </user_accounts_details>
   <TS_request>
      <request_identifier>I D_request_1</request_identifier>
      <request_type>SIGN_TRANSACTION</request_type>
      <wallet_identifier>ID_Wallet1</wallet_identifier>
      <transaction_identifier>ID_transaction_1</transaction_identifier>
      <transaction_hash>256-bit hash value to be signed</transaction-
_hash>
      <keychain_path>m/0/0/1/0</keychain_path>
   </TS_request>
</auth_request>
```

A transaction server transaction signing (TSTS) component 525 may utilize parameters provided in the TS request to facilitate transaction signing. See FIG. 6B for additional details regarding the TSTS component.

The TSS server may send a public key request message 529 to a HSM 510 to request a RSA public key from the HSM. In one implementation, the public key request message may be sent via a HSM Access Provider and may include data such as a request identifier, a transaction identifier, and/or the like. In one embodiment, the TSS server may provide the following example public key request message, substantially in the form of a HTTP(S) POST message including XML-formatted data, as provided below:

```
POST /public_key_request_message.php HTTP/1.1
Host: localhost
Content-Type: Application/XML
Content-Length: 667
<?XML version = "1.0" encoding = "UTF-8"?>
   <public_key_request_message>
   <request_identifier>ID_request_2</request_identifier>
   <transaction_identifier>ID_transaction_1</transaction_identifier>
</public_key_request_message>
```

The HSM may provide a RSA public key to the TSS server via a public key response message 533. In one implementation, the public key response message may include data such as a response identifier, a transaction identifier, a RSA public key, and/or the like. In one embodiment, the HSM may provide the following example public key response message, substantially in the form of a HTTP(S) POST message including XML-formatted data, as provided below:

```
POST /public_key_response_message.php HTTP/1.1
Host: localhost
Content-Type: Application/XML
Content-Length: 667
<?XML version = "1.0" encoding = "UTF-8"?>
<public_key_response_message>
   <response_identifier>ID_response_2</response_identifier>
   <transaction_identifier>ID_transaction_1</transaction_identifier>
   <RSA_public_key>RSA public key provided by the
HSM</RSA_public_key>
</public_key_response_message>
```

The TSS server may send a master key share request message 537 to a portable HSM 514 to request an encrypted master key share (e.g., for a specified wallet) from the portable HSM. In one implementation, the master key share request message may include data such as a request identifier, a transaction identifier, a wallet identifier, a RSA public key, and/or the like. In one embodiment, the TSS server may provide the following example master key share request message, substantially in the form of a HTTP(S) POST message including XML-formatted data, as provided below:

```
POST /master_key_share_request_message.php HTTP/1.1
Host: localhost
Content-Type: Application/XML
Content-Length: 667
<?XML version = "1.0" encoding = "UTF-8"?>
<master_key_share_request_message>
```

-continued

```
  <request_identifier>ID_request_3</request_identifier>
  <transaction_identifier>ID_transaction_1</transaction_identifier>
  <wallet_identifier>ID_Wallet1</wallet_identifier>
  <RSA_public_key>RSA public key provided by the
HSM</RSA_public_key>
</master_key_share_request_message>
```

The portable HSM may provide the encrypted master key share to the TSS server via a master key share response message 541. In one implementation, the master key share response message may include data such as a response identifier, a transaction identifier, a wallet identifier, an encrypted master key share, and/or the like. In one embodiment, the portable HSM may provide the following example master key share response message, substantially in the form of a HTTP(S) POST message including XML-formatted data, as provided below:

```
POST /master_key_share_response_message.php HTTP/1.1
Host: localhost
Content-Type: Application/XML
Content-Length: 667
<?XML version = "1.0" encoding = "UTF-8"?>
<master_key_share_response_message>
  <response_identifier>ID_response_3</response_identifier>
  <transaction_identifier>I D_transaction_1</transaction_identifier>
  <wallet_identifier>ID_Wallet1</wallet_identifier>
  <master_key_share>encrypted master key share provided by the portable HSM</master_key_share>
</master_key_share_response_message>
```

The TSS server may send a TS request message 545 to the HSM to request that the HSM sign the transaction. In one implementation, the TS request message may be sent via a HSM Access Provider and may include data such as a request identifier, a request type (e.g., sign message hash, get address hash), a wallet identifier, a transaction identifier, a transaction hash, a keychain path, an encrypted master key share, and/or the like. For example, the TSS server may provide the following example TS request message, substantially in the form of a HTTP(S) POST message including XML-formatted data, as provided below:

```
POST /TS_request_message.php HTTP/1.1
Host: localhost
Content-Type: Application/XML
Content-Length: 667
<?XML version = "1.0" encoding = "UTF-8"?>
<TS_request_message>
  <request_identifier>ID_request_4</request_identifier>
  <request_type>SIGN_TRANSACTION</request_type>
  <wallet_identifier>ID_Wallet1</wallet_identifier>
  <transaction_identifier>ID_transaction_1</transaction_identifier>
  <transaction_hash>256-bit hash value to be signed</transaction_hash>
  <keychain_path>m/0/0/1/0</keychain_path>
  <master_key_share>encrypted master key share provided by the portable HSM</master_key_share>
</TS_request_message>
```

The HSM may make a SFTS API call 549 to a SFTS module 518 to request that the SFTS module sign the transaction. In one implementation, the SFTS API call may include data such as a request type (e.g., sign message hash, get address hash), a wallet identifier, a transaction identifier, a transaction hash, a keychain path, an encrypted master key share, and/or the like.

Data provided in the SFTS API call may be used by a secure firmware transaction signing (SFTS) component 553 to determine a master private key from master key shares and to sign the transaction (e.g., to generate an ECDSA signature in DER format). See FIG. 6C for additional details regarding the SFTS component.

The SFTS module may send SFTS response data 557 to the HSM in response to the SFTS API call. In one implementation, the SFTS response data may include an ECDSA signature in DER format.

The HSM may send a TS response message 561 to the TSS server (e.g., via a HSM Access Provider). In one implementation, the TS response message may include data such as a response identifier, a transaction identifier, a transaction signature, and/or the like. For example, the HSM may provide the following example TS response message, substantially in the form of a HTTP(S) POST message including XML-formatted data, as provided below:

```
POST /TS_response_message.php HTTP/1.1
Host: localhost
Content-Type: Application/XML
Content-Length: 667
<?XML version = "1.0" encoding = "UTF-8"?>
<TS_response_message>
  <response_identifier>ID_response_4</response_identifier>
  <transaction_identifier>I D_transaction_1</transaction_identifier>
  <transaction_signature>ECDSA signature in DER
format</transaction_signature>
</TS_response_message>
```

The TSS server may send a TS response 565 to the client In one implementation, the TS response may include data such as a response identifier, a transaction identifier, a transaction signature, and/or the like. For example, the TSS server may provide the following example TS response, substantially in the form of a HTTP(S) POST message including XML-formatted data, as provided below:

```
POST /TS_response.php HTTP/1.1
Host: www.server.com
Content-Type: Application/XML
```

-continued

```
Content-Length: 667
<?XML version = "1.0" encoding = "UTF-8"?>
<TS_response>
  <response_identifier>I D_response_1</response_identifier>
  <transaction_identifier>I D_transaction_1</transaction_identifier>
  <transaction_signature>ECDSA signature in DER
format</transaction_signature>
</TS_response>
```

Figure 6A:
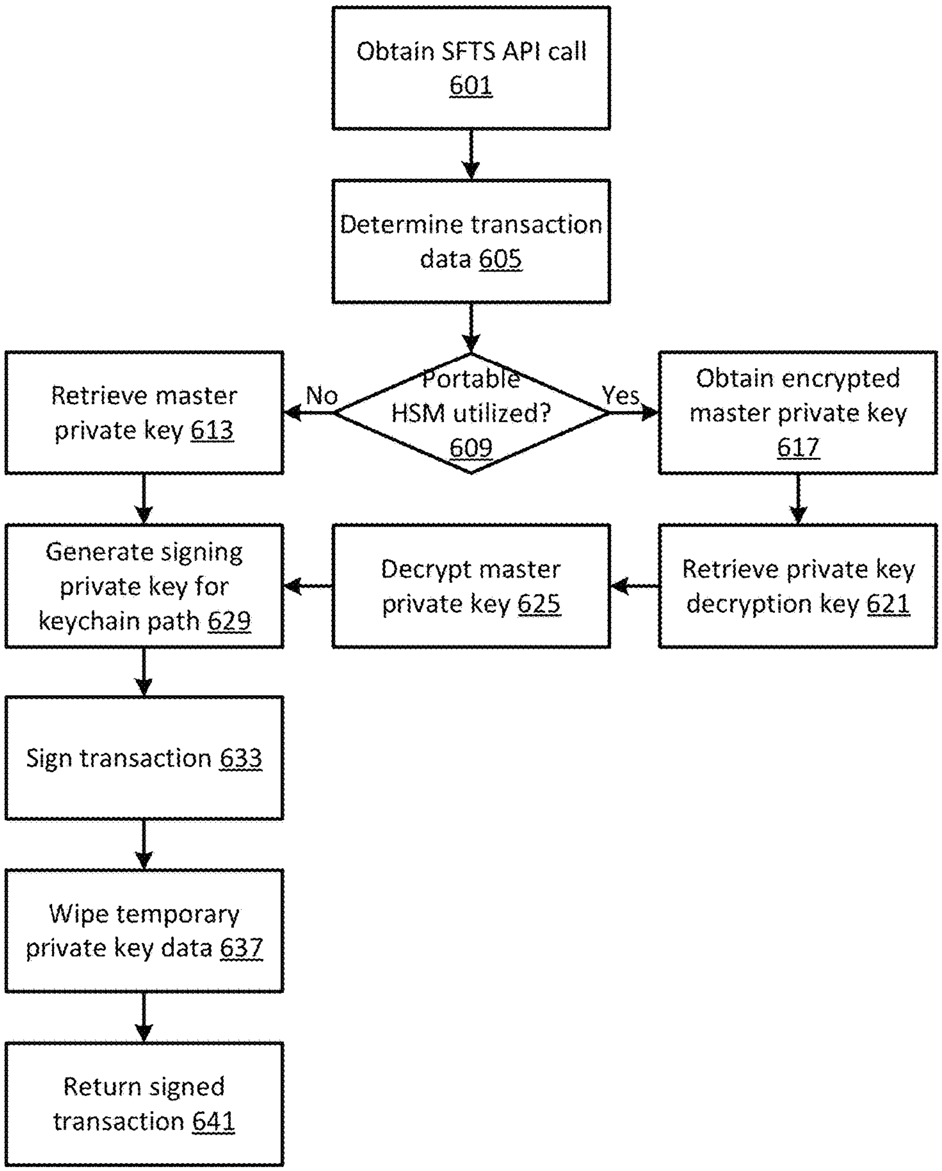
FIG. 6A shows a logic flow diagram illustrating embodiments of a secure firmware transaction signing (SFTS) component for the SFTSP.

FIG. 6A shows a logic flow diagram illustrating embodiments of a secure firmware transaction signing (SFTS) component for the SFTSP. In FIG. 6A, a SFTS API call may be obtained at 601. For example, the SFTS API call may be obtained as a result of a call from a HSM associated with the SFTS component. It is to be understood that although the SFTS component is described with regard to an API method to sign a transaction (e.g., signMessageHash), in some embodiment, a variety of API methods may be available. In one embodiment, the following API methods may be available to the HSM and/or to a TSS:

```
signMessageHash - this method receives a message hash and a keychain path and returns an ECDSA
signature value. Key derivation steps are implemented by the SFTS component. Temporary keys generated
for signing are wiped out of the device once the signing process is complete.
    Input:
            256-bit hash value to be signed
            keychain path to be used for Bip32 key derivation
    Output:
            ECDSA signature in DER format
getAddressHash - this method returns a public Pay-to-Script-Hash (P2SH) address generated for a given
keychain path. SFTS component code uses N extended master public keys stored inside the HSM,
generates N public keys corresponding to the provided keychain path, and generates a Bitcoin address that
can be used for receiving funds.
    Input:
            keychain path to be used for Bip32 key derivation
    Output:
            P2SH hash value that can be converted by the requesting application (e.g., client application)
into a Bitcoin address in the appropriate format (e.g., main Bitcoin network, Testnet, etc.)
```

Transaction data may be determined at 605. In one implementation, the transaction data may be provided in the SFTS API call and may include a wallet identifier, a transaction hash, a keychain path, and/or the like.

A determination may be made whether a portable HSM is being utilized to sign the transaction. For example, a portable HSM may not be utilized for a hot wallet transaction. In another example, a portable HSM may be utilized for a cold wallet transaction. In one implementation, this determination may be made by checking a setting associated with the HSM.

If a portable HSM is not being utilized, a master private key may be retrieved at 613. In one implementation, the master private key may be determined using a PKCS #11 function (e.g., C_FindObjectsInit( . . . )). In another implementation, the master private key may be determined via an internal call on a HSM environment setting configured externally at HSM deployment time.

If a portable HSM is being utilized, an encrypted master private key may be obtained at 617. In one implementation, the portable HSM may be queried to obtain the encrypted private master key. For example, the private master key may be encrypted using a public key encryption key (e.g., associated with the HSM) stored by the portable HSM. A private key decryption key for the HSM may be retrieved at 621. In one implementation, the private key decryption key may be determined using a PKCS #11 function (e.g., C_FindObjectsInit( . . . )). In another implementation, the private key decryption key may be determined via an internal call on a HSM environment setting configured externally at HSM deployment time.

Although one may choose to use the above to determine the master private key and/or the private key decryption key, in an alternative embodiment, the master private key and/or the private key decryption key may be determined via a MySQL database command (e.g., retrieved from a MySQL database in tamper-proof storage).

The encrypted master private key may be decrypted at 625 using the retrieved private key decryption key.

A signing private key for the specified keychain path may be generated at 629. In one implementation, the signing private key may be generated in accordance with a deterministic key derivation procedure as described in Bip32. The transaction may be signed at 633. In one implementation, the generated signing private key may be used to sign the transaction hash in accordance with the hashing algorithm utilized by the Bitcoin protocol (e.g., RIPE160(SHA256 (SHA256(message)))).

Temporary private key data may be wiped from memory at 637. In one implementation, the master private key obtained from the portable HSM and/or the generated signing private key may be wiped from memory of the HSM associated with the SFTS component. The signed transaction may be returned at 641. In one implementation, the Elliptic Curve Digital Signature Algorithm (ECDSA) signature in DER format may be returned.

Figure 6B:
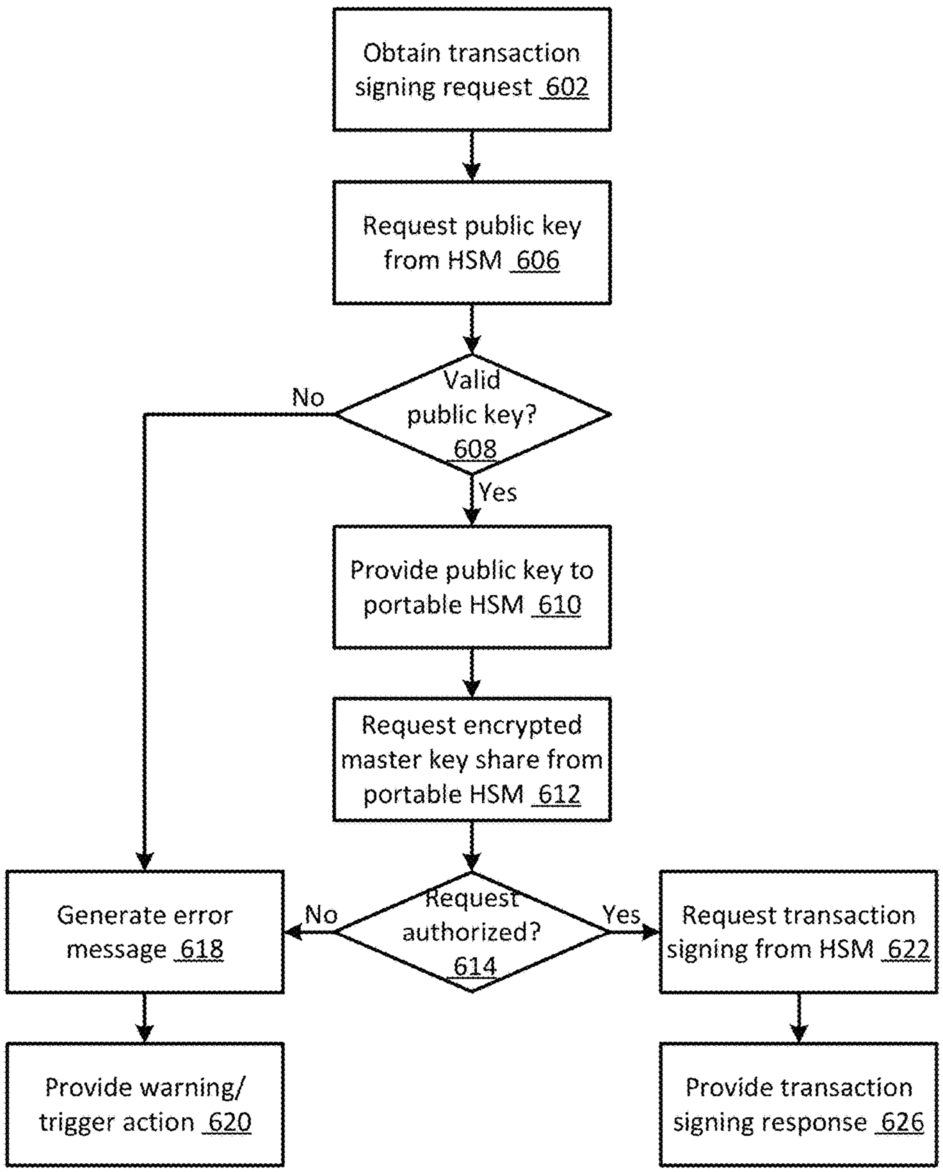
FIG. 6B shows a logic flow diagram illustrating embodiments of a transaction server transaction signing (TSTS) component for the SFTSP.
Figure 6:
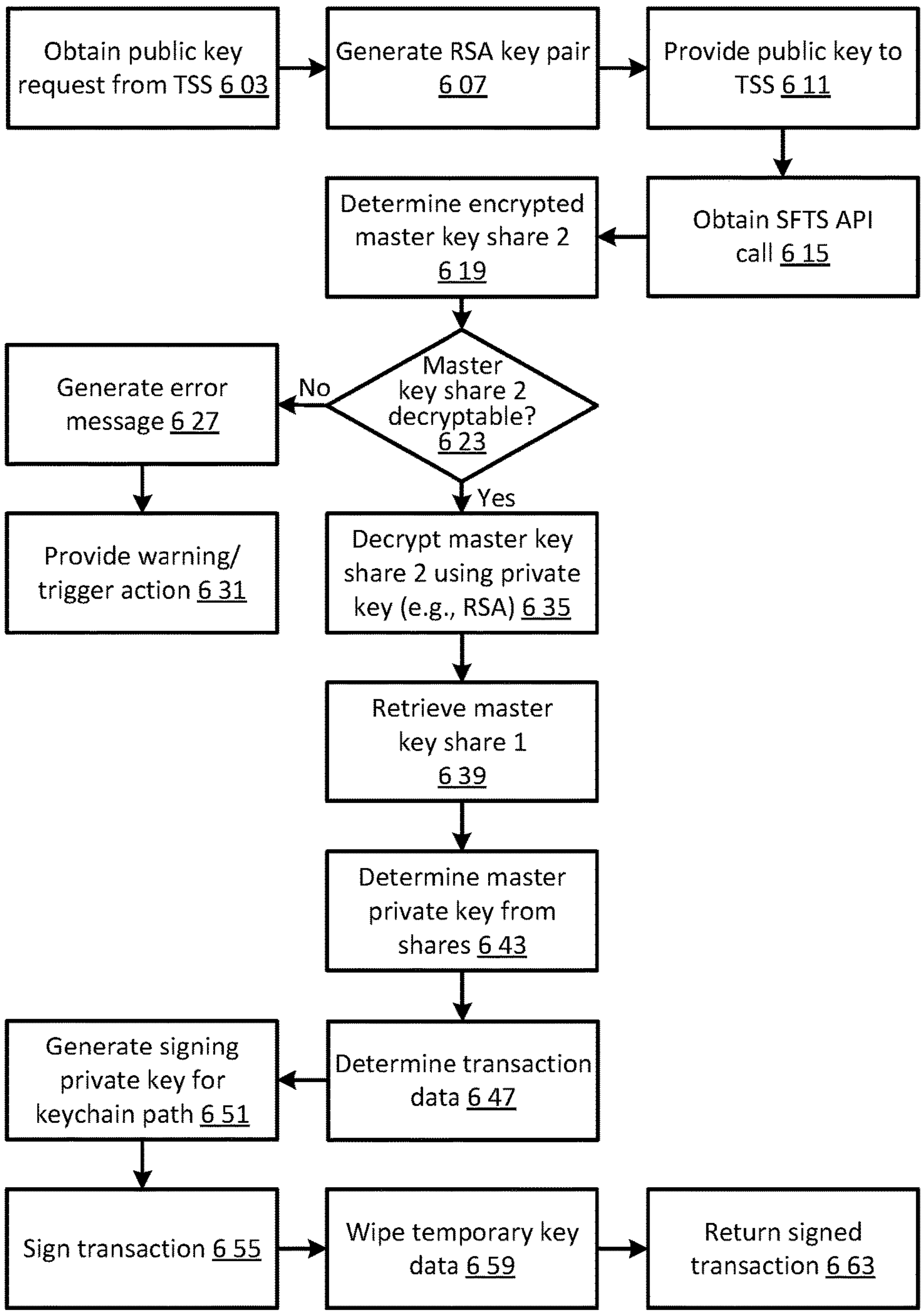
FIG. 6C shows a logic flow diagram illustrating embodiments of a secure firmware transaction signing (SFTS) component for the SFTSP.

FIG. 6B shows a logic flow diagram illustrating embodiments of a transaction server transaction signing (TSTS) component for the SFTSP. In FIG. 6B, a transaction signing request may be obtained at 602. For example, the transaction signing request may be obtained as a result of a user utilizing a UI of a fund transfer CLI program to initiate transaction signing (e.g., a fund transfer) using a master key associated with a hierarchical deterministic wallet.

A RSA public key may be requested from a HSM at 606. In one implementation, a public key request message may be sent to the HSM to request the RSA public key.

A determination may be made at 608 whether the obtained RSA public key is valid. For example, the fund transfer program may be configured to work with a specified set of HSMs, and the obtained RSA public key may have to be associated with one of the specified HSMs to be valid.

If the obtained RSA public key is not valid, an error message may be generated at 618. For example, the error message may specify the error that occurred (e.g., RSA public key is not valid). A warning message may be provided to the user and/or an action may be triggered at 620. In one implementation, a warning message based on the generated error message may be provided to the user to inform the user regarding the error. In another implementation, an action may be triggered based on a specified condition (e.g., invalid RSA public key obtained three times). For example, the triggered action may be to erase data associated with the wallet. In another example, the triggered action may be to invalidate the master key and to generate a new master key.

If the obtained RSA public key is valid, the RSA public key may be provided to a portable HSM at 610. For example, the RSA public key may be utilized by the portable HSM to encrypt a second master private key share stored by the portable HSM such that the corresponding RSA private key, available to the HSM, may be used to decrypt the second master private key share. In one implementation, the RSA public key may be forwarded to the portable HSM via a master key share request message.

An encrypted second master private key share (e.g., for the specified wallet) may be requested from the portable HSM at 612. In one implementation, a master key share request message may be sent to the portable HSM to request the second master private key share encrypted with the RSA public key.

A determination may be made at 614 whether the request for the encrypted second master private key share is authorized. In one implementation, one or more operators (e.g., based on M-of-N authentication) may have to approve (e.g., via an authentication entry device associated with the portable HSM) the request to export the encrypted second master private key share from the portable HSM for the request to be authorized.

% If the request for the encrypted second master private key share is not authorized, an error message may be generated at 618. For example, the error message may specify the error that occurred (e.g., request to export the encrypted second master private key share from the portable HSM is not authorized). A warning message may be provided to the user and/or an action may be triggered at 620. In one implementation, a warning message based on the generated error message may be provided to the user to inform the user regarding the error. In another implementation, an action may be triggered based on a specified condition (e.g., unauthorized request occurred three times). For example, the triggered action may be to erase data associated with the wallet. In another example, the triggered action may be to invalidate the master key and to generate a new master key.

If the request for the encrypted second master private key share is authorized, transaction signing may be requested from the HSM at 622. In one implementation, a transaction signing request message may be sent to the HSM to request transaction signing.

A transaction signing response may be provided to the client at 626. In one implementation, a transaction signing response may be sent to the client to inform the user whether the transaction signing was completed successfully (e.g., via a UI of the fund transfer program).

FIG. 6C shows a logic flow diagram illustrating embodiments of a secure firmware transaction signing (SFTS) component for the SFTSP. In FIG. 6C, a public key request from a TSS may be obtained at 603. For example, the public key request may be obtained as a result of the TSS facilitating transaction signing.

A RSA key pair may be generated at 607. In one embodiment, a RSA key pair (e.g., a RSA public key and a corresponding RSA private key) may be predefined (e.g., for a HSM). In one implementation, the RSA public key may be determined using a PKCS #11 function (e.g., C_FindObjectsInit( . . . )). In another implementation, the RSA public key may be determined via an internal call on a HSM environment setting configured externally at HSM deployment time. In an alternative implementation, the RSA public key may be determined via a MySQL database command (e.g., retrieved from a MySQL database in tamper-proof storage). In another embodiment, a RSA key pair may be generated dynamically (e.g., each time transaction signing is executed). In one implementation, a RSA public key may be generated using a PKCS #11 function (e.g., C_Create Object( . . . )).

The RSA public key may be provided to the TSS at 611. In one implementation, the RSA public key may be provided to the TSS via a public key response message.

A SFTS API call may be obtained at 615. For example, the SFTS API call may be obtained as a result of a call from a HSM associated with the SFTS component. It is to be understood that although the SFTS component is described with regard to an API method to sign a transaction (e.g., signMessageHash), in some embodiment, a variety of API methods may be available. In one embodiment, the following API methods may be available to the HSM and/or to a TSS:

signMessageHash - this method receives a message hash, a keychain path and a handle to the transient object containing a second master private key share (e.g., encrypted), and returns an ECDSA signature value. Seed concatenation and key derivation steps are implemented by the SFTS component. Temporary keys generated for signing are wiped out of the device once the signing process is complete.

Input:

256-bit hash value to be signed keychain path to be used for Bip32 key derivation handle to the transient object containing a second master private key share (e.g., encrypted)

Output:

ECDSA signature in DER format getAddressHash - this method returns a public Pay-to-Script-Hash (P2SH) address generated for a given keychain path. SFTS component code uses N extended master public keys stored inside the HSM, generates N public keys corresponding to the provided keychain path, and generates a Bitcoin address that can be used for receiving funds.

Input:

keychain path to be used for Bip32 key derivation

Output:

P2SH hash value that can be converted by the requesting application (e.g., client application) into a Bitcoin address in the appropriate format (e.g., main Bitcoin network, Testnet, etc.)

An encrypted second master private key share utilized to recover a master private key may be determined at 619. In one implementation, the encrypted second master private key share may be provided as an input parameter in the SFTS API call.

A determination may be made at 623 whether the encrypted second master private key share is decryptable. In one implementation, this determination may be made by checking whether decrypting the encrypted second master private key share using the RSA private key results in a valid object.

If the encrypted second master private key share is not decryptable, an error message may be generated at 627. For example, the error message may specify the error that occurred (e.g., second master private key share is not decryptable). A warning message may be provided to a user and/or an action may be triggered at 631. In one implementation, a warning message based on the generated error message may be provided to the user (e.g., via the TSS) to inform the user regarding the error. In another implementation, an action may be triggered based on a specified condition (e.g., non-decryptable second master private key share obtained three times). For example, the triggered action may be to erase data associated with an associated wallet. In another example, the triggered action may be to invalidate the master key associated with the second master private key share and to generate a new master key.

If the encrypted second master private key share is decryptable, the encrypted second master private key share may be decrypted using the RSA private key at 635. In one implementation, the RSA private key may be determined using a PKCS #11 function (e.g., C_FindObjectsInit( . . . )). In another implementation, the RSA private key may be determined via an internal call on a HSM environment setting configured externally at HSM deployment time. In an alternative implementation, the RSA private key may be determined via a MySQL database command (e.g., retrieved from a MySQL database in tamper-proof storage). In one implementation, the encrypted master key may be decrypted using a PKCS #11 function (e.g., C_Decrypt( . . . )).

A first master private key share may be retrieved at 639. In one implementation, the first master private key share may be determined using a PKCS #11 function (e.g., C_FindObjectsInit( . . . )). In another implementation, the first master private key share may be determined via an internal call on a HSM environment setting configured externally at HSM deployment time. In an alternative implementation, the first master private key share may be determined via a MySQL database command (e.g., retrieved from a MySQL database in tamper-proof storage).

A master private key may be determined from master private key shares (e.g., from the first master private key share and the second master private key share) at 643. In one embodiment, a method such as Shamir's Secret Sharing may be utilized to recover the master private key from the master private key shares. See FIG. 14 for additional details regarding utilizing Shamir's Secret Sharing.

Transaction data may be determined at 647. In one implementation, the transaction data may be provided in the SFTS API call and may include a wallet identifier, a transaction identifier, a transaction hash, a keychain path, and/or the like.

A signing private key for the specified keychain path may be generated using the determined master private key at 651. In one implementation, the signing private key may be generated in accordance with a deterministic key derivation procedure as described in Bip32. The transaction may be signed at 655. In one implementation, the generated signing private key may be used to sign the transaction hash in accordance with the hashing algorithm utilized by the Bitcoin protocol (e.g., RIPE160(SHA256(SHA256(message)))).

Temporary private key data may be wiped from memory at 659. In one implementation, the second master private key share obtained from the portable HSM, the determined master private key, and/or the generated signing private key may be wiped from memory of the HSM associated with the SFTS component. The signed transaction may be returned at 663. In one implementation, the ECDSA signature in DER format may be returned.

Figure 7A:
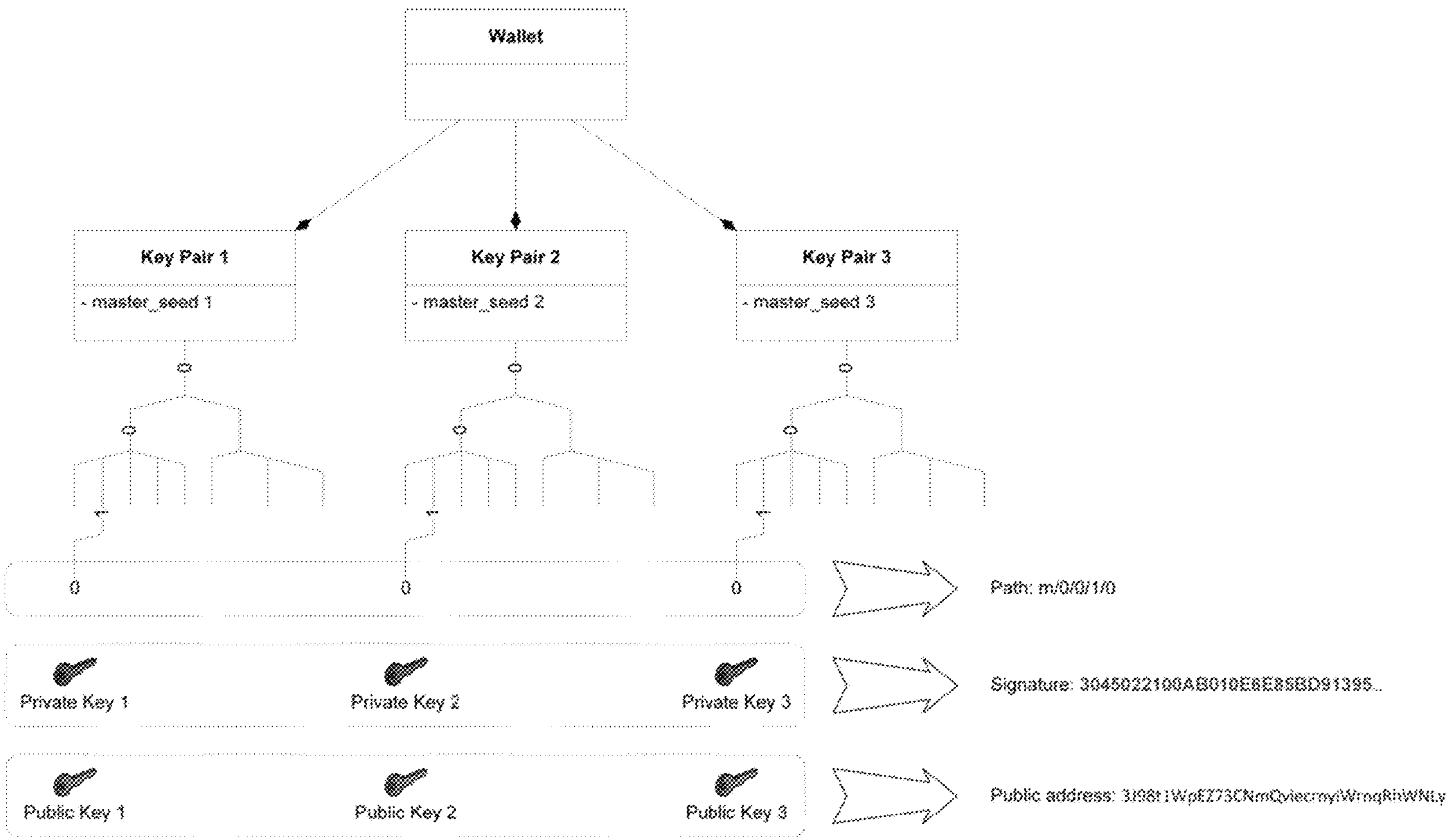
FIGS. 7A-B shows an exemplary data model for the SFTSP.

FIG. 7A shows an exemplary data model for the SFTSP. In one embodiment, the data model may be a Bip32 data model. In FIG. 7A, a wallet composed of N (e.g., 3) master keys (or seeds) is shown. For each path, a pair of private and public keys may be derived. A private key may be used for generating a signature; a public key may be used for a public address for receiving funds.

Figure 7B:
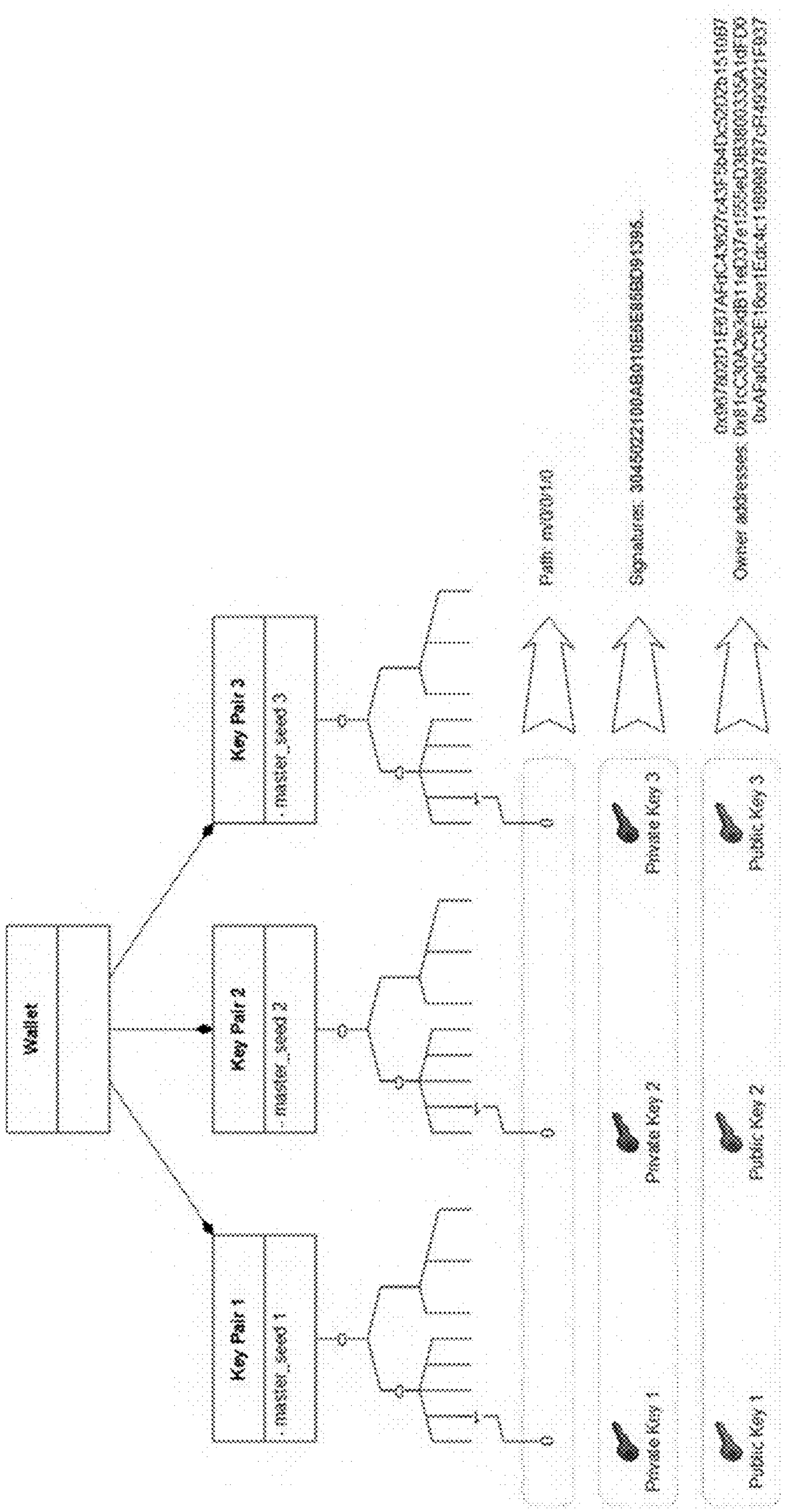

FIG. 7B shows an exemplary data model for the SFTSP. In one embodiment, the data model may be a Bip32 data model. In FIG. 7B, a wallet composed of N (e.g., 3) master keys (or seeds) is shown. For each path, a pair of children private and public keys may be derived. A private key may be used for generating a signature; a public key may be used for a generating an owner address. In one implementation, master key pairs are stored on FIPS 140-2 L3 HSM devices, and their derived children keys, address generation and signing occur inside the HSMs.

Figure 8:
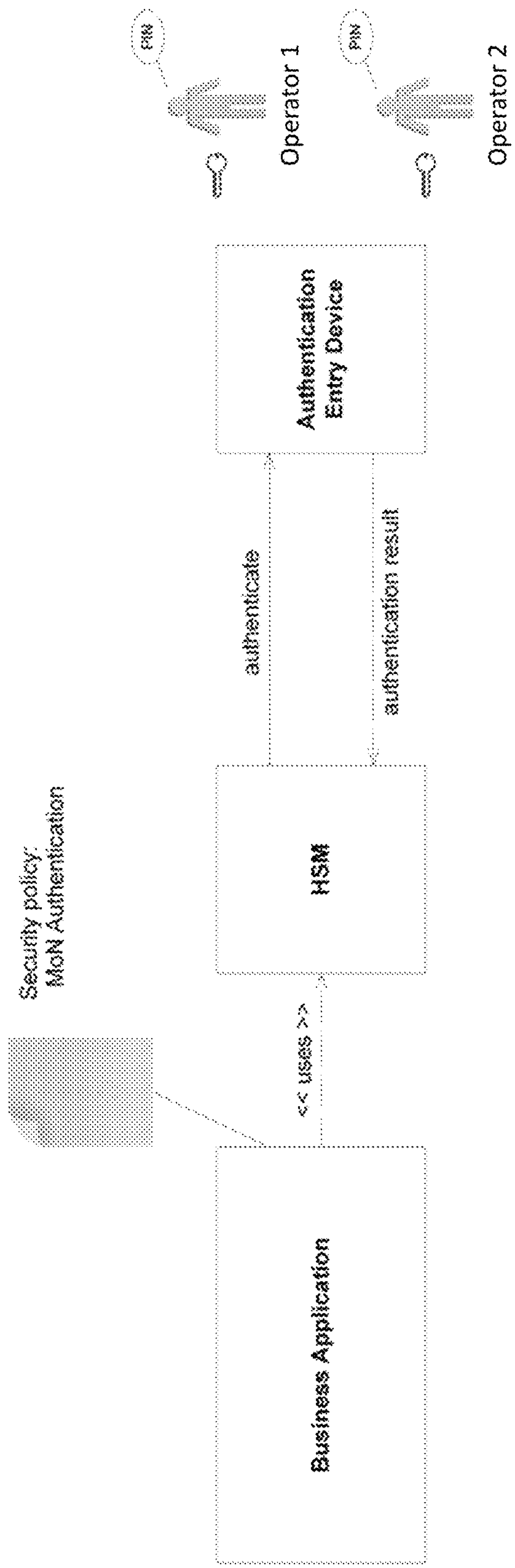
FIG. 8 shows an exemplary authentication model for the SFTSP.

A FIG. 8 shows an exemplary authentication model for the SFTSP. In FIG. 8, M-of-N authentication utilizing an HSM is illustrated. For example, in order to start a highly sensitive business application operation (e.g., transaction signing for a transfer of large funds between accounts, key backup, key recovery), several physically present persons may have to authenticate to the HSM. Physical presence is ensured by presenting a physical authentication device, such as a smart card, token or encrypted key on a USB device. In addition to the physical device, each person also may have to authenticate using a password or PIN, which makes it a multi-factor authentication (MFA) process with the first factor being a key (something to have) and the second factor a PIN (something to know). This is schematically shown in FIG. 8 where two operators, each holding an encrypted key on a USB memory stick, one after another insert their USB key into an authentication entry device attached to a HSM and confirm their ownership of the key by entering a PIN associated with the key in order to start a business application operation. Authentication to the HSM may be tightly integrated in HSM firmware for access control and protection of key objects stored on the HSM through a key hierarchy of user keys on the USB token and master encryption keys on the HSM.

Security policy, defined for a business application and enforced on the HSM, contains a minimum number of persons that should successfully authenticate to the system out of a larger number of people that hold authentication keys and PINs. If we have N operators with separate USB keys and PINs but any M of them can authenticate to the system, this so called M-of-N (or MoN) authentication policy covers such real life situations as two-person access control, work force rotation, leaves of absence, sickness, etc. See FIG. 9 for an example of valid authentication combinations for N=3 and M=2.

Figure 9:
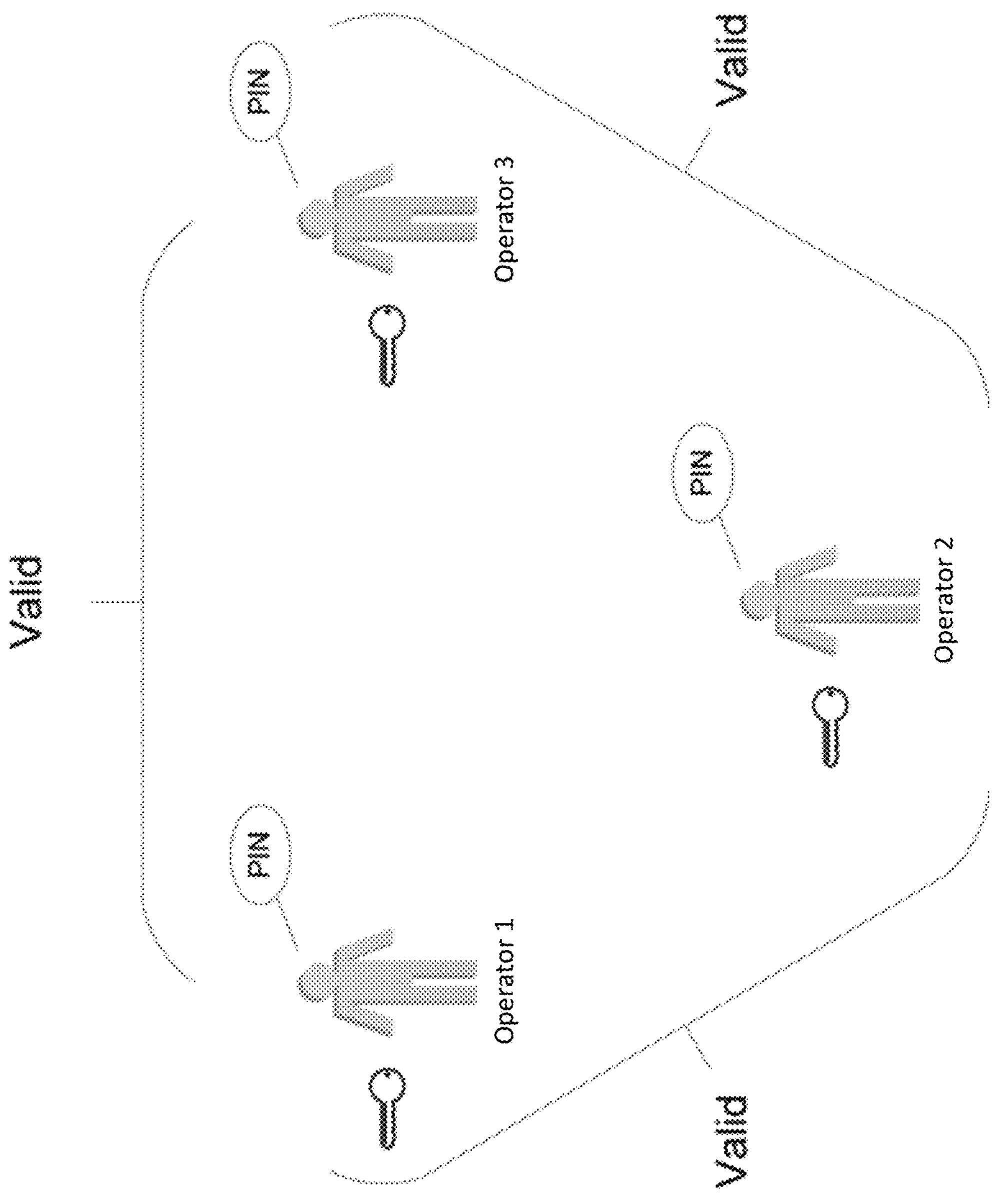
FIG. 9 shows an exemplary authentication use case for the SFTSP.

FIG. 9 shows an exemplary authentication use case for the SFTSP. In FIG. 9, valid authentication combinations for N=3 and M=2 are illustrated. As shown in FIG. 9, valid authentication combinations include: operator 1 and operator 2, operator 2 and operator 3, and operator 1 and operator 3.

Figure 10:
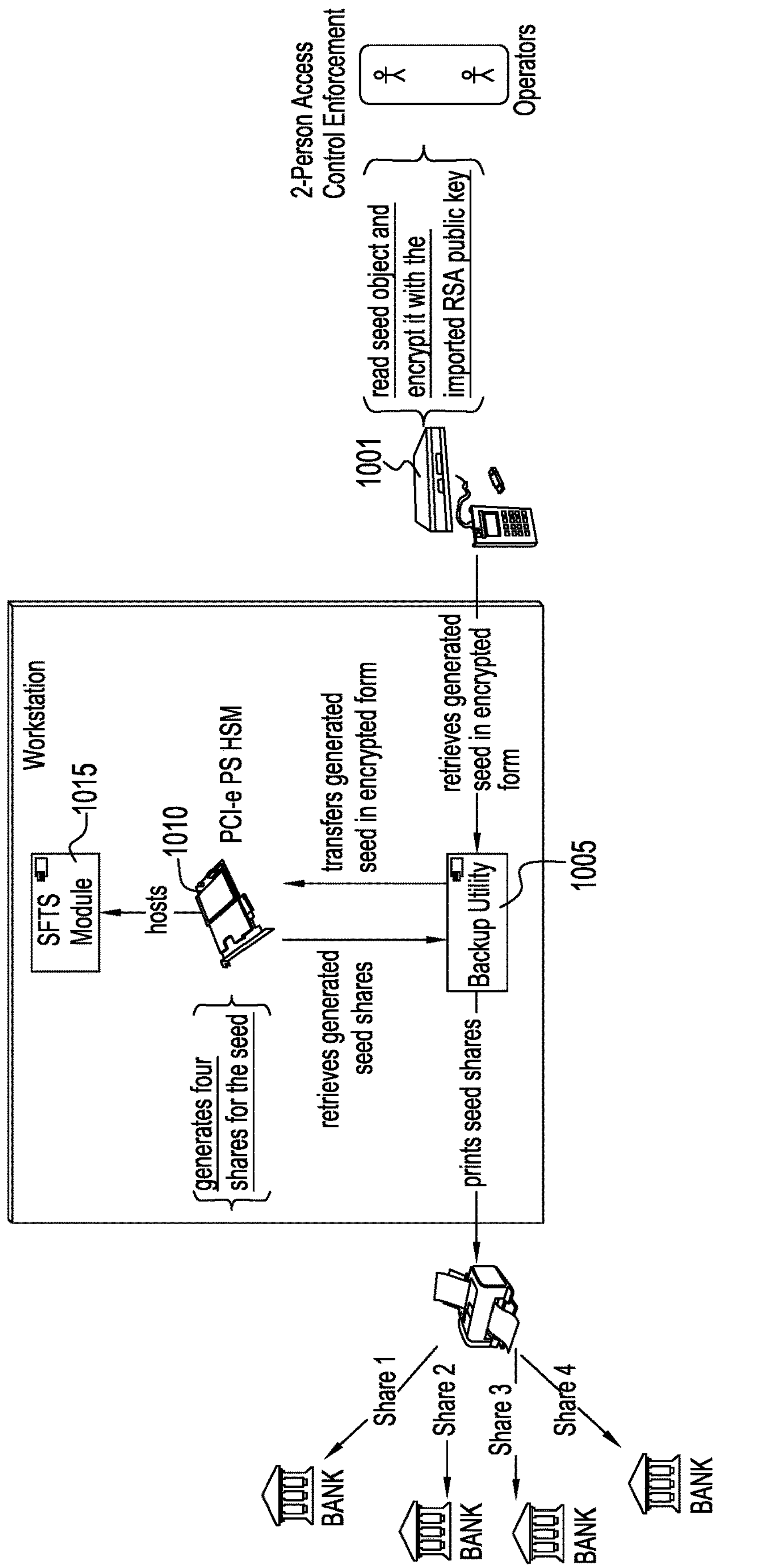
FIG. 10 shows an exemplary key backup model for the SFTSP.

FIG. 10 shows an exemplary key backup model for the SFTSP. In FIG. 10, a seed (e.g., master key) may be backed up using seed shares. The seed may be generated and may be stored on a seed hosting HSM 1001 (e.g., Gemalto's G5 HSM), which supports M-of-N authentication. For example, this may be done as part of a master key generation operation. A backup utility 1005 may request that a backup HSM 1010 (e.g., Gemalto's ProtectServer PCI-e HSM), which supports firmware module extensions and hosts SFTS module 1015, generate a RSA key pair and provide the generated public key. The backup utility may export the generated RSA public key from the backup HSM and import it into the hosting HSM. The backup utility may request an export of the seed from the hosting HSM encrypted with the imported RSA public key. Operators may approve the seed export request by authenticating to an authentication entry device associated with the hosting HSM (e.g., using 2-of-3 access control enforcement). The backup utility may transfer the encrypted seed to the backup HSM. The backup HSM may decrypt the seed using the previously generated RSA private key and may create a local copy of the seed in memory protected from external intrusion. The backup utility may utilize an API call to request seed shares, generated using an implemented secret sharing method, from the backup HSM. See FIG. 14 for an example of a secret sharing method. The backup utility may print the provided seed shares (e.g., one at a time on a separate sealed tamper-protected form), and the printed seed shares may be distributed for storage in geographically distributed locations in order to avoid the recovery of a complete seed from shares available at any single location. Thus, the full seed is not exposed in decrypted form outside of an HSM device (e.g., in RAM of the host workstation) during the key backup process, which eliminates the risk of memory-attack theft. As seed shares may be backed up separately (e.g., on paper in bank safety boxes), multi-person access control and segmentation is further enforced.

Figure 11A:
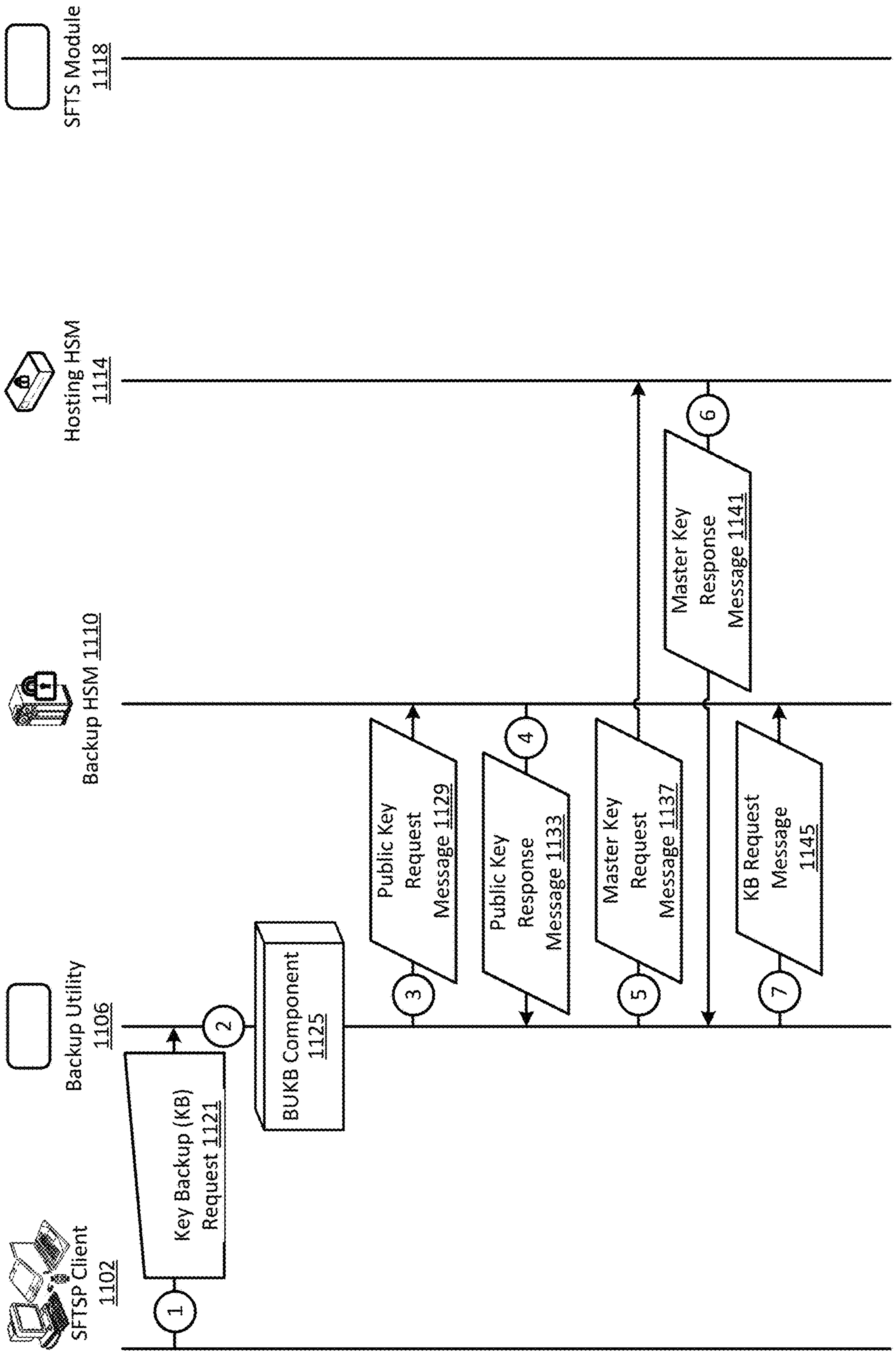
FIGS. 11A-B show a datagraph diagram illustrating embodiments of a data flow for the SFTSP.
Figure 11B:
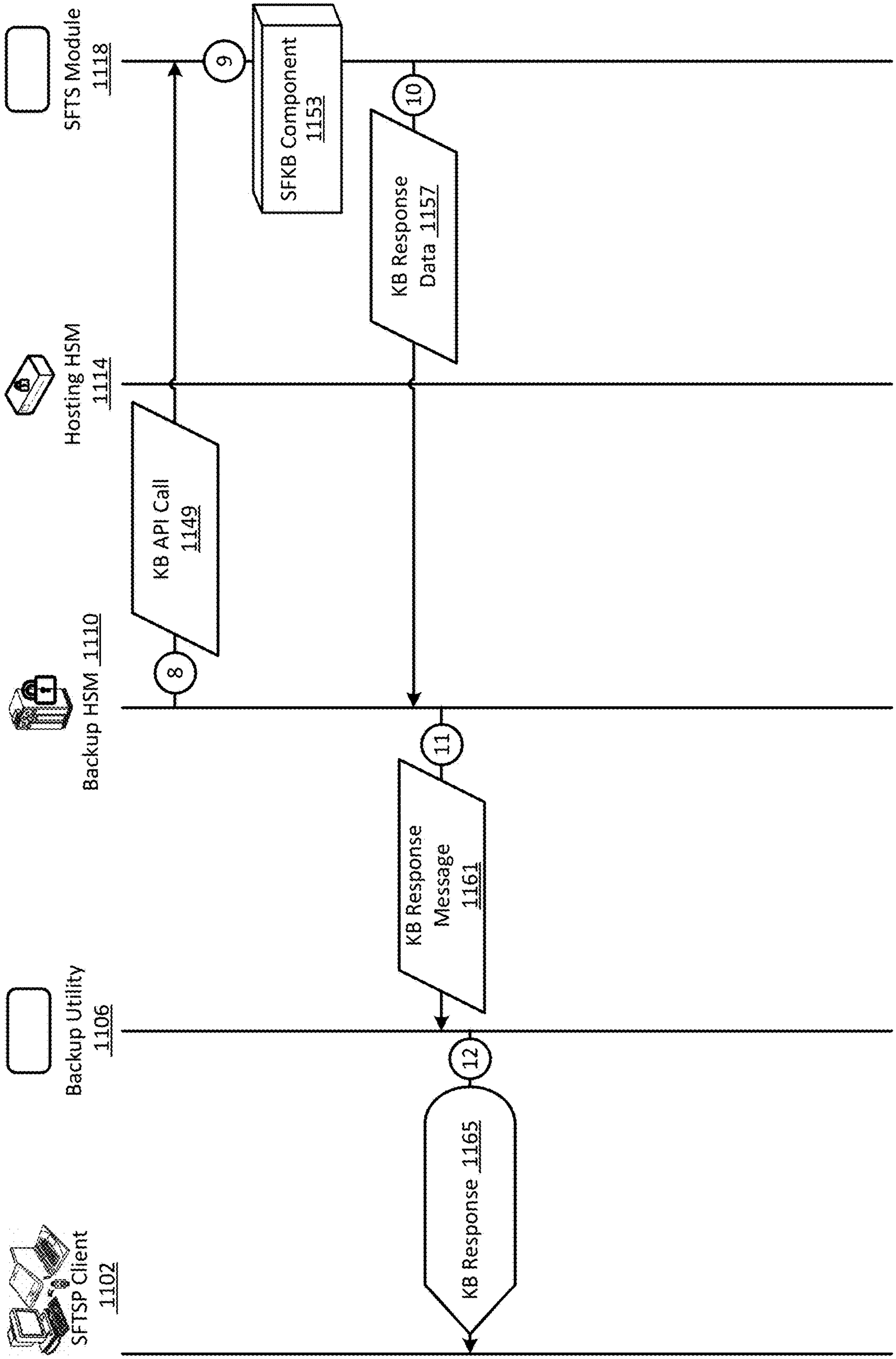

FIGS. 11A-B show a datagraph diagram illustrating embodiments of a data flow for the SFTSP. In FIGS. 11A-B, a user of a SFTSP client 1102 may send a key backup request 1121 to a backup utility 1106 to facilitate key backup (e.g., of a master key associated with a hierarchical deterministic wallet). For example, the SFTSP client may be a desktop, a laptop, a tablet, a smartphone, and/or the like that is executing the backup utility. In one implementation, the key backup request may include parameters specified by the user (e.g., via a user interface (UI) of the backup utility) such as a request type (e.g., backup master key, recover master key), a wallet identifier (e.g., of the wallet whose master key should be backed up), the number of master key shares to generate, the number of master key shares sufficient to recover the master key, and/or the like.

A backup utility key backup (BUKB) component 1125 may utilize parameters provided in the key backup request to facilitate generation of backup materials for the relevant master key (e.g., for the specified wallet). See FIG. 12 for additional details regarding the BUKB component.

The backup utility may send a public key request message 1129 to a backup HSM 1110 to request a RSA public key from the backup HSM. In one implementation, the public key request message may include data such as a request identifier, a backup request identifier, and/or the like. In one embodiment, the backup utility may provide the following example public key request message, substantially in the form of a HTTP(S) POST message including XML-formatted data, as provided below:

POST /public_key_request_message.php HTTP/1.1
Host: www.server.com
Content-Type: Application/XML
Content-Length: 667
<?XML version = "1.0" encoding = "UTF-8"?>
<public_key_request_message>

-continued

```
    <request_identifier>ID_request_11</request_identifier>
    <backup_request_identifier>ID_backup_request_1</backup_request_identifier>
</public_key_request_message>
```

The backup HSM may provide a RSA public key to the backup utility via a public key response message 1133. In one implementation, the public key response message may include data such as a response identifier, a backup request identifier, a RSA public key, and/or the like. In one embodiment, the backup HSM may provide the following example public key response message, substantially in the form of a HTTP(S) POST message including XML-formatted data, as provided below:

```
POST /public_key_response_message.php HTTP/1.1
Host: www.server.com
Content-Type: Application/XML
Content-Length: 667
<?XML version = "1.0" encoding = "UTF-8"?>
<public_key_response_message>
    <response_identifier>ID_response_11</response_identifier>
    <backup_request_identifier>ID_backup_request_1</backup_request_identifier>
    <RSA_public_key>RSA public key provided by the backup HSM</RSA_public_key>
</public_key_response_message>
```

The backup utility may send a master key request message 1137 to a hosting HSM 1114 to request an encrypted master key (e.g., for the specified wallet) from the hosting HSM. In one implementation, the master key request message may include data such as a request identifier, a backup request identifier, a wallet identifier, a RSA public key, and/or the like. In one embodiment, the backup utility may provide the following example master key request message, substantially in the form of a HTTP(S) POST message including XML-formatted data, as provided below:

```
POST /master_key_request_message.php HTTP/1.1
Host: localhost
Content-Type: Application/XML
Content-Length: 667
<?XML version = "1.0" encoding = "UTF-8"?>
<master_key_request_message>
    <request_identifier>ID_request_12</request_identifier>
    <backup_request_identifier>ID_backup_request_1</backup_request_identifier>
    <wallet_identifier>ID_Wallet1</wallet_identifier>
    <RSA_public_key>RSA public key provided by the backup HSM</RSA_public_key>
</master_key_request_message>
```

The hosting HSM may provide the encrypted master key to the backup utility via a master key response message 1141. In one implementation, the master key response message may include data such as a response identifier, a backup request identifier, a wallet identifier, an encrypted master key, and/or the like. In one embodiment, the hosting HSM may provide the following example master key response message, substantially in the form of a H-TTP(S) POST message including XML-formatted data, as provided below:

```
POST /master_key_response_message.php HTTP/1.1
Host: localhost
Content-Type: Application/XML
Content-Length: 667
<?XML version = "1.0" encoding = "UTF-8"?>
<master_key_response_message>
    <response_identifier>ID_response_12</response_identifier>
    <backup_request_identifier>ID_backup_request_1</backup_request_identifier>
    <wallet_identifier>ID_Wallet1</wallet_identifier>
    <master_key>encrypted master key provided by the hosting HSM</master_key>
</master_key_response_message>
```

The backup utility may send a key backup request message 1145 to the backup HSM to request master key shares for the encrypted master key from the backup HSM. In one implementation, the key backup request message may include data such as a request identifier, a request type, a backup request identifier, an encrypted master key, the number of master key shares to generate, the number of master key shares sufficient to recover the master key, and/or the like. In one embodiment, the backup utility may provide the following example key backup request message, substantially in the form of a HTTP(S) POST message including XML-formatted data, as provided below:

```
POST /key_backup_request_message.php HTTP/1.1
Host: localhost
Content-Type: Application/XML
Content-Length: 667
<?XML version = "1.0" encoding = "UTF-8"?>
<key_backup_request_message>
    <request_identifier>ID_request_13</request_identifier>
    <request_type>BACKUP_MASTER_KEY</request_type>
    <backup_request_identifier>ID_backup_request_1</backup_request_identifier>
    <master_key>encrypted master key provided by the hosting HSM</master_key>
    <number_of_shares_to_generate>4</number_of_shares_to_generate>
    <number_of_shares_sufficient_to_recover>2</number_of shares_sufficient_to_recover>
</key_backup_request_message>
```

The backup HSM may send a key backup response message 1161 to the backup utility. In one implementation, the key backup response message may include data such as a response identifier, a backup request identifier, generated master key shares, and/or the like. For example, data provided in the key backup response message may be utilized by the backup utility to facilitate printing and/or distributing the generated master key shares. In one embodiment, the backup HSM may provide the following example key backup response message, substantially in the form of a HTTP(S) POST message including XML-formatted data, as provided below:

```
POST /key_backup_response_message.php HTTP/1.1
Host: localhost
Content-Type: Application/XML
Content-Length: 667
<?XML version = "1.0" encoding = "UTF-8"?>
<key_backup_response_message>
    <response_identifier>ID_response_13</response_identifier>
    <backup_request_identifier>ID_backup_request_1</backup_request_identifier>
    <master_key_shares>
    <share>0_1D7927D78EAD692BB1694497180C66B3E88676F22B920625EDECAA1728F2921E
5E309297B76FE658B61DF9D501B49FB553255DFDC8FE966F2950DDD0078C809B02</share>
    <share>1_01658051EB654BBD692013E6E5FB6BA2D9C36980AE0D592D4D07516910646EE0
5B223C3C13C1DF6736232724DF32644791E4A1217DD642C8A7C0A240311DBD1172FE</share>
    <share>2_0191E6488B7976C0C147B244239459E2FF3DA2C64B554B9F215D1D6E8261B9F8
D9A1E78AC218260A8EEFCBD56A1BAE4E68A7F53DB2103AA70FBC070E8B0BFF414147</share>
    <share>3_01B2D2F13EBB73D1B486D84BA81B173D99AB2F56322452CDF97459965513F74F
5F7DD92EE1084F8847CBDA9FE118A133FEC788513A70C8B1343502C3C309052568E5</share>
    </master_key_shares>
</key_backup_response_message>
```

The backup HSM may make a key backup API call 1149 to a SFTS module 1118 to request that the SFTS module generate master key shares. In one implementation, the key backup API call may include data such as a request type (e.g., backup master key, recover master key), an encrypted master key, the number of master key shares to generate, the number of master key shares sufficient to recover the master key, and/or the like.

Data provided in the key backup API call may be used by a secure firmware key backup (SFKB) component 1153 to generate master key shares. See FIG. 13 for additional details regarding the SFKB component.

The SFTS module may send key backup response data 1157 to the backup HSM in response to the key backup API call. In one implementation, the key backup response data may include the generated master key shares.

The backup utility may send a key backup response 1165 to the user. For example, the key backup response may be used to inform the user whether the key backup was completed successfully (e.g., via a UI of the backup utility).

Figure 12:
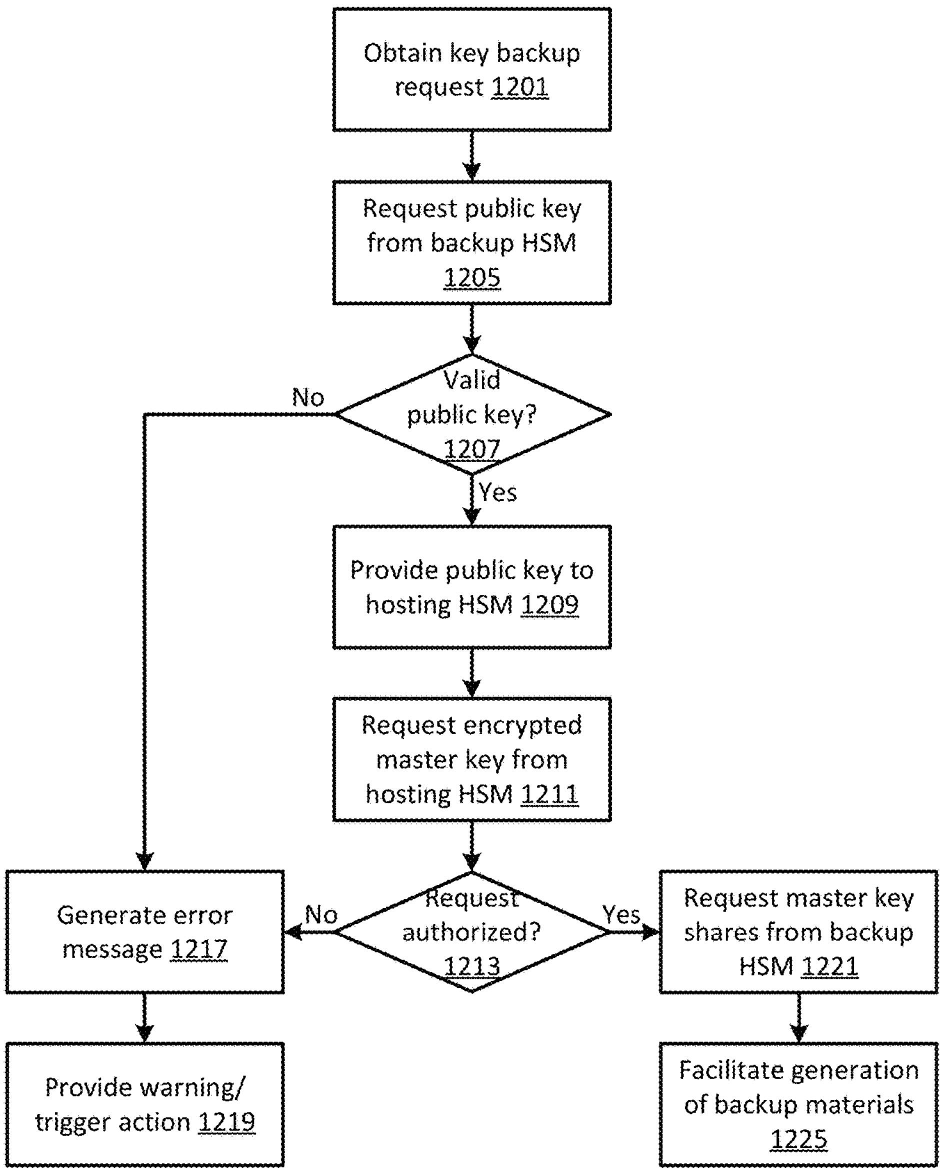
FIG. 12 shows a logic flow diagram illustrating embodiments of a backup utility key backup (BUKB) component for the SFTSP.

FIG. 12 shows a logic flow diagram illustrating embodiments of a backup utility key backup (BUKB) component for the SFTSP. In FIG. 12, a key backup request may be obtained at 1201. For example, the key backup request may be obtained as a result of a user utilizing a UI of a backup utility to initiate key backup of a master key associated with a hierarchical deterministic wallet. See FIG. 17 for an example of a UI that may be utilized by the user.

A RSA public key may be requested from a backup HSM at 1205. In one implementation, a public key request message may be sent to the backup HSM to request the RSA public key.

A determination may be made at 1207 whether the obtained RSA public key is valid. For example, the backup utility may be configured to work with a specified set of backup HSMs, and the obtained RSA public key may have to be associated with one of the specified backup HSMs to be valid.

If the obtained RSA public key is not valid, an error message may be generated at 1217. For example, the error message may specify the error that occurred (e.g., RSA public key is not valid). A warning message may be provided to the user and/or an action may be triggered at 1219. In one implementation, a warning message based on the generated error message may be provided to the user to inform the user regarding the error. In another implementation, an action may be triggered based on a specified condition (e.g., invalid RSA public key obtained three times). For example, the triggered action may be to erase data associated with the wallet. In another example, the triggered action may be to invalidate the master key and to generate a new master key.

If the obtained RSA public key is valid, the RSA public key may be provided to a hosting HSM at 1209. For example, the RSA public key may be utilized by the hosting HSM to encrypt the master key hosted by the hosting HSM such that the corresponding RSA private key, available to the backup HSM, may be used to decrypt the master key. In one implementation, the RSA public key may be forwarded to the hosting HSM via a master key request message.

An encrypted master key (e.g., for the specified wallet) may be requested from the hosting HSM at 1211. In one implementation, a master key request message may be sent to the hosting HSM to request the master key encrypted with the RSA public key.

A determination may be made at 1213 whether the request for the encrypted master key is authorized. In one implementation, one or more operators (e.g., based on M-of-N authentication) may have to approve (e.g., via an authentication entry device associated with the hosting HSM) the request to export the encrypted master key from the hosting HSM for the request to be authorized.

If the request for the encrypted master key is not authorized, an error message may be generated at 1217. For example, the error message may specify the error that occurred (e.g., request to export the encrypted master key from the hosting HSM is not authorized). A warning message may be provided to the user and/or an action may be triggered at 1219. In one implementation, a warning message based on the generated error message may be provided to the user to inform the user regarding the error. In another implementation, an action may be triggered based on a specified condition (e.g., unauthorized request occurred three times). For example, the triggered action may be to erase data associated with the wallet. In another example, the triggered action may be to invalidate the master key and to generate a new master key.

If the request for the encrypted master key is authorized, master key shares for the master key may be requested from the backup HSM at 1221. In one implementation, a key backup request message may be sent to the backup HSM to request generation of master key shares. For example, the key backup request message may specify how many master key shares to generate and/or how many master key shares should be sufficient to recover the master key.

Generation of backup materials may be facilitated at 1225. In various implementations, the provided master key shares may be backed up using backup materials such as paper printouts, metal or plastic plates (e.g., Cryptosteel), USB keys, hard drives, solid state drives, portable HSMs, and/or the like. For example, the provided master key shares may be printed out (e.g., one at a time on a separate sealed tamper-evident form). See FIG. 15 for an example of a tamper-evident paper form. The backup materials may be distributed for storage in geographically distributed locations. In some implementations, a hybrid combination of several backup materials may be used (e.g., 4 paper copies, 4 USB keys and 4 portable HSM devices). For example, each geographic backup location may store a mixture of different types of backup materials or materials of just one type. See FIG. 16A for an example of how the provided master key shares may be distributed and stored geographically. In some implementations, the SFTSP may be configured to require specified types of backup materials to recover the master key. For example, two master key shares stored on physical backup materials and two master key shares stored on digital backup materials may be required to recover the master key. See FIG. 16B for an example of backup materials that may be utilized to recover the master key.

Figure 13:
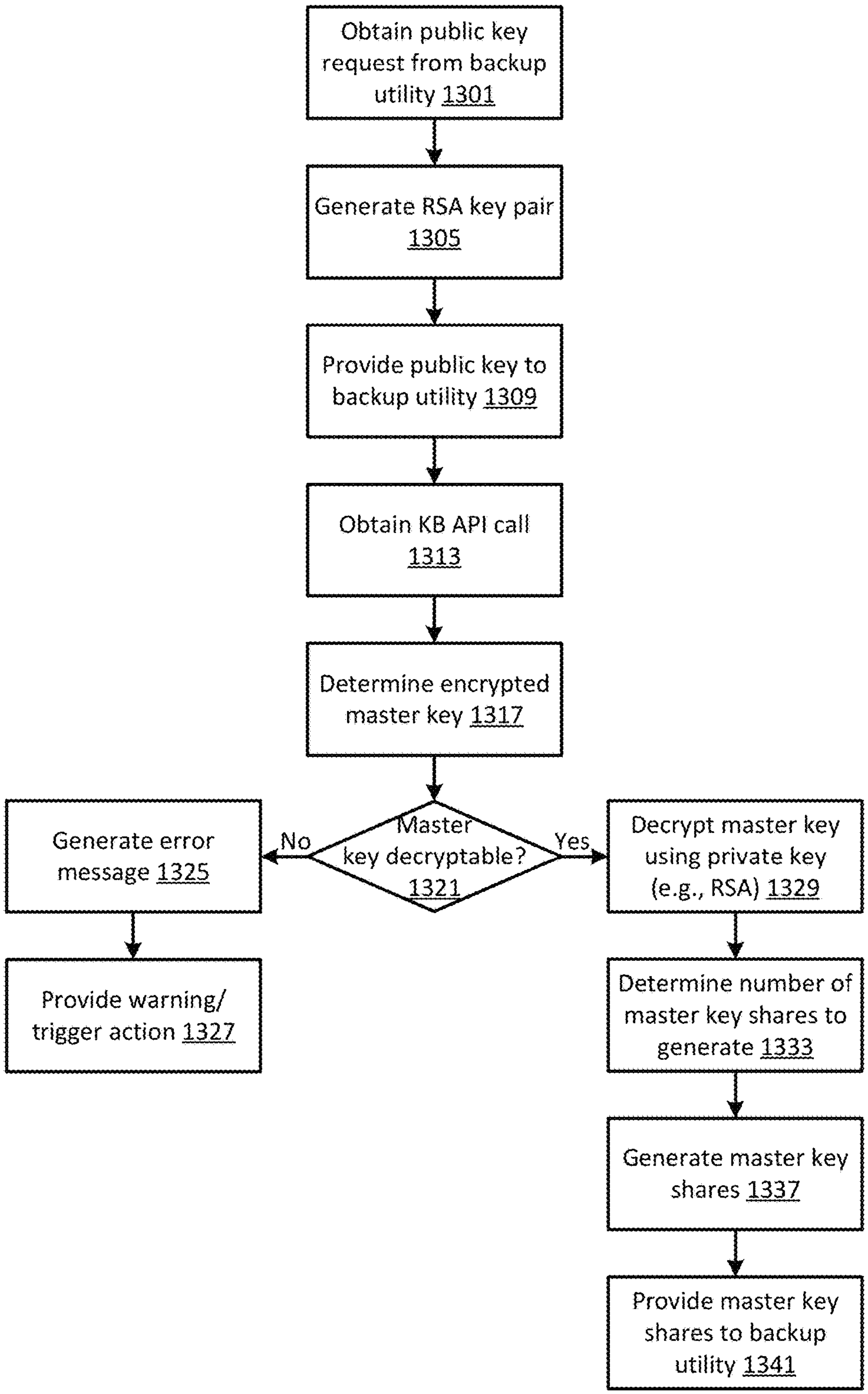
FIG. 13 shows a logic flow diagram illustrating embodiments of a secure firmware key backup (SFKB) component for the SFTSP.

FIG. 13 shows a logic flow diagram illustrating embodiments of a secure firmware key backup (SFKB) component for the SFTSP. In FIG. 13, a public key request from a backup utility may be obtained at 1301. For example, the public key request may be obtained as a result of the backup utility executing a key backup.

A RSA key pair may be generated at 1305. In one embodiment, a RSA key pair (e.g., a RSA public key and a corresponding RSA private key) may be predefined (e.g., for a backup HSM). In one implementation, the RSA public key may be determined using a PKCS #11 function (e.g., C_FindObjectsInit( . . . )). In another implementation, the RSA public key may be determined via an internal call on a backup HSM environment setting configured externally at HSM deployment time. In an alternative implementation, the RSA public key may be determined via a MySQL database command (e.g., retrieved from a MySQL database in tamper-proof storage). In another embodiment, a RSA key pair may be generated dynamically (e.g., each time a key backup is executed). In one implementation, a RSA public key may be generated using a PKCS #11 function (e.g., C_CreateObject( . . . )).

The RSA public key may be provided to the backup utility at 1309. In one implementation, the RSA public key may be provided to the backup utility via a public key response message.

A key backup API call may be obtained at 1313. For example, the key backup API call may be obtained as a result of a call from the backup HSM (e.g., based on receiving a key backup request message from the backup utility) associated with the SFKB component. In one embodiment, the following API method may be available to the backup HSM and/or to the backup utility:

SplitSeed - this method receives a master key value, 512-bit number, and returns an array of master key secret shares. Generation of master key shares is implemented by the SFKB component. Temporary materials, including the decrypted master key value, are wiped out of the device once the master key shares generation process is complete.

-continued

| | |
|---|---|
| Input: | |
| | 512-bit master key value encrypted with an RSA public key generated by the backup HSM |
| Output: | |
| | full array of 256-bit master key shares (N master key shares) |

In one implementation, a C implementation of this method for M-of-N key split may have the following interface:

```
SplitSeed(CK_ULONG slot_id,
    const char *pin,
    CK_OBJECT_HANDLE hSeed,
    CK_ULONG rec_shares_num,
    CK_ULONG backup_shares_num,
    CK_BYTE_PTR pRng_seed,
    CK_ULONG rng_seed_len,
    CK_BYTE_PTR *ppShares,
    CK_ULONG_PTR pShares_len);
```

The following table describes input and output parameters:

| Name | Input/ Output | Type | Description | Sample Values |
|---|---|---|---|---|
| slot_id | In | CK_ULONG | Identifier of the target slot inside HSM | 0 |
| pin | In | const char * | User token PIN for HSM | 0123 |
| hSeed | In | CK_OBJECT_HANDLE | Handle value of the master key | 1000 |
| rec_shares_num | In | CK_ULONG | Number of recovery shares (M) sufficient to recover the original seed. | 4 |
| backup_shares_num | In | CK_ULONG | Number of backup shares (N) to be generated. | 12 |
| pRng_seed | In | CK_BYTE_PTR | Pointer to a byte array containing an initialization seed for the random number generator | |
| rng_seed_len | In | CK_ULONG | Length of the array containing an initialization seed for the random number generator | 64 |
| ppShares | Out | CK_BYTE_PTR * | Pointer to the pointer to a byte array containing the generated secret shares | |
| pShares_len | Out | CK_ULONG_PTR | Pointer to a long number containing the length of the byte array containing the generated secret shares | 64 |

An encrypted master key for which master key shares should be generated may be determined at 1317. In one implementation, the encrypted master key may be provided as an input parameter in the key backup API call.

A determination may be made at 1321 whether the encrypted master key is decryptable. In one implementation, this determination may be made by checking whether decrypting the encrypted master key using the RSA private key results in a valid object.

If the encrypted master key is not decryptable, an error message may be generated at 1325. For example, the error message may specify the error that occurred (e.g., master key is not decryptable). A warning message may be provided to a user and/or an action may be triggered at 1327. In one implementation, a warning message based on the generated error message may be provided to the user (e.g., via the backup utility) to inform the user regarding the error. In another implementation, an action may be triggered based on a specified condition (e.g., non-decryptable master key obtained three times). For example, the triggered action may be to erase data associated with a wallet. In another example, the triggered action may be to invalidate the master key and to generate a new master key.

If the encrypted master key is decryptable, the encrypted master key may be decrypted using the RSA private key at 1329. In one implementation, the encrypted master key may be decrypted using a PKCS #11 function (e.g., C_Decrypt( . . . )).

The number of master key shares to generate and/or the number of master key shares that should be sufficient to recover the master key may be determined at 1333. In one implementation, this data may be provided as input parameters in the key backup API call.

Master key shares for the master key may be generated at 1337. In one embodiment, a method such as Shamir's Secret Sharing may be utilized to generate master key shares based on the specified number of master key shares to generate and/or the specified number of master key shares that should be sufficient to recover the master key. See FIG. 14 for additional details regarding utilizing Shamir's Secret Sharing. In one implementation, the generated master key shares may take on the following form (e.g., in hexadecimal format):

0_1D7927D78EAD692BB1694497180C66B3E88676F228920625EDECAA1728F2921E5E309297B76FE658861DF9D501B49FB553255DFDC8FE966F2950DDD0078C809B02

1_01658051EB654BBD692013E6E5FB6BA2D9C36980AE0D592D4D07516910646EE05B223C3C13C1DF6736232724DF32644791E4A1217DD642C8A7C0A240311DBD1172FE

2_0191E6488B7976C0C147B244239459E2FF3DA2C64B554B9F215D1D6E8261B9F8D9A1E78AC218260A8EEFCBD56A1BAE4E68A7F53DB2103AA70FBC070E8B8BFF414147

3_01B2D2F13EBB73D1B486D84BA81B173D99AB2F56322452CDF97459965513F74F5F7DD92EE1084F8847CBDA9FE118A133FEC788513A70C8B1343502C3C309052568E5

Where 0_, . . . , 3_ designate a master key share's Index and the rest Is Its value.

The generated master key shares may be provided to the backup utility at 1341. In one implementation, the master key shares may be returned to the backup HSM as the output of the key backup API call, and/or the backup HSM may provide the master key shares to the backup utility via a key backup response message.

Figure 14:
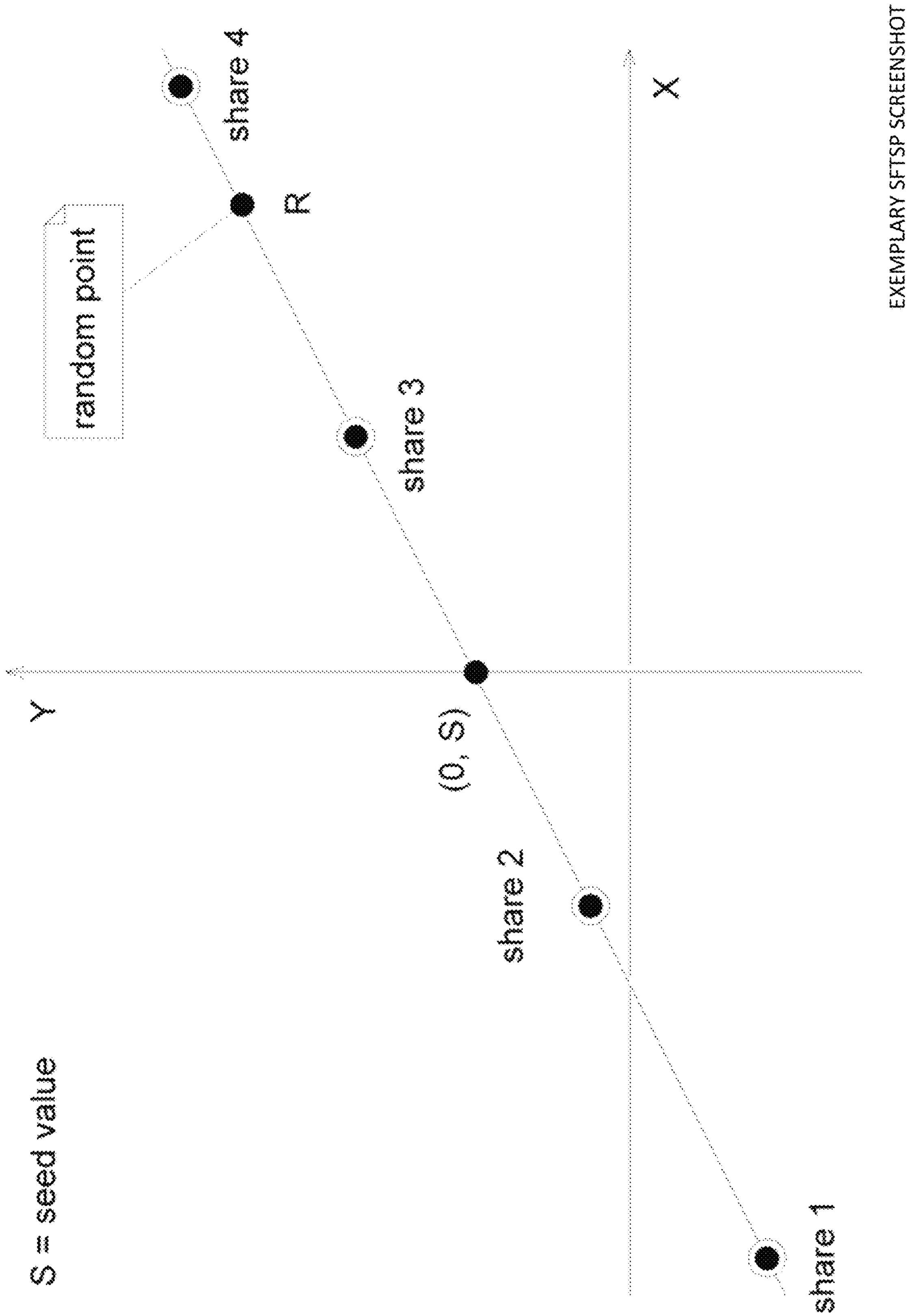
FIG. 14 shows a screenshot diagram illustrating embodiments of the SFTSP.

FIG. 14 shows a screenshot diagram illustrating embodiments of the SFTSP. In FIG. 14, Shamir's Secret Sharing method that may be utilized for secret sharing and/or secret recovery is illustrated. Shamir's Secret Sharing is based on the generic algebraic fact that knowing N different points is sufficient to recover a polynomial of the order of N−1. For example, two points on a coordinate plane define a line on that plane. As shown in FIG. 14, this may be used to generate several secret shares any pair of which can be used to restore the original secret.

For a seed value S, a point with coordinates (0, S) may be chosen (i.e., a point on the Y axis). A second point R with coordinates (X, Y) may be randomly generated (e.g., using two random numbers X and Y). Together this random point (X, Y) and point (0, S) define a line on the coordinate plane. Any number (e.g., the specified number of master key shares to generate) of points (e.g., any four points) on this line may be selected to become the secret shares—each point by itself does not reveal any information about the original number S. However, any pair of such points fully recovers the original line whose Y-intercept gives the seed value S.

In one implementation, in order to reduce the size of the backup key materials used in calculations, a pre-determined set of X-coordinate values (e.g., $10^2$, $10^4$, $10^6$, $10^8$) may be used for the shares and the Y-coordinates may be referred to by their indices in the range (e.g., [0 . . . 3]).

In implementations where more than two points (e.g., three points) are specified as being sufficient to recover the seed value S, Lagrange interpolation of polynomials may be utilized to generate secret shares and/or to recover the seed value.

Figure 15:
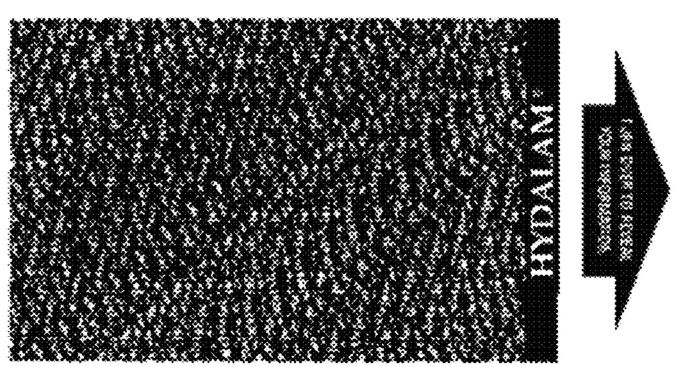
FIG. 15 shows a screenshot diagram illustrating embodiments of the SFTSP.

FIG. 15 shows a screenshot diagram illustrating embodiments of the SFTSP. In FIG. 15, a sample printed copy of concealed secret share's data on a tamper-evident paper form is illustrated.

Figure 16A:
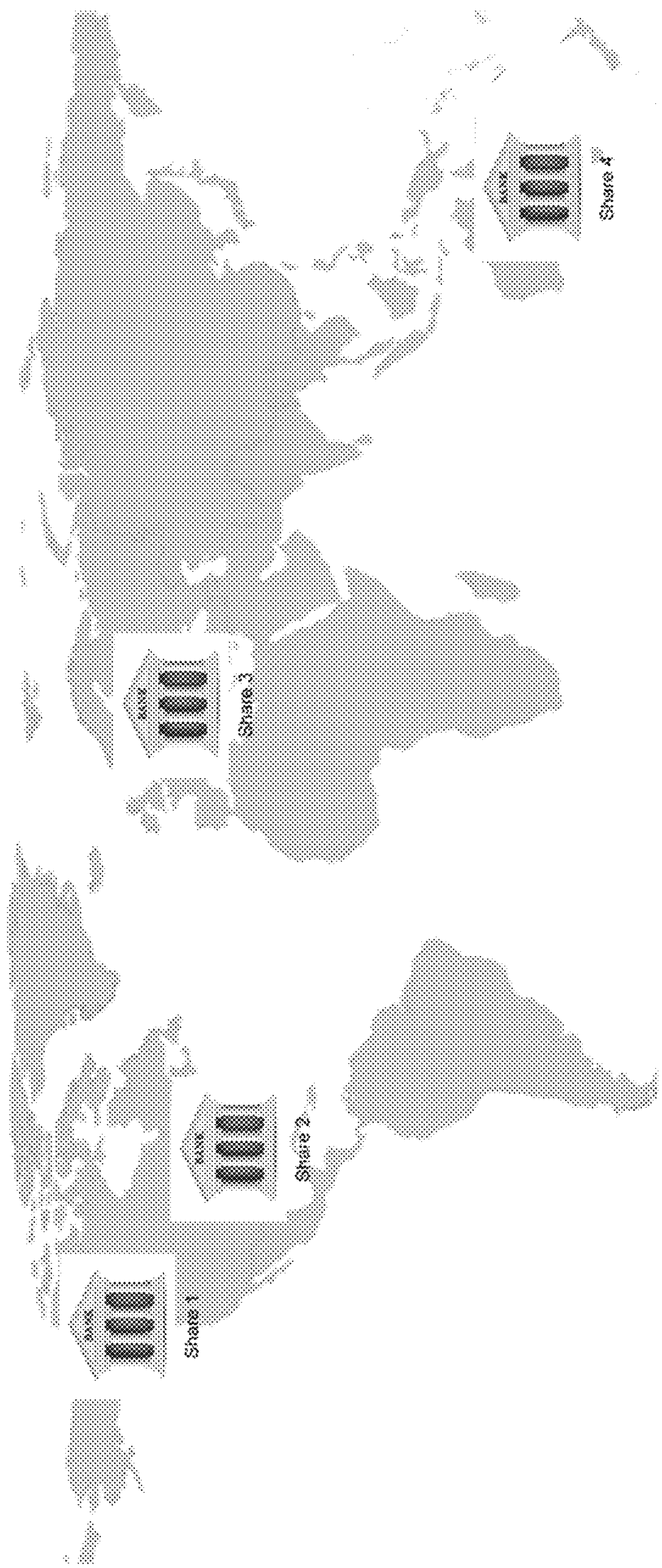
FIG. 16A shows an exemplary seed shares geographic distribution model for the SFTSP.

FIG. 16A shows an exemplary seed shares geographic distribution model for the SFTSP. In FIG. 16A, a schematic diagram of how generated seed shares may be distributed and stored geographically is shown. Each secret share backup material output (e.g., for the four generated secret shares) is distributed to a different geographic location and stored there in a secure location (e.g., a bank's vault).

For a seed recovery using 2-of-4 backup scheme, two shares from any two locations are sufficient to recover the seed. Similarly, in order to steal the seed, an attacker would have to successfully compromise at least two storage locations, which is more complicated than a single storage location. The seed becomes unrecoverable if at least three shares are completely destroyed, which is very unlikely even in case of a major disaster recovery.

Figure 16B:
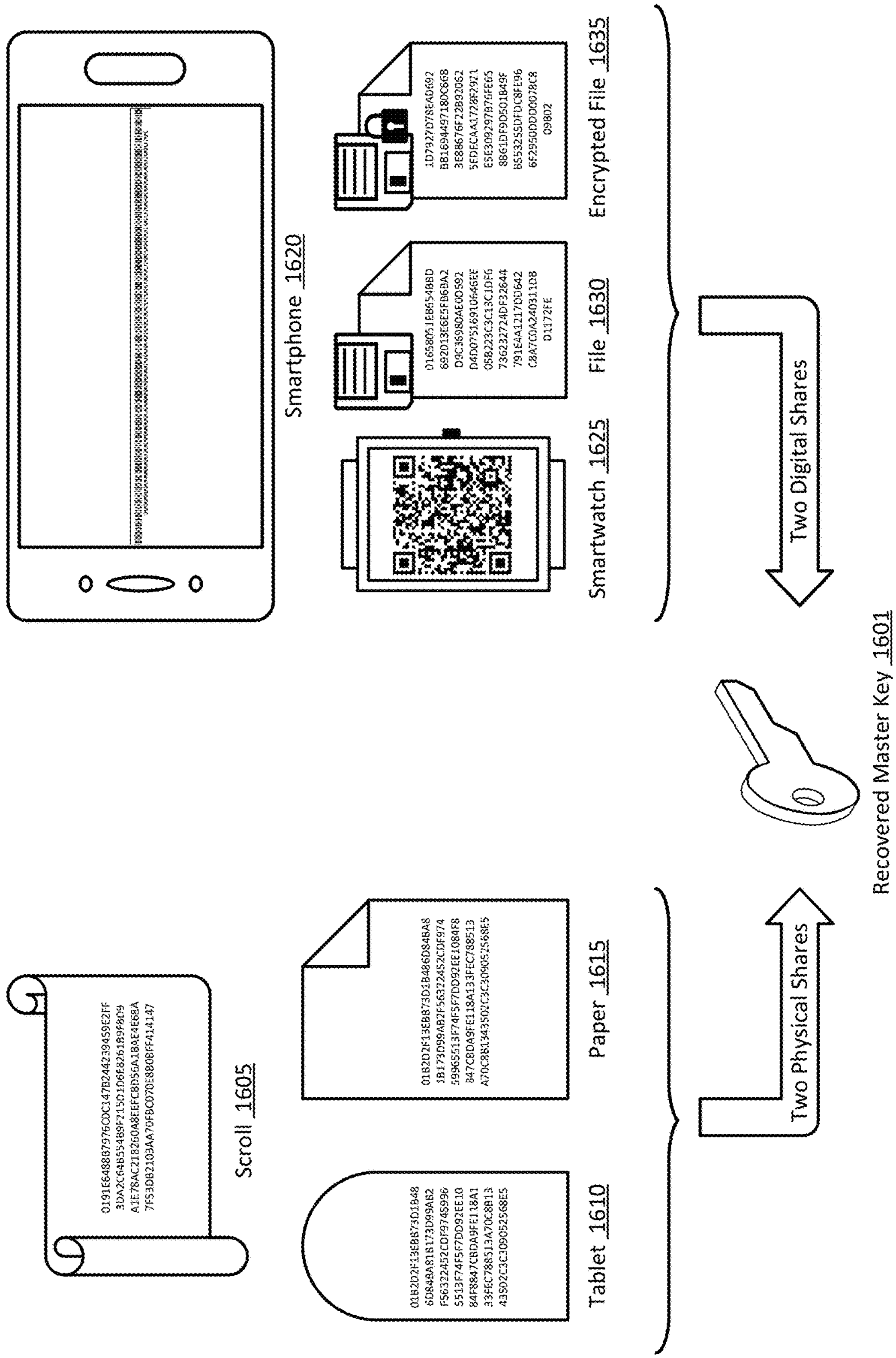
FIG. 16B shows an exemplary seed shares implementation case for the SFTSP.

FIG. 16B shows an exemplary seed shares implementation case for the SFTSP. In FIG. 16B, the SFTSP may be configured to require two master key shares stored on physical backup materials and two master key shares stored on digital backup materials to recover a master key 1601. Examples of physical backup materials that may be utilized include a scroll 1605, a stone table 1610, a piece of paper 1615, and/or the like. Examples of digital backup materials that may be utilized include a barcode shown on a smartphone 1620, a QR code shown on a smartwatch 1625, a file 1630, an encrypted file 1635, and/or the like. In one implementation, the SFTSP may be configured to require the use of any physical backup materials and/or any digital backup materials. In another implementation, the SFTSP may be configured to require the use of specified physical backup materials (e.g., one master key share stored on paper and one master key share stored on a stone tablet) and/or specified digital backup materials (e.g., one master key share stored in a QR code on a smartwatch and one master key share stored in an encrypted file).

FIG. 17 shows a screenshot diagram illustrating embodiments of the SFTSP. In FIG. 17, an exemplary interactive command-line interface (CLI) of a backup utility is illustrated. In one implementation, upon generating a master key on a HSM, the master key may be split into master key shares inside the HSM. Each share may be exported to an air-gapped key-generation workstation and printed out one at a time such that the shares are not in the workstation's RAM at the same time.

Figure 18:
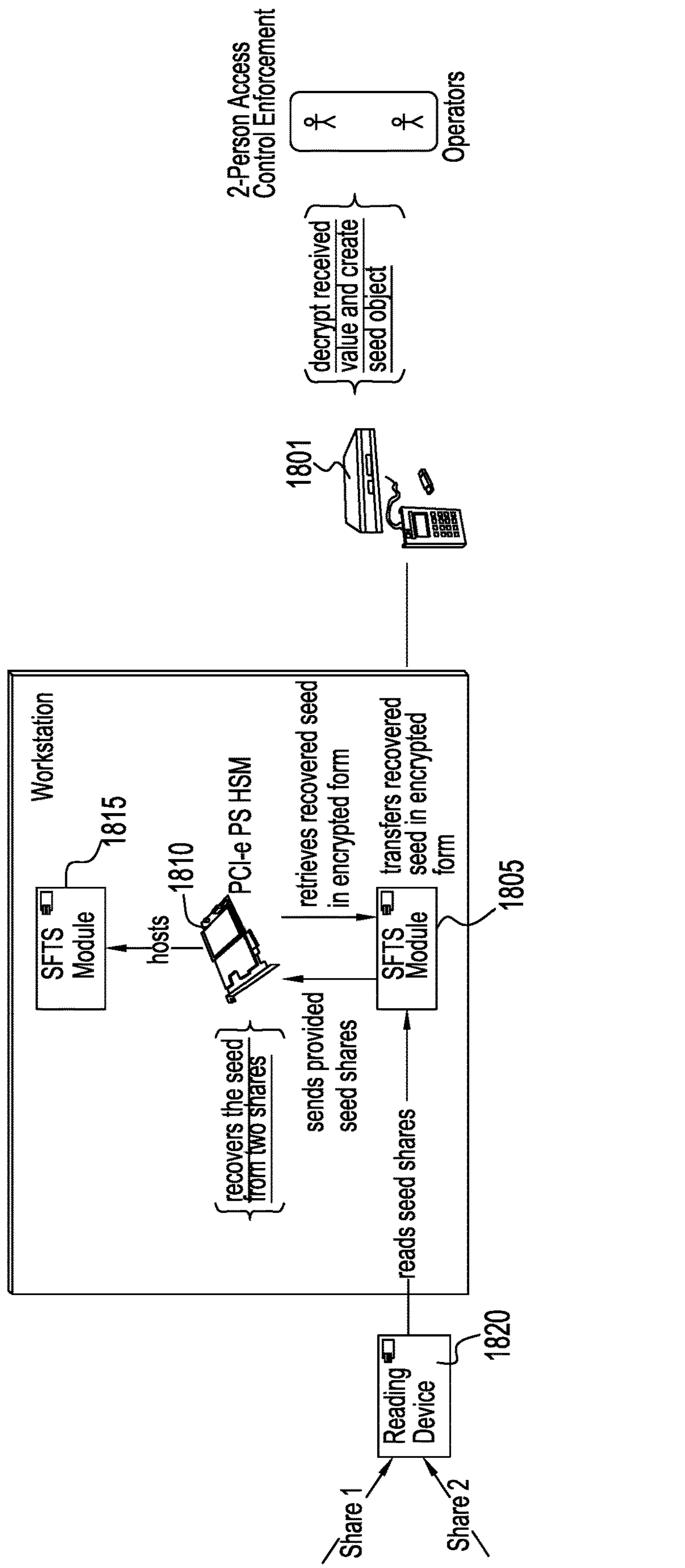
FIG. 18 shows an exemplary key recovery model for the SFTSP.

FIG. 18 shows an exemplary key recovery model for the SFTSP. In FIG. 18, a seed (e.g., master key) may be recovered from seed shares. Seed shares utilized to recover the seed (e.g., a minimum number of seed shares) may be transferred from their storage locations to a recovery center. Operators participating in the key recovery process may enter the seed shares into a reading device 1820 (e.g., each operator may hold and enter a single seed via a barcode reader, keyboard, USB drive, hard drive, portable HSM, etc.), and the reading device may transfer the seed shares to a recovery utility 1805. The recovery utility may request that a seed hosting HSM 1801 (e.g., Gemalto's G5 HSM), which will host the recovered seed and which supports M-of-N authentication, generate a RSA key pair and provide the generated public key. Operators may approve the key pair generation and seed recovery process by authenticating to an authentication entry device associated with the hosting HSM (e.g., using 2-of-3 access control enforcement). The recovery utility may export the generated RSA public key from the hosting HSM and import it into a backup HSM 1810 (e.g., Gemalto's ProtectServer PCI-e HSM), which supports firmware module extensions and hosts SFTS module 1815. The recovery utility may utilize an API call to provide the entered seed shares to the backup HSM and to request recovery of the seed from the provided shares. The backup HSM may recover the seed using an implemented secret recovery method. See FIG. 14 for an example of a secret recovery method. The backup HSM may encrypt the recovered seed using the provided RSA public key and may return the encrypted seed to the recovery utility. The recovery utility may transfer the encrypted seed to the hosting HSM. The hosting HSM may decrypt the seed using the previously generated RSA private key and may store the seed in the hosting HSM. Thus, the full seed is not exposed in decrypted form outside of an HSM device (e.g., in RAM of the host workstation) during the key recovery process, which eliminates the risk of memory-attack theft. As M-of-N shares may be utilized to recover the seed, the redundancy of backup stores is further increased. For example, in a 2-of-4 backup scheme, 4 shares may be stored at four regions separately. If one or two regions are destroyed, shares from the other two regions can still be used to recover the full seed.

Figure 19:
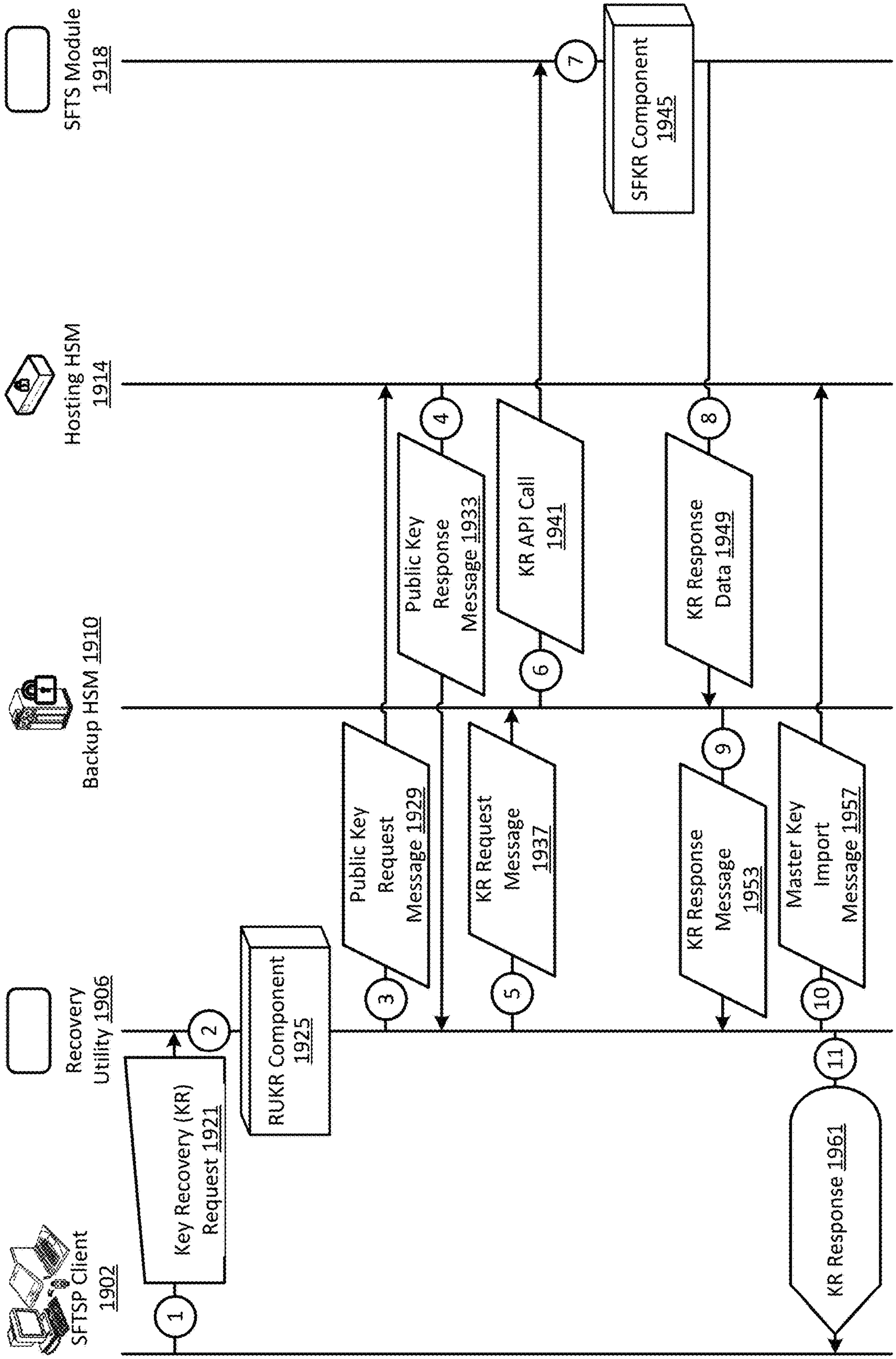
FIG. 19 shows a datagraph diagram illustrating embodiments of a data flow for the SFTSP.

FIG. 19 shows a datagraph diagram illustrating embodiments of a data flow for the SFTSP. In FIG. 19, a user of a SFTSP client 1902 may send a key recovery request 1921 to a recovery utility 1906 to facilitate key recovery (e.g., of a master key associated with a hierarchical deterministic wallet). For example, the SFTSP client may be a desktop, a laptop, a tablet, a smartphone, and/or the like that is executing the recovery utility (e.g., the recovery utility may be the same application as the backup utility or a separate application). In one implementation, the key recovery request may include parameters specified by the user (e.g., via a UI of the recovery utility) such as a request type (e.g., backup master key, recover master key), a wallet identifier (e.g., of the wallet whose master key should be recovered), the number of master key shares sufficient to recover the master key, master key shares (e.g., entered via a reading device), and/or the like.

A recovery utility key recovery (RUKR) component 1925 may utilize parameters provided in the key recovery request to facilitate recovery of the relevant master key (e.g., for the specified wallet). See FIG. 20 for additional details regarding the RUKR component.

The recovery utility may send a public key request message 1929 to a hosting HSM 1914 to request a RSA public key from the hosting HSM. In one implementation, the public key request message may include data such as a request identifier, a recovery request identifier, and/or the like. In one embodiment, the recovery utility may provide the following example public key request message, substantially in the form of a HTTP(S) POST message including XML-formatted data, as provided below:

```
POST /public_key_request_message.php HTTP/1.1
Host: localhost
Content-Type: Application/XML
Content-Length: 667
<?XML version = "1.0" encoding = "UTF-8"?>
<public_key_request_message>
    <request_identifier>ID_request_21</request_identifier>
    <recovery_request_identifier>ID_recovery_request_1</recovery_request_identifier>
</public_key_request_message>
```

The hosting HSM may provide a RSA public key to the recovery utility via a public key response message 1933. In one implementation, the public key response message may include data such as a response identifier, a recovery request identifier, a RSA public key, and/or the like. In one embodiment, the hosting HSM may provide the following example public key response message, substantially in the form of a HTTP(S) POST message including XML-formatted data, as provided below:

```
POST /public_key_response_message.php HTTP/1.1
Host: localhost
Content-Type: Application/XML
Content-Length: 667
<?XML version = "1.0" encoding = "UTF-8"?>
<public_key_response_message>
    <response_identifier>ID_response_21</response_identifier>
    <recovery_request_identifier>ID_recovery_request_1</recovery_request_identifier>
    <RSA_public_key>RSA public key provided by the hosting HSM</RSA_public_key>
</public_key_response_message>
```

The recovery utility may send a key recovery request message 1937 to a backup HSM 1910 to request recovery of a master key (e.g., for the specified wallet) from the backup HSM. In one implementation, the key recovery request message may include data such as a request identifier, a request type, a recovery request identifier, a RSA public key, the number of master key shares sufficient to recover the master key, master key shares, and/or the like. In one embodiment, the recovery utility may provide the following example key recovery request message, substantially in the form of a HTTP(S) POST message including XML-formatted data, as provided below:

```
POST /key_recovery_request_message.php HTTP/1.1
Host: localhost
Content-Type: Application/XML
Content-Length: 667
<?XML version = "1.0" encoding = "UTF-8"?>
<key_recovery_request_message>
    <request_identifier>ID_request_22</request_identifier>
    <request_type>RECOVER_MASTER_KEY</request_type>
    <recovery_request_identifier>ID_recovery_request_1</recovery_request_identifier>
    <RSA_public_key>RSA public key provided by the hosting HSM</RSA_public_key>
    <number_of_shares_sufficient_to_recover>2</number_of_shares_sufficient_to_recover>
```

-continued

```
    <master_key_shares>
    <share>0_1D7927D78EAD692BB1694497180C66B3E88676F22B920625EDECAA1728F2921E
5E309297B76FE658B61DF9D501B49FB553255DFDC8FE966F2950DDD0078C809B02</share>
    <share>1_01658051EB654BBD692013E6E5FB6BA2D9C36980AE0D592D4D07516910646EE0
5B223C3C13C1DF6736232724DF32644791E4A1217DD642C8A7C0A240311DBD1172FE</share>
    </master_key_shares>
</key_recovery_request_message>
```

The backup HSM may make a key recovery API call 1941 to a SFTS module 1918 to request that the SFTS module recover the master key from the master key shares. In one implementation, the key recovery API call may include data such as a request type (e.g., backup master key, recover master key), a RSA public key, the number of master key shares sufficient to recover the master key, master key shares, and/or the like.

Data provided in the key recovery API call may be used by a secure firmware key recovery (SFKR) component 1945 to recover the master key from the master key shares. See FIG. 21 for additional details regarding the SFKR component.

The SFTS module may send key recovery response data 1949 to the backup HSM in response to the key recovery API call. In one implementation, the key recovery response data may include an encrypted recovered master key.

The backup HSM may send a key recovery response message 1953 to the recovery utility. In one implementation, the key recovery response message may include data such as a response identifier, a recovery request identifier, the encrypted recovered master key, and/or the like. In one embodiment, the backup HSM may provide the following example key recovery response message, substantially in the form of a HTTP(S) POST message including XML-formatted data, as provided below:

```
POST /key_recovery_response_message.php HTTP/1.1
Host: localhost
Content-Type: Application/XML
Content-Length: 667
<?XML version = "1.0" encoding = "UTF-8"?>
<key_recovery_response_message>
    <response_identifier>ID_response_22</response_identifier>
    <recovery_request_identifier>ID_recovery_request_1</recovery_request_identifier>
    <master_key>encrypted recovered master key provided by the backup HSM</master_key>
</key_recovery_response_message>
```

The recovery utility may send a master key import message 1957 to the hosting HSM to import the recovered master key into the hosting HSM. In one implementation, the master key import message may include data such as a request identifier, a recovery request identifier, a wallet identifier, the encrypted recovered master key, and/or the like. For example, the hosting HSM may decrypt and/or store the recovered master key for the specified wallet. In one embodiment, the recovery utility may provide the following example master key import message, substantially in the form of a HTTP(S) POST message including XML-formatted data, as provided below

```
POST /master_key_import_message.php HTTP/1.1
Host: localhost
Content-Type: Application/XML
Content-Length: 667
<?XML version = "1.0" encoding = "UTF-8"?>
<master_key_import_message>
    <request_identifier>ID_request_23</request_identifier>
    <recovery_request_identifier>ID_recovery_request_1</recovery_request_identifier>
    <wallet_identifier>ID_Wallet1</wallet_identifier>
    <master_key>encrypted recovered master key provided by the backup HSM</master_key>
</master_key_import_message>
```

The recovery utility may send a key recovery response 1961 to the user. For example, the key recovery response may be used to inform the user whether the key recovery was completed successfully (e.g., via a UI of the recovery utility).

Figure 20:
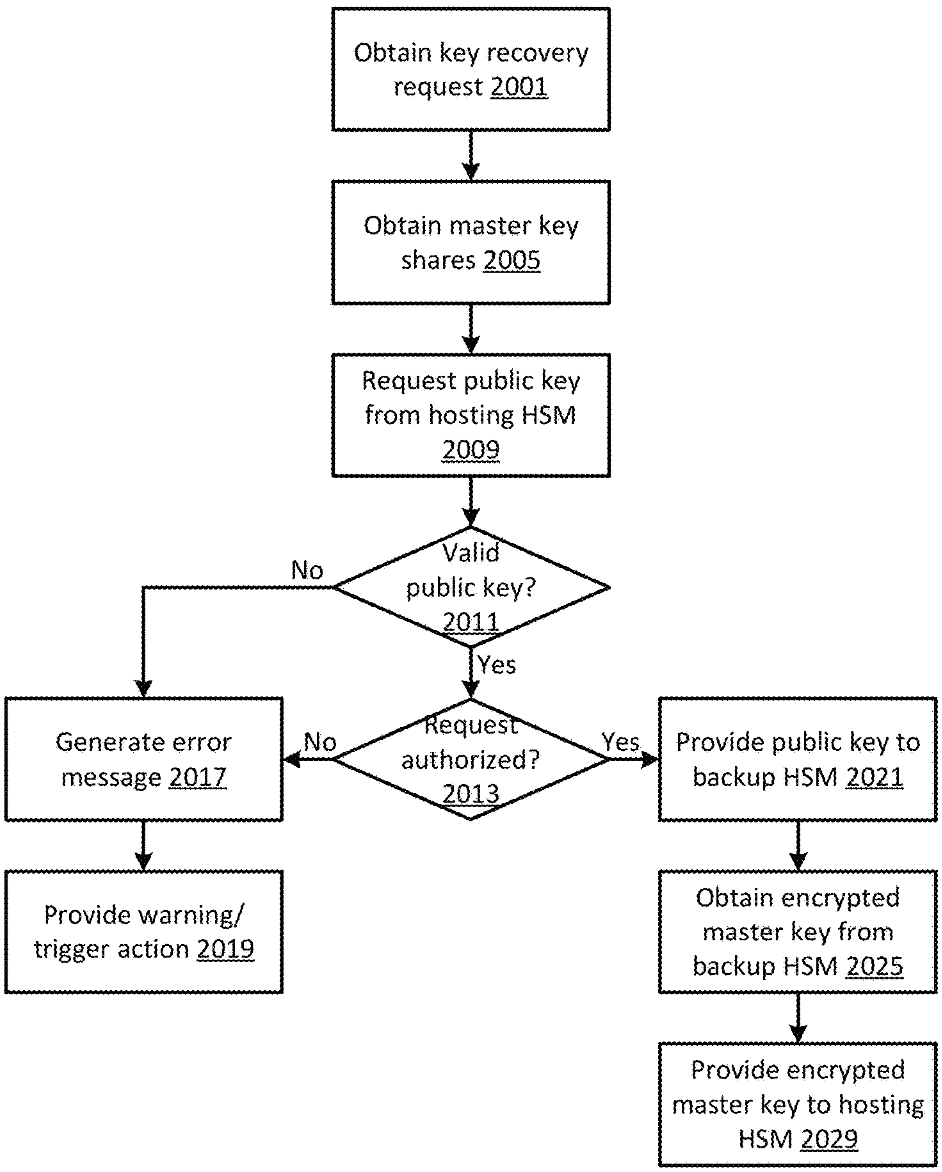
FIG. 20 shows a logic flow diagram illustrating embodiments of a recovery utility key recovery (RUKR) component for the SFTSP.

FIG. 20 shows a logic flow diagram illustrating embodiments of a recovery utility key recovery (RUKR) component for the SFTSP. In FIG. 20, a key recovery request may be obtained at 2001. For example, the key recovery request may be obtained as a result of a user utilizing a UI of a recovery utility to initiate key recovery of a master key associated with a hierarchical deterministic wallet. See FIG. 22 for an example of a UI that may be utilized by the user.

Master key shares utilized to recover the master key (e.g., a minimum number of master key shares sufficient to recover the master key) may be obtained at 2005. In one implementation, the master key shares may be obtained from operators participating in the key recovery process via a reading device. In one implementation, the master key shares may be forwarded to a backup HSM via a key recovery request message.

A RSA public key may be requested from a hosting HSM at 2009. In one implementation, a public key request message may be sent to the hosting HSM to request the RSA public key.

A determination may be made at 2011 whether the obtained RSA public key is valid. For example, the recovery utility may be configured to work with a specified set of hosting HSMs, and the obtained RSA public key may have to be associated with one of the specified hosting HSMs to be valid.

If the obtained RSA public key is not valid, an error message may be generated at 2017. For example, the error message may specify the error that occurred (e.g., RSA public key is not valid). A warning message may be provided to the user and/or an action may be triggered at 2019. In one implementation, a warning message based on the generated error message may be provided to the user to inform the user regarding the error. In another implementation, an action may be triggered based on a specified condition (e.g., invalid RSA public key obtained three times). For example, the triggered action may be to erase data associated with the wallet. In another example, the triggered action may be to invalidate the master key and to generate a new master key.

If the obtained RSA public key is valid, a determination may be made at 2013 whether the key recovery request is authorized. In one implementation, one or more operators (e.g., based on M-of-N authentication) may have to approve (e.g., via an authentication entry device associated with the hosting HSM) the request to recover the master key and to import it into the hosting HSM.

If the key recovery request is not authorized, an error message may be generated at 2017. For example, the error message may specify the error that occurred (e.g., key recovery request is not authorized). A warning message may be provided to the user and/or an action may be triggered at 2019. In one implementation, a warning message based on the generated error message may be provided to the user to inform the user regarding the error. In another implementation, an action may be triggered based on a specified condition (e.g., unauthorized request occurred three times). For example, the triggered action may be to erase data associated with the wallet. In another example, the triggered action may be to invalidate the master key and to generate a new master key.

If the key recovery request is authorized, the RSA public key may be provided to the backup HSM at 2021. For example, the RSA public key may be utilized by the backup HSM to encrypt the recovered master key such that the corresponding RSA private key, available to the hosting HSM, may be used to decrypt the recovered master key. In one implementation, the RSA public key may be forwarded to the backup HSM via the key recovery request message.

The encrypted recovered master key (e.g., for the specified wallet) may be obtained from the backup HSM at 2025. In one implementation, the encrypted recovered master key may be obtained via a key recovery response message sent by the backup HSM.

The encrypted master key may be provided to the hosting HSM at 2029. For example, the hosting HSM may decrypt and/or store the recovered master key for the specified wallet. In one implementation, the encrypted master key may be forwarded to the hosting HSM via a master key import message.

Figure 21:
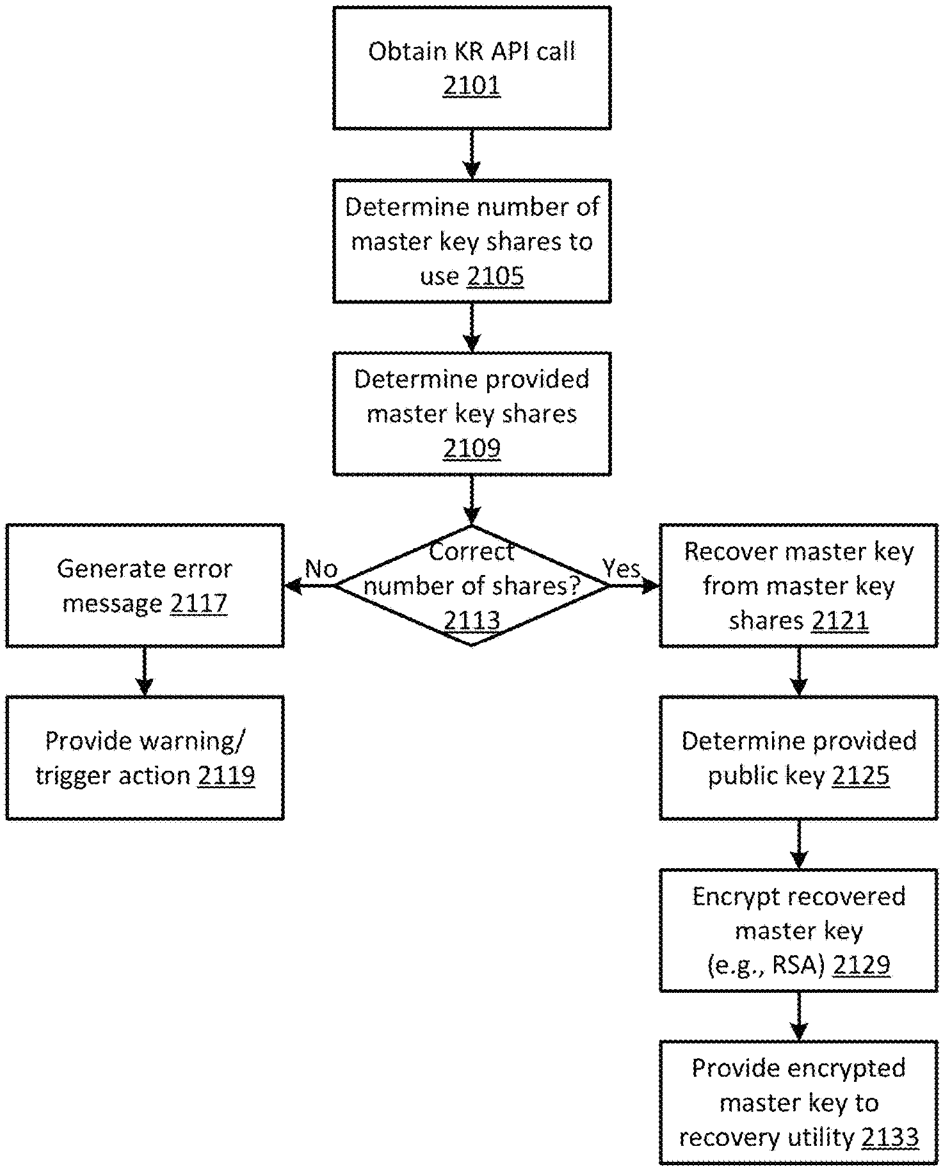
FIG. 21 shows a logic flow diagram illustrating embodiments of a secure firmware key recovery (SFKR) component for the SFTSP.

FIG. 21 shows a logic flow diagram illustrating embodiments of a secure firmware key recovery (SFKR) component for the SFTSP. In FIG. 21, a key recovery API call may be obtained at 2101. For example, the key recovery API call may be obtained as a result of a call from a backup HSM (e.g., based on receiving a key recovery request message from a recovery utility) associated with the SFKR component. In one embodiment, the following API method may be available to the backup HSM and/or to the recovery utility:

CombineSeedShares - this method returns a 512-bit master key value restored from provided master key shares and encrypted with an RSA public key generated by the hosting HSM. The SFKR component uses provided master key shares to restore the full master key value according to the secret sharing algorithm used in the implementation.

Input:
: subarray of master key shares sufficient to recover the master key (M master key shares)

Output:
: 512-bit master key value encrypted with an RSA public key generated by the hosting HSM In one implementation, a C implementation of this method for M-of-N key split may have the following interface:

```
CombineSeedShares(CK_ULONG slot_id,
    const char *pin,
    CK_BYTE_PTR pShares,
    CK_ULONG shares_num,
    CK_BYTE_PTR *phSeed,
    CK_ULONG_PTR phSeed_len)
```

The following table describes input and output parameters:

| Name | Input/ Output | Type | Description | Sample Values |
|---|---|---|---|---|
| slot_id | In | CK_ULONG | Identifier of the target slot inside HSM | 0 |
| pin | In | const char * | User PIN for HSM | 0123 |
| pShares | In | CK_BYTE_PTR | Pointer to the byte array containing the list of secret shares along with their indices | |
| shares_num | In | CK_ULONG | Number of secret shares submitted for master key recovery | 5 |
| phSeed | Out | CK_BYTE_PTR * | Pointer to the pointer to a byte array containing the handle to the recovered full master key | |
| phSeed_len | Out | CK_ULONG_PTR | Pointer to a long number containing the length of the byte array containing the handle to the recovered master key | |

The number of master key shares to use (e.g., the number of master key shares sufficient to recover the master key) may be determined at 2105. In one implementation, this data may be provided as an input parameter in the key recovery API call. In another implementation, this determination may be made via an internal call on a HSM environment setting.

The provided master key shares may be determined at 2109. In one implementation, this data may be provided as input parameters in the key recovery API call.

A determination may be made at 2113 whether the correct number of master key shares was provided. In one implementation, this determination may be made by checking whether the number of provided master key shares matches the number of master key shares to use.

If an incorrect number of master key shares was provided, an error message may be generated at 2117. For example, the error message may specify the error that occurred (e.g., incorrect number of master key shares is provided). A warning message may be provided to a user and/or an action may be triggered at 2119. In one implementation, a warning message based on the generated error message may be provided to the user (e.g., via the recovery utility) to inform the user regarding the error. In another implementation, an action may be triggered based on a specified condition (e.g., incorrect number of master key shares provided three times). For example, the triggered action may be to erase data associated with the wallet. In another example, the triggered action may be to invalidate the master key and to generate a new master key.

If the correct number of master key shares is provided, a master key may be recovered from the provided master key shares at 2121. In one embodiment, a method such as Shamir's Secret Sharing may be utilized to recover the master key from the master key shares based on the specified number of master key shares to use. See FIG. 14 for additional details regarding utilizing Shamir's Secret Sharing. For example, in a 2-of-4 backup scheme, any arbitrary two shares can be used to reconstruct the original full master key.

The provided RSA public key may be determined at 2125. In one implementation, the RSA public key may be provided as an input parameter in the key recovery API call.

The recovered master key may be encrypted using the RSA public key at 2129. In one implementation, the recovered master key may be encrypted using a PKCS #11 function (e.g., C_Encrypt( . . . )).

The encrypted recovered master key may be provided to the recovery utility at 2133. In one implementation, the encrypted recovered master key may be provided to the recovery utility via a key recovery response message.

FIG. 22 shows a screenshot diagram illustrating embodiments of the SFTSP. In FIG. 22, an exemplary interactive CLI of a recovery utility is illustrated. In one implementation, recovery of a master key may involve several users (operators) who authenticate to the involved devices using multi-factor authentication. For example, master key shares' indices and values may have to be manually entered (e.g., twice).

FIG. 23 shows an exemplary architecture for the SFTSP. As shown in FIG. 23, in various embodiments, an Ethereum EOA master private key is split into multiple key shares (e.g., via Shamir's Secret Sharing) which are stored and protected across multiple HSMs. For example, Shamir's Secret Sharing may be implemented as a custom firmware functional module (FM) (e.g., a SFTS module) on a designated HSM device such that at transaction signing runtime the HSM securely reconstructs key shares (e.g., with some stored on other HSM devices) back into a transient full private key on the HSM. When key shares are created (e.g., from a master private key in a key-generation ceremony), one share may be marked as non-extractable on the designated HSM device where the FM with Shamir's Secret Sharing is deployed. HSM storage of this share, under certified FIPS 140-2 level 3 protections, ensures the entire master private key is not vulnerable to key theft since it is not exposed outside of the HSM. A full key compromise entails key share compromises of multiple distributed HSM devices. Reconstruction of the full key and signing occur on the HSM and thus is not vulnerable to memory-based attacks on a wallet host.

At Ethereum transaction signing runtime (e.g., a TSS), key wrapping (e.g., via RSA keys) is used to protect confidentiality and integrity of key shares and transactions being transferred from other HSM devices to the designated HSM for master key reconstruction and signing in the FM. Unwrapping RSA private keys and signing ECDSA keys do not leave the HSM. The SFTSP architecture may be deployed to both online and offline keys for hot (e.g., networked) and cold (e.g., non-networked) storage (e.g., runtime signing steps 1-3 describe online transaction signing with two key shares in hot storage), and to mixed online and offline keys for air-gapped cold storage transaction signing (e.g., runtime signing steps 11-16 describe offline transaction signing with three key shares in hot and cold storage).

The M-of-N authentication schema may be used to achieve key at-rest protection on HSM devices at multiple locations, while maintaining runtime key redundancy and availability for transaction signing. Together with HSM key replication, hardware redundancy and high-availability deployment, the HSM-based key storage infrastructure may offer high scalability, load-balance and fail-over capabilities. The M-of-N authentication schema may also be used for key share backup in long-term offline storage locations for key recovery in case of disaster scenarios.

In one implementation, online transaction signing with key shares in hot storage may be utilized. A transaction (tx) to sign may be obtained (e.g., requested by a user) by an online transaction signing runtime (e.g., a TSS) 2301. A second hot HSM 2309 may wrap (e.g., encrypt) hot key share two H_priv_ss2 with the wrapping key H_RSA_pub of an RSA key pair generated by a first hot HSM 2305 and transfer the wrapped hot key share two to the first hot HSM (e.g., via the online transaction signing runtime). The first hot HSM may unwrap hot key share two using the unwrapping key H_RSA_priv, and merge hot key share two with hot key share one H_priv_ss1 into the hot master private key H_priv using a method such as Shamir's Secret Sharing (e.g., via a SFTS module). The transaction may be signed using a BIP-32 derived child private key of the hot master private key (e.g., via the SFTS module).

In another implementation, offline transaction signing with key shares in hot and cold storage may be utilized. A transaction (tx) to sign may be obtained (e.g., requested by a user) by an online transaction signing runtime (e.g., a TSS) 2301 and provided to a first hot HSM 2305. The first hot HSM may sign the transaction with the unwrapping key H_RSA_priv of a hot RSA key pair generated by the first hot HSM, and may wrap (e.g., encrypt) online cold key share three C_priv_ss3 with the wrapping key C_RSA_pub of a cold RSA key pair generated by a first cold HSM 2325. The signed transaction and the wrapped online cold key share three may be transferred via an external storage device 2315 (e.g., a USB drive) to the first cold HSM. The first cold HSM may unwrap online cold key share three using the unwrapping key C_RSA_priv of the cold RSA pair. A second cold HSM 2329 may wrap (e.g., encrypt) offline cold key share two C_priv_ss2 with the wrapping key C_RSA_pub of the cold RSA pair and transfer the wrapped offline cold key share two to the first cold HSM (e.g., via an offline transaction signing runtime 2321 (e.g., a TSS)). The first cold HSM may unwrap offline cold key share two using the unwrapping key C_RSA_priv of the cold RSA pair, and merge online cold key share three, offline cold key share two, and offline cold key share one C_priv_ss1 into the cold master private key C_priv using a method such as Shamir's Secret Sharing (e.g., via a SFTS module). The first cold HSM may verify the signature of the transaction using the wrapping key H_RSA_pub of the hot RSA pair (e.g., to verify that the transaction was provided by the first hot HSM), and the transaction may be signed using a BIP-32 derived child private key of the cold master private key (e.g., via the SFTS module).

Figure 24A:
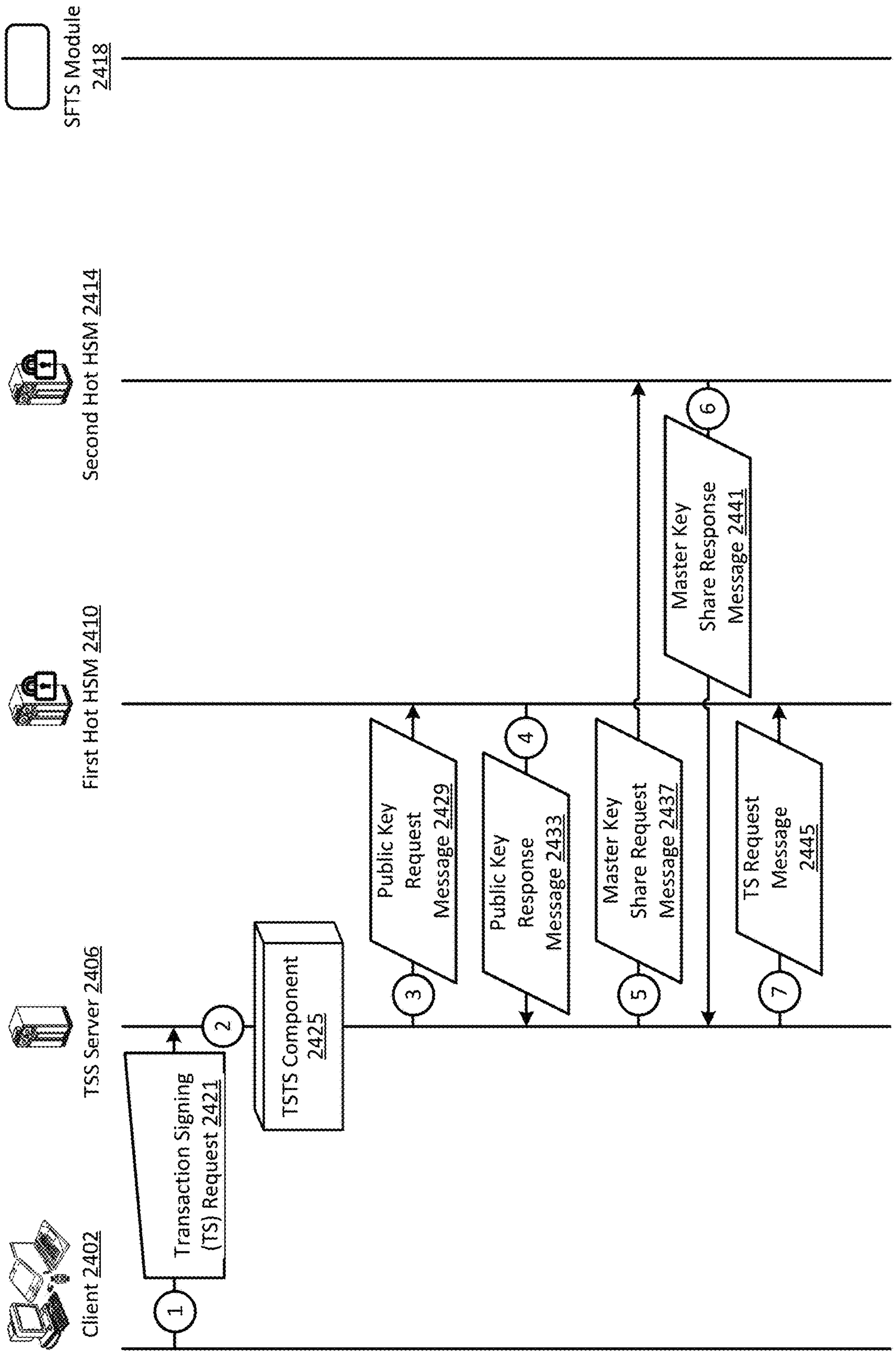
FIGS. 24A-B show a datagraph diagram illustrating embodiments of a data flow for the SFTSP.
Figure 24B:
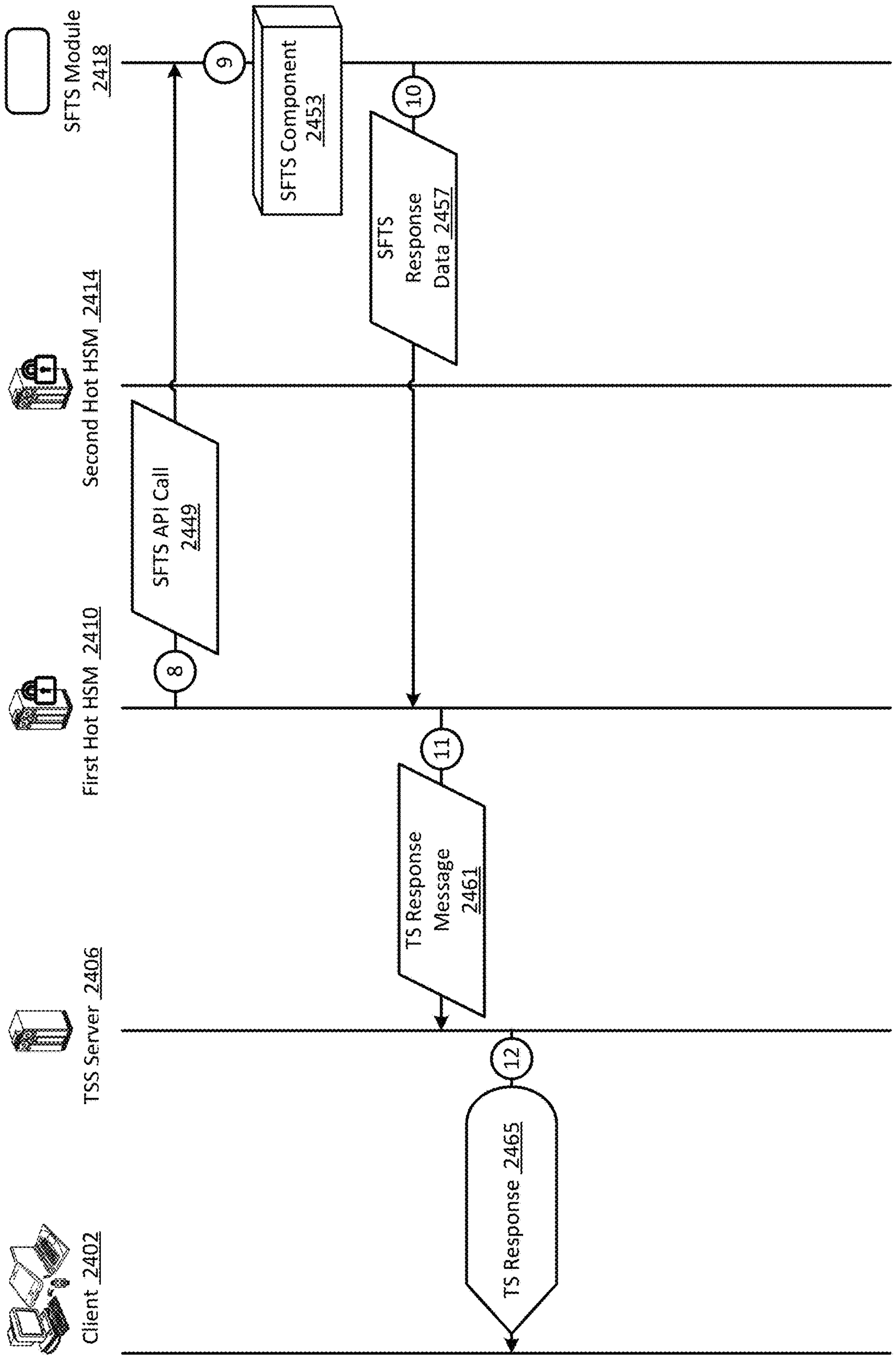

FIGS. 24A-B show a datagraph diagram illustrating embodiments of a data flow for the SFTSP. In FIGS. 24A-B, a client 2402 may send a transaction signing (TS) request 2421 to a TSS server (e.g., an online transaction signing runtime) 2406 to request that an EOA transaction be signed. For example, the client may be a desktop, a laptop, a tablet, a smartphone, and/or the like that is executing a client application. In one implementation, the TS request may include data such as a request identifier, user authentication data, a request type (e.g., sign message hash), a wallet identifier, a transaction identifier, a transaction hash, a keychain path, and/or the like. In one embodiment, the client may provide the following example TS request, substantially in the form of a HTTP(S) POST message including XML-formatted data, as provided below:

```
POST /authrequest.php HTTP/1.1
Host: localhost
Content-Type: Application/XML
Content-Length: 667
<?XML version = "1.0" encoding = "UTF-8"?>
<auth_request>
  <timestamp>2020-12-31 23:59:59</timestamp>
  <user_accounts_details>
    <user_account_credentials>
      <user_name>JohnDaDoeDoeDoooe@gmail.com</account_name>
      <password>abc123</password>
      //OPTIONAL <cookie>cookieID</cookie>
      //OPTIONAL <digital_cert_link>www.mydigitalcertificate.corn/
JohnDoeDaDoeDoe@gmail.com/mycertifcate.dc</digital_cert_link>
      //OPTIONAL <digital_certificate>_DATA_</digital_certificate>
    </user_account_credentials>
  </user_accounts_details>
  <TS_request>
    <request_identifier>ID_request_31</request_identifier>
    <request_type>SIGN_TRANSACTION</request_type>
    <wallet_identifier>ID_Wallet31</wallet_identifier>
    <transaction_identifier>ID_transaction_31</transaction_identifier>
    <transaction_hash>256-bit hash value to be signed</transaction-
_hash>
    <keychain_path>m/0/0/1/0</keychain_path>
  </TS_request>
</auth_request>
```

A transaction server transaction signing (TSTS) component 2425 may utilize parameters provided in the TS request to facilitate transaction signing. See FIG. 25 for additional details regarding the TSTS component.

The TSS server may send a public key request message 2429 to a first hot HSM 2410 to request a RSA public key from the first hot HSM. In one implementation, the public key request message may be sent via a HSM Access Provider and may include data such as a request identifier, a transaction identifier, and/or the like. In one embodiment, the TSS server may provide the following example public key request message, substantially in the form of a HTTP(S) POST message including XML-formatted data, as provided below:

```
POST /public_key_request_message.php HTTP/1.1
Host: localhost
Content-Type: Application/XML
Content-Length: 667
<?XML version = "1.0" encoding = "UTF-8"?>
<public_key_request_message>
  <request_identifier>ID_request_32</request_identifier>
  <transaction_identifier>ID_transaction_31</transaction_identifier>
</public_key_request_message>
```

The first hot HSM may provide a RSA public key to the TSS server via a public key response message 2433. In one implementation, the public key response message may include data such as a response identifier, a transaction identifier, a RSA public key, and/or the like. In one embodiment, the first hot HSM may provide the following example public key response message, substantially in the form of a HTTP(S) POST message including XML-formatted data, as provided below:

```
POST /public_key_response_message.php HTTP/1.1
Host: localhost
Content-Type: Application/XML
Content-Length: 667
```

-continued

```
<?XML version = "1.0" encoding = "UTF-8"?>
<public_key_response_message>
  <response_identifier>ID_response_32</response_identifier>
  <transaction_identifier>I D_transaction_31</transaction_identifier>
  <RSA_public_key>RSA public key provided by the 1st hot
HSM</RSA_public_key>
</public_key_response_message>
```

The TSS server may send a master key share request message 2437 to a second hot HSM 2414 to request an encrypted master key share (e.g., for a specified wallet) from the second hot HSM. In one implementation, the master key share request message may include data such as a request identifier, a transaction identifier, a wallet identifier, a RSA public key, and/or the like. In one embodiment, the TSS server may provide the following example master key share request message, substantially in the form of a HTTP(S) POST message including XML-formatted data, as provided below:

```
POST /master_key_share_request_message.php HTTP/1.1
Host: localhost
Content-Type: Application/XML
Content-Length: 667
<?XML version = "1.0" encoding = "UTF-8"?>
<master_key_share_request_message>
  <request_identifier>ID_request_33</request_identifier>
  <transaction_identifier>ID_transaction_31</transaction_identifier>
  <wallet_identifier>ID_Wallet31</wallet_identifier>
  <RSA_public_key>RSA public key provided by the 1st hot
HSM</RSA_public_key>
</master_key_share_request_message>
```

The second hot HSM may provide the encrypted master key share to the TSS server via a master key share response message 2441. In one implementation, the master key share response message may include data such as a response identifier, a transaction identifier, a wallet identifier, an encrypted master key share, and/or the like. In one embodiment, the second hot HSM may provide the following example master key share response message, substantially in the form of a HTTP(S) POST message including XML-formatted data, as provided below:

```
POST /master_key_share_response_message.php HTTP/1.1
Host: localhost
Content-Type: Application/XML
Content-Length: 667
<?XML version = "1.0" encoding = "UTF-8"?>
<master_key_share_response_message>
  <response_identifier>ID_response_33</response_identifier>
  <transaction_identifier>ID_transaction_31</transaction_identifier>
  <wallet_identifier>ID_Wallet31</wallet_identifier>
  <master_key_share>encrypted master key share provided by the 2nd hot HSM</master_key-
_share>
</master_key_share_response_message>
```

The TSS server may send a TS request message 2445 to the first hot HSM to request that the first hot HSM sign the transaction. In one implementation, the TS request message may be sent via a HSM Access Provider and may include data such as a request identifier, a request type (e.g., sign message hash), a wallet identifier, a transaction identifier, a transaction hash, a keychain path, an encrypted master key share, and/or the like. For example, the TSS server may provide the following example TS request message, substantially in the form of a HTTP(S) POST message including XML-formatted data, as provided below

```
POST /TS_request_message.php HTTP/1.1
Host: localhost
Content-Type: Application/XML
Content-Length: 667
<?XML version = "1.0" encoding = "UTF-8"?>
<TS_request_message>
  <request_identifier>ID_request_34</request_identifier>
  <request_type>SIGN_TRANSACTION</request_type>
  <wallet_identifier>ID_Wallet31</wallet_identifier>
  <transaction_identifier>ID_transaction_31</transaction_identifier>
  <transaction_hash>256-bit hash value to be signed</transaction_hash>
  <keychain_path>m/0/0/1/0</keychain_path>
  <master_key_share>encrypted master key share provided by the 2nd hot HSM</master_key-
_share>
</TS_request_message>
```

The first hot HSM may make a SFTS API call 2449 to a SFTS module 2418 to request that the SFTS module sign the transaction. In one implementation, the SFTS API call may include data such as a request type (e.g., sign message hash), a wallet identifier, a transaction identifier, a transaction hash, a keychain path, an encrypted master key share, and/or the like.

Data provided in the SFTS API call may be used by a secure firmware transaction signing (SFTS) component 2453 to determine a master private key from master key shares and to sign the transaction (e.g., to generate an ECDSA signature in DER format). See FIG. 26 for additional details regarding the SFTS component.

The SFTS module may send SFTS response data 2457 to the first hot HSM in response to the SFTS API call. In one implementation, the SFTS response data may include an ECDSA signature in DER format.

The first hot HSM may send a TS response message 2461 to the TSS server (e.g., via a HSM Access Provider). In one implementation, the TS response message may include data such as a response identifier, a transaction identifier, a transaction signature, and/or the like. For example, the first hot HSM may provide the following example TS response message, substantially in the form of a HTTP(S) POST message including XML-formatted data, as provided below:

```
POST /TS_response_message.php HTTP/1.1
Host: localhost
Content-Type: Application/XML
Content-Length: 667
<?XML version = "1.0" encoding = "UTF-8"?>
<TS_response_message>
  <response_identifier>ID_response_34</response_identifier>
  <transaction_identifier>ID_transaction_31</transaction_identifier>
  <transaction_signature>ECDSA signature in DER
format</transaction_signature>
</TS_response_message>
```

The TSS server may send a TS response 2465 to the client. In one implementation, the TS response may include data such as a response identifier, a transaction identifier, a transaction signature, and/or the like. For example, the TSS server may provide the following example TS response, substantially in the form of a HTTP(S) POST message including XML-formatted data, as provided below:

```
POST /TS_response.php HTTP/1.1
Host: www.server.com
Content-Type: Application/XML
Content-Length: 667
<?XML version = "1.0" encoding = "UTF-8"?>
<TS_response>
  <response_identifier>ID_response_31 </response_identifier>
  <transaction_identifier>ID_transaction_31 </transaction_identifier>
  <transaction_signature>ECDSA signature in DER
format</transaction_signature>
</TS_response>
```

Figure 25:
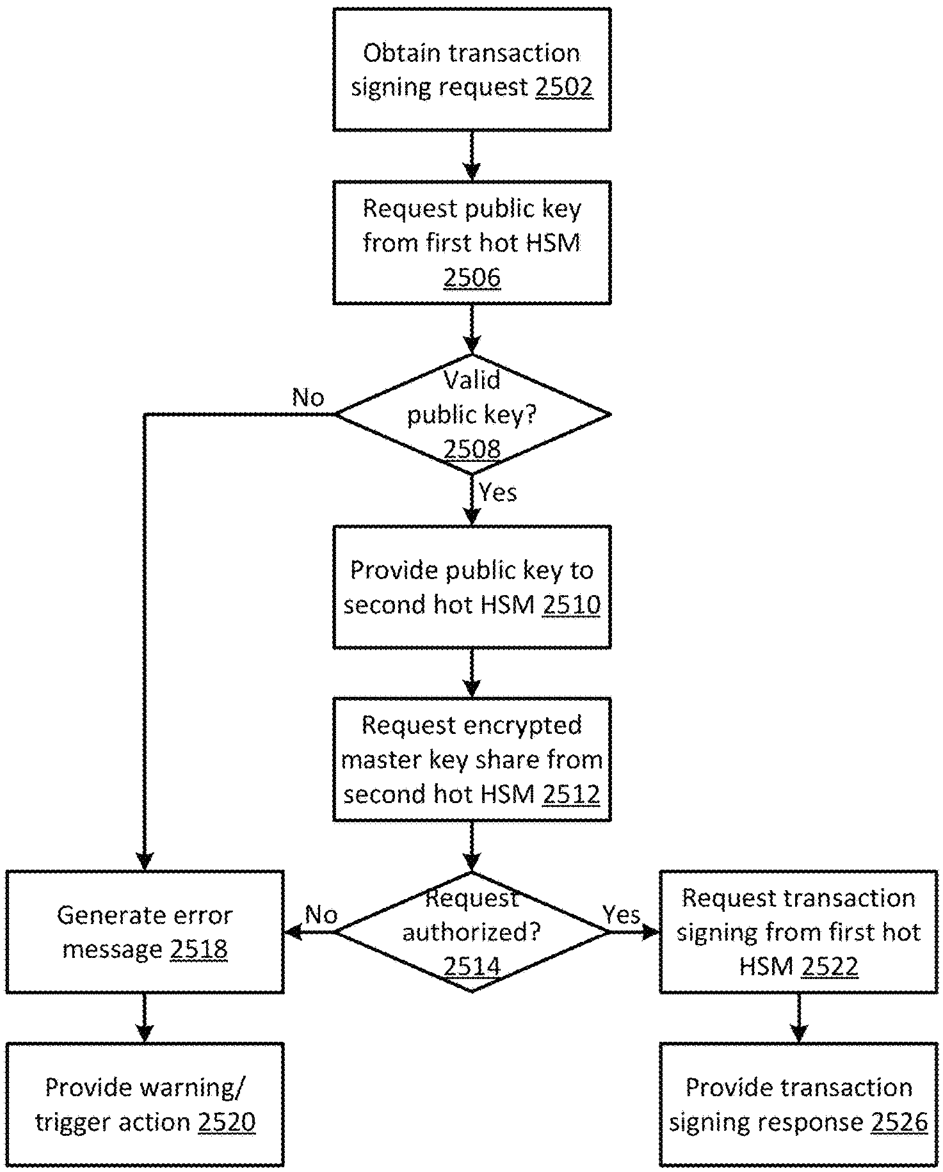
FIG. 25 shows a logic flow diagram illustrating embodiments of a transaction server transaction signing (TSTS) component for the SFTSP.

FIG. 25 shows a logic flow diagram illustrating embodiments of a transaction server transaction signing (TSTS) component for the SFTSP. In FIG. 25, a transaction signing request may be obtained at 2502. For example, the transaction signing request may be obtained as a result of a user utilizing a UI of an online transaction signing runtime CLI program to initiate transaction signing (e.g., a fund transfer EOA transaction on Ethereum blockchain) using a master key associated with a hierarchical deterministic wallet.

An RSA public key may be requested from a first hot HSM at 2506. In one implementation, a public key request message may be sent to the first hot HSM to request the RSA public key.

A determination may be made at 2508 whether the obtained RSA public key is valid. For example, the fund transfer program may be configured to work with a specified set of HSMs, and the obtained RSA public key may have to be associated with one of the specified HSMs to be valid.

If the obtained RSA public key is not valid, an error message may be generated at 2518. For example, the error message may specify the error that occurred (e.g., RSA public key is not valid). A warning message may be provided to the user and/or an action may be triggered at 2520. In one implementation, a warning message based on the generated error message may be provided to the user to inform the user regarding the error. In another implementation, an action may be triggered based on a specified condition (e.g., invalid RSA public key obtained three times). For example, the triggered action may be to erase data associated with the wallet. In another example, the triggered action may be to invalidate the master key and to generate a new master key.

If the obtained RSA public key is valid, the RSA public key may be provided to a second hot HSM at 2510. For example, the RSA public key may be utilized by the second hot HSM to encrypt a second master private key share stored by the second hot HSM such that the corresponding RSA private key, available to the first hot HSM, may be used to decrypt the second master private key share. In one implementation, the RSA public key may be forwarded to the second hot HSM via a master key share request message.

An encrypted second master private key share (e.g., for the specified wallet) may be requested from the second hot HSM at 2512. In one implementation, a master key share request message may be sent to the second hot HSM to request the second master private key share encrypted with the RSA public key.

A determination may be made at 2514 whether the request for the encrypted second master private key share is authorized. In one implementation, one or more operators (e.g., based on M-of-N authentication) may have to approve (e.g., via an authentication entry device associated with the second hot HSM) the request to export the encrypted second master private key share from the second hot HSM for the request to be authorized.

If the request for the encrypted second master private key share is not authorized, an error message may be generated at 2518. For example, the error message may specify the error that occurred (e.g., request to export the encrypted second master private key share from the second hot HSM is not authorized). A warning message may be provided to the user and/or an action may be triggered at 2520. In one implementation, a warning message based on the generated error message may be provided to the user to inform the user regarding the error. In another implementation, an action may be triggered based on a specified condition (e.g., unauthorized request occurred three times). For example, the triggered action may be to erase data associated with the wallet. In another example, the triggered action may be to invalidate the master key and to generate a new master key.

If the request for the encrypted second master private key share is authorized, transaction signing may be requested from the first hot HSM at 2522. In one implementation, a transaction signing request message may be sent to the first hot HSM to request transaction signing.

A transaction signing response may be provided to the client at 2526. In one implementation, a transaction signing response may be sent to the client to inform the user whether the transaction signing was completed successfully (e.g., via a UI of the online transaction signing runtime).

Figure 26:
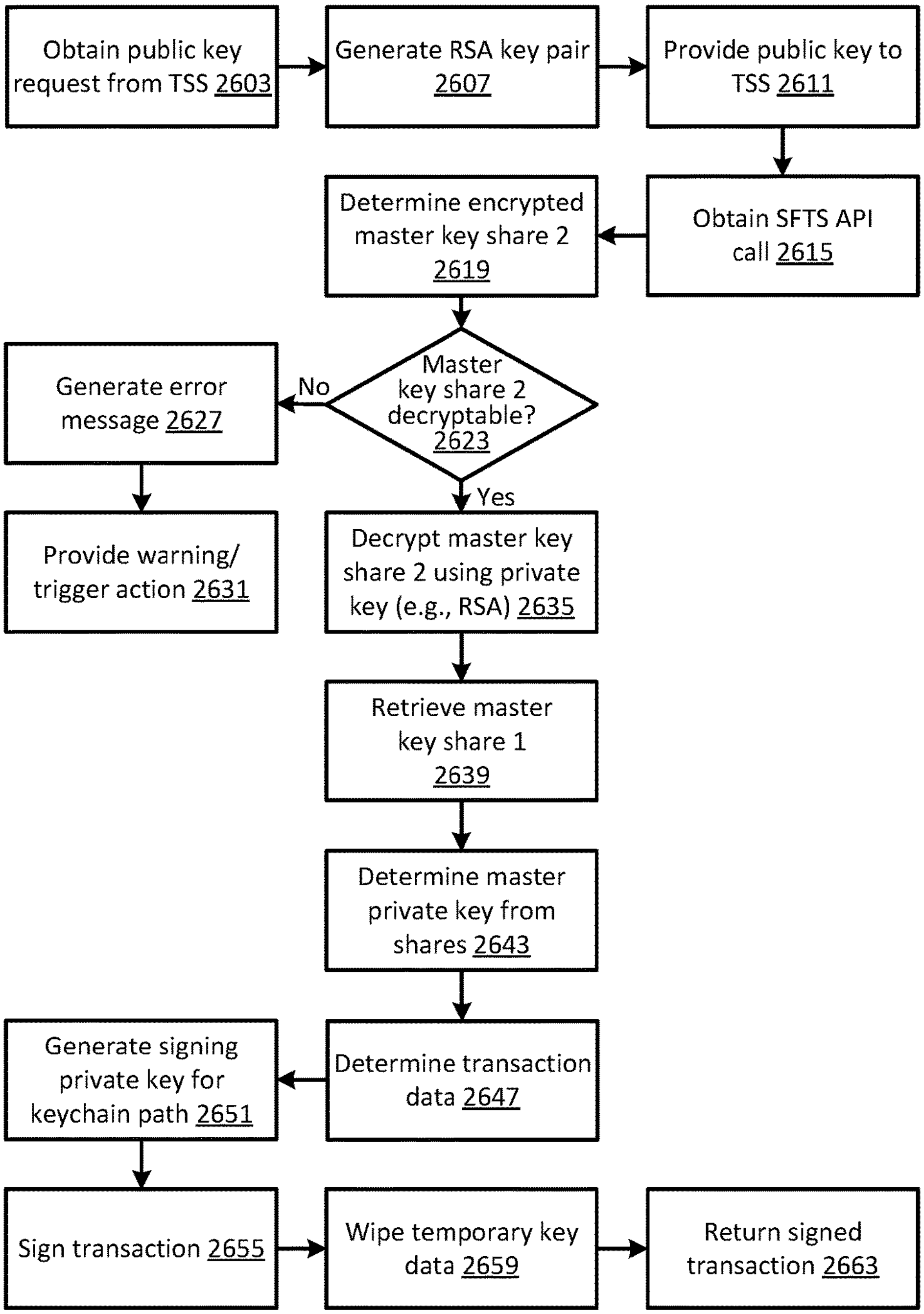
FIG. 26 shows a logic flow diagram illustrating embodiments of a secure firmware transaction signing (SFTS) component for the SFTSP.

FIG. 26 shows a logic flow diagram illustrating embodiments of a secure firmware transaction signing (SFTS) component for the SFTSP. In FIG. 26, a public key request from a TSS may be obtained at 2603. For example, the public key request may be obtained as a result of the TSS facilitating transaction signing.

A RSA key pair may be generated at 2607. In one embodiment, a RSA key pair (e.g., a RSA public key and a corresponding RSA private key) may be predefined (e.g., for a HSM). In one implementation, the RSA public key may be determined using a PKCS #11 function (e.g., C_FindObjectsInit( . . . )). In another implementation, the RSA public key may be determined via an internal call on a HSM environment setting configured externally at HSM deployment time. In an alternative implementation, the RSA public key may be determined via a MySQL database command (e.g., retrieved from a MySQL database in tamper-proof storage). In another embodiment, a RSA key pair may be generated dynamically (e.g., each time transaction signing is executed). In one implementation, a RSA public key may be generated using a PKCS #11 function (e.g., C_CreateObject( . . . )).

The RSA public key may be provided to the TSS at 2611. In one implementation, the RSA public key may be provided to the TSS via a public key response message.

A SFTS API call may be obtained at 2615. For example, the SFTS API call may be obtained as a result of a call from a first hot HSM associated with the SFTS component. It is to be understood that although the SFTS component is described with regard to an API method to sign a transaction (e.g., signMessageHash), in some embodiment, a variety of API methods may be available. In one embodiment, the following API methods may be available to the first hot HSM and/or to a TSS:

implementation, the encrypted second master private key share may be decrypted using a PKCS #11 function (e.g., C_Decrypt( . . . )).

A first master private key share may be retrieved at 2639. In one implementation, the first master private key share may be determined using a PKCS #11 function (e.g., C_FindObjectsInit( . . . )). In another implementation, the first master private key share may be determined via an internal call on a HSM environment setting configured externally at HSM deployment time. In an alternative implementation, the first master private key share may be determined via a MySQL database command (e.g., retrieved from a MySQL database in tamper-proof storage).

A master private key may be determined from master private key shares (e.g., from the first master private key share and the second master private key share) at 2643. In one embodiment, a method such as Shamir's Secret Sharing

--- signMessageHash - this method receives a message hash, a keychain path and a handle to the transient object containing a second master private key share (e.g., encrypted), and returns an ECDSA signature value. Seed reconstruction from shares and key derivation steps are implemented by the SETS component. Temporary keys generated for signing are wiped out of the device once the signing process is complete.

Input:

- 256-bit hash value to be signed
- keychain path to be used for Bip32 key derivation
- handle to the transient object containing a second master private key share (e.g., encrypted)

Output:

- ECDSA signature in DER format

--- may be utilized to recover the master private key from the master private key shares. See FIG. 14 for additional details regarding utilizing Shamir's Secret Sharing.

An encrypted second master private key share utilized to recover a master private key may be determined at 2619. In one implementation, the encrypted second master private key share may be provided as an input parameter in the SFTS API call.

A determination may be made at 2623 whether the encrypted second master private key share is decryptable. In one implementation, this determination may be made by checking whether decrypting the encrypted second master private key share using the RSA private key results in a valid object.

If the encrypted second master private key share is not decryptable, an error message may be generated at 2627. For example, the error message may specify the error that occurred (e.g., second master private key share is not decryptable). A warning message may be provided to a user and/or an action may be triggered at 2631. In one implementation, a warning message based on the generated error message may be provided to the user (e.g., via the TSS) to inform the user regarding the error. In another implementation, an action may be triggered based on a specified condition (e.g., non-decryptable second master private key share obtained three times). For example, the triggered action may be to erase data associated with an associated wallet. In another example, the triggered action may be to invalidate the master key associated with the second master private key share and to generate a new master key.

If the encrypted second master private key share is decryptable, the encrypted second master private key share may be decrypted using the RSA private key at 2635. In one implementation, the RSA private key may be determined using a PKCS #11 function (e.g., C_FindObjectsInit( . . . )). In another implementation, the RSA private key may be determined via an internal call on a HSM environment setting configured externally at HSM deployment time. In an alternative implementation, the RSA private key may be determined via a MySQL database command (e.g., retrieved from a MySQL database in tamper-proof storage). In one Transaction data may be determined at 2647. In one implementation, the transaction data may be provided in the SFTS API call and may include a wallet identifier, a transaction identifier, a transaction hash, a keychain path, and/or the like.

A signing private key for the specified keychain path may be generated using the determined master private key at 2651. In one implementation, the signing private key may be generated in accordance with a deterministic key derivation procedure as described in Bip32. The transaction may be signed at 2655. In one implementation, the generated signing private key may be used to sign the transaction hash in accordance with the hashing algorithm utilized by the Ethereum protocol (e.g., KECCAK256(RLP(message))). For example, the transaction may be signed using a Keccak hash function of a recursive length prefix (RLP) of the message.

Temporary private key data may be wiped from memory at 2659. In one implementation, the second master private key share obtained from the second hot HSM, the determined master private key, and/or the generated signing private key may be wiped from memory of the first hot HSM associated with the SFTS component. The signed transaction may be returned at 2663. In one implementation, the ECDSA signature in DER format may be returned.

Figure 27A:
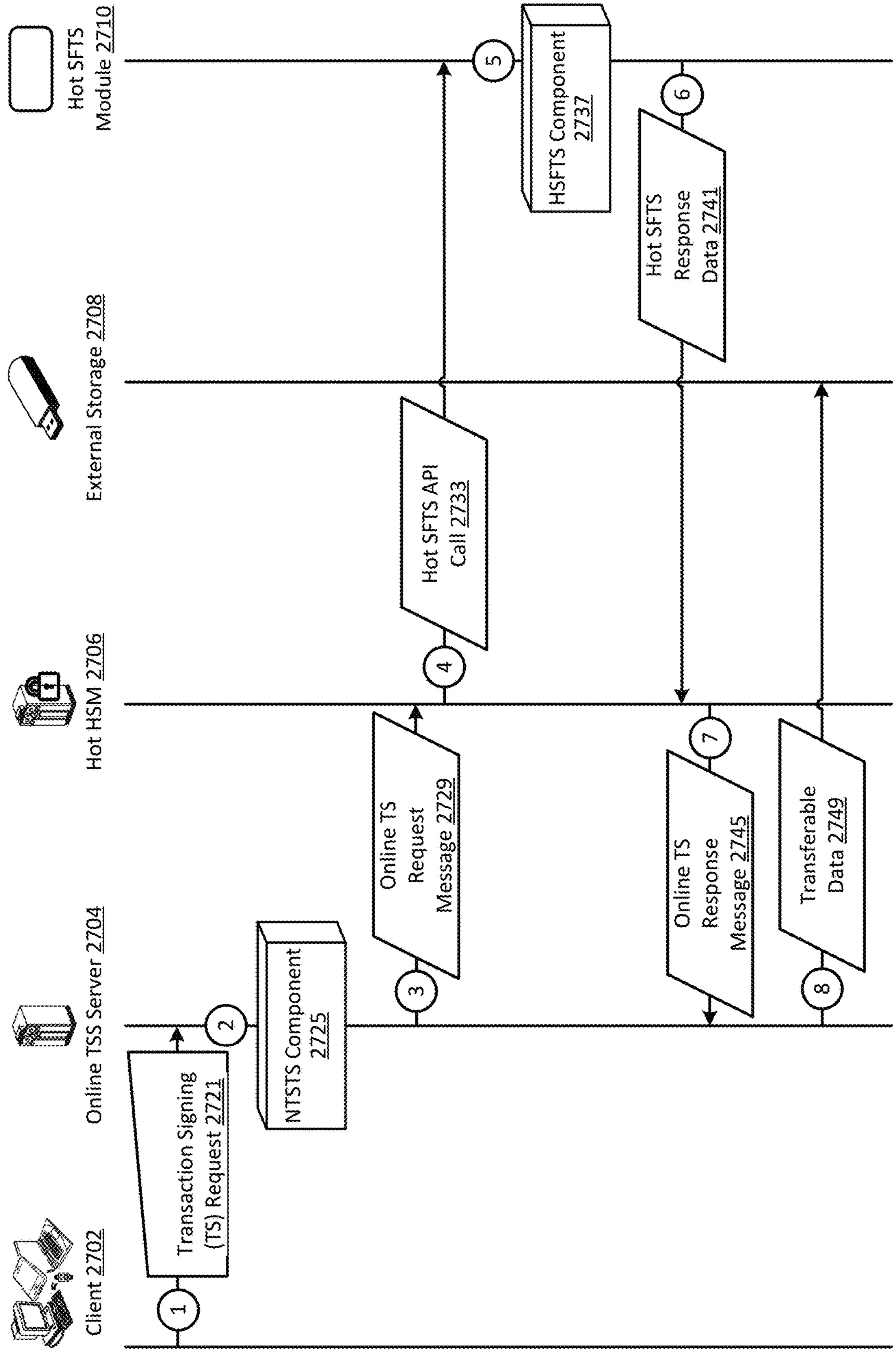
FIGS. 27A-C show a datagraph diagram illustrating embodiments of a data flow for the SFTSP.
Figure 27B:
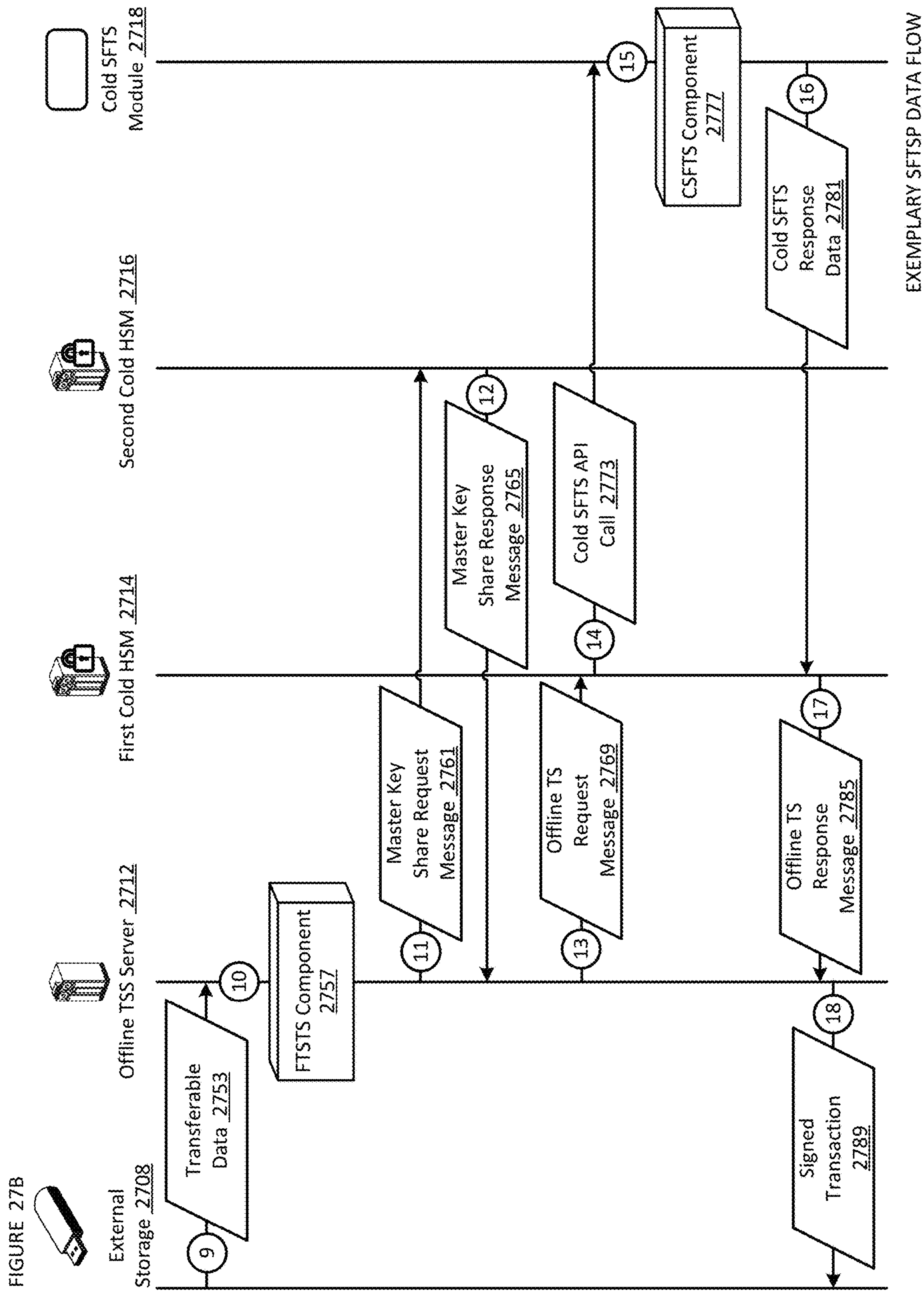
Figure 27:
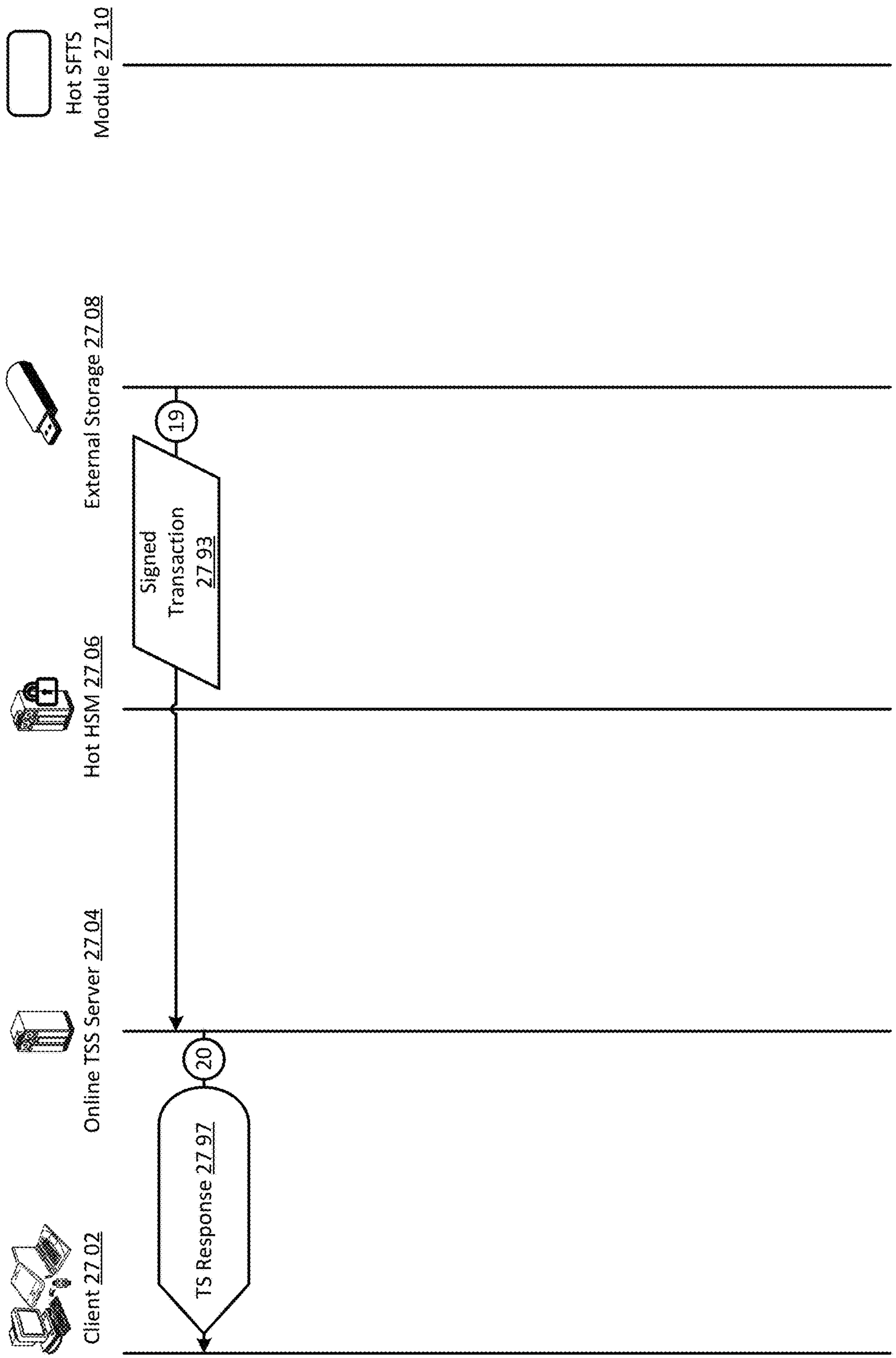

FIGS. 27A-C show a datagraph diagram illustrating embodiments of a data flow for the SFTSP. In FIGS. 27A-C, a user of a client 2702 may send a transaction signing (TS) request 2721 to an online TSS server (e.g., an online transaction signing runtime) 2704 to request that an EOA transaction be signed. For example, the client may be a desktop, a laptop, a tablet, a smartphone, and/or the like that is executing a client application. In one implementation, the TS request may include data such as a request identifier, user authentication data, a request type (e.g., sign message hash), a wallet identifier, a transaction identifier, a transaction hash, a keychain path, and/or the like. In one embodiment, the client may provide the following example TS request, substantially in the form of a HTTP(S) POST message including XML-formatted data, as provided below:

```
POST /authrequest.php HTTP/1.1
Host: localhost
Content-Type: Application/XML
Content-Length: 667
<?XML version = "1.0" encoding = "UTF-8"?>
<auth_request>
  <timestamp>2020-12-31 23:59:59</timestamp>
  <user_accounts_details>
    <user_account_credentials>
      <user_name>JohnDaDoeDoeD000e@gmail.com</account_name>
      <password>abc123</password>
      //OPTIONAL <cookie>cookieID</cookie>
      //OPTIONAL <digital_cert_link>www.mydigitalcertificate.corn/
JohnDoeDaDoeDoe@gmail.com/mycertifcate.dc</digital_cert_link>
      //OPTIONAL <digital_certificate>_DATA_</digital_certificate>
    </user_account_credentials>
  </user_accounts_details>
  <TS_request>
    <request_identifier>ID_request_41</request_identifier>
    <request_type>SIGN_TRANSACTION</request_type>
    <wallet_identifier>ID_Wallet41</wallet_identifier>
    <transaction_identifier>ID_transaction_41</transaction_identifier>
    <transaction_hash>256-bit hash value to be signed</transaction-
_hash>
    <keychain_path>m/0/0/1/0</keychain_path>
  </TS_request>
</auth_request>
```

An online transaction server transaction signing (NTSTS) component 2725 may utilize parameters provided in the TS request to facilitate transaction signing. See FIG. 28 for additional details regarding the NTSTS component.

The online TSS server may send an online TS request message 2729 to a hot HSM 2706 to request transferable data from the hot HSM to facilitate transaction signing. In one implementation, the online TS request message may be sent via a HSM Access Provider and may include data such as a request identifier, a request type (e.g., get transferable data), a wallet identifier, a transaction identifier, transaction data, and/or the like. For example, the online TSS server may provide the following example online TS request message, substantially in the form of a HTTP(S) POST message including XML-formatted data, as provided below:

```
POST /online_TS_request_message.php HTTP/1.1
Host: localhost
Content-Type: Application/XML
Content-Length: 667
<?XML version = "1.0" encoding = "UTF-8"?>
<online_TS_request_message>
  <request_identifier>ID_request_42</request_identifier>
  <request_type>GET_TRANSFERABLE_DATA</request_type>
  <wallet_identifier>ID_Wallet41</wallet_identifier>
  <transaction_identifier>ID_transaction_41</transaction_identifier>
  <transaction_data>transaction data to be signed</transaction_data>
</online_TS_request_message>
```

The hot HSM may make a hot SFTS API call 2733 to a hot SFTS module 2710 to request that the hot SFTS module provide the transferable data. In one implementation, the hot SFTS API call may include data such as a request type (e.g., get transferable data), a wallet identifier, a transaction identifier, transaction data, and/or the like.

Data provided in the hot SFTS API call may be used by a hot secure firmware transaction signing (HSFTS) component 2737 to provide the transferable data. For example, the transferable data may include an encrypted third master private key share (e.g., encrypted with a public key encryption key of a first cold HSM 2714) and signed transaction data (e.g., signed with a RSA private key of the hot HSM). See FIG. 29 for additional details regarding the HSFTS component.

The hot SFTS module may send hot SFTS response data 2741 to the hot HSM in response to the hot SFTS API call. In one implementation, the hot SFTS response data may include the transferable data.

The hot HSM may send an online TS response message 2745 to the online TSS server (e.g., via a HSM Access Provider). In one implementation, the online TS response message may include data such as a response identifier, a transaction identifier, transferable data, and/or the like. For example, the hot HSM may provide the following example online TS response message, substantially in the form of a HTTP(S) POST message including XML-formatted data, as provided below:

```
POST /online_TS_response_message.php HTTP/1.1
Host: localhost
Content-Type: Application/XML
Content-Length: 667
<?XML version = "1.0" encoding = "UTF-8"?>
<online_TS_response_message>
  <response_identifier>ID_response_42</response_identifier>
  <transaction_identifier>ID_transaction_41</transaction_identifier>
  <transferable_data>
    <master_key_share>encrypted master key share provided by the hot
HSM</master_key_share>
    <transaction_data>hot HSM signed transaction data</transaction-
_data>
  </transferable_data>
</online_TS_response_message>
```

The online TSS server may copy the transferable data 2749 and/or other data to an external storage device 2708. In various implementations, the external storage device may be a USB drive (e.g., a flash drive, a hard drive), an SD card, an optical disk, and/or the like.

An offline TSS server 2712 may copy the transferable data 2753 and/or other data from the external storage device. In one implementation, the user may move the external storage device from the online TSS server to the offline TSS server, and may utilize the offline TSS server (e.g., an offline transaction signing runtime) to request that the transaction be signed using the transferable data (e.g., resulting in the copying).

An offline transaction server transaction signing (FTSTS) component 2757 may utilize the transferable data to facilitate transaction signing. See FIG. 30 for additional details regarding the FTSTS component.

In some embodiments, the offline TSS server may send a master key share request message 2761 to a second cold HSM 2716 to request an encrypted master key share (e.g., for a specified wallet) from the second cold HSM. In one implementation, the master key share request message may include data such as a request identifier, a transaction identifier, a wallet identifier, and/or the like. For example, the offline TSS server may provide the following example master key share request message, substantially in the form of a HTTP(S) POST message including XML-formatted data, as provided below:

```
POST /master_key_share_request_message.php HTTP/1.1
Host: www.server.com
Content-Type: Application/XML
Content-Length: 667
<?XML version = "1.0" encoding = "UTF-8"?>
<master_key_share_request_message>
  <request_identifier>ID_request_43</request_identifier>
  <transaction_identifier>ID_transaction_41</transaction_identifier>
  <wallet_identifier>ID_Wallet41</wallet_identifier>
</master_key_share_request_message>
```

In some embodiments, the second cold HSM may provide the encrypted master private key share (e.g., second master private key share encrypted with a public key encryption key of the first cold HSM) to the offline TSS server via a master key response message 2765. In one implementation, the master key share response message may include data such as a response identifier, a transaction identifier, a wallet identifier, an encrypted master key share, and/or the like. In one embodiment, the second cold HSM may provide the following example master key share response message, substantially in the form of a HTTP(S) POST message including XML-formatted data, as provided below:

```
POST /master_key_share_response_message.php HTTP/1.1
Host: localhost
Content-Type: Application/XML
Content-Length: 667
<?XML version = "1.0" encoding = "UTF-8"?>
<master_key_share_response_message>
  <response_identifier>ID_response_43</response_identifier>
  <transaction_identifier>ID_transaction_41</transaction_identifier>
  <wallet_identifier>ID_Wallet41</wallet_identifier>
  <master_key_share>encrypted master key share provided by the 2nd cold HSM</master_key-
_share>
</master_key_share_response_message>
```

The offline TSS server may send an offline TS request message 2769 to the first cold HSM 2714 to request that the first cold HSM sign the transaction. In one implementation, the offline TS request message may be sent via a HSM Access Provider and may include data such as a request identifier, a request type (e.g., sign message hash), a wallet identifier, a transaction identifier, a transaction hash, a keychain path, transferable data, an encrypted master key share, and/or the like. For example, the offline TSS server may provide the following example offline TS request message, substantially in the form of a HTTP(S) POST message including XML-formatted data, as provided below:

```
POST /offline_TS_request_message.php HTTP/1.1
Host: localhost
Content-Type: Application/XML
Content-Length: 667
<?XML version = "1.0" encoding = "UTF-8"?>
<offline_TS_request_message>
  <request_identifier>ID_request_44</request_identifier>
  <request_type>SIGN_TRANSACTION</request_type>
  <wallet_identifier>ID_Wallet41</wallet_identifier>
  <transaction_identifier>ID_transaction_41</transaction_identifier>
  <transaction_hash>256-bit hash value to be signed</transaction_hash>
  <keychain_path>m/0/0/1/0</keychain_path>
  <transferable_data>
    <master_key_share>encrypted master key share provided by the hot
HSM</master_key_share>
    <transaction_data>hot HSM signed transaction data</transaction_data>
  </transferable_data>
  <master_key_share>encrypted master key share provided by the 2nd cold HSM</master_key-
_share>
</offline_TS_request_message>
```

The first cold HSM may make a cold SFTS API call 2773 to a cold SFTS module 2718 to request that the cold SFTS module sign the transaction. In one implementation, the cold SFTS API call may include data such as a request identifier, a request type (e.g., sign message hash), a wallet identifier, a transaction identifier, a transaction hash, a keychain path, transferable data, an encrypted master key share, and/or the like.

Data provided in the cold SFTS API call may be used by a cold secure firmware transaction signing (CSFTS) component 2777 to determine a master private key from master key shares and to sign the transaction (e.g., to generate an ECDSA signature in DER format). See FIG. 31 for additional details regarding the CSFTS component.

The cold SFTS module may send cold SFTS response data 2781 to the first cold HSM in response to the cold SFTS API call. In one implementation, the SFTS response data may include an ECDSA signature in DER format.

The first cold HSM may send an offline TS response message 2785 to the offline TSS server (e.g., via a HSM Access Provider). In one implementation, the offline TS response message may include data such as a response identifier, a transaction identifier, a transaction signature, and/or the like. For example, the first cold HSM may provide the following example offline TS response message, substantially in the form of a HTTP(S) POST message including XML-formatted data, as provided below:

```
POST /offline_TS_response_message.php HTTP/1.1
Host: localhost
Content-Type: Application/XML
Content-Length: 667
<?XML version = "1.0" encoding = "UTF-8"?>
<offline_TS_response_message>
  <response_identifier>ID_response_44</response_identifier>
  <transaction_identifier>I D_transaction_41</transaction_identifier>
  <transaction_signature>ECDSA signature in DER
format</transaction_signature>
</offiline_TS_response_message>
```

% The offline TSS server may copy the signed transaction (e.g., the transaction signature) 2789 and/or other data to the external storage device.

The online TSS server may copy the signed transaction (e.g., the transaction signature) 2793 and/or other data from the external storage device. In one implementation, the user may move the external storage device from the offline TSS server to the online TSS server, and may utilize the online TSS server to finalize transaction processing using the signed transaction (e.g., resulting in the copying).

The online TSS server may send a TS response 2797 to the client. In one implementation, the TS response may include data such as a response identifier, a transaction identifier, a transaction signature, and/or the like. For example, the online TSS server may provide the following example TS response, substantially in the form of a HTTP(S) POST message including XML-formatted data, as provided below:

```
POST /TS_response.php HTTP/1.1
Host: www.server.com
Content-Type: Application/XML
Content-Length: 667
<?XML version = "1.0" encoding = "UTF-8"?>
<TS_response>
  <response_identifier>ID_response_41</response_identifier>
  <transaction_identifier>ID_transaction_41</transaction_identifier>
  <transaction_signature>ECDSA signature in DER format</transaction_signature>
</TS_response>
```

Figure 28:
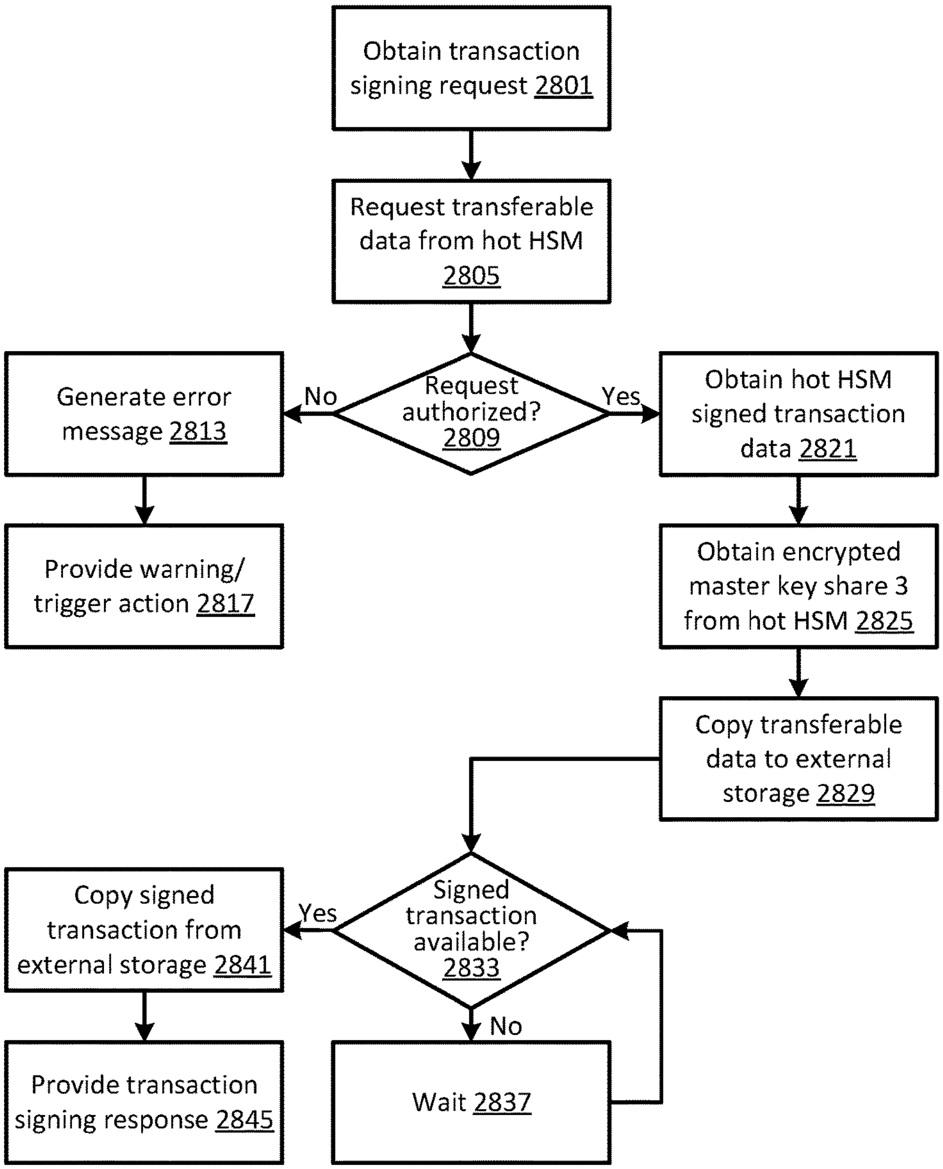
FIG. 28 shows a logic flow diagram illustrating embodiments of an online transaction server transaction signing (NTSTS) component for the SFTSP.

FIG. 28 shows a logic flow diagram illustrating embodiments of an online transaction server transaction signing (NTSTS) component for the SFTSP. In FIG. 28, a transaction signing request may be obtained at 2801. For example, the transaction signing request may be obtained as a result of a user utilizing a UI of an online transaction signing runtime to initiate transaction signing (e.g., a fund transfer EOA transaction on Ethereum blockchain) using a master key associated with a hierarchical deterministic wallet.

Transferable data may be requested from a hot HSM at 2805. For example, the transferable data may include an encrypted third master private key share and signed transaction data. In one implementation, an online TS request message may be sent to the hot HSM to request the transferable data.

A determination may be made at 2809 whether the request for the transferable data is authorized. In one implementation, one or more operators (e.g., based on M-of-N authentication) may have to approve (e.g., via an authentication entry device associated with the hot HSM) the request to provide the transferable data for the request to be authorized.

If the request for the transferable data is not authorized, an error message may be generated at 2813. For example, the error message may specify the error that occurred (e.g., request to provide the transferable data is not authorized). A warning message may be provided to the user and/or an action may be triggered at 2817. In one implementation, a warning message based on the generated error message may be provided to the user to inform the user regarding the error. In another implementation, an action may be triggered based on a specified condition (e.g., unauthorized request occurred three times). For example, the triggered action may be to erase data associated with the wallet. In another example, the triggered action may be to invalidate the master key and to generate a new master key.

If the request for the transferable data is authorized, transaction data signed by the hot HSM may be obtained at 2821 and the encrypted third master private key share may be obtained at 2825 as parts of the transferable data. The obtained transferable data and/or other data utilized to process the transaction may be copied to an external storage device at 2829.

A determination may be made at 2833 whether the signed transaction is available. In one implementation, the user may utilize the UI of the online transaction signing runtime to indicate that the external storage device (e.g., or another USB storage device) containing the signed transaction has been inserted. In another implementation, a notification that the external storage device (e.g., or another USB storage device) has been inserted may be obtained from the operating system and the external storage device may be checked to determine whether the external storage device contains the signed transaction. If the signed transaction is not available, the SFTSP may wait until the signed transaction is available at 2837.

If the signed transaction is available, the signed transaction may be copied from the external storage at 2841. For example, the signed transaction may include an ECDSA signature in DER format.

A transaction signing response may be provided to the client at 2845. In one implementation, a transaction signing response may be sent to the client to inform the user whether the transaction signing was completed successfully (e.g., via a UI of the online transaction signing runtime).

Figure 29:
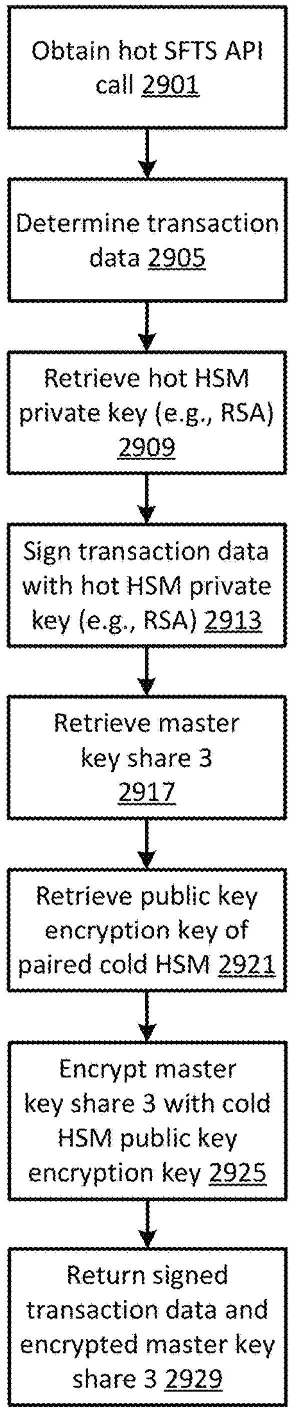
FIG. 29 shows a logic flow diagram illustrating embodiments of a hot secure firmware transaction signing (HSFTS) component for the SFTSP.

FIG. 29 shows a logic flow diagram illustrating embodiments of a hot secure firmware transaction signing (HSFTS) component for the SFTSP. In FIG. 29, a hot SFTS API call may be obtained at 2901. For example, the hot SFTS API call may be obtained as a result of a call from a hot HSM associated with the HSFTS component. It is to be understood that although the HSFTS component is described with regard to an API method to provide transferable data, in some embodiment, a variety of API methods may be available.

Transaction data may be determined at 2905. In one implementation, the transaction data may be provided in the hot SFTS API call and may include a wallet identifier, a transaction identifier, a transaction hash, a keychain path, and/or the like.

A RSA private key for the hot HSM may be retrieved at 2909. In one embodiment, a RSA key pair (e.g., a RSA public key and a corresponding RSA private key) may be predefined (e.g., for the hot HSM). In one implementation, the hot HSM RSA private key may be determined using a PKCS #11 function (e.g., C_FindObjectsInit( . . . )). In another implementation, the hot HSM RSA private key may be determined via an internal call on a HSM environment setting configured externally at HSM deployment time. In an alternative implementation, the hot HSM RSA private key may be determined via a MySQL database command (e.g., retrieved from a MySQL database in tamper-proof storage). In another embodiment, a RSA key pair may be generated dynamically (e.g., each time transaction signing is executed). In one implementation, the hot HSM RSA private key may be generated using a PKCS #11 function (e.g., C_CreateObject( . . . )).

The transaction data may be signed with the hot HSM RSA private key at 2913. In one implementation, the transaction data may be signed using a PKCS #11 function (e.g., C_Sign( . . . )).

A third master private key share may be retrieved at 2917. In one implementation, the third master private key share may be determined using a PKCS #11 function (e.g., C_FindObjectsInit( . . . )). In another implementation, the third master private key share may be determined via an internal call on a HSM environment setting configured externally at HSM deployment time. In an alternative implementation, the third master private key share may be determined via a MySQL database command (e.g., retrieved from a MySQL database in tamper-proof storage).

A public key encryption key of a paired cold HSM may be retrieved at 2921. For example, the public key encryption key may be an RSA public key that corresponds to the RSA private key stored in tamper-proof storage of the paired cold HSM (e.g., first cold HSM 2714). In one implementation, the public key encryption key may be determined using a PKCS #11 function (e.g., C_FindObjectsInit( . . . )). In another implementation, the public key encryption key may be determined via an internal call on a HSM environment setting configured externally at HSM deployment time. In an alternative implementation, the public key encryption key may be determined via a MySQL database command (e.g., retrieved from a MySQL database in tamper-proof storage). In another alternative implementation, the public key encryption key may be generated dynamically (e.g., each time transaction signing is executed) by the paired cold HSM and obtained using public key request and public key response messages (e.g., via an external storage device).

The third master private key share may be encrypted with the public key encryption key of the paired cold HSM at 2925. In one implementation, the third master private key share may be encrypted using a PKCS #11 function (e.g., C_Encrypt( . . . )).

The signed transaction data and/or the encrypted third master private key share may be returned at 2929. In one implementation, the transferable data (e.g., the signed transaction data and/or the encrypted third master private key share) may be an output of the hot SFTS API call.

Figure 30:
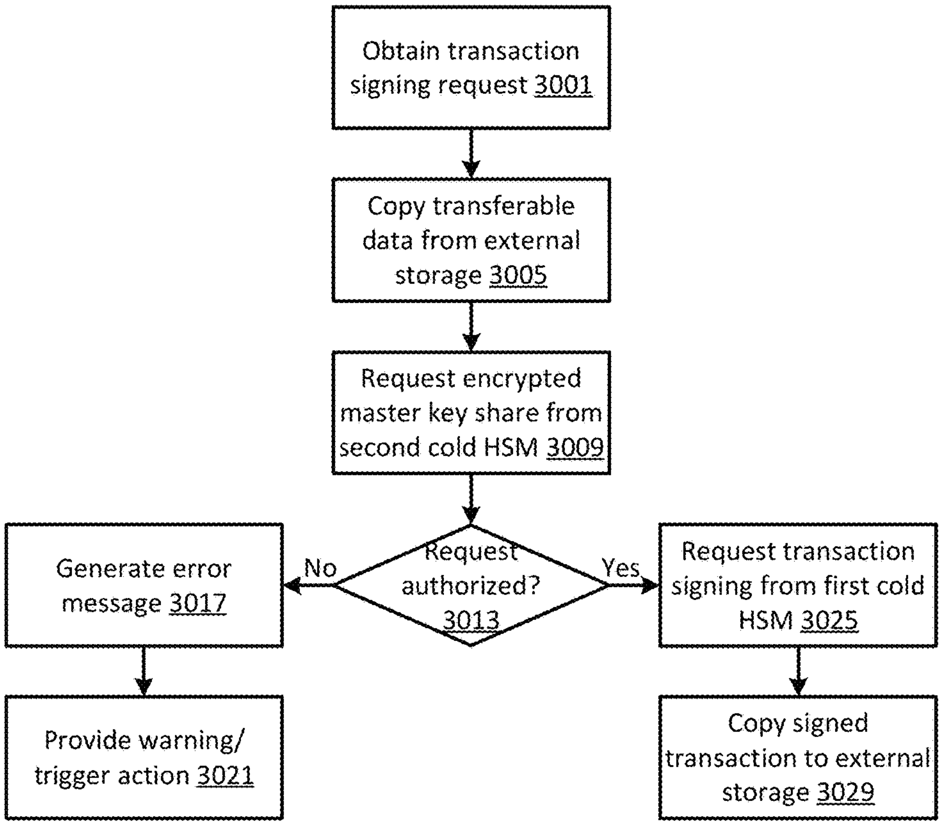
FIG. 30 shows a logic flow diagram illustrating embodiments of an offline transaction server transaction signing (FTSTS) component for the SFTSP.

FIG. 30 shows a logic flow diagram illustrating embodiments of an offline transaction server transaction signing (FTSTS) component for the SFTSP. In FIG. 30, a transaction signing request may be obtained at 3001. For example, the transaction signing request may be obtained as a result of a user utilizing a UI of an offline transaction signing runtime to request that a transaction (e.g., a fund transfer EOA transaction on Ethereum blockchain) be signed using transferable data from an external storage device (e.g., a USB drive inserted by the user).

The transferable data associated with the transaction may be copied from the external storage device at 3005. For example, the transferable data may include an encrypted third master private key share and transaction data signed by a hot HSM.

An encrypted second master private key share (e.g., for a wallet associated with the transaction) may be requested from a second cold HSM at 3009. In one implementation, a master key share request message may be sent to the second cold HSM to request the second master private key share encrypted with an RSA public key that corresponds to the RSA private key stored in tamper-proof storage of a first cold HSM. It is to be understood that, depending on the number of key shares used to reconstruct a full master private key, any number (e.g., none, one, multiple) of second cold HSMs may be utilized in this manner to obtain second master private key shares (e.g., if five key shares are used, three key shares from three second cold HSMs may be utilized in addition to a key share from the hot HSM and a key share from a first cold HSM).

A determination may be made at 3013 whether the request for the encrypted second master private key share is authorized. In one implementation, one or more operators (e.g., based on M-of-N authentication) may have to approve (e.g., via an authentication entry device associated with the second cold HSM) the request to export the encrypted second master private key share from the second cold HSM for the request to be authorized.

If the request for the encrypted second master private key share is not authorized, an error message may be generated at 3017. For example, the error message may specify the error that occurred (e.g., request to export the encrypted second master private key share from the second cold HSM is not authorized). A warning message may be provided to the user and/or an action may be triggered at 3021. In one implementation, a warning message based on the generated error message may be provided to the user to inform the user regarding the error. In another implementation, an action may be triggered based on a specified condition (e.g., unauthorized request occurred three times). For example, the triggered action may be to erase data associated with the wallet. In another example, the triggered action may be to invalidate the master key and to generate a new master key.

If the request for the encrypted second master private key share is authorized, transaction signing may be requested from the first cold HSM at 3025. In one implementation, a transaction signing request message may be sent to the first cold HSM to request transaction signing.

% The signed transaction (e.g., the transaction signature) may be copied to an external storage device at 3029. In one implementation, the signed transaction may be utilized by the NTSTS component to provide a transaction signing response.

Figure 31:
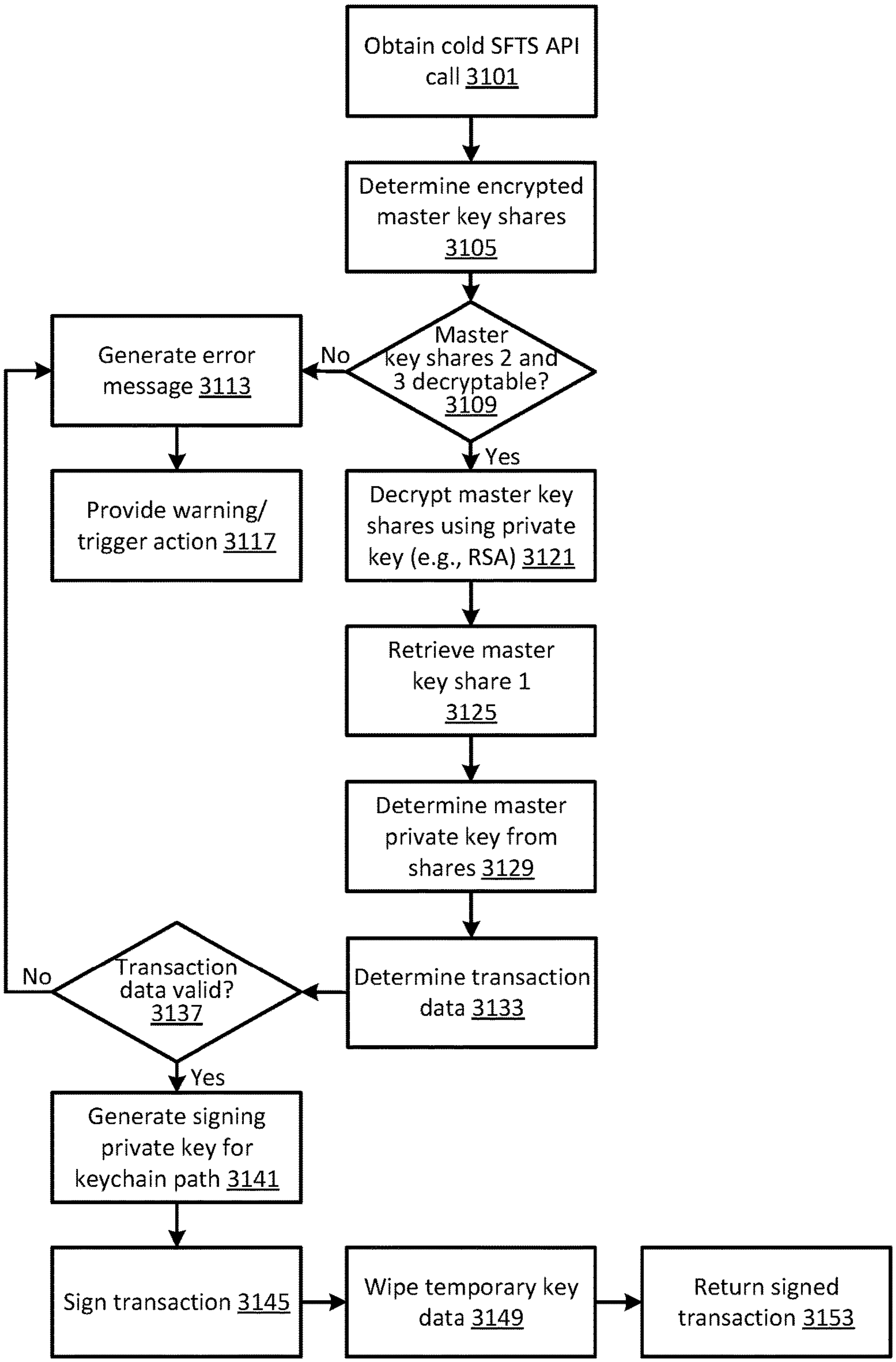
FIG. 31 shows a logic flow diagram illustrating embodiments of a cold secure firmware transaction signing (CSFTS) component for the SFTSP.

FIG. 31 shows a logic flow diagram illustrating embodiments of a cold secure firmware transaction signing (CSFTS) component for the SFTSP. In FIG. 31, a cold SFTS API call may be obtained at 3101. For example, the cold SFTS API call may be obtained as a result of a call from a first cold HSM associated with the CSFTS component. It is to be understood that although the CSFTS component is described with regard to an API method to sign a transaction (e.g., signMessageHash), in some embodiment, a variety of API methods may be available. In one embodiment, the following API methods may be available to the first cold HSM and/or to an offline TSS:

```
signMessageHash - this method receives a message hash, a keychain path and a handle to the transient
object containing a second master private key share (e.g., encrypted), and returns an ECDSA signature
value. Seed reconstruction from shares and key derivation steps are implemented by the CSFTS
component. Temporary keys generated for signing are wiped out of the device once the signing process
is complete.
  Input:
        256-bit hash value to be signed
        keychain path to be used for Bip32 key derivation
        handle to the transient object containing a second master private key share (e.g., encrypted)
  Output:
        ECDSA signature in DER format
```

Encrypted master private key shares utilized to recover a master private key may be determined at 3105. For example, the encrypted master private key shares may include an encrypted second master private key share (e.g., from a second cold HSM) and an encrypted third master private key share (e.g., from a paired hot HSM). In one implementation, the encrypted master private key shares may be provided as input parameters in the cold SFTS API call.

A determination may be made at 3109 whether the encrypted master private key shares are decryptable. In one implementation, this determination may be made by checking whether decrypting the encrypted master private key shares using a private key decryption key stored in tamper-proof storage of the first cold HSM results in valid objects.

If the encrypted master private key shares are not decryptable, an error message may be generated at 3113. For example, the error message may specify the error that occurred (e.g., master private key shares are not decryptable). A warning message may be provided to a user and/or an action may be triggered at 3117. In one implementation, a warning message based on the generated error message may be provided to the user (e.g., via the offline TSS) to inform the user regarding the error. In another implementation, an action may be triggered based on a specified condition (e.g., non-decryptable master private key shares obtained three times). For example, the triggered action may be to erase data associated with an associated wallet. In another example, the triggered action may be to invalidate the master key associated with the master private key shares and to generate a new master key.

If the encrypted master private key shares are decryptable, the encrypted master private key shares may be decrypted using the private key decryption key at 3121. For example, the private key decryption key may be an RSA private key that corresponds to the RSA public key provided to other HSMs. In one implementation, the RSA private key may be determined using a PKCS #11 function (e.g., C_FindObjectsInit( . . . )). In another implementation, the RSA private key may be determined via an internal call on a HSM environment setting configured externally at HSM deployment time. In an alternative implementation, the RSA private key may be determined via a MySQL database command (e.g., retrieved from a MySQL database in tamper-proof storage). In another alternative implementation, the RSA private key may be generated dynamically (e.g., each time transaction signing is executed) and provided to other HSMs using public key request and public key response messages. In one implementation, the encrypted master private key shares may be decrypted using a PKCS #11 function (e.g., C_Decrypt( . . . )).

A first master private key share may be retrieved at 3125. In one implementation, the first master private key share may be determined using a PKCS #11 function (e.g., C_FindObjectsInit( . . . )). In another implementation, the first master private key share may be determined via an internal call on a HSM environment setting configured externally at HSM deployment time. In an alternative implementation, the first master private key share may be determined via a MySQL database command (e.g., retrieved from a MySQL database in tamper-proof storage).

A master private key may be determined from master private key shares (e.g., from the first master private key share, the second master private key share and the third master private key share) at 3129. In one embodiment, a method such as Shamir's Secret Sharing may be utilized to recover the master private key from the master private key shares. See FIG. 14 for additional details regarding utilizing Shamir's Secret Sharing.

Transaction data may be determined at 3133. In one implementation, the transaction data may be provided in the cold SFTS API call and may include a wallet identifier, a transaction identifier, a transaction hash, a keychain path, and/or the like.

A determination may be made at 3137 whether the transaction data is valid. In one embodiment, this determination may be made by checking whether the transaction data has a valid signature from the paired hot HSM. For example, checking the signature facilitates verifying that the transaction data was provided by the paired hot HSM. In one implementation, the signature may be verified using a PKCS #11 function (e.g., C_Verify ( . . . )).

If the signature is invalid, an error message may be generated at 3113. For example, the error message may specify the error that occurred (e.g., transaction data signature is invalid). A warning message may be provided to a user and/or an action may be triggered at 3117. In one implementation, a warning message based on the generated error message may be provided to the user (e.g., via the offline TSS) to inform the user regarding the error. In another implementation, an action may be triggered based on a specified condition (e.g., transaction data with invalid signature obtained three times). For example, the triggered action may be to erase data associated with an associated wallet. In another example, the triggered action may be to invalidate the master key associated with the master private key shares and to generate a new master key.

If the signature is valid, a signing private key for the specified keychain path may be generated using the determined master private key at 3141. In one implementation, the signing private key may be generated in accordance with a deterministic key derivation procedure as described in Bip32. The transaction may be signed at 3145. In one implementation, the generated signing private key may be used to sign the transaction hash in accordance with the hashing algorithm utilized by the Ethereum protocol (e.g., KECCAK256(RLP(message))). For example, the transaction may be signed using a Keccak hash function of a recursive length prefix (RLP) of the message.

Temporary private key data may be wiped from memory at 3149. In one implementation, the second master private key share obtained from the second cold HSM, the third master private key share obtained from the paired hot HSM, the determined master private key, and/or the generated signing private key may be wiped from memory of the first cold HSM associated with the CSFTS component. The signed transaction may be returned at 3153. In one implementation, the ECDSA signature in DER format may be returned.

Figure 32:
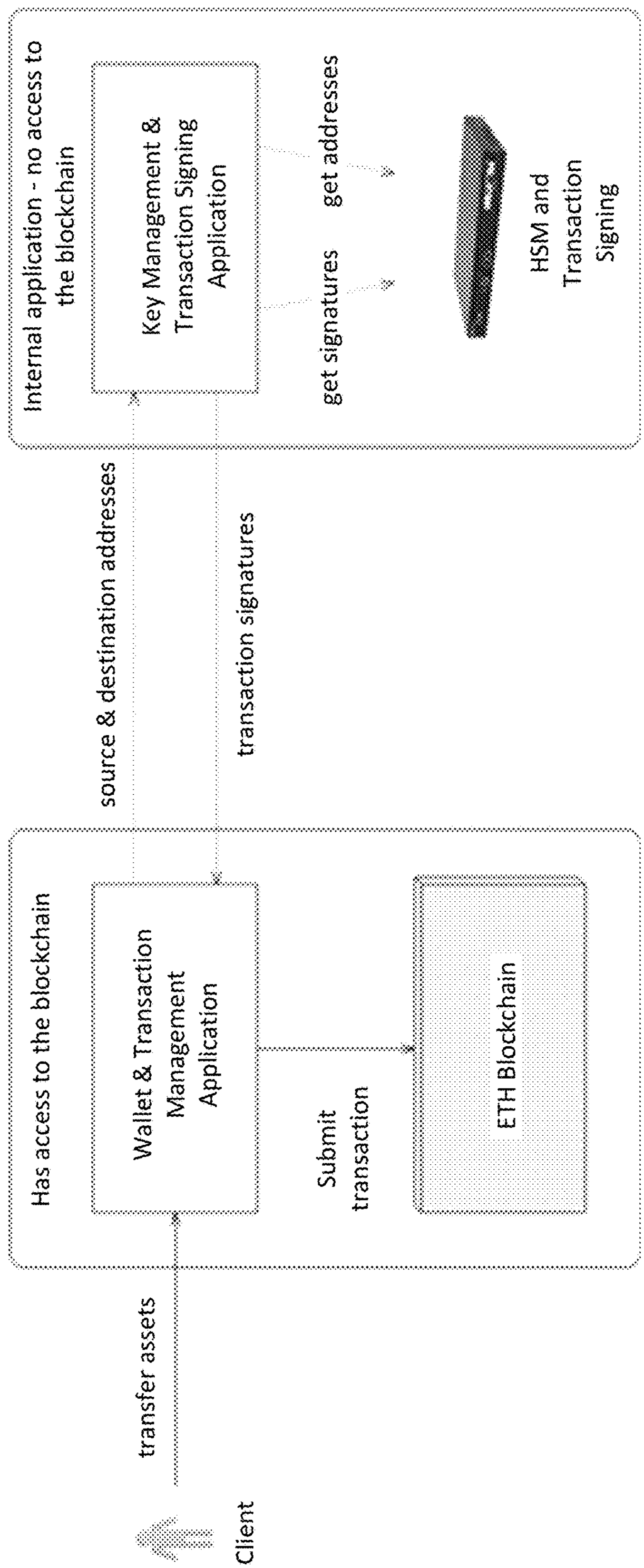
FIG. 32 shows non-limiting, example embodiments of an architecture for the SFTSP.

FIG. 32 shows non-limiting, example embodiments of an architecture for the SFTSP. In FIG. 32, an embodiment of how a wallet & transaction management application and a key management & transaction signing application may be utilized to facilitate validation of wallet addresses participating in blockchain transactions is illustrated.

Multi-signature (m-sig) wallets are used to protect digital assets by enforcing a certain minimum number of signatures from authorized parties for enabling sensitive operations (e.g., transfer of assets, withdrawal of funds, etc.). For example, in a 3-of-5 m-sig wallet at least three holders of wallet-controlling key pairs (owners) must submit their signatures in order to authorize spending transactions.

There is no native multi-signature support built in Ethereum specification and this functionality requires custom implementation using smart contracts (or simply contracts). Further, there is no built-in dependency among wallets' addresses and their owners' key pairs. This dependency, however, can play a significant security control role in systems where wallet management and key management systems are segregated and a key management system uses a FIPS compliant HSM to store wallet keys for transaction signing and address generation. In one embodiment, wallet addresses and transaction compositions are being managed by the Wallet & Transaction Management application and submitted to the Key Management & Transaction Signing application for signing asset movement transactions (e.g., movement of funds from a source to a destination wallet). If any such address, maintained by the Wallet & Transaction Management application, is tampered with, corrupted, or substituted with a malicious one without additional controls, Key Management & Transaction Signing application cannot detect this and may sign a malicious or erroneous transaction resulting in a theft or loss of assets. If, however, participating wallet addresses are dependent on the key materials that are controlled by the Key Management & Transaction Signing application, the latter may be able to validate submitted addresses before generating transaction signatures.

In one embodiment, the SFTSP may include a deployment procedure of Ethereum multi-signature smart contracts that creates a dependency among addresses of deployed contracts and their owners' public keys, and a verification procedure of proving the legitimacy of wallet addresses owned by the parties controlling owners' key pairs.

Figure 33:
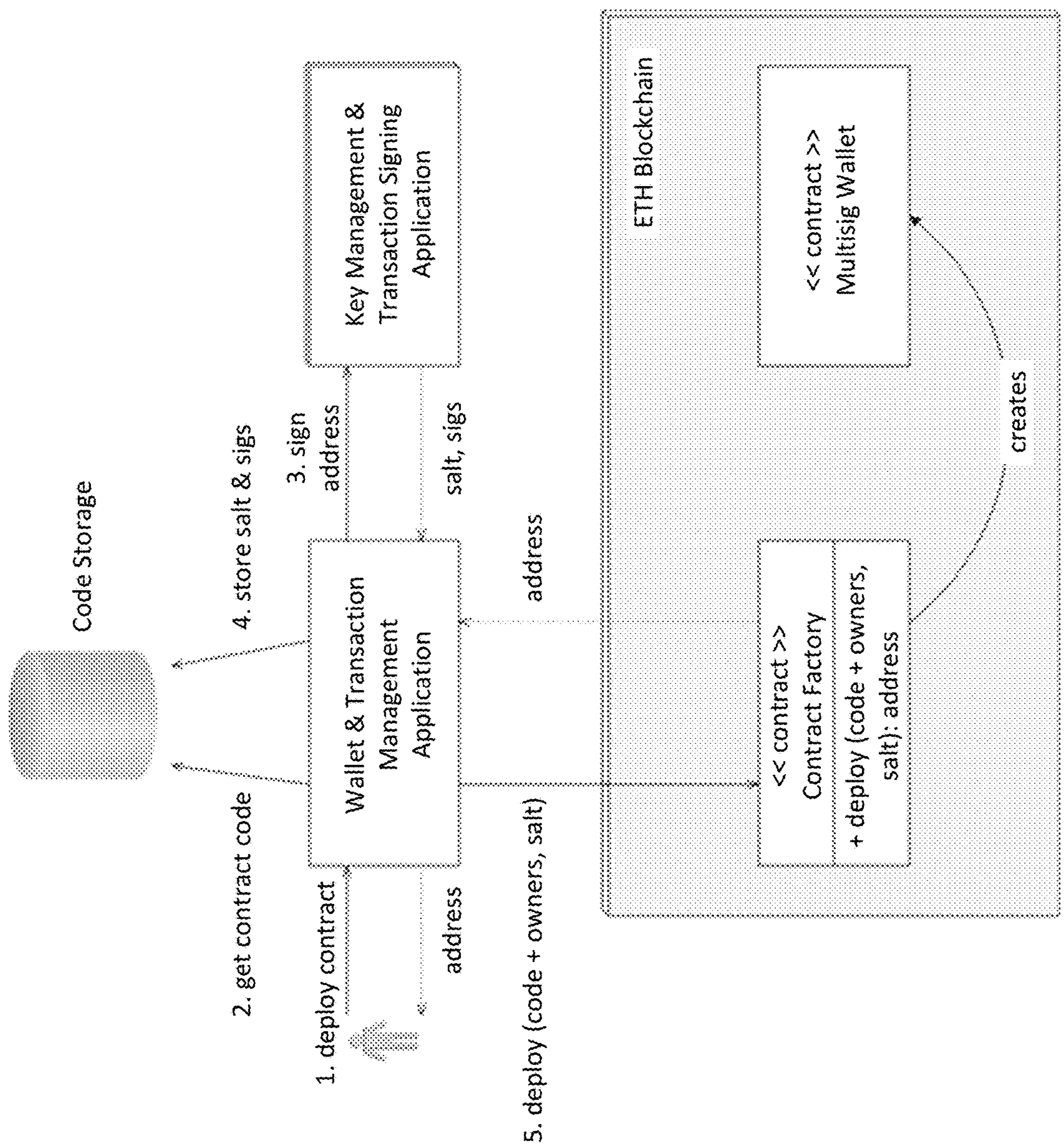
FIG. 33 shows non-limiting, example embodiments of a contract deployment architecture for the SFTSP.

FIG. 33 shows non-limiting, example embodiments of a contract deployment architecture for the SFTSP. In FIG. 33, an embodiment of a deployment procedure of Ethereum multi-signature smart contracts that creates a dependency among addresses of deployed contracts and their owners' public keys is illustrated.

Ethereum specification provides a method, proposed in Ethereum Improvement Protocol (EIP) EIP-1014, to deploy smart contracts and obtain their addresses, where deployment request is being sent as a functional call to an instance of the specialized contract, called Contract Factory, and the address of deployed contract is calculated as a function of the Contract Factory's address, bytecode of the contract being deployed and a one-time 32-byte salt value. Addresses calculated this way do not have any dependency on the keys that actually control the deployed contracts.

In one embodiment, the SFTSP may implement the following deployment procedure to create a dependency among addresses of deployed contracts and their owners' public keys for multi-signature wallet deployment based on EIP-1014 method:

a. For each owner's controlling key pair, generate an EOA address (owner address) from the pair's public key.
b. Make a list of owner addresses an input parameter to the constructor method of the contract and append it to the contract's bytecode.
c. Address of the deployed contract becomes a function of the contract's bytecode and the full list of owners' addresses and can be calculated in advance as follows:

---

An EIP-1014 address = last 20 bytes of the Keccak-256 (SHA-3) hash of the concatenated list of deployment factory's address, salt and Keccak-256 hash of contract's bytecode including constructor parameters - all prefixed with 0xFF byte:

- Factory address: 0x4949d05Cb64224BA4DC94D6A1776455C37c63F53
- Salt: 0x000000000000000000000000000000000000000000000000000000000000208A
- Contract's bytecode (including constructor parameters): 6080604052604051610 81...30005100032
- Minimum number of signatures, necessary to unlock funds: 2
- Owners address 1: 0x788fd5e1f7b444ea36963e1c08261a7188049f6f
- Owners address 2: 0xe82e2d50f58521aea63c87b25173cdb5b9455551

-continued

```
•  Owners address 3: 0xee995c9ded9311a58373d52cfed87d965925f400
⇒ Concatenated list:
   FF 4949d05Cb64224BA4DC94D6A1776455C37c63F53 208A
   Keccak-256(608060405260405161081...2...788fd5e1f7b444ea36963e1c08261a7188049f6f
   e82e2d50f58521aea63c87b25173cdb5b9455551 ee995c9ded9311a58373d52cfed87d965925f400)
⇒ Keccak-256 of concatenated list:
   CC51A85DE52745986D4F95924DBBA4673520EC3D921818A72D18D8E3C100C824
⇒ EIP-1014 address = last 20 bytes:
   0x4Dbba4673520eC3D921818a72d18D8e3C100C824
```

d. Sign this address using the private keys, corresponding to owner's addresses. For the signing procedure, submit the bytecode and Contract Factory's address, as well as identification parameters of the owners' keys. Signing component may:
   i. Generate a one-time 32-byte salt value.
   ii. Generate owner addresses from the key identification parameters.
   iii. Append generated owner addresses to the contract's bytecode and calculate the addresses of the contract after the deployment.
   iv. Append calculated address and the same 32-byte salt, hash the result and sign it with one of owners' private keys.
   v. Repeat the signing procedure for each signing node each time verifying previously generated signatures and reusing the same salt value, generated for the first signature.

Addresses of contracts deployed this way may be calculated in advance and "parked" for security and/or other purposes (e.g., turning on monitoring for contract's events ahead of its deployment, etc.).

Figure 34A:
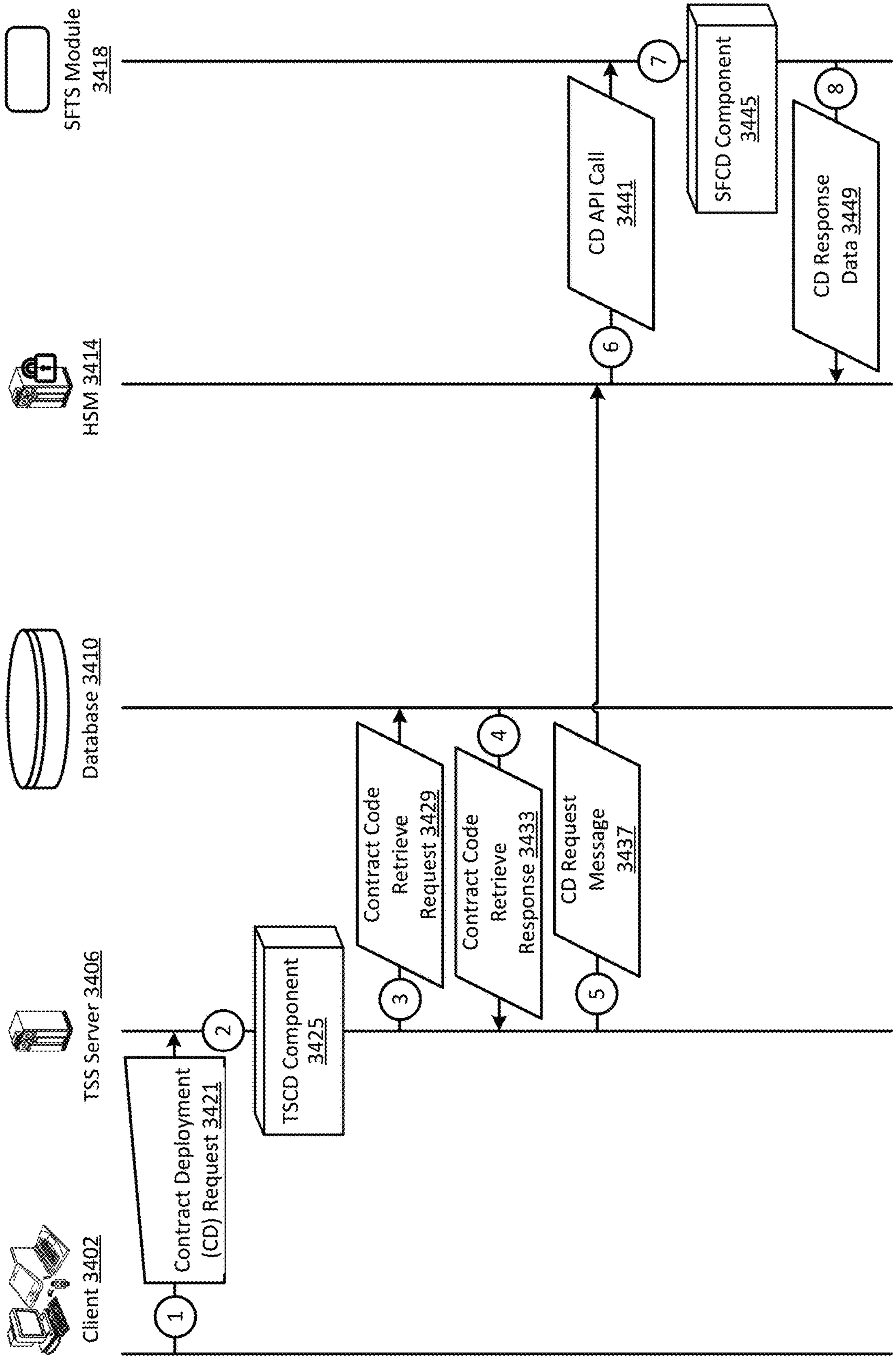
FIGS. 34A-B show non-limiting, example embodiments of a datagraph illustrating data flow(s) for the SFTSP.
Figure 34B:
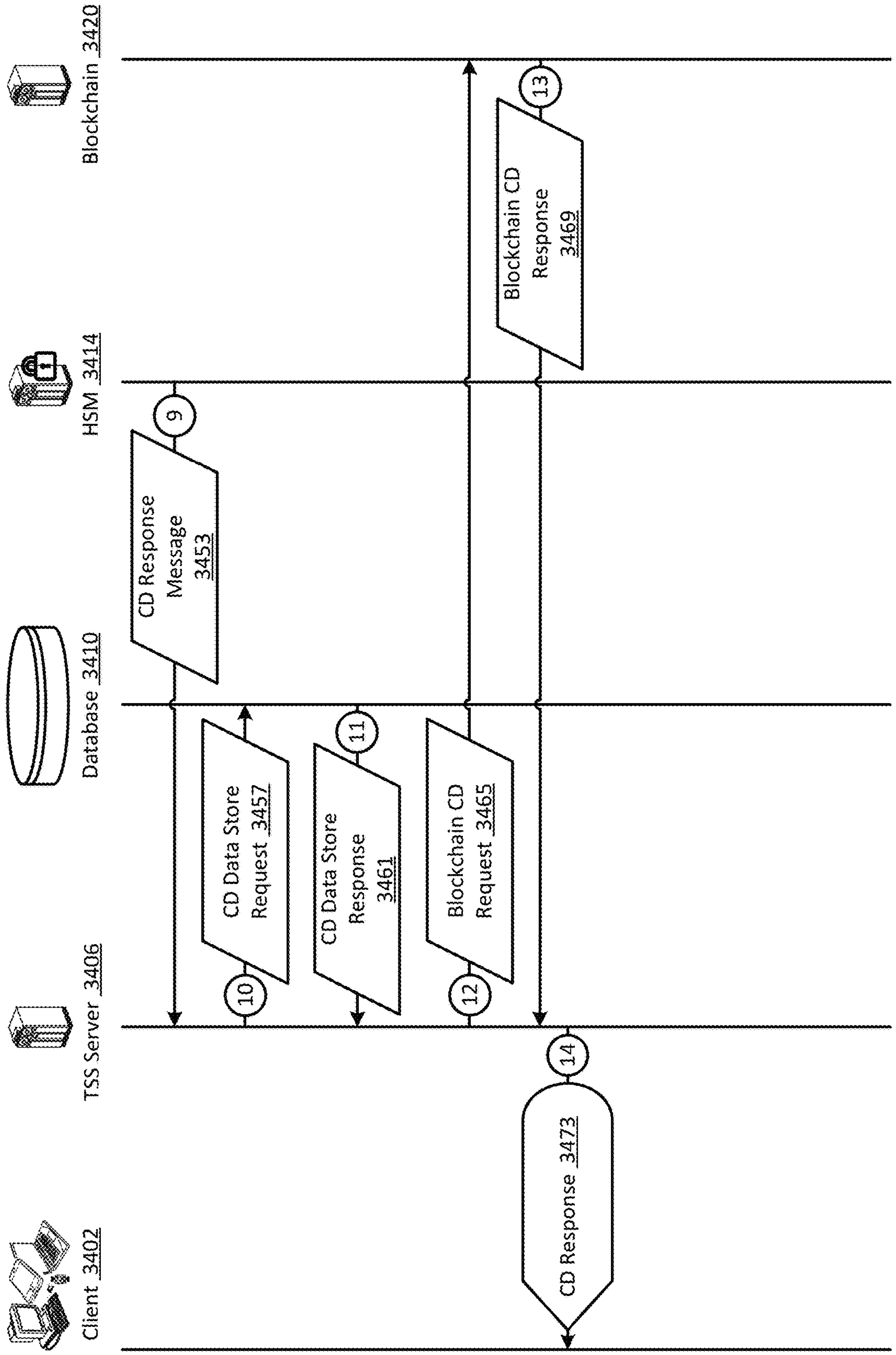

FIGS. 34A-B show non-limiting, example embodiments of a datagraph illustrating data flow(s) for the SFTSP. In FIGS. 34A-B, a client 3402 (e.g., of a user) may send a contract deployment (CD) request 3421 to a TSS server 3406 to request deployment of a smart contract (e.g., an Ethereum multi-signature smart contract with a dependency between the address of the deployed contract and the owners' public keys). For example, the client may be a desktop, a laptop, a tablet, a smartphone, a smartwatch, and/or the like that is executing a client application. In one implementation, the contract deployment request may include data such as a request identifier, user authentication data, a request type (e.g., deploy contract), contract parameters (e.g., contract identifier, M-of-N, owners), and/or the like. In one embodiment, the client may provide the following example contract deployment request, substantially in the form of a HTTP(S) POST message including XML-formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
  <timestamp>2020-12-31 23:59:59</timestamp>
  <user_accounts_details>
      <user_account_credentials>
          <user_name>JohnDaDoeDoeDoooe@gmail.com</account_name>

          <password>abc123</password>
          //OPTIONAL <cookie>cookieID</cookie>
          //OPTIONAL <digital_cert_link>www.mydigitalcertificate.com/
JohnDoeDaDoeDoe@gmail.com/mycertifcate.dc</digital_cert_link>
          //OPTIONAL <digital_certificate>_DATA_</digital_certificate>
      </user_account_credentials>
  </user_accounts_details>
  <contract_deployment_request>
    <request_identifier>ID_request_51</request_identifier>
    <request_type>DEPLOY_CONTRACT</request_type>
    <contract_parameters>
      <contract_identifier>ID_contract_51</contract_identifier>
      <M_of_N>2-of-3</M_of_N>
      <owner>
        <owner_identifier>ID_user_1</owner_identifier>
        <keyset_identifier>ID_master_key_pair_1</keyset_identifier>
        <keychain_path>m/0/0/1/0</keychain_path>
      </owner>
      <owner>
        <owner_identifier>ID_user_2</owner_identifier>
        <keyset_identifier>ID_master_key_pair_2</keyset_identifier>
        <keychain_path>m/0/0/1/0</keychain_path>
      </owner>
      <owner>
        <owner_identifier>ID_user_3</owner_identifier>
        <keyset_identifier>ID_master_key_pair_3</keyset_identifier>
        <keychain_path>m/0/0/1/0</keychain_path>
      </owner>
```

-continued

```
    </contract_parameters>
  </contract_deployment_request>
</auth_request>
```

A TSCD component 3425 may utilize data provided in the contract deployment request to facilitate contract deployment. See FIG. 35 for additional details regarding the TSCD component.

The TSS server 3406 may send a contract code retrieve request 3429 to a database 3410 to retrieve the contract's code (e.g., bytecode (e.g., including constructor parameters)). In one implementation, the contract code retrieve request may include data such as a request identifier, a contract identifier, and/or the like. In one embodiment, the TSS server may provide the following example contract code retrieve request, substantially in the form of a HTTP(S) POST message including XML-formatted data, as provided below:

```
POST /contract_code_retrieve_request.php HTTP/1.1
Host: www.server.com
Content-Type: Application/XML
Content-Length: 667
<?XML version = "1.0" encoding = "UTF-8"?>
<contract_code_retrieve_request>
  <request_identifier>ID_request_52</request_identifier>
  <contract_identifier>ID_contract_51</contract_identifier>
</contract_code_retrieve_request>
```

The database 3410 may send a contract code retrieve response 3433 to the TSS server 3406 with the requested contract code. In one implementation, the contract code retrieve response may include data such as a response identifier, the requested contract code, and/or the like. In one embodiment, the database may provide the following example contract code retrieve response, substantially in the form of a HTTP(S) POST message including XML-formatted data, as provided below:

```
POST /contract_code_retrieve_response.php HTTP/1.1
Host: www.server.com
Content-Type: Application/XML
Content-Length: 667
<?XML version = "1.0" encoding = "UTF-8"?>
<contract_code_retrieve_response>
  <response_identifier>ID_response_52</response_identifier>
  <bytecode>608060405260405161081...30005100032</bytecode>
</contract_code_retrieve_response>
```

The TSS server 3406 may send a CD request message 3437 to a HSM 3414 to request that the HSM sign the contract and/or provide contract deployment data. In one implementation, the CD request message may include data such as a request identifier, a request type (e.g., deploy contract), contract parameters (e.g., contract identifier, M-of-N, owners), contract code, contract factory address, and/or the like. In one embodiment, the TSS server may provide the following example CD request message, substantially in the form of a HTTP(S) POST message including XML-formatted data, as provided below:

```
POST /CD_request_message.php HTTP/1.1
Host: www.server.com
```

-continued

```
Content-Type: Application/XML
Content-Length: 667
<?XML version = "1.0" encoding = "UTF-8"?>
<CD_request_message>
  <request_identifier>ID_request_53</request_identifier>
  <request_type>DEPLOY_CONTRACT</request_type>
  <contract_parameters>
    <contract_identifier>ID_contract_51</contract_identifier>
    <M_of_N>2-of-3</M_of_N>
    <owner>
      <owner_identifier>ID_user_1</owner_identifier>
      <keyset_identifier>ID_master_key_pair_1</keyset_identifier>
      <keychain_path>m/0/0/1/0</keychain_path>
    </owner>
    <owner>
      <owner_identifier>ID_user_2</owner_identifier>
      <keyset_identifier>ID_master_key_pair_2</keyset_identifier>
      <keychain_path>m/0/0/1/0</keychain_path>
    </owner>
    <owner>
      <owner_identifier>ID_user_3</owner_identifier>
      <keyset_identifier>ID_master_key_pair_3</keyset_identifier>
      <keychain_path>m/0/0/1/0</keychain_path>
    </owner>
  </contract_parameters>
  <bytecode>608060405260405161081...30005100032</bytecode>
  <contract_factory_address>
    0x4949d05Cb64224BA4DC94D6A1776455C37c63F53
  </contract_factory_address>
</CD_request_message>
```

The HSM 3414 may send a CD API call 3441 to a SFTS module 3418 to request that the SFTS module sign the contract and/or provide contract deployment data. In one implementation, the CD API call may include data such as a request identifier, a request type (e.g., deploy contract), contract parameters (e.g., contract identifier, M-of-N, owners), contract code, contract factory address, and/or the like.

Data provided in the CD API call may be used by a SFCD component 3445 to calculate a contract address (e.g., based on owners' addresses) and to sign the contract (e.g., to generate ECDSA signatures in DER format). See FIG. 36 for additional details regarding the SFCD component.

The SFTS module 3418 may send CD response data 3449 to the HSM 3414 in response to the CD API call. In one implementation, the CD response data may include owners' ECDSA signatures in DER format, a salt value, the contract address, and/or the like.

The HSM 3414 may send a CD response message 3453 to the TSS server 3406 (e.g., via a HSM Access Provider). In one implementation, the CD response message may include data such as a response identifier, contract deployment data, and/or the like. In one embodiment, the HSM may provide the following example CD response message, substantially in the form of a HTTP(S) POST message including XML-formatted data, as provided below:

```
POST /CD_response_message.php HTTP/1.1
Host: www.server.com
Content-Type: Application/XML
Content-Length: 667
<?XML version = "1.0" encoding = "UTF-8"?>
<CD_response_message>
  <response_identifier>ID_response_53</response_identifier>
  <contract_deployment_data>
    <contract_identifier>ID_contract_51</contract_identifier>
    <contract_deployment_signature>
      ECDSA signature in DER format of ID_user_1
    </contract_deployment_signature>
    <contract_deployment_signature>
      ECDSA signature in DER format of ID_user_2
    </contract_deployment_signature>
    <contract_deployment_signature>
      ECDSA signature in DER format of ID_user_3
    </contract_deployment_signature>
    <salt_value>
      0x000000000000000000000000000000000000000000000000000000000000208A
    </salt_value>
    <contract_address>
      0x4Dbba4673520eC3D921818a72d18D8e3C100C824
    </contract_address>
  </contract_deployment_data>
</CD_response_message>
```

The TSS server 3406 may send a CD data store request 3457 to the database 3410 to store the contract's contract deployment data. In one implementation, the CD data store request may include data such as a request identifier, contract deployment data, and/or the like. In one embodiment, the TSS server may provide the following example CD data store request, substantially in the form of a HTTP(S) POST message including XML-formatted data, as provided below:

```
POST /CD_data_store_request.php HTTP/1.1
Host: www.server.com
Content-Type: Application/XML
Content-Length: 667
<?XML version = "1.0" encoding = "UTF-8"?>
<CD_data_store_request>
  <request_identifier>ID_request_55</request_identifier>
  <contract_deployment_data>
    <contract_identifier>ID_contract_51</contract_identifier>
    <contract_deployment_signature>
      ECDSA signature in DER format of ID_user_1
    </contract_deployment_signature>
    <contract_deployment_signature>
      ECDSA signature in DER format of ID_user_2
    </contract_deployment_signature>
    <contract_deployment_signature>
      ECDSA signature in DER format of ID_user_3
    </contract_deployment_signature>
    <salt_value>
      0x000000000000000000000000000000000000000000000000000000000000208A
    </salt_value>
    <contract_address>
      0x4Dbba4673520eC3D921818a72d18D8e3C100C824
    </contract_address>
  </contract_deployment_data>
</CD_data_store_request>
```

The database 3410 may send a CD data store response 3461 to the TSS server 3406 to confirm that the contract's contract deployment data was stored successfully. In one implementation, the CD data store response may include data such as a response identifier, a status, and/or the like. In one embodiment, the database may provide the following example CD data store response, substantially in the form of a HTTP(S) POST message including XML-formatted data, as provided below:

```
POST /CD_data_store_response.php HTTP/1.1
Host: www.server.com
Content-Type: Application/XML
Content-Length: 667
<?XML version = "1.0" encoding = "UTF-8"?>
<CD_data_store_response>
  <response_identifier>ID_response_55</response_identifier>
```

-continued

```
  <status>OK</status>
</CD_data_store_response>
```

The TSS server 3406 may send a blockchain CD request 3465 to a blockchain 3420 to deploy the contract on the blockchain (e.g., Ethereum). In one implementation, the blockchain CD request may include data such as a request identifier, contract code (e.g., bytecode including owners' addresses), a salt value, and/or the like. In one embodiment, the TSS server may provide the following example blockchain CD request, substantially in the form of a HTTP(S) POST message including XML-formatted data, as provided below:

```
POST /blockchain_CD_request.php HTTP/1.1
Host: www.server.com
Content-Type: Application/XML
Content-Length: 667
<?XML version = "1.0" encoding = "UTF-8"?>
<blockchain_CD_request>
  <request_identifier>ID_request_56</request_identifier>
  <bytecode>
    608060405260405161081...2...788fd5e1f7b444ea36963e1c08261a7188049f6f
    e82e2d50f58521aea63c87b25173cdb5b9455551
    ee995c9ded9311a58373d52cfed87d965925f400
  </bytecode>
  <salt_value>
    0x000000000000000000000000000000000000000000000000000000000000208A
  </salt_value>
</blockchain_CD_request>
```

The blockchain 3420 may send a blockchain CD response 3469 to the TSS server 3406 to confirm that the contract was deployed. In one implementation, the blockchain CD response may include data such as a response identifier, a status, a contract address, additional blockchain data (e.g., block hash, gas used), and/or the like. In one embodiment, the blockchain may provide the following example blockchain CD response, substantially in the form of a HTTP(S) POST message including XML-formatted data, as provided below:

```
POST /blockchain_CD_response.php HTTP/1.1
Host: www.server.com
Content-Type: Application/XML
Content-Length: 667
<?XML version = "1.0" encoding = "UTF-8"?>
<blockchain_CD_response>
  <response_identifier>ID_response_56</response_identifier>
  <status>OK</status>
  <contract_address>
    0x4Dbba4673520eC3D921818a72d18D8e3C100C824
  </contract_address>
  ...
</blockchain_CD_response>
```

The TSS server 3406 may send a CD response 3473 to the client 3402 (e.g., to provide the user with the address of the deployed smart contract). In one implementation, the CD response may include data such as a response identifier, a status, a contract address, and/or the like. In one embodiment, the TSS server may provide the following example CD response, substantially in the form of a HTTP(S) POST message including XML-formatted data, as provided below:

```
POST /CD_response.php HTTP/1.1
Host: www.server.com
Content-Type: Application/XML
Content-Length: 667
<?XML version = "1.0" encoding = "UTF-8"?>
<CD_response>
  <response_identifier>ID_response_51</response_identifier>
  <status>OK</status>
  <contract_address>
    0x4Dbba4673520eC3D921818a72d18D8e3C100C824
  </contract_address>
</CD_response>
```

Figure 35:
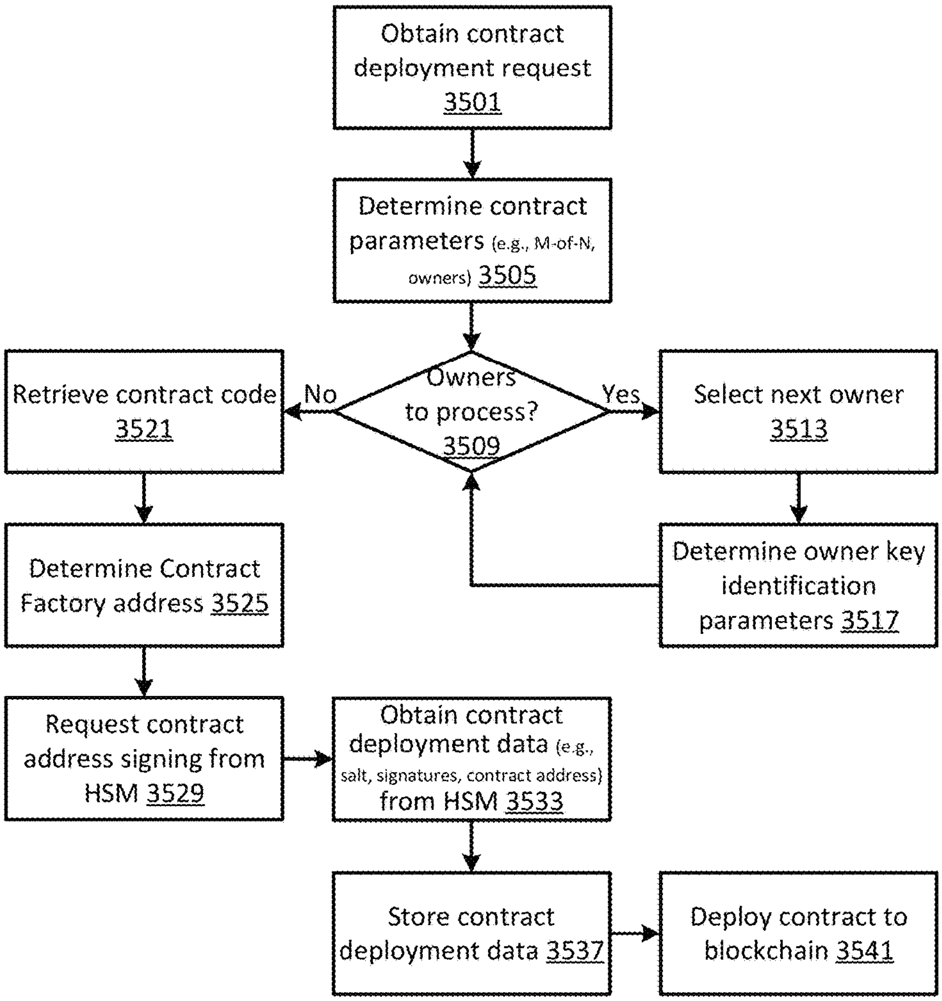
FIG. 35 shows non-limiting, example embodiments of a logic flow illustrating a transaction server contract deployment (TSCD) component for the SFTSP.

FIG. 35 shows non-limiting, example embodiments of a logic flow illustrating a transaction server contract deployment (TSCD) component for the SFTSP. In FIG. 35, a contract deployment request may be obtained at 3501. For example, the contract deployment request may be obtained as a result of a user utilizing SFTSP UI to request deployment of a smart contract (e.g., an Ethereum multi-signature smart contract with a dependency between the address of the deployed contract and the owners' public keys).

Contract parameters of the smart contract associated with the contract deployment request may be determined at 3505. For example, contract parameters may include a contract identifier, an M-of-N configuration, a set of owner datastructures, and/or the like. In one implementation, the contract deployment request may be parsed (e.g., using PHP commands) to determine the contract parameters (e.g., based on the value of the contract_parameters field).

A determination may be made at 3509 whether there remain owner datastructures to process. In one implementation, each of the owner datastructures specified in the contract parameters may be processed. If there remain owner datastructures to process, the next owner datastructure may be selected for processing at 3513.

Owner key identification parameters associated with the selected owner datastructure may be determined at 3517. For example, owner key identification parameters may include an owner identifier, a keyset identifier, a wallet type, a keychain path, and/or the like. In one implementation, the selected owner datastructure may be parsed (e.g., using PHP commands) to determine the owner key identification parameters (e.g., based on the values of the owner_identifier, keyset identifier, keychain_path fields).

Contract code of the smart contract associated with the contract deployment request may be retrieved at 3521. In one embodiment, the contract code may be the bytecode of the smart contract. In one implementation, the contract code may be retrieved from the contracts database table 41191. For example, the contract code may be retrieved via a MySQL database command similar to the following:

```
SELECT contractCode
FROM Contracts
WHERE contractID=ID_contract_51;
```

A deployment factory (e.g., Contract Factory) address may be determined at 3525. In one embodiment, the deployment factory (e.g., Contract Factory) may be a specialized smart contract utilized to facilitate deployment of smart contracts (e.g., to the Ethereum blockchain). In one implementation, a blockchain address of the deployment factory associated with a TSS server executing the TSCD component may be determined.

Contract address signing for the smart contract associated with the contract deployment request may be requested from an HSM at 3529. In one implementation, a contract deployment (CD) request message may be sent to the HSM to request contract address signing. For example, the CD request message may include the determined owner key identification parameters, contract code, deployment factory address, and/or the like.

Contract deployment data for the smart contract associated with the contract deployment request may be obtained from the HSM at 3533. For example, contract deployment data may include a salt (e.g., a 32-byte salt value), a set of contract deployment signatures (e.g., by the owners specified in the owner datastructures), a set of owner addresses (e.g., generated by the HSM based on the owner key identification parameters), a contract address, and/or the like. In one implementation, the contract deployment data may be obtained via a CD response message. It is to be understood that the combination of two different sets of parameters, bytecode and list of addresses, creates a wallet, controlled by specific owners. Adding a salt value during the deployment creates a unique address for such a wallet. Thus, different salt values for the same combination of bytecode and owners' addresses create different wallets for the same owners, which may be utilized for splitting funds, upgrading wallets, and/or the like.

The contract deployment data may be stored at 3537. In one implementation, the contract deployment data may be stored in the contracts database table **4119*l***. For example, the contract deployment data may be stored via a MySQL database command similar to the following:

```
UPDATE Contracts
SET contractSalt = "0x000000000000000000000000000000000000000000000000000000000000208A",
  contractDeploymentSignatures =
    "ECDSA signature in DER format of ID_user_1
    ECDSA signature in DER format of ID_user_2
    ECDSA signature in DER format of ID_user_3",
  contractOwnerAddresses = "
    Owner's address 1: 0x788fd5e1f7b444ea36963e1c08261a7188049f6f
    Owner's address 2: 0xe82e2d50f58521aea63c87b25173cdb5b9455551
    Owner's address 3: 0xee995c9ded9311a58373d52cfed87d965925f400",
  contractAddress = "0x4Dbba4673520eC3D921818a72d18D8e3C100C824"
WHERE contractID = ID_contract_51;
```

The smart contract associated with the contract deployment request may be deployed to the blockchain at 3541. In one implementation, a deploy method of the deployment factory may be utilized to deploy the smart contract. For example, the bytecode of the smart contract (e.g., including the set of owner addresses as part of the constructor parameters) and the salt may be provided to the deploy method.

Figure 36:
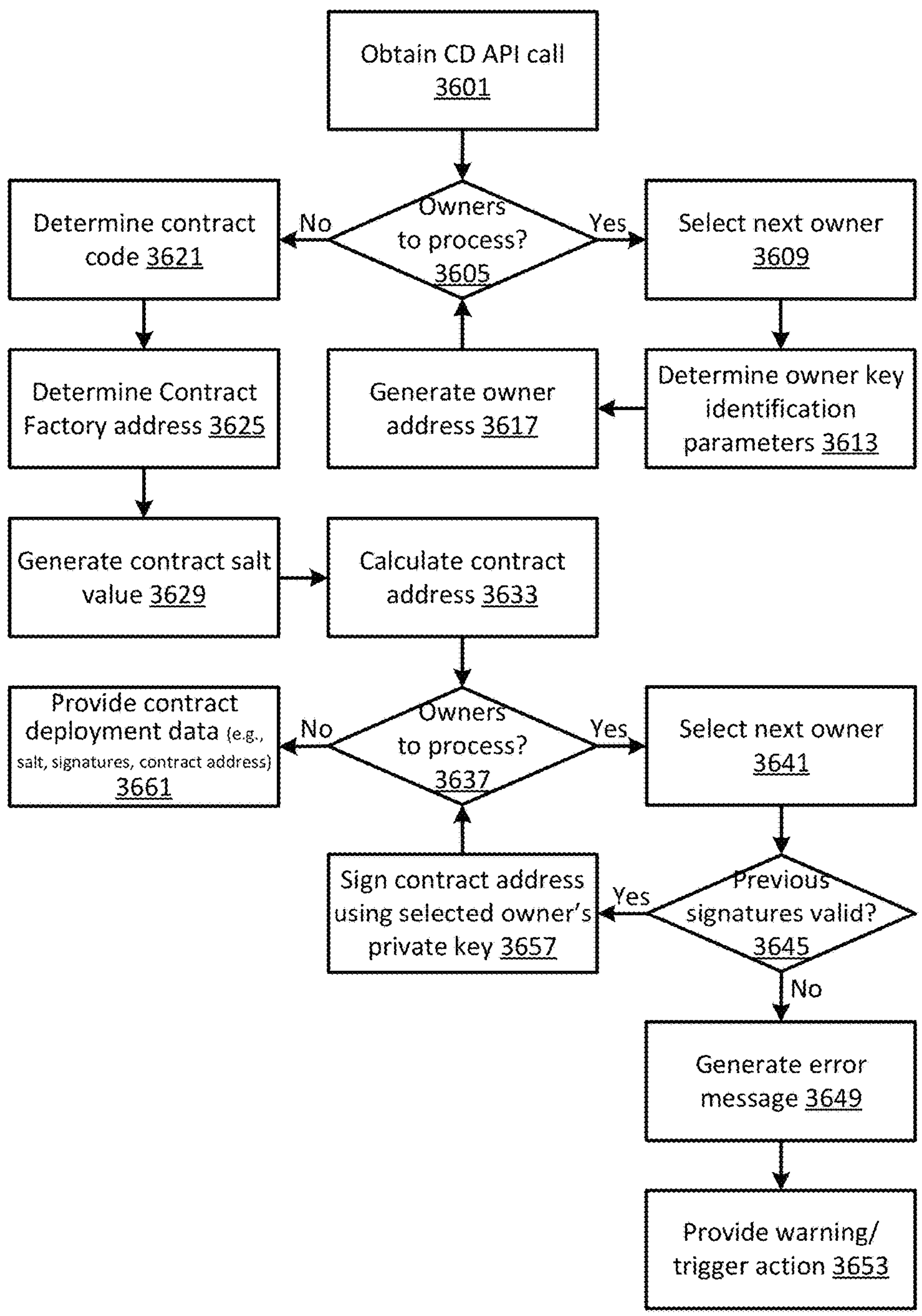
FIG. 36 shows non-limiting, example embodiments of a logic flow illustrating a secure firmware contract deployment (SFCD) component for the SFTSP.

FIG. 36 shows non-limiting, example embodiments of a logic flow illustrating a secure firmware contract deployment (SFCD) component for the SFTSP. In FIG. 36, a contract deployment (CD) API call associated with a smart contract may be obtained at 3601. For example, the CD API call may be obtained as a result of a call from a HSM associated with the SFCD component. It is to be understood that although the SFCD component is described with regard to an API method to sign a smart contract address (e.g., /address/sign), in some embodiment, a variety of API methods may be available. In one embodiment, the following API methods (e.g., REST API endpoints) may be available to the HSM and/or to a TSS:

```
/address/sign - this API method receives a contract's bytecode, Contract
Factory's address, owners' identification parameters, and returns the
future address of the deployed contract along with an ECDSA
signature value, created with one of the owners' private keys.
  Input:
    contract's bytecode
    Contract Factory's address
    owners identification parameters (e.g., keyset ID, wallet type,
keychain path for Bip-32 derivation)
  Output:
    address of the contract after the deployment
    32-byte salt value to be used both during the deployment and
for the validation of the address signature
    ECDSA signature in DER format
```

A determination may be made at 3605 whether there remain owner datastructures to process. In one implementation, each of the owner datastructures provided in the CD API call may be processed. If there remain owner datastructures to process, the next owner datastructure may be selected for processing at 3609.

Owner key identification parameters associated with the selected owner datastructure may be determined at 3613. For example, owner key identification parameters may include an owner identifier, a keyset identifier, a wallet type, a keychain path, and/or the like. In one implementation, the selected owner datastructure may be parsed (e.g., using PHP commands) to determine the owner key identification parameters (e.g., based on the values of the owner_identifier, keyset identifier, keychain_path fields).

An owner address associated with the selected owner datastructure may be generated at 3617. In one implementation, the owner address may be generated using the owner key identification parameters associated with the selected owner datastructure as an EOA address per Bip32 data model. See FIG. 7B for additional details regarding generating owner addresses using the Bip32 data model. For example, the keyset identifier may correspond to a master key pair associated with the owner identifier, and the keychain path may be used to determine a public key that is used to generate the owner address (e.g., last 20 bytes of the Keccak-256 (SHA-3) hash of the public key). In one embodiment, a keyset identifier is a unique number, identifying a keyset: logical aggregation of master seeds (e.g., 64-byte numbers). In one embodiment, a wallet type is a subgroup of seeds within a keyset (e.g., no seed should belong to more than one wallet type). In one embodiment, the number of seeds for a specific wallet type may be determined by the multi-signature configuration (e.g., a 2-of-3 wallet type should have three seeds). In one embodiment, from each seed, using a keychain path and BIP-32 spec, one can generate one public key and, consequently, one address. For example, if the wallet type contains three seeds, there are three independent addresses to be generated for the same keychain path, but from different seeds (e.g., a 2-of-3 wallet may have 3 owners' addresses for each combination of: keyset ID, wallet type, keychain path).

Contract code of the smart contract may be determined at 3621. In one embodiment, the contract code may be the bytecode of the smart contract. In one implementation, the contract code may be provided in the CD API call.

A deployment factory (e.g., Contract Factory) address associated with the smart contract may be determined at 3625. In one embodiment, the deployment factory address may be a blockchain address of a deployment factory smart contract on the Ethereum blockchain. In one implementation, the deployment factory address may be provided in the CD API call.

A salt value for the smart contract may be generated at 3629. For example, a one-time 32-byte salt value may be generated. In one implementation, a random or (e.g., cryptographically secure) pseudorandom number generator may be utilized to generate the salt value.

A contract address for the smart contract may be calculated at 3633. In one embodiment, the contract address may be calculated in a way that creates a dependency between the contract address and the owners' public keys. In one implementation, the contract address may be calculated as an EIP-1014 address that is equal to the last 20 bytes of the Keccak-256 (SHA-3) hash of the concatenated list of the deployment factory address, the salt value, and Keccak-256 hash of the smart contract's bytecode including the generated owner addresses as constructor parameters—all prefixed with 0xFF byte. See FIG. 33 for additional details regarding calculating an EIP-1014 address.

A determination may be made at 3637 whether there remain owner datastructures to process. In one implementation, each of the owner datastructures provided in the CD API call may be processed. If there remain owner datastructures to process, the next owner datastructure may be selected for processing at 3641.

A determination may be made at 3645 whether previously generated contract deployment signatures (e.g., if any) used to sign the contract address for the smart contract are valid. If any of the previously generated signatures is invalid, an error message may be generated at 3649. For example, the error message may specify the error that occurred (e.g., a previously generated signature is invalid). A warning message may be provided to a user and/or an action may be triggered at 3653. In one implementation, a warning message based on the generated error message may be provided to the user (e.g., via the TSS) to inform the user regarding the error. In another implementation, an action may be triggered based on a specified condition (e.g., invalid signature obtained three times). For example, the triggered action may be to erase data associated with an associated wallet.

If the previously generated contract deployment signatures are valid, the contract address for the smart contract may be signed using a private key associated with the selected owner datastructure that corresponds to the generated owner address associated with the selected owner datastructure at 3657. In one embodiment, the contract address and the salt value may be appended, the result hashed, and the hash signed using the private key to generate a contract deployment signature. In one implementation, the hash may be calculated in accordance with the hashing algorithm utilized by the Ethereum protocol (e.g., KECCAK256(contract address+salt value)), and the hash may be signed using a PKCS #11 function (e.g., C_Sign( . . . )). It is to be understood that, in various implementations, different owners may utilize different HSMs (e.g., each HSM executing a separate SFCD component), the same HSM, combinations of HSMs, and/or the like to sign the contract address (e.g., reusing the same salt value by passing it among HSMs as a parameter).

Contract deployment data may be provided at 3661. For example, contract deployment data may include the salt value, the generated contract deployment signatures, the generated owner addresses, the contract address, and/or the like. In one implementation, the contract deployment data may be returned to the HSM as the output of the CD API call.

Figure 37:
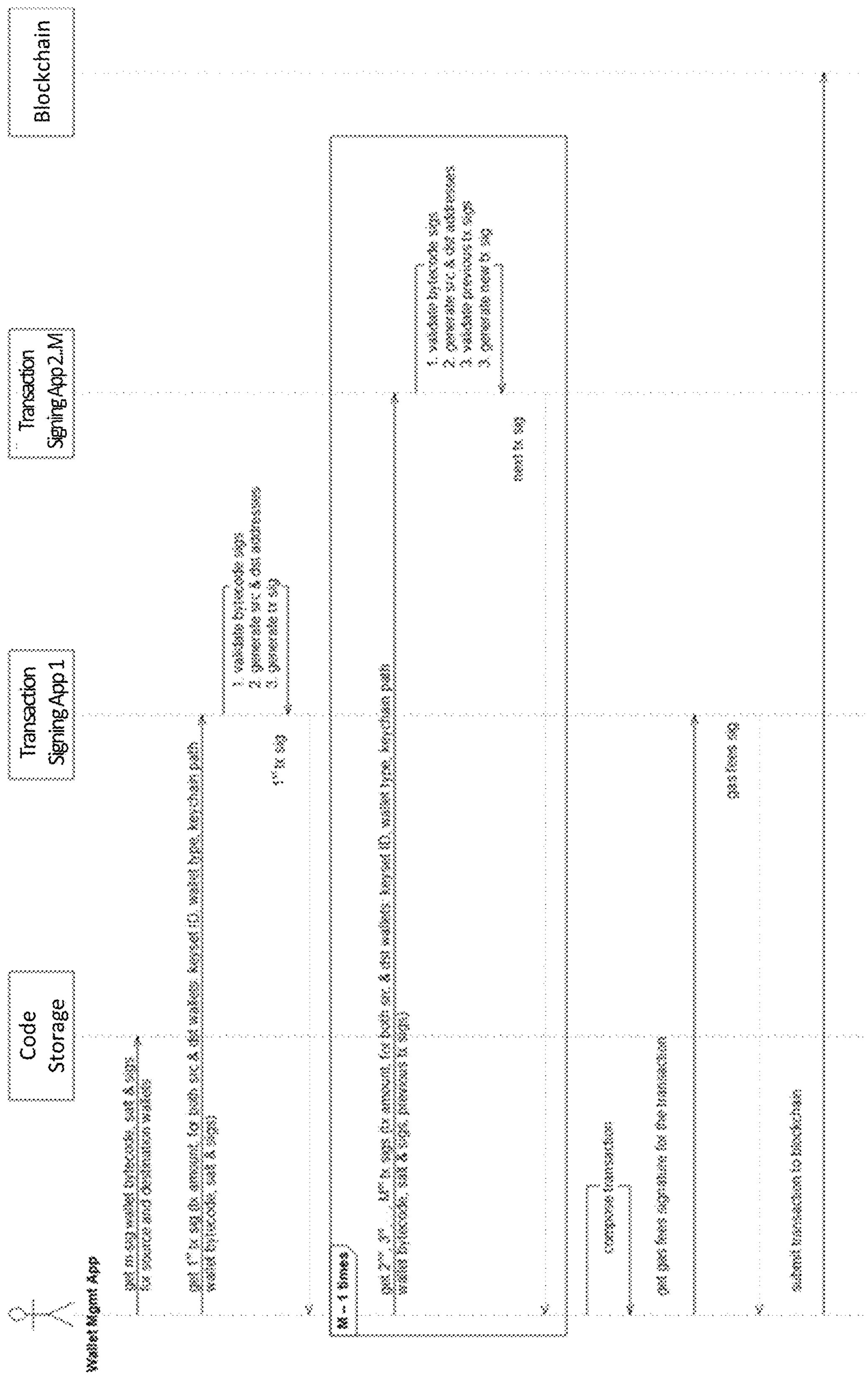
FIG. 37 shows non-limiting, example embodiments of a transaction signing architecture for the SFTSP.

FIG. 37 shows non-limiting, example embodiments of a transaction signing architecture for the SFTSP. In FIG. 37, an embodiment of a verification procedure of proving the legitimacy of wallet addresses owned by the parties controlling owners' key pairs is illustrated.

In one embodiment, in a fund transfer transaction moving funds from one contract (e.g., source wallet) to another (e.g., destination wallet), where either one or both are controlled by a company's own m-sig wallets, the source and/or destination contract addresses, generated as described above (e.g., with regard to FIGS. 32-36), may be securely and reliably generated during the transaction signing process. Instead of providing source and/or destination addresses of intra-wallet transactions to the Key Management & Transaction Signing application, which runs the risk of address tampering at the Wallet & Transaction Management application side, the wallet client provides wallet identification parameters in the signing request, for example:

Wallet identification parameters:
- keyset ID
- wallet type
- keychain path
- wallet address
- wallet address signatures Including salt value Using these parameters, the Key Management & Transaction Signing application may verify that provided signatures match the owner's public keys, generated for keyset ID/wallet type/keychain path combinations, to validate the legitimacy of wallet addresses participating in the blockchain transaction before generating transaction signatures.

Figure 38A:
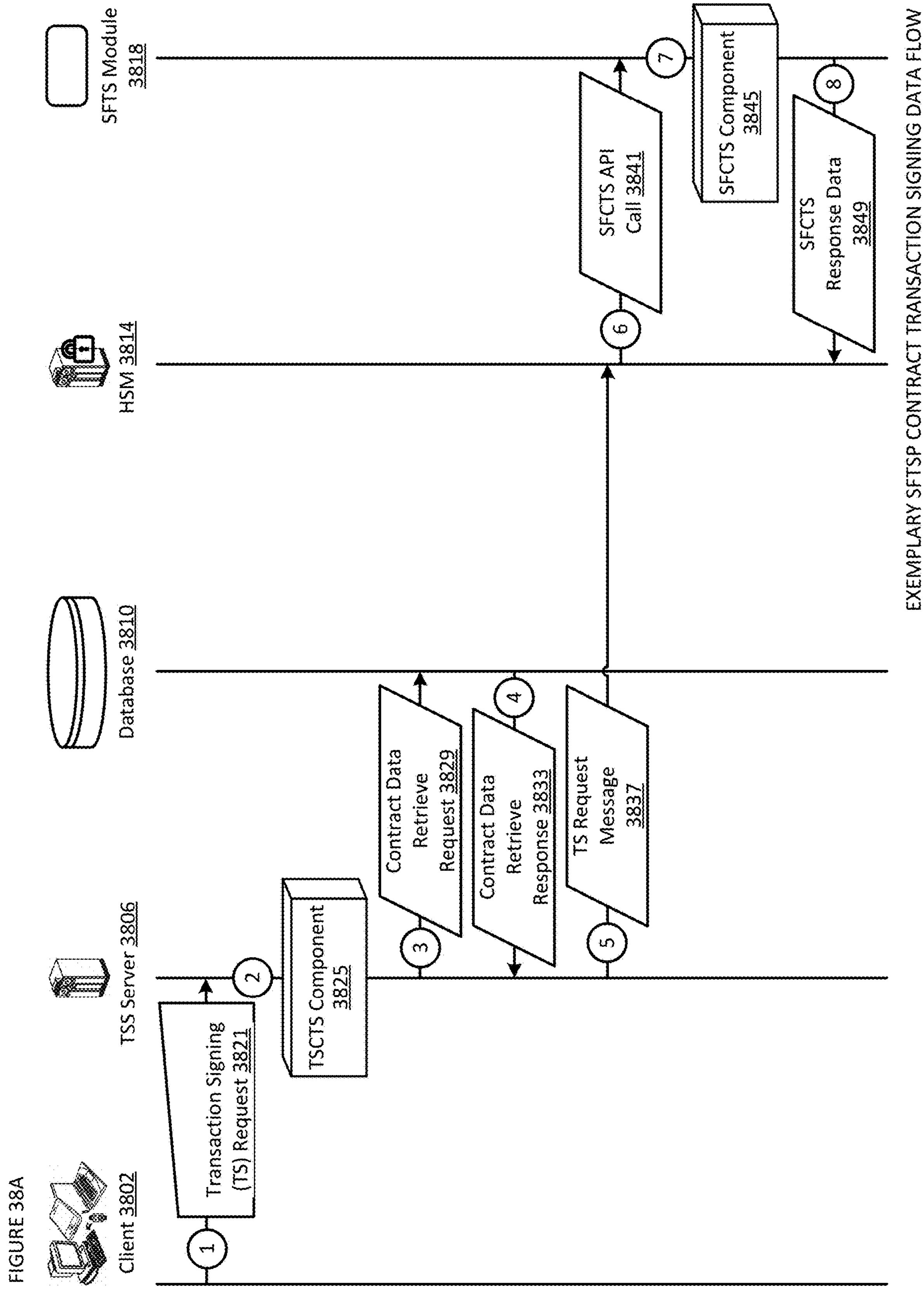
FIGS. 38A-B show non-limiting, example embodiments of a datagraph illustrating data flow(s) for the SFTSP.
Figure 38B:
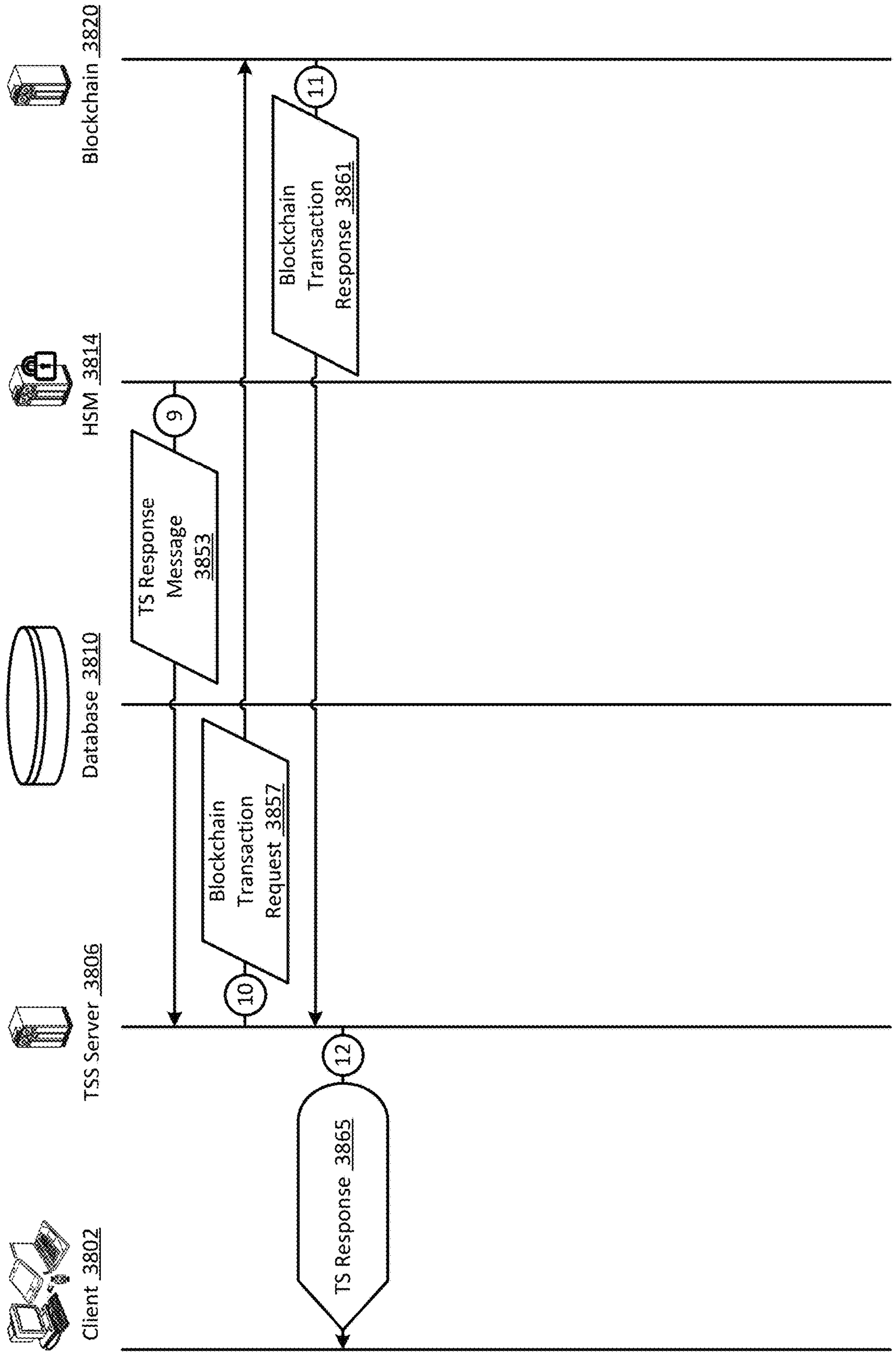

FIGS. 38A-B show non-limiting, example embodiments of a datagraph illustrating data flow(s) for the SFTSP. In FIGS. 38A-B, a client 3802 (e.g., of a user) may send a transaction signing (TS) request 3821 to a TSS server 3806 to request that a transaction be signed. For example, the client may be a desktop, a laptop, a tablet, a smartphone, a smartwatch, and/or the like that is executing a client application. In one implementation, the TS request may include data such as a request identifier, a request type (e.g., sign transaction), a transaction identifier, transaction details, source wallet parameters, destination wallet parameters, and/or the like. In one embodiment, the client may provide the following example transaction signing (TS) request, substantially in the form of a HTTP(S) POST message including XML-formatted data, as provided below:

```
POST /TS_request.php HTTP/1.1
Host: www.server.com
Content-Type: Application/XML
Content-Length: 667
<?XML version = "1.0"encoding = "UTF-8"?>
<TS_request>
  <request_identifier>ID_request_61</request_identifier>
  <request_type>SIGN_TRAN SACTION</request_type>
```

-continued

```
<transaction_identifier>ID_transaction_61</transaction_identifier>
<transaction_details>transaction amount, etc.</transaction_details>
<source_wallet_parameters>
  <contract_identifier>ID_contract_51</contract_identifier>
  <M_of_N>2-of-3</M_of_N>
  <owner>
    <owner_identifier>ID_user_1</owner_identifier>
    <keyset_identifier>ID_master_key_pair_1</keyset_identifier>
    <keychain_path>m/0/0/1/0</keychain_path>
  </owner>
  <owner>
    <owner_identifier>ID_user_2</owner_identifier>
    <keyset_identifier>ID_master_key_pair_2</keyset_identifier>
    <keychain_path>m/0/0/1/0</keychain_path>
  </owner>
  <owner>
    <owner_identifier>ID_user_3</owner_identifier>
    <keyset_identifier>ID_master_key_pair_3</keyset_identifier>
    <keychain_path>m/0/0/1/0</keychain_path>
  </owner>
</source_wallet_parameters>
<destination_wallet_parameters>
  <contract_identifier>ID_contract_52</contract_identifier>
  <M_of_N>2-of-3</M_of_N>
  <owner>
    <owner_identifier>ID_user_11</owner_identifier>
    <keyset_identifier>ID_master_key_pair_11</keyset_identifier>
    <keychain_path>m/0/0/1/0</keychain_path>
  </owner>
  <owner>
    <owner_identifier>ID_user_12</owner_identifier>
    <keyset_identifier>ID_master_key_pair_12</keyset_identifier>
    <keychain_path>m/0/0/1/0</keychain_path>
  </owner>
  <owner>
    <owner_identifier>ID_user_13</owner_identifier>
    <keyset_identifier>ID_master_key_pair_13</keyset_identifier>
    <keychain_path>m/0/0/1/0</keychain_path>
  </owner>
</destination_wallet_parameters>
</TS_request>
```

A TSCTS component 3825 may utilize parameters provided in the TS request to facilitate transaction signing. See FIG. 39 for additional details regarding the TSCTS component.

The TSS server 3806 may send a contract data retrieve request 3829 to a database 3810 to retrieve contract data for a source wallet and/or for a destination wallet. For example, separate contract data retrieve requests may be sent for the source wallet and for the destination wallet. In another example, a combined contract data retrieve request may be sent for both the source wallet and for the destination wallet. In one implementation, the contract data retrieve request may include data such as a request identifier, a contract identifier (e.g., a source wallet identifier, a destination wallet identifier), and/or the like. In one embodiment, the TSS server may provide the following example contract data retrieve request, substantially in the form of a HTTP(S) POST message including XML-formatted data, as provided below:

```
POST /contract_data_retrieve_request.php HTTP/1.1
Host: www.server.com
Content-Type: Application/XML
Content-Length: 667
<?XML version = "1.0" encoding = "UTF-8"?>
<contract_data_retrieve_request>
  <request_identifier>ID_request_62</request_identifier>
  <contract_identifier>ID_contract_51</contract_identifier>
</contract_data_retrieve_request>
```

The database 3810 may send a contract data retrieve response 3833 to the TSS server 3806 with the requested contract data. In one implementation, the contract data retrieve response may include data such as a response identifier, the requested contract data, and/or the like. In one embodiment, the database may provide the following example contract data retrieve response, substantially in the form of a HTTP(S) POST message including XML-formatted data, as provided below:

```
POST /contract_data_retrieve_response.php HTTP/1.1
Host: www.server.com
Content-Type: Application/XML
Content-Length: 667
<?XML version = "1.0" encoding = "UTF-8"?>
<contract_data_retrieve_response>
  <response_identifier>ID_response_62</response_identifier>
  <bytecode>6080604052604051610 81...30005100032</bytecode>
  <salt_value>
    0x000000000000000000000000000000000000000000000000000000000000208A
  </salt_value>
  <contract_address>
    0x4Dbba4673520eC3D921818a72d18D8e3C100C824
  </contract_address>
  <contract_deployment_signature>
    ECDSA signature in DER format of ID_user_1
  </contract_deployment_signature>
  <contract_deployment_signature>
    ECDSA signature in DER format of ID_user_2
  </contract_deployment_signature>
  <contract_deployment_signature>
    ECDSA signature in DER format of ID_user_3
  </contract_deployment_signature>
</contract_data_retrieve_response>
```

The TSS server 3806 may send a TS request message 3837 to a HSM 3814 to request that the HSM sign the transaction. In one implementation, the TS request message may be sent via a HSM Access Provider and may include data such as a request identifier, a request type (e.g., sign transaction), a transaction identifier, transaction details, contract factory address, source wallet parameters, source wallet contract data, destination wallet parameters, destination wallet contract data, previous transaction signature(s), and/or the like. In one embodiment, the TSS server may provide the following example TS request message, substantially in the form of a HTTP(S) POST message including XML-formatted data, as provided below:

```
POST /TS_request_message.php HTTP/1.1
Host: www.server.com
Content-Type: Application/XML
Content-Length: 667
<?XML version = "1.0" encoding = "UTF-8"?>
<TS_request_message>
  <request_identifier>ID_request_63</request_identifier>
  <request_type>SIGN_TRANSACTION</request_type>
  <transaction_identifier>ID_transaction_61</transaction_identifier>
  <transaction_details>transaction amount, etc.</transaction_details>
  <contract_factory_address>
    0x4949d05Cb64224BA4DC94D6A1776455C37c63F53
  </contract_factory_address>
  <source_wallet_parameters>
    <contract_identifier>ID_contract_51</contract_identifier>
    <M_of N>2-of-3</M_of_N>
    <owner>
      <owner_identifier>ID_user_1</owner_identifier>
      <keyset_identifier>ID_master_key_pair_1</keyset_identifier>
      <keychain_path>m/0/0/1/0</keychain_path>
    </owner>
    <owner>
      <owner_identifier>ID_user_2</owner_identifier>
      <keyset_identifier>ID_master_key_pair_2</keyset_identifier>
      <keychain_path>m/0/0/1/0</keychain_path>
    </owner>
    <owner>
      <owner_identifier>ID_user_3</owner_identifier>
      <keyset_identifier>ID_master_key_pair_3</keyset_identifier>
      <keychain_path>m/0/0/1/0</keychain_path>
    </owner>
  </source_wallet_parameters>
  <source_wallet_contract_data>
    <contract_identifier>ID_contract_51</contract_identifier>
    <bytecode>608060405260405161081...30005100032</bytecode>
    <salt_value>
      0x000000000000000000000000000000000000000000000000000000000000208A
    </salt_value>
    <contract_address>
      0x4Dbba4673520eC3D921818a72d18D8e3C100C824
    </contract_address>
    <contract_deployment_signature>
      ECDSA signature in DER format of ID_user_1
    </contract_deployment_signature>
    <contract_deployment_signature>
      ECDSA signature in DER format of ID_user_2
    </contract_deployment_signature>
    <contract_deployment_signature>
      ECDSA signature in DER format of ID_user_3
    </contract_deployment_signature>
  </source_wallet_contract_data>
  <destination_wallet_parameters>
    <contract_identifier>ID_contract_52</contract_identifier>
    <M_of N>2-of-3</M_of_N>
    <owner>
      <owner_identifier>ID_user_11</owner_identifier>
      <keyset_identifier>ID_master_key_pair_11</keyset_identifier>
      <keychain_path>m/0/0/1/0</keychain_path>
    </owner>
    <owner>
      <owner_identifier>ID_user_12</owner_identifier>
      <keyset_identifier>ID_master_key_pair_12</keyset_identifier>
      <keychain_path>m/0/0/1/0</keychain_path>
    </owner>
    <owner>
      <owner_identifier>ID_user_13</owner_identifier>
      <keyset_identifier>ID_master_key_pair_13</keyset_identifier>
      <keychain_path>m/0/0/1/0</keychain_path>
    </owner>
  </destination_wallet_parameters>
  <destination_wallet_contract_data>
    <contract_identifier>ID_contract_52</contract_identifier>
    <bytecode>467860405262754161033...45605100999</bytecode>
    <salt_value>
      0x000000000000000000000000000000000000000000000000000000000000319B
    </salt_value>
```

-continued

```
    <contract_address>
      0x5Dbba4673520eC3D921818a72d18D8e3C100C935
    </contract_address>
    <contract_deployment_signature>
      ECDSA signature in DER format of ID_user_11
    </contract_deployment_signature>
    <contract_deployment_signature>
      ECDSA signature in DER format of ID_user_12
    </contract_deployment_signature>
    <contract_deployment_signature>
      ECDSA signature in DER format of ID_user_13
    </contract_deployment_signature>
  </destination_wallet_contract_data>
</TS_request_message>
```

The HSM 3814 may send a SFCTS API call 3841 to a SFTS module 3818 to request that the SFTS module sign the transaction. In one implementation, the SFCTS API call may include data such as a request identifier, a request type (e.g., sign transaction), a transaction identifier, transaction details, contract factory address, source wallet parameters, source wallet contract data, destination wallet parameters, destination wallet contract data, and/or the like.

Data provided in the SFCTS API call may be used by a SFCTS component 3845 to validate the legitimacy of wallet addresses participating in the blockchain transaction and to sign the transaction (e.g., to generate an ECDSA signature in DER format). See FIG. 40 for additional details regarding the SFCTS component.

The SFTS module 3818 may send SFCTS response data 3849 to the HSM 3814 in response to the SFCTS API call. In one implementation, the SFCTS response data may include an ECDSA signature in DER format.

The HSM 3814 may send a TS response message 3853 to the TSS server 3806 (e.g., via a HSM Access Provider). In one implementation, the TS response message may include data such as a response identifier, a transaction identifier, a transaction signature, and/or the like. In one embodiment, the HSM may provide the following example TS response message, substantially in the form of a HTTP(S) POST message including XML-formatted data, as provided below:

```
POST /TS_response_message.php HTTP/1.1
Host: www.server.com
Content-Type: Application/XML
Content-Length: 667
<?XML version = "1.0" encoding = "UTF-8"?>
<TS_response_message>
  <response_identifier>ID_response_63</response_identifier>
  <transaction_identifier>ID_transaction_61</transaction_identifier>
  <transaction_signature>ECDSA signature in DER format</transaction_signature>
</TS_response_message>
```

The TSS server 3806 may send a blockchain transaction request 3857 to a blockchain 3820 to submit the transaction to the blockchain (e.g., Ethereum). In one implementation, the blockchain transaction request may include data such as a request identifier, transaction data (e.g., including the transaction details and the transaction signature), and/or the like. In one embodiment, the TSS server may provide the following example blockchain transaction request, substantially in the form of a HTTP(S) POST message including XML-formatted data, as provided below:

```
POST /blockchain_transaction_request.php HTTP/1.1
Host: www.server.com
Content-Type: Application/XML
Content-Length: 667
<?XML version = "1.0" encoding = "UTF-8"?>
<blockchain_transaction_request>
  <request_identifier>ID_request_65</request_identifier>
  <transaction_data>Ethereum transaction data </transaction_data>
</blockchain_transaction_request>
```

The blockchain 3820 may send a blockchain transaction response 3861 to the TSS server 3806 to confirm that the transaction was processed. In one implementation, the blockchain transaction response may include data such as a response identifier, a status, and/or the like. In one embodiment, the blockchain may provide the following example blockchain transaction response, substantially in the form of a HTTP(S) POST message including XML-formatted data, as provided below:

```
POST /blockchain_transaction_response.php HTTP/1.1
Host: www.server.com
Content-Type: Application/XML
Content-Length: 667
<?XML version = "1.0" encoding = "UTF-8"?>
<blockchain_transaction_response>
  <response_identifier>ID_response_65</response_identifier>
```

-continued

```
  <status>OK</status>
</blockchain_transaction_response>
```

The TSS server 3806 may send a TS response 3865 to the client 3802 (e.g., to inform the user that the transaction was processed). In one implementation, the TS response may include data such as a response identifier, a transaction identifier, a transaction signature, a status, and/or the like. In one embodiment, the TSS server may provide the following example TS response, substantially in the form of a H-TTP (S) POST message including XML-formatted data, as provided below

```
POST /TS_response.php HTTP/1.1
Host: www.server.com
Content-Type: Application/XML
Content-Length: 667
<?XML version = "1.0" encoding = "UTF-8"?>
<TS_response>
  <response_identifier>ID_response_61</response_identifier>
  <transaction_identifier>ID_transaction_61</transaction_identifier>
  <transaction_signature>ECDSA signature in DER format</transaction_signature>
  <status>OK</status>
</TS_response>
```

Figure 39:
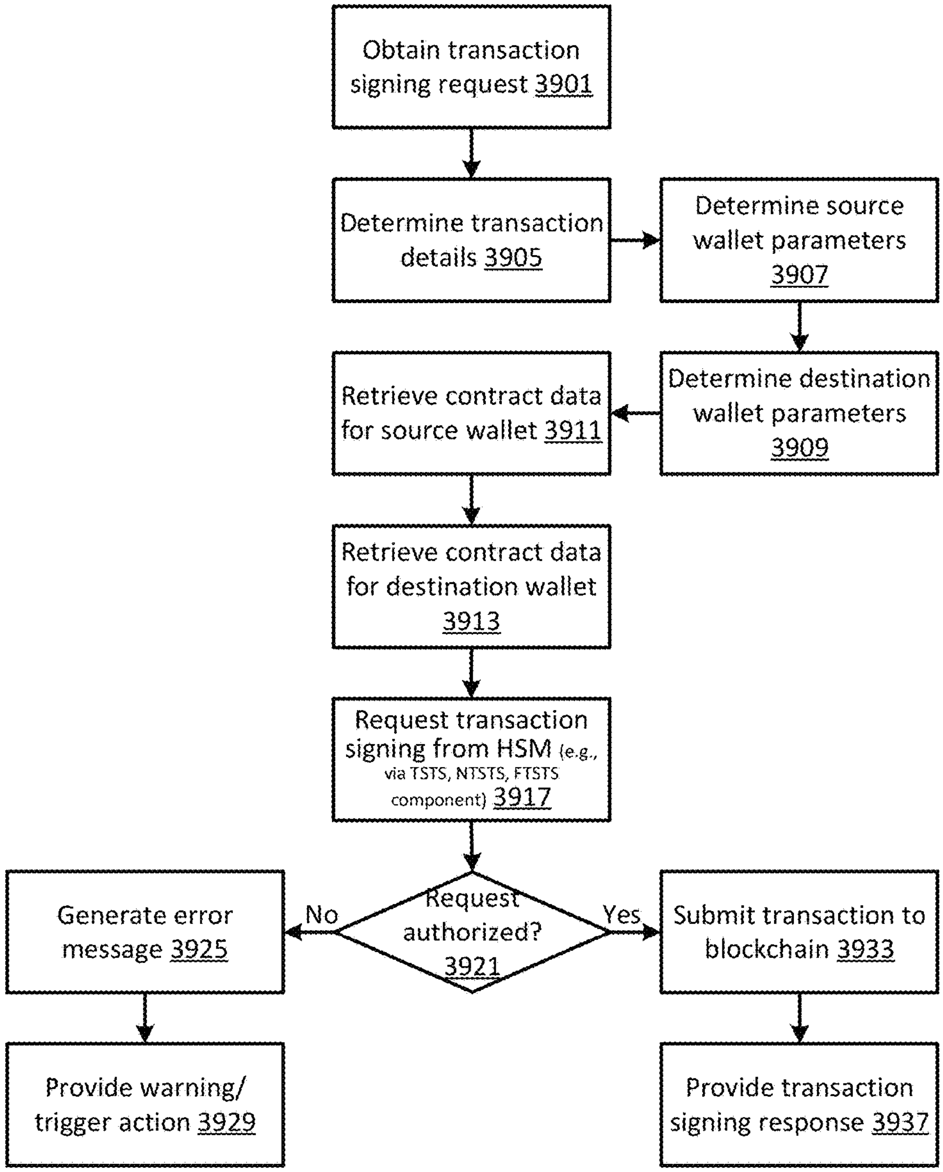
FIG. 39 shows non-limiting, example embodiments of a logic flow illustrating a transaction server contract transaction signing (TSCTS) component for the SFTSP.

FIG. 39 shows non-limiting, example embodiments of a logic flow illustrating a transaction server contract transaction signing (TSCTS) component for the SFTSP. In FIG. 39, a transaction signing request may be obtained at 3901. For example, the transaction signing request may be obtained as a result of a user utilizing a UI of a fund transfer program to initiate transaction signing (e.g., a fund transfer transaction between a source wallet and a destination wallet).

Transaction details associated with the transaction signing request may be determined at 3905. For example, transaction details may include a transaction amount, gas price, gas limit, a nonce, and/or the like. In one implementation, the transaction signing request may be parsed (e.g., using PHP commands) to determine the transaction details (e.g., based on the value of the transaction_details field).

Source wallet parameters of a source wallet (e.g., smart contract) associated with the transaction signing request may be determined at 3907. For example, source wallet parameters may include a wallet identifier (e.g., a contract identifier), an M-of-N configuration, a set of owner datastructures, and/or the like. In one implementation, the transaction signing request may be parsed (e.g., using PHP commands) to determine the source wallet parameters (e.g., based on the value of the source_wallet_parameters field).

Destination wallet parameters of a destination wallet (e.g., smart contract) associated with the transaction signing request may be determined at 3909. For example, destination wallet parameters may include a wallet identifier (e.g., a contract identifier), an M-of-N configuration, a set of owner datastructures, and/or the like. In one implementation, the transaction signing request may be parsed (e.g., using PHP commands) to determine the destination wallet parameters (e.g., based on the value of the destination_wallet_parameters field).

Contract data for the source wallet may be retrieved at 3911. In one implementation, the contract data for the source wallet may be retrieved from the contracts database table 41191. For example, the contract data for the source wallet may be retrieved via a MySQL database command similar to the following:

```
SELECT contractCode, contractSalt, contractAddress, contractDeploymentSignatures,
contractContractFactoryAddress
FROM Contracts
WHERE contractID = ID_contract_51;
```

Contract data for the destination wallet may be retrieved at 3913. In one implementation, the contract data for the destination wallet may be retrieved from the contracts database table 41191. For example, the contract data for the destination wallet may be retrieved via a MySQL database command similar to the following:

```
SELECT contractCode, contractSalt, contractAddress, contractDeploymentSignatures,
contractContractFactoryAddress
FROM Contracts
WHERE contractID = ID_contract_52;
```

Transaction signing may be requested from an HSM (e.g., via TSTS, NTSTS, FTSTS component) at 3917. In one implementation, a transaction signing request message may be sent to the HSM to request transaction signing. It is to be understood that, in various embodiments, transaction signing may be performed in a variety of ways (e.g., as discussed with regard to TSTS, NTSTS, FTSTS components).

A determination may be made at 3921 whether the transaction signing request was authorized by the HSM. In one implementation, the HSM may validate the legitimacy of wallet addresses participating in the blockchain transaction before signing the transaction. If the transaction signing request was not authorized, an error message may be generated at 3925. For example, the error message may specify the error that occurred (e.g., source wallet address and/or destination wallet address cannot be validated). A warning message may be provided to the user and/or an action may be triggered at 3929. In one implementation, a warning message based on the generated error message may be provided to the user to inform the user regarding the error. In another implementation, an action may be triggered based on a specified condition (e.g., unauthorized request occurred three times). For example, the triggered action may be to erase data associated with a wallet.

If the transaction signing request was authorized, the transaction may be submitted to a blockchain (e.g., the Ethereum blockchain) at 3933. In one implementation, the transaction may be broadcast to the blockchain via a blockchain transaction request.

A transaction signing response may be provided to the user's client at 3937. In one implementation, a transaction signing response may be sent to inform the user whether the transaction signing was completed successfully (e.g., via a UI of the fund transfer program).

Figure 40:
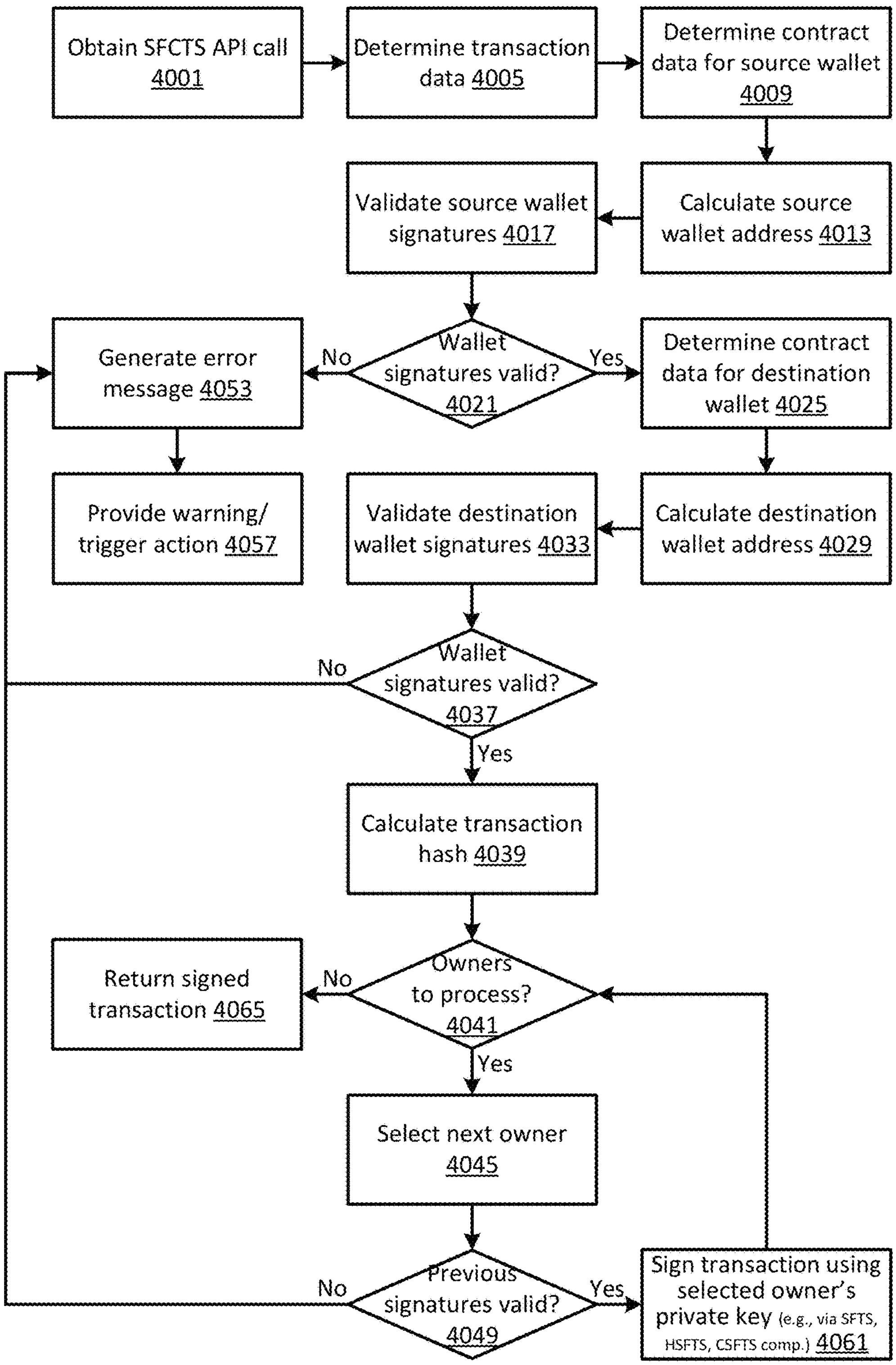
FIG. 40 shows non-limiting, example embodiments of a logic flow illustrating a secure firmware contract transaction signing (SFCTS) component for the SFTSP.

FIG. 40 shows non-limiting, example embodiments of a logic flow illustrating a secure firmware contract transaction signing (SFCTS) component for the SFTSP. In FIG. 40, a SFCTS API call may be obtained at 4001. For example, the SFCTS API call may be obtained as a result of a call from a HSM associated with the SFCTS component. It is to be understood that although the SFCTS component is described with regard to an API method to sign a transaction (e.g., /transaction/sign), in some embodiment, a variety of API methods may be available. In one embodiment, the following API methods (e.g., REST API endpoints) may be available to the HSM and/or to a TSS:

```
/transaction/sign - this API method signs transactions transferring digital assets (e.g., within or among a
company's wallets).
  Source:
          contract identifier:
                   address
                   list of signatures
          ...
  Destination:
          contract identifier:
                   address
                   list of signatures
          ...
```

Transaction data may be determined at 4005. In one implementation, the transaction data may be provided in the SFCTS API call and may include a transaction identifier, transaction details (e.g., including transaction amount, gas price, gas limit, a nonce, and/or the like), a deployment factory (e.g., Contract Factory) address, source wallet parameters (e.g., including a wallet identifier (e.g., a contract identifier), an M-of-N configuration, a set of owner datastructures, and/or the like) of a source wallet (e.g., smart contract), destination wallet parameters (e.g., including a wallet identifier (e.g., a contract identifier), an M-of-N configuration, a set of owner datastructures, and/or the like) of a destination wallet (e.g., smart contract), and/or the like.

Contract data for the source wallet may be determined at 4009. In one implementation, the contract data for the source wallet may be provided in the SFCTS API call and may include contract code (e.g., the bytecode), a salt value, a contract address, a set of contract deployment signatures, a deployment factory (e.g., Contract Factory) address (e.g., in case different Contract Factories were used for the source wallet and for the destination wallet), and/or the like.

A source wallet address may be calculated at 4013. In one implementation, the source wallet address may be calculated as an EIP-1014 address that is equal to the last 20 bytes of the Keccak-256 (SHA-3) hash of the concatenated list of the deployment factory address for the source wallet, the salt value for the source wallet, and Keccak-256 hash of the source wallet's bytecode including owner addresses generated using owner key identification parameters for each associated owner datastructure (e.g., as discussed with regard to 3605-3617) as constructor parameters—all prefixed with 0xFF byte. See FIG. 33 for additional details regarding calculating an EIP-1014 address. In another implementation, the source wallet address may be provided as part of the contract data for the source wallet Source wallet signatures may be validated at 4017. In one embodiment, each of the contract deployment signatures associated with the source wallet may be validated. In one implementation, the contract deployment signatures associated with the source wallet may be verified using a PKCS #11 function (e.g., C_Verify ( . . . )). For example, a contract deployment signature associated with an owner datastructure may be validated as follows:

Public Key=determine a public key that corresponds to the generated owner address associated with the owner datastructure using the owner key Identification parameters associated with the owner datastructure Hashed Value=Append the source wallet address and the salt value for the source wallet, and calculate a hash value of the result (e.g., KECCAK256 (source wallet address+salt value))

Validate the contract deployment signature=the contract deployment signature Is valid if the validation procedure for the hashed value and the public key returns true A determination may be made at 4021 whether the contract deployment signatures associated with the source wallet are valid. If the contract deployment signatures associated with the source wallet are not valid, an error message may be generated at 4053. For example, the error message may specify the error that occurred (e.g., contract deployment signature is invalid). A warning message may be provided to a user and/or an action may be triggered at 4057. In one implementation, a warning message based on the generated error message may be provided to the user (e.g., via the TSS) to inform the user regarding the error. In another implementation, an action may be triggered based on a specified condition (e.g., invalid signature obtained three times). For example, the triggered action may be to erase data associated with the source wallet.

If the contract deployment signatures associated with the source wallet are valid, contract data for the destination wallet may be determined at 4025. In one implementation, the contract data for the destination wallet may be provided in the SFCTS API call and may include contract code (e.g., the bytecode), a salt value, a contract address, a set of contract deployment signatures, a deployment factory (e.g., Contract Factory) address (e.g., in case different Contract Factories were used for the source wallet and for the destination wallet), and/or the like.

A destination wallet address may be calculated at 4029. In one implementation, the destination wallet address may be calculated as an EIP-1014 address that is equal to the last 20 bytes of the Keccak-256 (SHA-3) hash of the concatenated list of the deployment factory address for the destination wallet, the salt value for the destination wallet, and Keccak-256 hash of the destination wallet's bytecode including owner addresses generated using owner key identification parameters for each associated owner datastructure (e.g., as discussed with regard to 3605-3617) as constructor parameters—all prefixed with 0xFF byte. See FIG. 33 for additional details regarding calculating an EIP-1014 address. In another implementation, the destination wallet address may be provided as part of the contract data for the destination wallet.

Destination wallet signatures may be validated at 4033. In one embodiment, each of the contract deployment signatures associated with the destination wallet may be validated. In one implementation, the contract deployment signatures associated with the destination wallet may be verified using a PKCS #11 function (e.g., C_Verify ( . . . )). For example, a contract deployment signature associated with an owner datastructure may be validated as follows:

Public Key=determine a public key that corresponds to the generated owner address associated with the owner datastructure using the owner key Identification parameters associated with the owner datastructure Hashed Value=Append the destination wallet address and the salt value for the destination wallet, and calculate a hash value of the result (e.g., KECCAK256 (destination wallet address+salt value))

Validate the contract deployment signature=the contract deployment signature is valid if the validation procedure for the hashed value and the public key returns true A determination may be made at 4037 whether the contract deployment signatures associated with the destination wallet are valid. If the contract deployment signatures associated with the destination wallet are not valid, an error message may be generated at 4053. For example, the error message may specify the error that occurred (e.g., contract deployment signature is invalid). A warning message may be provided to a user and/or an action may be triggered at 4057. In one implementation, a warning message based on the generated error message may be provided to the user (e.g., via the TSS) to inform the user regarding the error. In another implementation, an action may be triggered based on a specified condition (e.g., invalid signature obtained three times). For example, the triggered action may be to erase data associated with the destination wallet.

If the contract deployment signatures associated with the destination wallet are valid, a transaction hash for the transaction (e.g., with the calculated destination wallet address used as the "to address" of the transaction message) may be generated at 4039. In one implementation, the transaction hash may be calculated in accordance with the hashing algorithm utilized by the Ethereum protocol (e.g., KECCAK256(RLP(message))).

A determination may be made at 4041 whether there remain owner datastructures to process. In one implementation, each of the owner datastructures provided in the SFCTS API call may be processed. If there remain owner datastructures to process, the next owner datastructure may be selected for processing at 4045.

A determination may be made at 4049 whether previously generated transaction signatures (e.g., if any) used to sign the transaction are valid. If any of the previously generated signatures is invalid, an error message may be generated at 4053. For example, the error message may specify the error that occurred (e.g., transaction signature is invalid). A warning message may be provided to a user and/or an action may be triggered at 4057. In one implementation, a warning message based on the generated error message may be provided to the user (e.g., via the TSS) to inform the user regarding the error. In another implementation, an action may be triggered based on a specified condition (e.g., invalid signature obtained three times). For example, the triggered action may be to erase data associated with the source wallet.

If the previously generated transaction signatures are valid, the transaction may be signed using a private key associated with the selected owner datastructure at 4061. It is to be understood that, in various embodiments, transaction signing may be performed in a variety of ways (e.g., as discussed with regard to SFTS, HSFTS, CSFTS components), and different owners may utilize different HSMs (e.g., each HSM executing a separate SFCTS component), the same HSM, combinations of HSMs, and/or the like to sign the transaction.

The signed transaction may be returned at 4065. In one implementation, the ECDSA signature in DER format may be returned.

SFTSP Controller

Figure 41:
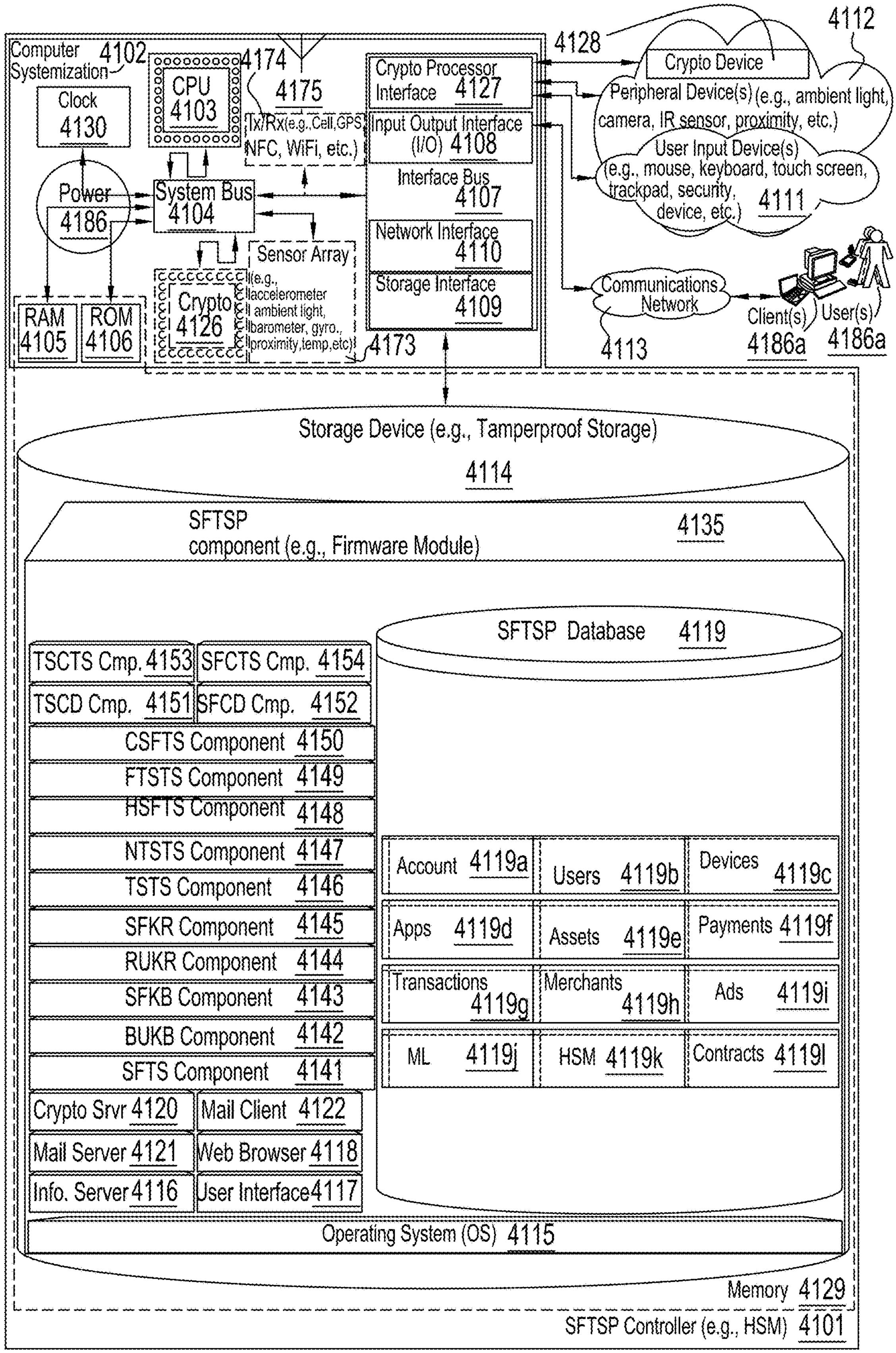
FIG. 41 shows a block diagram illustrating embodiments of a SFTSP controller.

FIG. 41 shows a block diagram illustrating non-limiting, example embodiments of a SFTSP controller. In this embodiment, the SFTSP controller 4101 may serve to aggregate, process, store, search, serve, identify, instruct, generate, match, and/or facilitate interactions with a computer through information technology technologies, and/or other related data.

Users, which may be people and/or other systems, may engage information technology systems (e.g., computers) to facilitate information processing. In turn, computers employ processors to process information; such processors 4103 may be referred to as central processing units (CPU). One form of processor is referred to as a microprocessor. CPUs use communicative circuits to pass binary encoded signals acting as instructions to allow various operations. These instructions may be operational and/or data instructions containing and/or referencing other instructions and data in various processor accessible and operable areas of memory 4129 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the SFTSP controller 4101 may be connected to and/or communicate with entities such as, but not limited to: one or more users from peripheral devices 4112 (e.g., user input devices 4111); an optional cryptographic processor device 4128; and/or a communications network 4113.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is referred to as a "node." Networks are generally thought to facilitate the transfer of information from source points to destinations. A node specifically tasked with furthering the passage of information from a source to a destination is called a "router." There are many forms of networks such as Local Area Networks (LANs), Pico networks, Wide Area Networks (WANs), Wireless Networks (WLANs), etc. For example, the Internet is, generally, an interconnection of a multitude of networks whereby remote clients and servers may access and interoperate with one another.

The SFTSP controller 4101 may be based on computer systems that may comprise, but are not limited to, components such as: a computer systemization 4102 connected to memory 4129.

Computer Systemization

A computer systemization 4102 may comprise a clock 4130, central processing unit ("CPU(s)" and/or "processor(s)" (these terms are used interchangeably throughout the disclosure unless noted to the contrary)) 4103, a memory 4129 (e.g., a read only memory (ROM) 4106, a random access memory (RAM) 4105, etc.), and/or an interface bus 4107, and most frequently, although not necessarily, are all interconnected and/or communicating through a system bus 4104 on one or more (mother)board(s) 4102 having conductive and/or otherwise transportive circuit pathways through which instructions (e.g., binary encoded signals) may travel to effectuate communications, operations, storage, etc. The computer systemization may be connected to a power source 4186; e.g., optionally the power source may be internal. Optionally, a cryptographic processor 4126 may be connected to the system bus. In another embodiment, the cryptographic processor, transceivers (e.g., ICs) 4174, and/or sensor array (e.g., accelerometer, altimeter, ambient light, barometer, global positioning system (GPS) (thereby allowing SFTSP controller to determine its location), gyroscope, magnetometer, pedometer, proximity, ultra-violet sensor, etc.) 4173 may be connected as either internal and/or external peripheral devices 4112 via the interface bus I/O 4108 (not pictured) and/or directly via the interface bus 4107. In turn, the transceivers may be connected to antenna(s) 4175, thereby effectuating wireless transmission and reception of various communication and/or sensor protocols; for example the antenna(s) may connect to various transceiver chipsets (depending on deployment needs), including: Broadcom® BCM4329FKUBG transceiver chip (e.g., providing 802.11n, Bluetooth 2.1+EDR, FM, etc.); a Broadcom® BCM4752 GPS receiver with accelerometer, altimeter, GPS, gyroscope, magnetometer; a Broadcom® BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom® BCM43341 transceiver chip (e.g., providing 2G, 3G and 4G LTE cellular communications; 802.11g/, Bluetooth 4.0, near field communication (NFC), FM radio); an Infineon Technologies® X-Gold 618-PMB9800 transceiver chip (e.g., providing 2G/3G HSDPA/HSUPA communications); a MediaTek® MT6620 transceiver chip (e.g., providing 802.11a/ac/b/g/n (also known as WiFi in numerous iterations), Bluetooth 4.0 LE, FM, GPS; a Lapis Semiconductor® ML8511 UV sensor; a maxim integrated MAX44000 ambient light and infrared proximity sensor; a Texas Instruments® WiLink WL1283 transceiver chip (e.g., providing 802.11n, Bluetooth 3.0, FM, GPS); and/or the like. The system clock may have a crystal oscillator and generates a base signal through the computer systemization's circuit pathways. The dock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks®), netbooks, tablets (e.g., Android®, iPads®, and Windows® tablets, etc.), mobile smartphones (e.g., Android®, iPhones®, Nokia®, Palm® and Windows® phones, etc.), wearable device(s) (e.g., headsets (e.g., Apple AirPods (Pro)®, glasses, goggles (e.g., Google Glass®), watches, etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 4129 beyond the processor itself; internal memory may include, but is not limited to: fast registers, various levels of cache memory (e.g., level 1, 2, 3, etc.), (dynamic/static) RAM, solid state memory, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon®, Duron® and/or Opteron®; Apple's® A series of processors (e.g., A5, A6, A7, A8, etc.); ARM's® application, embedded and secure processors; IBM® and/or Motorola's DragonBall® and PowerPC®; IBM's® and Sony's® Cell processor; Intel's® 80X86 series (e.g., 80386, 80486), Pentium®, Celeron®, Core (2) Duo®, i series (e.g., i3, i5, i7, i9, etc.), Itanium®, Xeon®, and/or XScale®; Motorola's® 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code), e.g., via load/read address commands; e.g., the CPU may read processor issuable instructions from memory (e.g., reading it from a component collection (e.g., an interpreted and/or compiled program application/library including allowing the processor to execute instructions from the application/library) stored in the memory). Such instruction passing facilitates communication within the SFTSP controller and beyond through various interfaces. Should processing requirements dictate a greater amount speed and/or capacity, distributed processors (e.g., see Distributed SFTSP below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the SFTSP may be achieved by implementing a microcontroller such as CAST's® R8051XC2 microcontroller; Intel's® MCS 51 (i.e., 8051 microcontroller); and/or the like. Also, to implement certain features of the SFTSP, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the SFTSP component collection (distributed or otherwise) and/or features may be implemented via the microprocessor and/or via embedded components; e.g., via ASIC, coprocessor, DSP, FPGA, and/or the like. Alternately, some implementations of the SFTSP may be implemented with embedded components that are configured and used to achieve a variety of features or signal processing.

Depending on the particular implementation, the embedded components may include software solutions, hardware solutions, and/or some combination of both hardware/software solutions. For example, SFTSP features discussed herein may be achieved through implementing FPGAs, which are a semiconductor devices containing programmable logic components called "logic blocks", and programmable interconnects, such as the high performance FPGA Virtex® series and/or the low cost Spartan® series manufactured by Xilinx®. Logic blocks and interconnects can be programmed by the customer or designer, after the FPGA is manufactured, to implement any of the SFTSP features. A hierarchy of programmable interconnects allow logic blocks to be interconnected as needed by the SFTSP system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the SFTSP may be developed on FPGAs and then migrated into a fixed version that more resembles ASIC implementations. Alternate or coordinating implementations may migrate SFTSP controller features to a final ASIC instead of or in addition to FPGAs. Depending on the implementation all of the aforementioned embedded components and microprocessors may be considered the "CPU" and/or "processor" for the SFTSP.

Power Source

The power source 4186 may be of any various form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 4186 is connected to at least one of the interconnected subsequent components of the SFTSP thereby providing an electric current to all subsequent components. In one example, the power source 4186 is connected to the system bus component 4104. In an alternative embodiment, an outside power source 4186 is provided through a connection across the I/O 4108 interface. For example, Ethernet (with power on Ethernet), IEEE 1394, USB and/or the like connections carry both data and power across the connection and is therefore a suitable source of power.

Interface Adapters

Interface bus(ses) 4107 may accept, connect, and/or communicate to a number of interface adapters, variously although not necessarily in the form of adapter cards, such as but not limited to: input output interfaces (I/O) 4108, storage interfaces 4109, network interfaces 4110, and/or the like. Optionally, cryptographic processor interfaces 4127 similarly may be connected to the interface bus. The interface bus provides for the communications of interface adapters with one another as well as with other components of the computer systemization. Interface adapters are adapted for a compatible interface bus. Interface adapters variously connect to the interface bus via a slot architecture. Various slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 4109 may accept, communicate, and/or connect to a number of storage devices such as, but not limited to: (removable) storage devices 4114, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Non-Volatile Memory (NVM) Express (NVMe), Small Computer Systems Interface (SCSI), Thunderbolt, Universal Serial Bus (USB), and/or the like.

Network interfaces 4110 may accept, communicate, and/or connect to a communications network 4113. Through a communications network 4113, the SFTSP controller is accessible through remote clients 4133*b* (e.g., computers with web browsers) by users 4133*a*. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed SFTSP below), architectures may similarly be employed to pool, load balance, and/or otherwise decrease/increase the communicative bandwidth required by the SFTSP controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 4110 may be used to engage with various communications network types 4113. For example, multiple network interfaces may be employed to allow for the communication over broadcast, multicast, and/or unicast networks.

Input Output interfaces (I/O) 4108 may accept, communicate, and/or connect to user, peripheral devices 4112 (e.g., input devices 4111), cryptographic processor devices 4128, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, Thunderbolt/USB-C, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may include a video display, which may comprise a Cathode Ray Tube (CRT), Liquid Crystal Display (LCD), Light-Emitting Diode (LED), Organic Light-Emitting Diode (OLED), and/or the like based monitor with an interface (e.g., HDMI circuitry and cable) that accepts signals from a video interface, may be used. The video interface composites information generated by a computer systemization and generates video signals based on the composited information in a video memory frame. Another output device is a television set, which accepts signals from a video interface. The video interface provides the composited video information through a video connection interface that accepts a video display interface (e.g., an RCA composite video connector accepting an RCA composite video cable; a DVI connector accepting a DVI display cable, etc.).

Peripheral devices 4112 may be connected and/or communicate to I/O and/or other facilities of the like such as network interfaces, storage interfaces, directly to the interface bus, system bus, the CPU, and/or the like. Peripheral devices may be external, internal and/or part of the SFTSP controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection ensuring secure transactions with a digital signature, as connection/format adaptors, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 4111 often are a type of peripheral device 512 (see above) and may include: accelerometers, cameras, card readers, dongles, finger print readers, gloves, graphics tablets, joysticks, keyboards, microphones, mouse (mice), remote controls, security/biometric devices (e.g., facial identifiers, fingerprint reader, iris reader, retina reader, etc.), styluses, touch screens (e.g., capacitive, resistive, etc.), trackballs, trackpads, watches, and/or the like.

It should be noted that although user input devices and peripheral devices may be employed, the SFTSP controller may be embodied as an embedded, dedicated, and/or monitor-less (i.e., headless) device, and access may be provided over a network interface connection.

Cryptographic units such as, but not limited to, microcontrollers, processors 4126, interfaces 4127, and/or devices 4128 may be attached, and/or communicate with the SFTSP controller. A MC68HC16 microcontroller, manufactured by Motorola, Inc.®, may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other specialized cryptographic processors include: Broadcom's® CryptoNetX and other Security Processors; nCipher's® nShield; SafeNet's® Luna PCI (e.g., 7100) series; Semaphore Communications'® 40 MHz Roadrunner 184; Sun's® Cryptographic Accelerators (e.g., Accelerator 6000 PCIe Board, Accelerator 500 Daughtercard); Via Nano® Processor (e.g., L2100, L2200, U2400) line, which is capable of performing 500+MB/s of cryptographic instructions; VLSI Technology's® 33 MHz 6868; and/or the like.

Memory

Generally, any mechanization and/or embodiment allowing a processor to affect the storage and/or retrieval of information is regarded as memory 4129. The storing of information in memory may result in a physical alteration of the memory to have a different physical state that makes the memory a structure with a unique encoding of the memory stored therein. Often, memory is a fungible technology and resource, thus, any number of memory embodiments may be employed in lieu of or in concert with one another. It is to be understood that the SFTSP controller and/or a computer systemization may employ various forms of memory 4129. For example, a computer systemization may be configured to have the operation of on-chip CPU memory (e.g., registers), RAM, ROM, and any other storage devices performed by a paper punch tape or paper punch card mechanism; however, such an embodiment would result in an extremely slow rate of operation. In one configuration, memory 4129 will include ROM 4106, RAM 4105, and a storage device 4114. A storage device 4114 may be any various computer system storage. Storage devices may include: an array of devices (e.g., Redundant Array of Independent Disks (RAID)); a cache memory, a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; register memory (e.g., in a CPU), solid state memory devices (USB memory, solid state drives (SSD), etc.); other processor-readable storage mediums; and/or other devices of the like. Thus, a computer systemization generally employs and makes use of memory.

Component Collection

The memory 4129 may contain a collection of processor-executable application/library/program and/or database components (e.g., including processor-executable instructions) and/or data such as, but not limited to: operating system component(s) 4115 (operating system); information server component(s) 4116 (information server); user interface component(s) 4117 (user interface); Web browser component(s) 4118 (Web browser); database(s) 4119; mail server component(s) 4121; mail client component(s) 4122; cryptographic server component(s) 4120 (cryptographic server); machine learning component 4123; the SFTSP component(s) 4135 (e.g., which may include SFTS, BUKB, SFKB, RUKR, SFKR, TSTS, NTSTS, HSFTS, FTSTS, CSFTS, TSCD, SFCD, TSCTS, SFCTS 4141-4154, and/or the like components); and/or the like (i.e., collectively referred to throughout as a "component collection"). These components may be stored and accessed from the storage devices and/or from storage devices accessible through an interface bus. Although unconventional program components such as those in the component collection may be stored in a local storage device 4114, they may also be loaded and/or stored in memory such as: cache, peripheral devices, processor registers, RAM, remote storage facilities through a communications network, ROM, various forms of memory, and/or the like.

Operating System

The operating system component 4115 is an executable program component facilitating the operation of the SFTSP controller. The operating system may facilitate access of I/O, network interfaces, peripheral devices, storage devices, and/or the like. The operating system may be a highly fault tolerant, scalable, and secure system such as: Apple's Macintosh OS X (Server) and macOS®; AT&T Plan 9®; Be OS®; Blackberry's QNX®; Google's Chrome®; Microsoft's Windows® 7/8/10; Unix and Unix-like system distributions (such as AT&T's UNIX®; Berkley Software Distribution (BSD)® variations such as FreeBSD®, NetBSD, OpenBSD, and/or the like; Linux distributions such as Red Hat, Ubuntu, and/or the like); and/or the like operating systems. However, more limited and/or less secure operating systems also may be employed such as Apple Macintosh OS® (i.e., versions 1-9), IBM OS/2®, Microsoft DOS®, Microsoft Windows 2000/2003/3.1/95/98/CE/Millennium/Mobile/NT/Vista/XP/7/X (Server)®, Palm OS®, and/or the like. Additionally, for robust mobile deployment applications, mobile operating systems may be used, such as: Apple's iOS®; China Operating System COS®; Google's Android®; Microsoft Windows RT/Phone®; Palm's WebOS®; Samsung/Intel's Tizen®; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may facilitate the interaction with communications networks, data, I/O, peripheral devices, program components, memory, user input devices, and/or the like. The operating system may provide communications protocols that allow the SFTSP controller to communicate with other entities through a communications network 4113. Various communication protocols may be used by the SFTSP controller as a subcarrier transport mechanism for interaction, such as, but not limited to: multicast, TCP/IP, UDP, unicast, and/or the like.

Information Server

M An information server component 4116 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C(++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, Ruby, wireless application protocol (WAP), WebObjects®, and/or the like. The information server may support secure communications protocols such as, but not limited to, File Transfer Protocol (FTP(S)); HyperText Transfer Protocol (HTTP); Secure Hypertext Transfer Protocol (HTTPS), Secure Socket Layer (SSL) Transport Layer Security (TLS), messaging protocols (e.g., America Online (AOL) Instant Messenger (AIM)®, Application Exchange (APEX), ICQ, Internet Relay Chat (IRC), Microsoft Network (MSN) Messenger® Service, Presence and Instant Messaging Protocol (PRIM), Internet Engineering Task Force's® (IETF's) Session Initiation Protocol (SIP), SIP for Instant Messaging and Presence Leveraging Extensions (SIMPLE), Slack®, open XML-based Extensible Messaging and Presence Protocol (XMPP) (ie., Jabber® or Open Mobile Alliance's (OMA's) Instant Messaging and Presence Service (IMPS)), Yahoo! Instant Messenger® Service, and/or the like). The information server may provide results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the SFTSP controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the SFTSP database 4119, operating systems, other program components, user interfaces, Web browsers, and/or the like.

Access to the SFTSP database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the SFTSP. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in SQL by instantiating a search string with the proper join/select commands based on the tagged text entries, and the resulting command is provided over the bridge mechanism to the SFTSP as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, graphical views, menus, scrollers, text fields, and windows (collectively referred to as widgets) similarly facilitate the access, capabilities, operation, and display of data and computer hardware and operating system resources, and status. Operation interfaces are called user interfaces. Graphical user interfaces (GUIs) such as the Apple's iOS®, Macintosh Operating System's Aqua®; IBM's OS/2®; Google's Chrome® (e.g., and other webbrowser/cloud based client OSs); Microsoft's Windows® 2000/2003/3.1/95/98/CE/Millennium/Mobile/NT/Vista/XP/7/X (Server)® (ie., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface®, and/or the like, any of which may be used and) provide a baseline and mechanism of accessing and displaying information graphically to users.

A user interface component 4117 is a stored program component that is executed by a CPU. The user interface may be a graphic user interface as provided by, with, and/or atop operating systems and/or operating environments, and may provide executable library APIs (as may operating systems and the numerous other components noted in the component collection) that allow instruction calls to generate user interface elements such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 4118 is a stored program component that is executed by a CPU. The Web browser may be a hypertext viewing application such as Apple's (mobile) Safari®, Google's Chrome®, Microsoft Internet Explorer®, Mozilla's Firefox®, Netscape Navigator®, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the SFTSP enabled nodes. The combined application may be nugatory on systems employing Web browsers.

Mail Server

A mail server component 4121 is a stored program component that is executed by a CPU 4103. The mail server may be an Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C(++), C# and/or .NET, CGI scripts, Java, JavaScript, PERL, PHP, pipes, Python, WebObjects®, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the SFTSP. Alternatively, the mail server component may be distributed out to mail service providing entities such as Google's® cloud services (e.g., Gmail and notifications may alternatively be provided via messenger services such as AOL's Instant Messenger®, Apple's iMessage®, Google Messenger®, SnapChat®, etc.).

Access to the SFTSP mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 4122 is a stored program component that is executed by a CPU 4103. The mail client may be a mail viewing application such as Apple Mail®, Microsoft Entourage®, Microsoft Outlook®, Microsoft Outlook Express®, Mozilla®, Thunderbird®, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 4120 is a stored program component that is executed by a CPU 4103, cryptographic processor 4126, cryptographic processor interface 4127, cryptographic processor device 4128, and/or the like. Cryptographic processor interfaces will allow for expedition of encryption and/or decryption requests by the cryptographic component; however, the cryptographic component, alternatively, may run on a CPU and/or GPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component facilitates numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the SFTSP may encrypt all incoming and/or outgoing communications and may serve as node within a virtual private network (VPN) with a wider communications network. The cryptographic component facilitates the process of "security authorization" whereby access to a resource is inhibited by a security protocol and the cryptographic component effects authorized access to the secured resource. In addition, the cryptographic component may provide unique identifiers of content, e.g., employing an MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to allow the SFTSP component to engage in secure transactions if so desired. The cryptographic component facilitates the secure accessing of resources on the SFTSP and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

Machine Learning (ML)

In one non limiting embodiment, the SFTSP includes a machine learning component 4123, which may be a stored program component that is executed by a CPU 4103. The machine learning component, alternatively, may run on a set of specialized processors, ASICs, FPGAs, GPUs, and/or the like. The machine learning component may be deployed to execute serially, in parallel, distributed, and/or the like, such as by utilizing cloud computing. The machine learning component may employ an ML platform such as Amazon SageMaker, Azure Machine Learning, DataRobot AI Cloud, Google AI Platform, IBM Watson® Studio, and/or the like. The machine learning component may be implemented using an ML framework such as PyTorch, Apache MXNet, MathWorks Deep Learning Toolbox, scikit-learn, TensorFlow, XGBoost, and/or the like. The machine learning component facilitates training and/or testing of ML prediction logic data structures (e.g., models) and/or utilizing ML prediction logic data structures (e.g., models) to output ML predictions by the SFTSP. The machine learning component may employ learning mechanisms such as Reinforcement Learning, Supervised Learning, Unsupervised Learning, and/or the like. The machine learning component may employ ML prediction logic data structure (e.g., model) types such as Bayesian Networks, Classification prediction logic data structures (e.g., models), Decision Trees, Neural Networks (NNs), Regression prediction logic data structures (e.g., models), and/or the like.

The SFTSP Database

The SFTSP database component 4119 may be embodied in a database and its stored data. The database is a stored program component, which is executed by the CPU; the stored program component portion configuring the CPU to process the stored data. The database may be a fault tolerant, relational, scalable, secure database such as Claris FileMaker®, MySQL®, Oracle®, Sybase®, etc. may be used. Additionally, optimized fast memory and distributed databases such as IBM's Netezza®, MongoDB's MongoDB®, opensource Hadoop®, opensource VoltDB, SAP's Hana®, etc. Relational databases are an extension of a flat file. Relational databases include a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the SFTSP database may be implemented using various other data-structures, such as an array, hash, (linked) list, struct, structured text file (e.g., XML), table, flat file database, and/or the like. Such data-structures may be stored in memory and/or in (structured) files. In another alternative, an object-oriented database may be used, such as Frontier™, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the SFTSP database is implemented as a data-structure, the use of the SFTSP database 4119 may be integrated into another component such as the SFTSP component 4135. Also, the database may be implemented as a mix of data structures, objects, programs, relational structures, scripts, and/or the like. Databases may be consolidated and/or distributed in countless variations (e.g., see Distributed SFTSP below). Portions of databases, e.g., tables, may be exported and/or imported and thus decentralized and/or integrated.

In one embodiment, the database component 4119 includes several tables representative of the schema, tables, structures, keys, entities and relationships of the described database **4119*a*-1**:

An accounts table **4119*a*** includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table **4119*b*** includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a SFTSP);

An devices table **4119*c*** includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppInstalledFlag, deviceAccessPrivileges, devicePreferences, deviceRestrictions, hardware_config, software_config, storage_ location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_ dimensions, device_dimensions, sensor_communications_type, device_communications_type, power_percentage, power condition, temperature_setting, speed_ adjust, hold_duration, part actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table **4119*d*** includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table **4119*e*** includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, asset- SeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table **4119*f*** includes fields such as, but not limited to: paymentID, accountID, userID, couponID, couponValue, couponConditions, couponExpiration, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table **4119*g*** includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table **4119*h*** includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An ads table **4119*i*** includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

An ML table **4119*j*** includes fields such as, but not limited to: MLID, predictionLogicStructureID, predictionLogicStructureType, predictionLogicStructureConfiguration, predictionLogicStructureTrainedStructure, predictionLogicStructureTrainingData, predictionLogicStructureTrainingDataConfiguration, predictionLogicStructureTestingData, predictionLogicStructureTestingDataConfiguration, predictionLogicStructureOutputData, predictionLogicStructureOutputDataConfiguration, and/or the like;

A HSM table **4119*k*** includes fields such as, but not limited to: HSM_ID, walletID, masterPrivateKey, masterPublicKey, privateKeyDecryptionKey, publicKeyEncryptionKey, isPortableHSM_Utilized, associatedHSM_ID, masterPrivateKeyShare, and/or the like;

A contracts table **4119*l*** includes fields such as, but not limited to: contractID, contractCode, contractOwnerIDs, contractOwnerAddresses, contractNumberOfSignatures, contractDeploymentSignatures, contractSalt, contractAddress, contractContractFactoryAddress, and/or the like.

In one embodiment, the SFTSP database may interact with other database systems. For example, employing a distributed database system, queries and data access by search SFTSP component may treat the combination of the SFTSP database, an integrated data security layer database as a single database entity (e.g., see Distributed SFTSP below).

In one embodiment, user programs may contain various user interface primitives, which may serve to update the SFTSP. Also, various accounts may require custom database tables depending upon the environments and the types of clients the SFTSP may need to serve. It should be noted that any unique fields may be designated as a key field throughout. In an alternative embodiment, these tables have been decentralized into their own databases and their respective database controllers (i.e., individual database controllers for each of the above tables). The SFTSP may also be configured to distribute the databases over several computer systemizations and/or storage devices. Similarly, configurations of the decentralized database controllers may be varied by consolidating and/or distributing the various database components **4119*a-l***. The SFTSP may be configured to keep track of various settings, inputs, and parameters via database controllers.

The SFTSP database may communicate to and/or with other components in a component collection, including itself, and/or facilities of the like. Most frequently, the SFTSP database communicates with the SFTSP component, other program components, and/or the like. The database may contain, retain, and provide information regarding other nodes and data.

The SFTSPs

The SFTSP component 4135 is a stored program component that is executed by a CPU via stored instruction code configured to engage signals across conductive pathways of the CPU and ISICI controller components. In one embodiment, the SFTSP component incorporates any and/or all combinations of the aspects of the SFTSP that were discussed in the previous figures. As such, the SFTSP affects accessing, obtaining and the provision of information, services, transactions, and/or the like across various communications networks. The features and embodiments of the SFTSP discussed herein increase network efficiency by reducing data transfer requirements with the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the SFTSP's features and facilities, and in many cases reduce the costs, energy consumption/requirements, and extend the life of SFTSP's underlying infrastructure; this has the added benefit of making the SFTSP more reliable. Similarly, many of the features and mechanisms are designed to be easier for users to use and access, thereby broadening the audience that may enjoy/employ and exploit the feature sets of the SFTSP; such ease of use also helps to increase the reliability of the SFTSP. In addition, the feature sets include heightened security as noted via the Cryptographic components 4120, 4126, 4128 and throughout, making access to the features and data more reliable and secure The SFTSP transforms contract deployment request, transaction signing request, key backup request, key recovery request inputs, via SFTSP components (e.g., SFTS, BUKB, SFKB, RUKR, SFKR, TSTS, NTSTS, HSFTS, FTSTS, CSFTS, TSCD, SFCD, TSCTS, SFCTS), into contract deployment response, transaction signing response, key backup response, key recovery response outputs.

The SFTSP component facilitates access of information between nodes may be developed by employing various development tools and languages such as, but not limited to: Apache® components, Assembly, ActiveX, binary executables, (ANSI) (Objective-) C(++), C# and/or .NET, database adapters, CGI scripts, Java, JavaScript, mapping tools, procedural and object oriented development tools, PERL, PHP, Python, Ruby, shell scripts, SQL commands, web application server extensions, web development environments and libraries (e.g., Microsoft's® ActiveX; Adobe® AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo!® User Interface; and/or the like), WebObjects®, and/or the like. In one embodiment, the SFTSP server employs a cryptographic server to encrypt and decrypt communications. The SFTSP component may communicate to and/or with other components in a component collection, including itself, and/or facilities of the like. Most frequently, the SFTSP component communicates with the SFTSP database, operating systems, other program components, and/or the like. The SFTSP may contain, communicate, generate, obtain, and/or provide program component, system, user, and/or data communications, requests, and/or responses.

Distributed SFTSPs

The structure and/or operation of any of the SFTSP node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such, a combination of hardware may be distributed within a location, within a region and/or globally where logical access to a controller may be abstracted as a singular node, yet where a multitude of private, semiprivate and publicly accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access, etc.).

The component collection may be consolidated and/or distributed in countless variations through various data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so as discussed through the disclosure and/or through various other data processing communication techniques.

The configuration of the SFTSP controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services®, Microsoft Azure®, Hewlett Packard Helion®, IBM® Cloud services allow for SFTSP controller and/or SFTSP component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), NeXT Computer, Inc.'s (Dynamic) Object Linking, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as JSON, lex, yacc, XML, and/or the like, which allow for grammar generation and parsing capabilities, which in turn may form the basis of communication messages within and between components.

For example, a grammar may be arranged to recognize the tokens of an I-TTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the SFTSP controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via an SSL connection, parse the data to extract variables, and store the data to a database, is provided below:

```
<?PHP
header('Content-Type: text/plain');
// set ip address and port to listen to for incoming data
$address = '92.168.0.1001';
$port = 255;
// create a server-side SSL socket, listen for/accept incoming communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of message
do {
   $input =
   $input = socket_read($client, 1024);
   $data .= $input;
} while($input != "");
// parse data to extract variables
$obj = json_decode($data, true);
// store input data in a database
mysql_connect("201.408.185.132",$DBserver,$password); // access database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/pert/site/lib/SOAP/Parser.html http://publib.boulder.ibm.com/infocenter/tivihelp/v2r1/Index.jsp?topic=/com.ibm.IBMDI.doc/referenceguide29 5.htm and other parser implementations:

http://publib.boulder.ibm.com/infocenter/tivihelp/v2r1/index.jsp?topic=/com.ibm.IBMDI.doc/referenceguide25 9.htm all of which are hereby expressly incorporated by reference.

Additional embodiments include:

1. A transaction signing apparatus, comprising:

a memory;

a component collection in the memory, including:

a secure firmware transaction signing component implemented by a first hardware security module (HSM);

a processor disposed in communication with the memory, and configured to issue a plurality of processing instructions from the component collection stored in the memory, wherein the processor issues instructions from the secure firmware transaction signing component, stored in the memory, to:

receive, via at least one processor, a transaction signing request message for a transaction;

obtain, via at least one processor, an encrypted master private key associated with the transaction from a second HSM;

retrieve, via at least one processor, from the first HSM's tamper-proof storage, a private key decryption key associated with the first HSM;

decrypt, via at least one processor, by the first HSM, the encrypted master private key using the retrieved private key decryption key;

determine, via at least one processor, a transaction hash and a keychain path associated with the transaction signing request message;

generate, via at least one processor, by the first HSM, a signing private key for the determined keychain path using the decrypted master private key;

sign, via at least one processor, by the first HSM, the determined transaction hash using the generated signing private key to generate a signature; and return, via at least one processor, the generated signature.

2. The apparatus of embodiment 1, wherein the first HSM is a PCIe appliance installed in a transaction signing server.

3. The apparatus of embodiment 1, wherein the second HSM is a USB appliance communicatively coupled to the first HSM via USB.

4. The apparatus of embodiment 1, wherein the second HSM includes a pin entry device.

5. The apparatus of embodiment 4, wherein the second HSM provides the encrypted master private key to the first HSM upon obtaining separate credentials from a predetermined number of people.

6. The apparatus of embodiment 1, wherein the second HSM also implements a secure firmware transaction signing component.

7. The apparatus of embodiment 1, wherein the transaction signing request is an API call to a method exposed by the secure firmware transaction signing component.

8. The apparatus of embodiment 1, wherein the encrypted master private key is encrypted, by the second HSM, using a public key encryption key of the first HSM stored in the second HSM's tamper-proof storage.

9. The apparatus of embodiment 1, wherein the signing private key is generated using a Bip32-based deterministic key derivation procedure.

10. The apparatus of embodiment 1, further, comprising:

the processor issues instructions from the secure firmware transaction signing component, stored in the memory, to:

wipe, via at least one processor, temporary private key data from the memory after generating the signature.

11. The apparatus of embodiment 10, wherein the temporary private key data includes the encrypted master private key, the decrypted master private key, and the generated signing private key.

12. The apparatus of embodiment 1, wherein the transaction hash is signed in accordance with the hashing algorithm utilized by the Bitcoin protocol.

13. The apparatus of embodiment 1, wherein the signature is returned in Distinguished Encoding Rules format.

14. A processor-readable transaction signing non-transient physical medium storing processor-executable components, the components, comprising:

a component collection stored in the medium, including:

a secure firmware transaction signing component implemented by a first hardware security module (HSM);

wherein the secure firmware transaction signing component, stored in the medium, includes processor-issuable instructions to:

receive, via at least one processor, a transaction signing request message for a transaction;

obtain, via at least one processor, an encrypted master private key associated with the transaction from a second HSM;

retrieve, via at least one processor, from the first HSM's tamper-proof storage, a private key decryption key associated with the first HSM;

decrypt, via at least one processor, by the first HSM, the encrypted master private key using the retrieved private key decryption key;

determine, via at least one processor, a transaction hash and a keychain path associated with the transaction signing request message;

generate, via at least one processor, by the first HSM, a signing private key for the determined keychain path using the decrypted master private key;

sign, via at least one processor, by the first HSM, the determined transaction hash using the generated signing private key to generate a signature; and return, via at least one processor, the generated signature.

15. The medium of embodiment 14, wherein the first HSM is a PCIe appliance installed in a transaction signing server.

16. The medium of embodiment 14, wherein the second HSM is a USB appliance communicatively coupled to the first HSM via USB.

17. The medium of embodiment 14, wherein the second HSM includes a pin entry device.

18. The medium of embodiment 17, wherein the second HSM provides the encrypted master private key to the first HSM upon obtaining separate credentials from a predetermined number of people.

19. The medium of embodiment 14, wherein the second HSM also implements a secure firmware transaction signing component.

20. The medium of embodiment 14, wherein the transaction signing request is an API call to a method exposed by the secure firmware transaction signing component.

21. The medium of embodiment 14, wherein the encrypted master private key is encrypted, by the second HSM, using a public key encryption key of the first HSM stored in the second HSM's tamper-proof storage.

22. The medium of embodiment 14, wherein the signing private key is generated using a Bip32-based deterministic key derivation procedure.

23. The medium of embodiment 14, further, comprising:

the secure firmware transaction signing component, stored in the medium, includes processor-issuable instructions to:

wipe, via at least one processor, temporary private key data from the memory after generating the signature.

24. The medium of embodiment 23, wherein the temporary private key data includes the encrypted master private key, the decrypted master private key, and the generated signing private key.

25. The medium of embodiment 14, wherein the transaction hash is signed in accordance with the hashing algorithm utilized by the Bitcoin protocol.

26. The medium of embodiment 14, wherein the signature is returned in Distinguished Encoding Rules format.

27. A processor-implemented transaction signing system, comprising:

secure firmware transaction signing component means implemented by a first hardware security module (HSM), to:

receive, via at least one processor, a transaction signing request message for a transaction;

obtain, via at least one processor, an encrypted master private key associated with the transaction from a second HSM;

retrieve, via at least one processor, from the first HSM's tamper-proof storage, a private key decryption key associated with the first HSM;

decrypt, via at least one processor, by the first HSM, the encrypted master private key using the retrieved private key decryption key;

determine, via at least one processor, a transaction hash and a keychain path associated with the transaction signing request message;

generate, via at least one processor, by the first HSM, a signing private key for the determined keychain path using the decrypted master private key;

sign, via at least one processor, by the first HSM, the determined transaction hash using the generated signing private key to generate a signature; and return, via at least one processor, the generated signature.

28. The system of embodiment 27, wherein the first HSM is a PCIe appliance installed in a transaction signing server.

29. The system of embodiment 27, wherein the second HSM is a USB appliance communicatively coupled to the first HSM via USB.

30. The system of embodiment 27, wherein the second HSM includes a pin entry device.

31. The system of embodiment 30, wherein the second HSM provides the encrypted master private key to the first HSM upon obtaining separate credentials from a predetermined number of people.

32. The system of embodiment 27, wherein the second HSM also implements a secure firmware transaction signing component.

33. The system of embodiment 27, wherein the transaction signing request is an API call to a method exposed by the secure firmware transaction signing component.

34. The system of embodiment 27, wherein the encrypted master private key is encrypted, by the second HSM, using a public key encryption key of the first HSM stored in the second HSM's tamper-proof storage.

35. The system of embodiment 27, wherein the signing private key is generated using a Bip32-based deterministic key derivation procedure.

36. The system of embodiment 27, further, comprising:

secure firmware transaction signing component means, to:

wipe, via at least one processor, temporary private key data from the memory after generating the signature.

37. The system of embodiment 36, wherein the temporary private key data includes the encrypted master private key, the decrypted master private key, and the generated signing private key.

38. The system of embodiment 27, wherein the transaction hash is signed in accordance with the hashing algorithm utilized by the Bitcoin protocol.

39. The system of embodiment 27, wherein the signature is returned in Distinguished Encoding Rules format.

40. A processor-implemented transaction signing method, comprising:

executing processor-implemented secure firmware transaction signing component instructions implemented by a first hardware security module (HSM), to:

receive, via at least one processor, a transaction signing request message for a transaction;

obtain, via at least one processor, an encrypted master private key associated with the transaction from a second HSM;

retrieve, via at least one processor, from the first HSM's tamper-proof storage, a private key decryption key associated with the first HSM;

decrypt, via at least one processor, by the first HSM, the encrypted master private key using the retrieved private key decryption key;

determine, via at least one processor, a transaction hash and a keychain path associated with the transaction signing request message;

generate, via at least one processor, by the first HSM, a signing private key for the determined keychain path using the decrypted master private key;

sign, via at least one processor, by the first HSM, the determined transaction hash using the generated signing private key to generate a signature; and return, via at least one processor, the generated signature.

41. The method of embodiment 40, wherein the first HSM is a PCIe appliance installed in a transaction signing server.

42. The method of embodiment 40, wherein the second HSM is a USB appliance communicatively coupled to the first HSM via USB.

43. The method of embodiment 40, wherein the second HSM includes a pin entry device.

44. The method of embodiment 43, wherein the second HSM provides the encrypted master private key to the first HSM upon obtaining separate credentials from a predetermined number of people.

45. The method of embodiment 40, wherein the second HSM also implements a secure firmware transaction signing component.

46. The method of embodiment 40, wherein the transaction signing request is an API call to a method exposed by the secure firmware transaction signing component.

47. The method of embodiment 40, wherein the encrypted master private key is encrypted, by the second HSM, using a public key encryption key of the first HSM stored in the second HSM's tamper-proof storage.

48. The method of embodiment 40, wherein the signing private key is generated using a Bip32-based deterministic key derivation procedure.

49. The method of embodiment 40, further, comprising:

executing processor-implemented secure firmware transaction signing component instructions to:

wipe, via at least one processor, temporary private key data from the memory after generating the signature.

50. The method of embodiment 49, wherein the temporary private key data includes the encrypted master private key, the decrypted master private key, and the generated signing private key.

51. The method of embodiment 40, wherein the transaction hash is signed in accordance with the hashing algorithm utilized by the Bitcoin protocol.

52. The method of embodiment 40, wherein the signature is returned in Distinguished Encoding Rules format.

101. A secure firmware key backup apparatus, comprising:

a memory;

a component collection in the memory, including:

a secure firmware key backup component implemented by a backup hardware security module (HSM);

a processor disposed in communication with the memory, and configured to issue a plurality of processing instructions from the component collection stored in the memory, wherein the processor issues instructions from the secure firmware key backup component, stored in the memory, to:

receive, via at least one processor, by the backup HSM, a key backup request from a backup utility, wherein the key backup request includes an encrypted master key associated with a hosting HSM;

retrieve, via at least one processor, from the backup HSM's tamper-proof storage, a private key decryption key corresponding to a public key encryption key previously provided by the backup HSM to the backup utility for the hosting HSM, wherein the encrypted master key is encrypted using the public key encryption key by the hosting HSM;

decrypt, via at least one processor, by the backup HSM, the encrypted master key using the retrieved private key decryption key;

determine, via at least one processor, by the backup HSM, a specified number of master key shares to generate for the decrypted master key;

generate, via at least one processor, by the backup HSM, the specified number of master key shares using a secret sharing method; and provide, via at least one processor, by the backup HSM, the generated master key shares to the backup utility.

102. The apparatus of embodiment 101, wherein the backup HSM is a PCIe appliance.

103. The apparatus of embodiment 101, wherein the hosting HSM is a USB appliance communicatively coupled to the backup HSM via USB.

104. The apparatus of embodiment 101, wherein the key backup request is an API call to a method exposed by the secure firmware key backup component.

105. The apparatus of embodiment 101, wherein the public key encryption key and the corresponding private key decryption key are predefined for the backup HSM.

106. The apparatus of embodiment 101, wherein the public key encryption key and the corresponding private key decryption key are generated dynamically each time a key backup is executed.

107. The apparatus of embodiment 101, wherein the secret sharing method is Shamir's Secret Sharing.

108. The apparatus of embodiment 101, further, comprising:

the processor issues instructions from the secure firmware key backup component, stored in the memory, to:

determine, via at least one processor, by the backup HSM, a specified number of master key shares sufficient to recover the master key; and wherein the master key shares are generated using the secret sharing method based on the determined number of master key shares sufficient to recover the master key.

109. The apparatus of embodiment 101, further, comprising:

a backup utility key backup component in the component collection, and the processor issues instructions from the backup utility key backup component, stored in the memory, to:

generate, via at least one processor, backup materials from the generated master key shares.

110. The apparatus of embodiment 109, wherein the backup materials are any of: paper printouts, metal plates, plastic plates, USB keys, hard drives, solid state drives, portable HSMs.

111. The apparatus of embodiment 109, wherein the backup materials are distributed for storage in geographically distributed backup locations.

112. The apparatus of embodiment 111, wherein each geographic backup location stores a mixture of different types of backup materials.

113. The apparatus of embodiment 101, further, comprising:

a secure firmware key recovery component in the component collection, and the processor issues instructions from the secure firmware key recovery component, stored in the memory, to:

receive, via at least one processor, by a second backup HSM, a key recovery request from a recovery utility, wherein the key recovery request includes a set of master key shares sufficient to recover the master key, wherein the key recovery request includes a second public key encryption key provided by a second hosting HSM, wherein the second public key encryption key corresponds to a second private key decryption key stored in tamper-proof storage of the second hosting HSM;

recover, via at least one processor, by the second backup HSM, the master key from the set of master key shares using the secret sharing method;

encrypt, via at least one processor, by the second backup HSM, the recovered master key using the second public key encryption key; and provide, via at least one processor, by the second backup HSM, the encrypted recovered master key to the recovery utility.

114. The apparatus of embodiment 113, wherein the backup HSM and the second backup HSM are the same HSM.

115. The apparatus of embodiment 113, wherein the hosting HSM and the second hosting HSM are the same HSM.

116. A processor-readable secure firmware key backup non-transient physical medium storing processor-executable components, the components, comprising:

a component collection stored in the medium, including:

a secure firmware key backup component implemented by a backup hardware security module (HSM);

wherein the secure firmware key backup component, stored in the medium, includes processor-issuable instructions to:

receive, via at least one processor, by the backup HSM, a key backup request from a backup utility, wherein the key backup request includes an encrypted master key associated with a hosting HSM;

retrieve, via at least one processor, from the backup HSM's tamper-proof storage, a private key decryption key corresponding to a public key encryption key previously provided by the backup HSM to the backup utility for the hosting HSM, wherein the encrypted master key is encrypted using the public key encryption key by the hosting HSM;

decrypt, via at least one processor, by the backup HSM, the encrypted master key using the retrieved private key decryption key;

determine, via at least one processor, by the backup HSM, a specified number of master key shares to generate for the decrypted master key;

generate, via at least one processor, by the backup HSM, the specified number of master key shares using a secret sharing method; and provide, via at least one processor, by the backup HSM, the generated master key shares to the backup utility.

117. The medium of embodiment 116, wherein the backup HSM is a PCIe appliance.

118. The medium of embodiment 116, wherein the hosting HSM is a USB appliance communicatively coupled to the backup HSM via USB.

119. The medium of embodiment 116, wherein the key backup request is an API call to a method exposed by the secure firmware key backup component.

120. The medium of embodiment 116, wherein the public key encryption key and the corresponding private key decryption key are predefined for the backup HSM.

121. The medium of embodiment 116, wherein the public key encryption key and the corresponding private key decryption key are generated dynamically each time a key backup is executed.

122. The medium of embodiment 116, wherein the secret sharing method is Shamir's Secret Sharing.

123. The medium of embodiment 116, further, comprising:

the secure firmware key backup component, stored in the medium, includes processor-issuable instructions to:

determine, via at least one processor, by the backup HSM, a specified number of master key shares sufficient to recover the master key; and wherein the master key shares are generated using the secret sharing method based on the determined number of master key shares sufficient to recover the master key.

124. The medium of embodiment 116, further, comprising:

a backup utility key backup component in the component collection, and the backup utility key backup component, stored in the medium, includes processor-issuable instructions to:

generate, via at least one processor, backup materials from the generated master key shares.

125. The medium of embodiment 124, wherein the backup materials are any of: paper printouts, metal plates, plastic plates, USB keys, hard drives, solid state drives, portable HSMs.

126. The medium of embodiment 124, wherein the backup materials are distributed for storage in geographically distributed backup locations.

127. The medium of embodiment 126, wherein each geographic backup location stores a mixture of different types of backup materials.

128. The medium of embodiment 116, further, comprising:

a secure firmware key recovery component in the component collection, and the secure firmware key recovery component, stored in the medium, includes processor-issuable instructions to:

receive, via at least one processor, by a second backup HSM, a key recovery request from a recovery utility, wherein the key recovery request includes a set of master key shares sufficient to recover the master key, wherein the key recovery request includes a second public key encryption key provided by a second hosting HSM, wherein the second public key encryption key corresponds to a second private key decryption key stored in tamper-proof storage of the second hosting HSM;

recover, via at least one processor, by the second backup HSM, the master key from the set of master key shares using the secret sharing method;

encrypt, via at least one processor, by the second backup HSM, the recovered master key using the second public key encryption key; and provide, via at least one processor, by the second backup HSM, the encrypted recovered master key to the recovery utility.

129. The medium of embodiment 128, wherein the backup HSM and the second backup HSM are the same HSM.

130. The medium of embodiment 128, wherein the hosting HSM and the second hosting HSM are the same HSM.

131. A processor-implemented secure firmware key backup system, comprising:

a secure firmware key backup component means implemented by a backup hardware security module (HSM), to:

receive, via at least one processor, by the backup HSM, a key backup request from a backup utility, wherein the key backup request includes an encrypted master key associated with a hosting HSM;

retrieve, via at least one processor, from the backup HSM's tamper-proof storage, a private key decryption key corresponding to a public key encryption key previously provided by the backup HSM to the backup utility for the hosting HSM, wherein the encrypted master key is encrypted using the public key encryption key by the hosting HSM;

decrypt, via at least one processor, by the backup HSM, the encrypted master key using the retrieved private key decryption key;

determine, via at least one processor, by the backup HSM, a specified number of master key shares to generate for the decrypted master key;

generate, via at least one processor, by the backup HSM, the specified number of master key shares using a secret sharing method; and provide, via at least one processor, by the backup HSM, the generated master key shares to the backup utility.

132. The system of embodiment 131, wherein the backup HSM is a PCIe appliance.

133. The system of embodiment 131, wherein the hosting HSM is a USB appliance communicatively coupled to the backup HSM via USB.

134. The system of embodiment 131, wherein the key backup request is an API call to a method exposed by the secure firmware key backup component.

135. The system of embodiment 131, wherein the public key encryption key and the corresponding private key decryption key are predefined for the backup HSM.
136. The system of embodiment 131, wherein the public key encryption key and the corresponding private key decryption key are generated dynamically each time a key backup is executed.
137. The system of embodiment 131, wherein the secret sharing method is Shamir's Secret Sharing.
138. The system of embodiment 131, further, comprising: the secure firmware key backup component means, to:
determine, via at least one processor, by the backup HSM, a specified number of master key shares sufficient to recover the master key; and
wherein the master key shares are generated using the secret sharing method based on the determined number of master key shares sufficient to recover the master key.
139. The system of embodiment 131, further, comprising: a backup utility key backup component means, to:
generate, via at least one processor, backup materials from the generated master key shares.
140. The system of embodiment 139, wherein the backup materials are any of: paper printouts, metal plates, plastic plates, USB keys, hard drives, solid state drives, portable HSMs.
141. The system of embodiment 139, wherein the backup materials are distributed for storage in geographically distributed backup locations.
142. The system of embodiment 141, wherein each geographic backup location stores a mixture of different types of backup materials.
143. The system of embodiment 131, further, comprising: a secure firmware key recovery component means, to:
receive, via at least one processor, by a second backup HSM, a key recovery request from a recovery utility, wherein the key recovery request includes a set of master key shares sufficient to recover the master key, wherein the key recovery request includes a second public key encryption key provided by a second hosting HSM, wherein the second public key encryption key corresponds to a second private key decryption key stored in tamper-proof storage of the second hosting HSM;
recover, via at least one processor, by the second backup HSM, the master key from the set of master key shares using the secret sharing method;
encrypt, via at least one processor, by the second backup HSM, the recovered master key using the second public key encryption key; and
provide, via at least one processor, by the second backup HSM, the encrypted recovered master key to the recovery utility.
144. The system of embodiment 143, wherein the backup HSM and the second backup HSM are the same HSM.
145. The system of embodiment 143, wherein the hosting HSM and the second hosting HSM are the same HSM.
146. A processor-implemented secure firmware key backup method, comprising:
executing processor-implemented secure firmware key backup component instructions to:
receive, via at least one processor, by the backup HSM, a key backup request from a backup utility, wherein the key backup request includes an encrypted master key associated with a hosting HSM;
retrieve, via at least one processor, from the backup HSM's tamper-proof storage, a private key decryption key corresponding to a public key encryption key previously provided by the backup HSM to the backup utility for the hosting HSM, wherein the encrypted master key is encrypted using the public key encryption key by the hosting HSM;
decrypt, via at least one processor, by the backup HSM, the encrypted master key using the retrieved private key decryption key;
determine, via at least one processor, by the backup HSM, a specified number of master key shares to generate for the decrypted master key;
generate, via at least one processor, by the backup HSM, the specified number of master key shares using a secret sharing method; and
provide, via at least one processor, by the backup HSM, the generated master key shares to the backup utility.
147. The method of embodiment 146, wherein the backup HSM is a PCIe appliance.
148. The method of embodiment 146, wherein the hosting HSM is a USB appliance communicatively coupled to the backup HSM via USB.
149. The method of embodiment 146, wherein the key backup request is an API call to a method exposed by the secure firmware key backup component.
150. The method of embodiment 146, wherein the public key encryption key and the corresponding private key decryption key are predefined for the backup HSM.
151. The method of embodiment 146, wherein the public key encryption key and the corresponding private key decryption key are generated dynamically each time a key backup is executed.
152. The method of embodiment 146, wherein the secret sharing method is Shamir's Secret Sharing.
153. The method of embodiment 146, further, comprising: executing processor-implemented secure firmware key backup component instructions to:
determine, via at least one processor, by the backup HSM, a specified number of master key shares sufficient to recover the master key; and
wherein the master key shares are generated using the secret sharing method based on the determined number of master key shares sufficient to recover the master key.
154. The method of embodiment 146, further, comprising: executing processor-implemented backup utility key backup component instructions to:
generate, via at least one processor, backup materials from the generated master key shares.
155. The method of embodiment 154, wherein the backup materials are any of: paper printouts, metal plates, plastic plates, USB keys, hard drives, solid state drives, portable HSMs.
156. The method of embodiment 154, wherein the backup materials are distributed for storage in geographically distributed backup locations.
157. The method of embodiment 156, wherein each geographic backup location stores a mixture of different types of backup materials.
158. The method of embodiment 146, further, comprising: executing processor-implemented secure firmware key recovery component instructions to:
receive, via at least one processor, by a second backup HSM, a key recovery request from a recovery utility, wherein the key recovery request includes a set of master key shares sufficient to recover the master key, wherein the key recovery request includes a second public key encryption key provided by a second hosting HSM, wherein the second public key encryption key corresponds to a second private key decryption key stored in tamper-proof storage of the second hosting HSM;

recover, via at least one processor, by the second backup HSM, the master key from the set of master key shares using the secret sharing method;

encrypt, via at least one processor, by the second backup HSM, the recovered master key using the second public key encryption key; and provide, via at least one processor, by the second backup HSM, the encrypted recovered master key to the recovery utility.

159. The method of embodiment 158, wherein the backup HSM and the second backup HSM are the same HSM.

160. The method of embodiment 158, wherein the hosting HSM and the second hosting HSM are the same HSM.

171. The apparatus of embodiment 113, wherein the second backup HSM requires the set of master key shares to include a first specified number of master key shares stored on any physical backup materials and a second specified number of master key shares stored on any digital backup materials.

172. The apparatus of embodiment 113, wherein the second backup HSM requires the set of master key shares to include a first specified number of master key shares stored on specified physical backup materials and a second specified number of master key shares stored on specified digital backup materials.

173. The medium of embodiment 128, wherein the second backup HSM requires the set of master key shares to include a first specified number of master key shares stored on any physical backup materials and a second specified number of master key shares stored on any digital backup materials.

174. The medium of embodiment 128, wherein the second backup HSM requires the set of master key shares to include a first specified number of master key shares stored on specified physical backup materials and a second specified number of master key shares stored on specified digital backup materials.

175. The system of embodiment 143, wherein the second backup HSM requires the set of master key shares to include a first specified number of master key shares stored on any physical backup materials and a second specified number of master key shares stored on any digital backup materials.

176. The system of embodiment 143, wherein the second backup HSM requires the set of master key shares to include a first specified number of master key shares stored on specified physical backup materials and a second specified number of master key shares stored on specified digital backup materials.

177. The method of embodiment 158, wherein the second backup HSM requires the set of master key shares to include a first specified number of master key shares stored on any physical backup materials and a second specified number of master key shares stored on any digital backup materials.

178. The method of embodiment 158, wherein the second backup HSM requires the set of master key shares to include a first specified number of master key shares stored on specified physical backup materials and a second specified number of master key shares stored on specified digital backup materials.

201. A transaction signing apparatus, comprising:

a memory;

a component collection in the memory, including:

a secure firmware transaction signing component implemented by a first hardware security module (HSM);

a processor disposed in communication with the memory, and configured to issue a plurality of processing instructions from the component collection stored in the memory, wherein the processor issues instructions from the secure firmware transaction signing component, stored in the memory, to:

receive, via at least one processor, by the first HSM, a transaction signing request message for a transaction from a transaction signing server (TSS), wherein the transaction signing request message includes an encrypted second master key share associated with a second HSM;

retrieve, via at least one processor, from the first HSM's tamper-proof storage, a private key decryption key corresponding to a public key encryption key previously provided by the first HSM to the TSS for the second HSM, wherein the encrypted second master key share is encrypted using the public key encryption key by the second HSM;

decrypt, via at least one processor, by the first HSM, the encrypted second master key share using the retrieved private key decryption key;

retrieve, via at least one processor, from the first HSM's tamper-proof storage, a first master key share;

recover, via at least one processor, by the first HSM, a master private key from the first master key share and the decrypted second master key share using a secret sharing method;

determine, via at least one processor, by the first HSM, a transaction hash and a keychain path associated with the transaction signing request message;

generate, via at least one processor, by the first HSM, a signing private key for the determined keychain path using the recovered master private key;

sign, via at least one processor, by the first HSM, the determined transaction hash using the generated signing private key to generate a signature; and return, via at least one processor, the generated signature.

202. The apparatus of embodiment 201, wherein the first HSM is a PCIe appliance.

203. The apparatus of embodiment 201, wherein the second HSM is a USB appliance communicatively coupled to the TSS via USB.

204. The apparatus of embodiment 201, wherein the second HSM includes an authentication entry device.

205. The apparatus of embodiment 204, wherein the second HSM provides the encrypted second master key share to the TSS upon obtaining separate credentials via the authentication entry device from a predetermined number of people.

206. The apparatus of embodiment 205, wherein the second HSM enforces M-of-N security policy for exporting the encrypted second master key share, wherein access to the second HSM is controlled by M-of-N authentication policy.

207. The apparatus of embodiment 201, wherein the private key decryption key and the public key encryption key are predefined for the first HSM.

208. The apparatus of embodiment 201, wherein the private key decryption key and the public key encryption key are generated dynamically each time a transaction signing request message is received.

209. The apparatus of embodiment 201, wherein the transaction signing request message is an API call to a method exposed by the secure firmware transaction signing component.

210. The apparatus of embodiment 201, wherein the secret sharing method is Shamir's Secret Sharing.

211. The apparatus of embodiment 201, wherein the signing private key is generated using a Bip32-based deterministic key derivation procedure.

212. The apparatus of embodiment 201, further, comprising:

the processor issues instructions from the secure firmware transaction signing component, stored in the memory, to:

wipe, via at least one processor, temporary private key data from the memory after generating the signature.

213. The apparatus of embodiment 212, wherein the temporary private key data includes the private key decryption key, the public key encryption key, the encrypted second master key share, the decrypted second master key share, the recovered master private key, and the generated signing private key.

214. The apparatus of embodiment 201, wherein the transaction hash is signed in accordance with the hashing algorithm utilized by the Bitcoin protocol.

215. The apparatus of embodiment 201, wherein the signature is returned in Distinguished Encoding Rules format.

216. A processor-readable transaction signing non-transient physical medium storing processor-executable components, the components, comprising:

a component collection stored in the medium, including:

a secure firmware transaction signing component implemented by a first hardware security module (HSM);

wherein the secure firmware transaction signing component, stored in the medium, includes processor-issuable instructions to:

receive, via at least one processor, by the first HSM, a transaction signing request message for a transaction from a transaction signing server (TSS), wherein the transaction signing request message includes an encrypted second master key share associated with a second HSM;

retrieve, via at least one processor, from the first HSM's tamper-proof storage, a private key decryption key corresponding to a public key encryption key previously provided by the first HSM to the TSS for the second HSM, wherein the encrypted second master key share is encrypted using the public key encryption key by the second HSM;

decrypt, via at least one processor, by the first HSM, the encrypted second master key share using the retrieved private key decryption key;

retrieve, via at least one processor, from the first HSM's tamper-proof storage, a first master key share;

recover, via at least one processor, by the first HSM, a master private key from the first master key share and the decrypted second master key share using a secret sharing method;

determine, via at least one processor, by the first HSM, a transaction hash and a keychain path associated with the transaction signing request message;

generate, via at least one processor, by the first HSM, a signing private key for the determined keychain path using the recovered master private key;

sign, via at least one processor, by the first HSM, the determined transaction hash using the generated signing private key to generate a signature; and return, via at least one processor, the generated signature.

217. The medium of embodiment 216, wherein the first HSM is a PCIe appliance.

218. The medium of embodiment 216, wherein the second HSM is a USB appliance communicatively coupled to the TSS via USB.

219. The medium of embodiment 216, wherein the second HSM includes an authentication entry device.

220. The medium of embodiment 219, wherein the second HSM provides the encrypted second master key share to the TSS upon obtaining separate credentials via the authentication entry device from a predetermined number of people.

221. The medium of embodiment 220, wherein the second HSM enforces M-of-N security policy for exporting the encrypted second master key share, wherein access to the second HSM is controlled by M-of-N authentication policy.

222. The medium of embodiment 216, wherein the private key decryption key and the public key encryption key are predefined for the first HSM.

223. The medium of embodiment 216, wherein the private key decryption key and the public key encryption key are generated dynamically each time a transaction signing request message is received.

224. The medium of embodiment 216, wherein the transaction signing request message is an API call to a method exposed by the secure firmware transaction signing component.

225. The medium of embodiment 216, wherein the secret sharing method is Shamir's Secret Sharing.

226. The medium of embodiment 216, wherein the signing private key is generated using a Bip32-based deterministic key derivation procedure.

227. The medium of embodiment 216, further, comprising:

the secure firmware transaction signing component, stored in the medium, includes processor-issuable instructions to:

wipe, via at least one processor, temporary private key data from the memory after generating the signature.

228. The medium of embodiment 227, wherein the temporary private key data includes the private key decryption key, the public key encryption key, the encrypted second master key share, the decrypted second master key share, the recovered master private key, and the generated signing private key.

229. The medium of embodiment 216, wherein the transaction hash is signed in accordance with the hashing algorithm utilized by the Bitcoin protocol.
230. The medium of embodiment 216, wherein the signature is returned in Distinguished Encoding Rules format.
231. A processor-implemented transaction signing system, comprising:
  secure firmware transaction signing component means implemented by a first hardware security module (HSM), to:
    receive, via at least one processor, by the first HSM, a transaction signing request message for a transaction from a transaction signing server (TSS), wherein the transaction signing request message includes an encrypted second master key share associated with a second HSM;
    retrieve, via at least one processor, from the first HSM's tamper-proof storage, a private key decryption key corresponding to a public key encryption key previously provided by the first HSM to the TSS for the second HSM, wherein the encrypted second master key share is encrypted using the public key encryption key by the second HSM;
    decrypt, via at least one processor, by the first HSM, the encrypted second master key share using the retrieved private key decryption key;
    retrieve, via at least one processor, from the first HSM's tamper-proof storage, a first master key share;
    recover, via at least one processor, by the first HSM, a master private key from the first master key share and the decrypted second master key share using a secret sharing method;
    determine, via at least one processor, by the first HSM, a transaction hash and a keychain path associated with the transaction signing request message;
    generate, via at least one processor, by the first HSM, a signing private key for the determined keychain path using the recovered master private key;
    sign, via at least one processor, by the first HSM, the determined transaction hash using the generated signing private key to generate a signature; and
    return, via at least one processor, the generated signature.
232. The system of embodiment 231, wherein the first HSM is a PCIe appliance.
233. The system of embodiment 231, wherein the second HSM is a USB appliance communicatively coupled to the TSS via USB.
234. The system of embodiment 231, wherein the second HSM includes an authentication entry device.
235. The system of embodiment 234, wherein the second HSM provides the encrypted second master key share to the TSS upon obtaining separate credentials via the authentication entry device from a predetermined number of people.
236. The system of embodiment 235, wherein the second HSM enforces M-of-N security policy for exporting the encrypted second master key share, wherein access to the second HSM is controlled by M-of-N authentication policy.
237. The system of embodiment 231, wherein the private key decryption key and the public key encryption key are predefined for the first HSM.
238. The system of embodiment 231, wherein the private key decryption key and the public key encryption key are generated dynamically each time a transaction signing request message is received.
239. The system of embodiment 231, wherein the transaction signing request message is an API call to a method exposed by the secure firmware transaction signing component.
240. The system of embodiment 231, wherein the secret sharing method is Shamir's Secret Sharing.
241. The system of embodiment 231, wherein the signing private key is generated using a Bip32-based deterministic key derivation procedure.
242. The system of embodiment 231, further, comprising:
  secure firmware transaction signing component means, to:
    wipe, via at least one processor, temporary private key data from the memory after generating the signature.
243. The system of embodiment 242, wherein the temporary private key data includes the private key decryption key, the public key encryption key, the encrypted second master key share, the decrypted second master key share, the recovered master private key, and the generated signing private key.
244. The system of embodiment 231, wherein the transaction hash is signed in accordance with the hashing algorithm utilized by the Bitcoin protocol.
245. The system of embodiment 231, wherein the signature is returned in Distinguished Encoding Rules format.
246. A processor-implemented transaction signing method, comprising:
  executing processor-implemented secure firmware transaction signing component instructions implemented by a first hardware security module (HSM), to:
    receive, via at least one processor, by the first HSM, a transaction signing request message for a transaction from a transaction signing server (TSS), wherein the transaction signing request message includes an encrypted second master key share associated with a second HSM;
    retrieve, via at least one processor, from the first HSM's tamper-proof storage, a private key decryption key corresponding to a public key encryption key previously provided by the first HSM to the TSS for the second HSM, wherein the encrypted second master key share is encrypted using the public key encryption key by the second HSM;
    decrypt, via at least one processor, by the first HSM, the encrypted second master key share using the retrieved private key decryption key;
    retrieve, via at least one processor, from the first HSM's tamper-proof storage, a first master key share;
    recover, via at least one processor, by the first HSM, a master private key from the first master key share and the decrypted second master key share using a secret sharing method;
    determine, via at least one processor, by the first HSM, a transaction hash and a keychain path associated with the transaction signing request message;

generate, via at least one processor, by the first HSM, a signing private key for the determined keychain path using the recovered master private key;

sign, via at least one processor, by the first HSM, the determined transaction hash using the generated signing private key to generate a signature; and return, via at least one processor, the generated signature.

247. The method of embodiment 246, wherein the first HSM is a PCIe appliance.

248. The method of embodiment 246, wherein the second HSM is a USB appliance communicatively coupled to the TSS via USB.

249. The method of embodiment 246, wherein the second HSM includes an authentication entry device.

250. The method of embodiment 249, wherein the second HSM provides the encrypted second master key share to the TSS upon obtaining separate credentials via the authentication entry device from a predetermined number of people.

251. The method of embodiment 250, wherein the second HSM enforces M-of-N security policy for exporting the encrypted second master key share, wherein access to the second HSM is controlled by M-of-N authentication policy.

252. The method of embodiment 246, wherein the private key decryption key and the public key encryption key are predefined for the first HSM.

253. The method of embodiment 246, wherein the private key decryption key and the public key encryption key are generated dynamically each time a transaction signing request message is received.

254. The method of embodiment 246, wherein the transaction signing request message is an API call to a method exposed by the secure firmware transaction signing component.

255. The method of embodiment 246, wherein the secret sharing method is Shamir's Secret Sharing.

256. The method of embodiment 246, wherein the signing private key is generated using a Bip32-based deterministic key derivation procedure.

257. The method of embodiment 246, further, comprising:

executing processor-implemented secure firmware transaction signing component instructions to:

wipe, via at least one processor, temporary private key data from the memory after generating the signature.

258. The method of embodiment 257, wherein the temporary private key data includes the private key decryption key, the public key encryption key, the encrypted second master key share, the decrypted second master key share, the recovered master private key, and the generated signing private key.

259. The method of embodiment 246, wherein the transaction hash is signed in accordance with the hashing algorithm utilized by the Bitcoin protocol.

260. The method of embodiment 246, wherein the signature is returned in Distinguished Encoding Rules format.

301. A transaction signing apparatus, comprising:

a memory;

a component collection in the memory, including:

a hot secure firmware transaction signing component implemented by a hot hardware security module (HSM), and a cold secure firmware transaction signing component implemented by a first cold HSM;

a processor disposed in communication with the memory, and configured to issue a plurality of processing instructions from the component collection stored in the memory, wherein the processor issues instructions from the hot secure firmware transaction signing component, stored in the memory, to:

receive, via at least one processor, by the hot HSM, an online transaction signing request message for a transaction from an online transaction signing server (TSS);

retrieve, via at least one processor, from the hot HSM's tamper-proof storage, a third master key share;

determine, via at least one processor, by the hot HSM, a public key encryption key of the first cold HSM;

encrypt, via at least one processor, by the hot HSM, the third master key share using the public key encryption key of the first cold HSM; and return, via at least one processor, the encrypted third master key share to the online TSS for transfer to an offline TSS;

wherein the processor issues instructions from the cold secure firmware transaction signing component, stored in the memory, to:

receive, via at least one processor, by the first cold HSM, an offline transaction signing request message for the transaction from the offline TSS, wherein the offline transaction signing request message includes: an encrypted second master key share associated with a second cold HSM and the encrypted third master key share associated with the hot HSM;

retrieve, via at least one processor, from the first cold HSM's tamper-proof storage, a private key decryption key of the first cold HSM corresponding to the public key encryption key of the first cold HSM previously provided to the second cold HSM and to the hot HSM, wherein the encrypted second master key share is encrypted using the public key encryption key of the first cold HSM by the second cold HSM;

decrypt, via at least one processor, by the first cold HSM, the encrypted second master key share and the encrypted third master key share using the retrieved private key decryption key of the first cold HSM;

retrieve, via at least one processor, from the first cold HSM's tamper-proof storage, a first master key share;

recover, via at least one processor, by the first cold HSM, a master private key from the first master key share, the decrypted second master key share and the decrypted third master key share using a secret sharing method;

determine, via at least one processor, by the first cold HSM, a keychain path associated with the offline transaction signing request message;

generate, via at least one processor, by the first cold HSM, a signing private key for the determined keychain path using the recovered master private key;

sign, via at least one processor, by the first cold HSM, the transaction using the generated signing private key to generate a signature; and return, via at least one processor, the generated signature.

302. The apparatus of embodiment 301, further, comprising:

the processor issues instructions from the hot secure firmware transaction signing component, stored in the memory, to:

determine, via at least one processor, by the hot HSM, transaction data associated with the transaction;

retrieve, via at least one processor, from the hot HSM's tamper-proof storage, a private signing key corresponding to a public signing key of the hot HSM previously provided to the first cold HSM;

sign, via at least one processor, by the hot HSM, the transaction data; and return, via at least one processor, the signed transaction data to the online TSS for transfer to the offline TSS.

303. The apparatus of embodiment 302, further, comprising:

the processor issues instructions from the cold secure firmware transaction signing component, stored in the memory, to:

verify, via at least one processor, by the first cold HSM, the signed transaction data using the public signing key of the hot HSM.

304. The apparatus of embodiment 301, wherein an external storage device is utilized to transfer the encrypted third master key share from the online TSS to the offline TSS.

305. The apparatus of embodiment 301, wherein the hot HSM and the first cold HSM are PCIe appliances.

306. The apparatus of embodiment 301, wherein the second cold HSM is a USB appliance communicatively coupled to the first cold HSM via USB.

307. The apparatus of embodiment 301, wherein the second cold HSM includes an authentication entry device.

308. The apparatus of embodiment 307, wherein the second cold HSM provides the encrypted second master key share to the offline TSS upon obtaining separate credentials via the authentication entry device from a predetermined number of people.

309. The apparatus of embodiment 308, wherein the second cold HSM enforces M-of-N security policy for exporting the encrypted second master key share, wherein access to the second cold HSM is controlled by M-of-N authentication policy.

310. The apparatus of embodiment 301, wherein the private key decryption key of the first cold HSM and the public key encryption key of the first cold HSM are predefined.

311. The apparatus of embodiment 301, wherein the private key decryption key of the first cold HSM and the public key encryption key of the first cold HSM are generated dynamically for each transaction.

312. The apparatus of embodiment 301, wherein the secret sharing method is Shamir's Secret Sharing.

313. The apparatus of embodiment 301, further, comprising:

the processor issues instructions from the cold secure firmware transaction signing component, stored in the memory, to:

wipe, via at least one processor, temporary key data from the memory of the first cold HSM after generating the signature.

314. The apparatus of embodiment 313, wherein the temporary key data includes the encrypted second master key share, the decrypted second master key share, the encrypted third master key share, the decrypted third master key share, the recovered master private key, and the generated signing private key.

315. The apparatus of embodiment 301, wherein the signature is returned in Distinguished Encoding Rules format.

316. A processor-readable transaction signing non-transient physical medium storing processor-executable components, the components, comprising:

a component collection stored in the medium, including:

a hot secure firmware transaction signing component implemented by a hot hardware security module (HSM), and a cold secure firmware transaction signing component implemented by a first cold HSM;

wherein the hot secure firmware transaction signing component, stored in the medium, includes processor-issuable instructions to:

receive, via at least one processor, by the hot HSM, an online transaction signing request message for a transaction from an online transaction signing server (TSS);

retrieve, via at least one processor, from the hot HSM's tamper-proof storage, a third master key share;

determine, via at least one processor, by the hot HSM, a public key encryption key of the first cold HSM;

encrypt, via at least one processor, by the hot HSM, the third master key share using the public key encryption key of the first cold HSM; and return, via at least one processor, the encrypted third master key share to the online TSS for transfer to an offline TSS;

wherein the cold secure firmware transaction signing component, stored in the medium, includes processor-issuable instructions to:

receive, via at least one processor, by the first cold HSM, an offline transaction signing request message for the transaction from the offline TSS, wherein the offline transaction signing request message includes: an encrypted second master key share associated with a second cold HSM and the encrypted third master key share associated with the hot HSM;

retrieve, via at least one processor, from the first cold HSM's tamper-proof storage, a private key decryption key of the first cold HSM corresponding to the public key encryption key of the first cold HSM previously provided to the second cold HSM and to the hot HSM, wherein the encrypted second master key share is encrypted using the public key encryption key of the first cold HSM by the second cold HSM;

decrypt, via at least one processor, by the first cold HSM, the encrypted second master key share and the encrypted third master key share using the retrieved private key decryption key of the first cold HSM;

retrieve, via at least one processor, from the first cold HSM's tamper-proof storage, a first master key share;

recover, via at least one processor, by the first cold HSM, a master private key from the first master key share, the decrypted second master key share and the decrypted third master key share using a secret sharing method;

determine, via at least one processor, by the first cold HSM, a keychain path associated with the offline transaction signing request message;

generate, via at least one processor, by the first cold HSM, a signing private key for the determined keychain path using the recovered master private key;

sign, via at least one processor, by the first cold HSM, the transaction using the generated signing private key to generate a signature; and return, via at least one processor, the generated signature.

317. The medium of embodiment 316, further, comprising:

the hot secure firmware transaction signing component, stored in the medium, includes processor-issuable instructions to:

determine, via at least one processor, by the hot HSM, transaction data associated with the transaction;

retrieve, via at least one processor, from the hot HSM's tamper-proof storage, a private signing key corresponding to a public signing key of the hot HSM previously provided to the first cold HSM;

sign, via at least one processor, by the hot HSM, the transaction data; and return, via at least one processor, the signed transaction data to the online TSS for transfer to the offline TSS.

318. The medium of embodiment 317, further, comprising:

the cold secure firmware transaction signing component, stored in the medium, includes processor-issuable instructions to:

verify, via at least one processor, by the first cold HSM, the signed transaction data using the public signing key of the hot HSM.

319. The medium of embodiment 316, wherein an external storage device is utilized to transfer the encrypted third master key share from the online TSS to the offline TSS.

320. The medium of embodiment 316, wherein the hot HSM and the first cold HSM are PCIe appliances.

321. The medium of embodiment 316, wherein the second cold HSM is a USB appliance communicatively coupled to the first cold HSM via USB.

322. The medium of embodiment 316, wherein the second cold HSM includes an authentication entry device.

323. The medium of embodiment 322, wherein the second cold HSM provides the encrypted second master key share to the offline TSS upon obtaining separate credentials via the authentication entry device from a predetermined number of people.

324. The medium of embodiment 323, wherein the second cold HSM enforces M-of-N security policy for exporting the encrypted second master key share, wherein access to the second cold HSM is controlled by M-of-N authentication policy.

325. The medium of embodiment 316, wherein the private key decryption key of the first cold HSM and the public key encryption key of the first cold HSM are predefined.

326. The medium of embodiment 316, wherein the private key decryption key of the first cold HSM and the public key encryption key of the first cold HSM are generated dynamically for each transaction.

327. The medium of embodiment 316, wherein the secret sharing method is Shamir's Secret Sharing.

328. The medium of embodiment 316, further, comprising:

the cold secure firmware transaction signing component, stored in the medium, includes processor-issuable instructions to:

wipe, via at least one processor, temporary key data from the memory of the first cold HSM after generating the signature.

329. The medium of embodiment 328, wherein the temporary key data includes the encrypted second master key share, the decrypted second master key share, the encrypted third master key share, the decrypted third master key share, the recovered master private key, and the generated signing private key.

330. The medium of embodiment 316, wherein the signature is returned in Distinguished Encoding Rules format.

331. A processor-implemented transaction signing system, comprising:

a hot secure firmware transaction signing component means, to:

receive, via at least one processor, by the hot HSM, an online transaction signing request message for a transaction from an online transaction signing server (TSS);

retrieve, via at least one processor, from the hot HSM's tamper-proof storage, a third master key share;

determine, via at least one processor, by the hot HSM, a public key encryption key of the first cold HSM;

encrypt, via at least one processor, by the hot HSM, the third master key share using the public key encryption key of the first cold HSM; and return, via at least one processor, the encrypted third master key share to the online TSS for transfer to an offline TSS;

a cold secure firmware transaction signing component means, to:

receive, via at least one processor, by the first cold HSM, an offline transaction signing request message for the transaction from the offline TSS, wherein the offline transaction signing request message includes: an encrypted second master key share associated with a second cold HSM and the encrypted third master key share associated with the hot HSM;

retrieve, via at least one processor, from the first cold HSM's tamper-proof storage, a private key decryption key of the first cold HSM corresponding to the public key encryption key of the first cold HSM previously provided to the second cold HSM and to the hot HSM, wherein the encrypted second master key share is encrypted using the public key encryption key of the first cold HSM by the second cold HSM;

decrypt, via at least one processor, by the first cold HSM, the encrypted second master key share and the encrypted third master key share using the retrieved private key decryption key of the first cold HSM;

retrieve, via at least one processor, from the first cold HSM's tamper-proof storage, a first master key share;

recover, via at least one processor, by the first cold HSM, a master private key from the first master key share, the decrypted second master key share and the decrypted third master key share using a secret sharing method;

determine, via at least one processor, by the first cold HSM, a keychain path associated with the offline transaction signing request message;

generate, via at least one processor, by the first cold HSM, a signing private key for the determined keychain path using the recovered master private key;

sign, via at least one processor, by the first cold HSM, the transaction using the generated signing private key to generate a signature; and return, via at least one processor, the generated signature.

332. The system of embodiment 331, further, comprising: the hot secure firmware transaction signing component means, to:

determine, via at least one processor, by the hot HSM, transaction data associated with the transaction;

retrieve, via at least one processor, from the hot HSM's tamper-proof storage, a private signing key corresponding to a public signing key of the hot HSM previously provided to the first cold HSM;

sign, via at least one processor, by the hot HSM, the transaction data; and return, via at least one processor, the signed transaction data to the online TSS for transfer to the offline TSS.

333. The system of embodiment 332, further, comprising: the cold secure firmware transaction signing component means, to:

verify, via at least one processor, by the first cold HSM, the signed transaction data using the public signing key of the hot HSM.

334. The system of embodiment 331, wherein an external storage device is utilized to transfer the encrypted third master key share from the online TSS to the offline TSS.

335. The system of embodiment 331, wherein the hot HSM and the first cold HSM are PCIe appliances.

336. The system of embodiment 331, wherein the second cold HSM is a USB appliance communicatively coupled to the first cold HSM via USB.

337. The system of embodiment 331, wherein the second cold HSM includes an authentication entry device.

338. The system of embodiment 337, wherein the second cold HSM provides the encrypted second master key share to the offline TSS upon obtaining separate credentials via the authentication entry device from a predetermined number of people.

339. The system of embodiment 338, wherein the second cold HSM enforces M-of-N security policy for exporting the encrypted second master key share, wherein access to the second cold HSM is controlled by M-of-N authentication policy.

340. The system of embodiment 331, wherein the private key decryption key of the first cold HSM and the public key encryption key of the first cold HSM are predefined.

341. The system of embodiment 331, wherein the private key decryption key of the first cold HSM and the public key encryption key of the first cold HSM are generated dynamically for each transaction.

342. The system of embodiment 331, wherein the secret sharing method is Shamir's Secret Sharing.

343. The system of embodiment 331, further, comprising: the cold secure firmware transaction signing component means, to:

wipe, via at least one processor, temporary key data from the memory of the first cold HSM after generating the signature.

344. The system of embodiment 343, wherein the temporary key data includes the encrypted second master key share, the decrypted second master key share, the encrypted third master key share, the decrypted third master key share, the recovered master private key, and the generated signing private key.

345. The system of embodiment 331, wherein the signature is returned in Distinguished Encoding Rules format.

346. A processor-implemented transaction signing method, comprising:

executing processor-implemented hot secure firmware transaction signing component instructions to:

receive, via at least one processor, by the hot HSM, an online transaction signing request message for a transaction from an online transaction signing server (TSS);

retrieve, via at least one processor, from the hot HSM's tamper-proof storage, a third master key share;

determine, via at least one processor, by the hot HSM, a public key encryption key of the first cold HSM;

encrypt, via at least one processor, by the hot HSM, the third master key share using the public key encryption key of the first cold HSM; and return, via at least one processor, the encrypted third master key share to the online TSS for transfer to an offline TSS;

executing processor-implemented cold secure firmware transaction signing component instructions to:

receive, via at least one processor, by the first cold HSM, an offline transaction signing request message for the transaction from the offline TSS, wherein the offline transaction signing request message includes: an encrypted second master key share associated with a second cold HSM and the encrypted third master key share associated with the hot HSM;

retrieve, via at least one processor, from the first cold HSM's tamper-proof storage, a private key decryption key of the first cold HSM corresponding to the public key encryption key of the first cold HSM previously provided to the second cold HSM and to the hot HSM, wherein the encrypted second master key share is encrypted using the public key encryption key of the first cold HSM by the second cold HSM;

decrypt, via at least one processor, by the first cold HSM, the encrypted second master key share and the encrypted third master key share using the retrieved private key decryption key of the first cold HSM;

retrieve, via at least one processor, from the first cold HSM's tamper-proof storage, a first master key share;

recover, via at least one processor, by the first cold HSM, a master private key from the first master key share, the decrypted second master key share and the decrypted third master key share using a secret sharing method;

determine, via at least one processor, by the first cold HSM, a keychain path associated with the offline transaction signing request message;

generate, via at least one processor, by the first cold HSM, a signing private key for the determined keychain path using the recovered master private key;

sign, via at least one processor, by the first cold HSM, the transaction using the generated signing private key to generate a signature; and return, via at least one processor, the generated signature.

347. The method of embodiment 346, further, comprising: executing processor-implemented hot secure firmware transaction signing component instructions to:

determine, via at least one processor, by the hot HSM, transaction data associated with the transaction;

retrieve, via at least one processor, from the hot HSM's tamper-proof storage, a private signing key corresponding to a public signing key of the hot HSM previously provided to the first cold HSM;

sign, via at least one processor, by the hot HSM, the transaction data; and return, via at least one processor, the signed transaction data to the online TSS for transfer to the offline TSS.

348. The method of embodiment 347, further, comprising: executing processor-implemented cold secure firmware transaction signing component instructions to:

verify, via at least one processor, by the first cold HSM, the signed transaction data using the public signing key of the hot HSM.

349. The method of embodiment 346, wherein an external storage device is utilized to transfer the encrypted third master key share from the online TSS to the offline TSS.

350. The method of embodiment 346, wherein the hot HSM and the first cold HSM are PCIe appliances.

351. The method of embodiment 346, wherein the second cold HSM is a USB appliance communicatively coupled to the first cold HSM via USB.

352. The method of embodiment 346, wherein the second cold HSM includes an authentication entry device.

353. The method of embodiment 352, wherein the second cold HSM provides the encrypted second master key share to the offline TSS upon obtaining separate credentials via the authentication entry device from a predetermined number of people.

354. The method of embodiment 353, wherein the second cold HSM enforces M-of-N security policy for exporting the encrypted second master key share, wherein access to the second cold HSM is controlled by M-of-N authentication policy.

355. The method of embodiment 346, wherein the private key decryption key of the first cold HSM and the public key encryption key of the first cold HSM are predefined.

356. The method of embodiment 346, wherein the private key decryption key of the first cold HSM and the public key encryption key of the first cold HSM are generated dynamically for each transaction.

357. The method of embodiment 346, wherein the secret sharing method is Shamir's Secret Sharing.

358. The method of embodiment 346, further, comprising: executing processor-implemented cold secure firmware transaction signing component instructions to:

wipe, via at least one processor, temporary key data from the memory of the first cold HSM after generating the signature.

359. The method of embodiment 358, wherein the temporary key data includes the encrypted second master key share, the decrypted second master key share, the encrypted third master key share, the decrypted third master key share, the recovered master private key, and the generated signing private key.

360. The method of embodiment 346, wherein the signature is returned in Distinguished Encoding Rules format.

401. A verified address smart contract deploying apparatus, comprising:

at least one memory;

a component collection stored in the at least one memory;

at least one processor disposed in communication with the at least one memory, the at least one processor executing processor-executable instructions from the component collection, the component collection storage structured with processor-executable instructions, comprising:

obtain, via the at least one processor, a contract deployment request message datastructure by a hardware security module (HSM) from a transaction signing server (TSS), in which the contract deployment request message datastructure is structured to specify a set of owner datastructures, a deployment factory address, and contract code for a smart contract;

determine, via the at least one processor, by the HSM, owner key identification parameters associated with an owner datastructure in the set of owner datastructures, in which the owner key identification parameters are structured to specify a keyset identifier and a keychain path;

determine, via the at least one processor, by the HSM, an owner public key associated with the owner datastructure using the owner key identification parameters;

generate, via the at least one processor, by the HSM, an owner address associated with the owner datastructure using the owner public key;

generate, via the at least one processor, by the HSM, a salt value for the smart contract;

calculate, via the at least one processor, by the HSM, a contract address for the smart contract as a function of the deployment factory address, the salt value, the contract code, and the owner address;

determine, via the at least one processor, by the HSM, an owner private key associated with the owner datastructure using the owner key identification parameters, in which the owner private key corresponds to the owner public key;

sign, via at least one processor, by the HSM, the contract address for the smart contract using the owner private key to generate a contract deployment signature; and provide, via at least one processor, by the HSM, a contract deployment data datastructure to the TSS, in which the contract deployment data datastructure is structured to specify the salt value, and the contract deployment signature.

402. The apparatus of embodiment 401, in which the deployment factory address is a blockchain address of a Contract Factory smart contract on the Ethereum blockchain.

403. The apparatus of embodiment 401, in which the contract code is structured as a bytecode.

404. The apparatus of embodiment 401, in which the owner key identification parameters are structured to specify a wallet type.

405. The apparatus of embodiment 401, in which the owner address is generated using a Bip32-based deterministic key derivation procedure.

406. The apparatus of embodiment 405, in which the owner address is calculated as the last 20 bytes of Keccak-256 hash of the owner public key.

407. The apparatus of embodiment 401, in which the salt value is structured as a one-time 32-byte salt value.

408. The apparatus of embodiment 401, in which the contract address is calculated as an EIP-1014 blockchain address.

409. The apparatus of embodiment 408, in which the contract address is calculated as the last 20 bytes of Keccak-256 hash of a concatenated list of: 0xFF byte, the deployment factory address, the salt value, and Keccak-256 hash of a concatenated list of: the contract code, and the owner address.

410. The apparatus of embodiment 401, in which the contract deployment data datastructure is structured to specify the owner address.

411. The apparatus of embodiment 401, in which the component collection storage is further structured with processor-executable instructions, comprising:

obtain, via the at least one processor, by the HSM, a transaction signing request message datastructure associated with a transaction, in which the transaction signing request message datastructure is structured to specify a transaction amount, a source wallet datastructure, and a destination wallet datastructure, in which either the source wallet datastructure or the destination wallet datastructure is a verified address wallet datastructure that corresponds to the smart contract;

determine, via the at least one processor, by the HSM, the owner key identification parameters associated with the verified address wallet datastructure;

calculate, via the at least one processor, by the HSM, the contract address for the verified address wallet datastructure as a function of the deployment factory address, the salt value, the contract code, and the owner address;

validate, via the at least one processor, by the HSM, the contract deployment signature associated with the verified address wallet datastructure;

calculate, via the at least one processor, by the HSM, a transaction hash for the transaction;

sign, via at least one processor, by the HSM, the transaction hash using a transaction signing private key associated with the owner datastructure to generate a transaction signature; and return, via at least one processor, the generated transaction signature.

412. The apparatus of embodiment 411, in which the instructions to validate the contract deployment signature associated with the verified address wallet datastructure are structured as instructions to also validate other contract deployment signatures associated with the verified address wallet datastructure, in which the other contract deployment signatures are associated with other owner datastructures in the set of owner datastructures.

413. The apparatus of embodiment 411, in which the owner private key and the transaction signing private key are the same key.

414. The apparatus of embodiment 411, in which the transaction hash is signed in accordance with a hashing algorithm utilized by the Ethereum protocol.

415. The apparatus of embodiment 411, in which the transaction signature is returned in Distinguished Encoding Rules format.

416. A verified address smart contract deploying processor-readable, non-transient medium, the medium storing a component collection, the component collection storage structured with processor-executable instructions comprising:

obtain, via the at least one processor, a contract deployment request message datastructure by a hardware security module (HSM) from a transaction signing server (TSS), in which the contract deployment request message datastructure is structured to specify a set of owner datastructures, a deployment factory address, and contract code for a smart contract;

determine, via the at least one processor, by the HSM, owner key identification parameters associated with an owner datastructure in the set of owner datastructures, in which the owner key identification parameters are structured to specify a keyset identifier and a keychain path;

determine, via the at least one processor, by the HSM, an owner public key associated with the owner datastructure using the owner key identification parameters;

generate, via the at least one processor, by the HSM, an owner address associated with the owner datastructure using the owner public key;

generate, via the at least one processor, by the HSM, a salt value for the smart contract;

calculate, via the at least one processor, by the HSM, a contract address for the smart contract as a function of the deployment factory address, the salt value, the contract code, and the owner address;

determine, via the at least one processor, by the HSM, an owner private key associated with the owner datastructure using the owner key identification parameters, in which the owner private key corresponds to the owner public key;

sign, via at least one processor, by the HSM, the contract address for the smart contract using the owner private key to generate a contract deployment signature; and provide, via at least one processor, by the HSM, a contract deployment data datastructure to the TSS, in which the contract deployment data datastructure is structured to specify the salt value, and the contract deployment signature.

417. The medium of embodiment 416, in which the deployment factory address is a blockchain address of a Contract Factory smart contract on the Ethereum blockchain.

418. The medium of embodiment 416, in which the contract code is structured as a bytecode.

419. The medium of embodiment 416, in which the owner key identification parameters are structured to specify a wallet type.

420. The medium of embodiment 416, in which the owner address is generated using a Bip32-based deterministic key derivation procedure.

421. The medium of embodiment 420, in which the owner address is calculated as the last 20 bytes of Keccak-256 hash of the owner public key.

422. The medium of embodiment 416, in which the salt value is structured as a one-time 32-byte salt value.

423. The medium of embodiment 416, in which the contract address is calculated as an EIP-1014 blockchain address.

424. The medium of embodiment 423, in which the contract address is calculated as the last 20 bytes of Keccak-256 hash of a concatenated list of: 0xFF byte, the deployment factory address, the salt value, and Keccak-256 hash of a concatenated list of: the contract code, and the owner address.

425. The medium of embodiment 416, in which the contract deployment data datastructure is structured to specify the owner address.

426. The medium of embodiment 416, in which the component collection storage is further structured with processor-executable instructions, comprising:

obtain, via the at least one processor, by the HSM, a transaction signing request message datastructure associated with a transaction, in which the transaction signing request message datastructure is structured to specify a transaction amount, a source wallet datastructure, and a destination wallet datastructure, in which either the source wallet datastructure or the destination wallet datastructure is a verified address wallet datastructure that corresponds to the smart contract;

determine, via the at least one processor, by the HSM, the owner key identification parameters associated with the verified address wallet datastructure;

calculate, via the at least one processor, by the HSM, the contract address for the verified address wallet datastructure as a function of the deployment factory address, the salt value, the contract code, and the owner address;

validate, via the at least one processor, by the HSM, the contract deployment signature associated with the verified address wallet datastructure;

calculate, via the at least one processor, by the HSM, a transaction hash for the transaction;

sign, via at least one processor, by the HSM, the transaction hash using a transaction signing private key associated with the owner datastructure to generate a transaction signature; and return, via at least one processor, the generated transaction signature.

427. The medium of embodiment 426, in which the instructions to validate the contract deployment signature associated with the verified address wallet datastructure are structured as instructions to also validate other contract deployment signatures associated with the verified address wallet datastructure, in which the other contract deployment signatures are associated with other owner datastructures in the set of owner datastructures.

428. The medium of embodiment 426, in which the owner private key and the transaction signing private key are the same key.

429. The medium of embodiment 426, in which the transaction hash is signed in accordance with a hashing algorithm utilized by the Ethereum protocol.

430. The medium of embodiment 426, in which the transaction signature is returned in Distinguished Encoding Rules format.

431. A verified address smart contract deploying processor-implemented system, comprising: means to store a component collection;

means to process processor-executable instructions from the component collection, the component collection storage structured with processor-executable instructions including:

obtain, via the at least one processor, a contract deployment request message datastructure by a hardware security module (HSM) from a transaction signing server (TSS), in which the contract deployment request message datastructure is structured to specify a set of owner datastructures, a deployment factory address, and contract code for a smart contract;

determine, via the at least one processor, by the HSM, owner key identification parameters associated with an owner datastructure in the set of owner datastructures, in which the owner key identification parameters are structured to specify a keyset identifier and a keychain path;

determine, via the at least one processor, by the HSM, an owner public key associated with the owner datastructure using the owner key identification parameters;

generate, via the at least one processor, by the HSM, an owner address associated with the owner datastructure using the owner public key;

generate, via the at least one processor, by the HSM, a salt value for the smart contract;

calculate, via the at least one processor, by the HSM, a contract address for the smart contract as a function of the deployment factory address, the salt value, the contract code, and the owner address;

determine, via the at least one processor, by the HSM, an owner private key associated with the owner datastructure using the owner key identification parameters, in which the owner private key corresponds to the owner public key;

sign, via at least one processor, by the HSM, the contract address for the smart contract using the owner private key to generate a contract deployment signature; and provide, via at least one processor, by the HSM, a contract deployment data datastructure to the TSS, in which the contract deployment data datastructure is structured to specify the salt value, and the contract deployment signature.

432. The system of embodiment 431, in which the deployment factory address is a blockchain address of a Contract Factory smart contract on the Ethereum blockchain.

433. The system of embodiment 431, in which the contract code is structured as a bytecode.

434. The system of embodiment 431, in which the owner key identification parameters are structured to specify a wallet type.

435. The system of embodiment 431, in which the owner address is generated using a Bip32-based deterministic key derivation procedure.

436. The system of embodiment 435, in which the owner address is calculated as the last 20 bytes of Keccak-256 hash of the owner public key.

437. The system of embodiment 431, in which the salt value is structured as a one-time 32-byte salt value.

438. The system of embodiment 431, in which the contract address is calculated as an EIP-1014 blockchain address.

439. The system of embodiment 438, in which the contract address is calculated as the last 20 bytes of Keccak-256 hash of a concatenated list of: 0xFF byte, the deployment factory address, the salt value, and Keccak-256 hash of a concatenated list of: the contract code, and the owner address.

440. The system of embodiment 431, in which the contract deployment data datastructure is structured to specify the owner address.

441. The system of embodiment 431, in which the component collection storage is further structured with processor-executable instructions, comprising:
- obtain, via the at least one processor, by the HSM, a transaction signing request message datastructure associated with a transaction, in which the transaction signing request message datastructure is structured to specify a transaction amount, a source wallet datastructure, and a destination wallet datastructure, in which either the source wallet datastructure or the destination wallet datastructure is a verified address wallet datastructure that corresponds to the smart contract;
- determine, via the at least one processor, by the HSM, the owner key identification parameters associated with the verified address wallet datastructure;
- calculate, via the at least one processor, by the HSM, the contract address for the verified address wallet datastructure as a function of the deployment factory address, the salt value, the contract code, and the owner address;
- validate, via the at least one processor, by the HSM, the contract deployment signature associated with the verified address wallet datastructure;
- calculate, via the at least one processor, by the HSM, a transaction hash for the transaction;
- sign, via at least one processor, by the HSM, the transaction hash using a transaction signing private key associated with the owner datastructure to generate a transaction signature; and
- return, via at least one processor, the generated transaction signature.

442. The system of embodiment 441, in which the instructions to validate the contract deployment signature associated with the verified address wallet datastructure are structured as instructions to also validate other contract deployment signatures associated with the verified address wallet datastructure, in which the other contract deployment signatures are associated with other owner datastructures in the set of owner datastructures.

443. The system of embodiment 441, in which the owner private key and the transaction signing private key are the same key.

444. The system of embodiment 441, in which the transaction hash is signed in accordance with a hashing algorithm utilized by the Ethereum protocol.

445. The system of embodiment 441, in which the transaction signature is returned in Distinguished Encoding Rules format.

446. A verified address smart contract deploying processor-implemented process, including processing processor-executable instructions via at least one processor from a component collection stored in at least one memory, the component collection storage structured with processor-executable instructions comprising:
- obtain, via the at least one processor, a contract deployment request message datastructure by a hardware security module (HSM) from a transaction signing server (TSS), in which the contract deployment request message datastructure is structured to specify a set of owner datastructures, a deployment factory address, and contract code for a smart contract;
- determine, via the at least one processor, by the HSM, owner key identification parameters associated with an owner datastructure in the set of owner datastructures, in which the owner key identification parameters are structured to specify a keyset identifier and a keychain path;
- determine, via the at least one processor, by the HSM, an owner public key associated with the owner datastructure using the owner key identification parameters;
- generate, via the at least one processor, by the HSM, an owner address associated with the owner datastructure using the owner public key;
- generate, via the at least one processor, by the HSM, a salt value for the smart contract;
- calculate, via the at least one processor, by the HSM, a contract address for the smart contract as a function of the deployment factory address, the salt value, the contract code, and the owner address;
- determine, via the at least one processor, by the HSM, an owner private key associated with the owner datastructure using the owner key identification parameters, in which the owner private key corresponds to the owner public key;
- sign, via at least one processor, by the HSM, the contract address for the smart contract using the owner private key to generate a contract deployment signature; and
- provide, via at least one processor, by the HSM, a contract deployment data datastructure to the TSS, in which the contract deployment data datastructure is structured to specify the salt value, and the contract deployment signature.

447. The process of embodiment 446, in which the deployment factory address is a blockchain address of a Contract Factory smart contract on the Ethereum blockchain.

448. The process of embodiment 446, in which the contract code is structured as a bytecode.

449. The process of embodiment 446, in which the owner key identification parameters are structured to specify a wallet type.

450. The process of embodiment 446, in which the owner address is generated using a Bip32-based deterministic key derivation procedure.

451. The process of embodiment 450, in which the owner address is calculated as the last 20 bytes of Keccak-256 hash of the owner public key.

452. The process of embodiment 446, in which the salt value is structured as a one-time 32-byte salt value.

453. The process of embodiment 446, in which the contract address is calculated as an EIP-1014 blockchain address.

454. The process of embodiment 453, in which the contract address is calculated as the last 20 bytes of Keccak-256 hash of a concatenated list of: 0xFF byte, the deployment factory address, the salt value, and Keccak-256 hash of a concatenated list of: the contract code, and the owner address.

455. The process of embodiment 446, in which the contract deployment data datastructure is structured to specify the owner address.

456. The process of embodiment 446, in which the component collection storage is further structured with processor-executable instructions, comprising:

obtain, via the at least one processor, by the HSM, a transaction signing request message datastructure associated with a transaction, in which the transaction signing request message datastructure is structured to specify a transaction amount, a source wallet datastructure, and a destination wallet datastructure, in which either the source wallet datastructure or the destination wallet datastructure is a verified address wallet datastructure that corresponds to the smart contract;

determine, via the at least one processor, by the HSM, the owner key identification parameters associated with the verified address wallet datastructure;

calculate, via the at least one processor, by the HSM, the contract address for the verified address wallet datastructure as a function of the deployment factory address, the salt value, the contract code, and the owner address;

validate, via the at least one processor, by the HSM, the contract deployment signature associated with the verified address wallet datastructure;

calculate, via the at least one processor, by the HSM, a transaction hash for the transaction;

sign, via at least one processor, by the HSM, the transaction hash using a transaction signing private key associated with the owner datastructure to generate a transaction signature; and return, via at least one processor, the generated transaction signature.

457. The process of embodiment 456, in which the instructions to validate the contract deployment signature associated with the verified address wallet datastructure are structured as instructions to also validate other contract deployment signatures associated with the verified address wallet datastructure, in which the other contract deployment signatures are associated with other owner datastructures in the set of owner datastructures.

458. The process of embodiment 456, in which the owner private key and the transaction signing private key are the same key.

459. The process of embodiment 456, in which the transaction hash is signed in accordance with a hashing algorithm utilized by the Ethereum protocol.

460. The process of embodiment 456, in which the transaction signature is returned in Distinguished Encoding Rules format.

501. A verified address smart contract transaction signing apparatus, comprising:

at least one memory;

a component collection stored in the at least one memory;

at least one processor disposed in communication with the at least one memory, the at least one processor executing processor-executable instructions from the component collection, the component collection storage structured with processor-executable instructions, comprising:

obtain, via the at least one processor, by a hardware security module (HSM), a transaction signing request message datastructure associated with a transaction, in which the transaction signing request message datastructure is structured to specify a transaction amount, a source wallet datastructure, and a destination wallet datastructure, in which either the source wallet datastructure or the destination wallet datastructure is a verified address wallet datastructure that corresponds to a smart contract;

determine, via the at least one processor, by the HSM, owner key identification parameters associated with an owner datastructure associated with the verified address wallet datastructure;

calculate, via the at least one processor, by the HSM, a contract address for the verified address wallet datastructure as a function of a deployment factory address, a salt value for the smart contract, contract code for the smart contract, and an owner address generated using the owner key identification parameters;

validate, via the at least one processor, by the HSM, a contract deployment signature associated with the verified address wallet datastructure;

calculate, via the at least one processor, by the HSM, a transaction hash for the transaction;

sign, via at least one processor, by the HSM, the transaction hash using a transaction signing private key associated with the owner datastructure to generate a transaction signature; and return, via at least one processor, the generated transaction signature.

502. The apparatus of embodiment 501, in which the instructions to validate the contract deployment signature associated with the verified address wallet datastructure are structured as instructions to also validate other contract deployment signatures associated with the verified address wallet datastructure, in which the other contract deployment signatures are associated with other owner datastructures in a set of owner datastructures associated with the smart contract.

503. The apparatus of embodiment 501, in which an owner private key used to generate the contract deployment signature and the transaction signing private key are the same key.

504. The apparatus of embodiment 501, in which the transaction hash is signed in accordance with a hashing algorithm utilized by the Ethereum protocol.

505. The apparatus of embodiment 501, in which the transaction signature is returned in Distinguished Encoding Rules format.

506. A verified address smart contract transaction signing processor-readable, non-transient medium, the medium storing a component collection, the component collection storage structured with processor-executable instructions comprising:

obtain, via the at least one processor, by a hardware security module (HSM), a transaction signing request message datastructure associated with a transaction, in which the transaction signing request message datastructure is structured to specify a transaction amount, a source wallet datastructure, and a destination wallet datastructure, in which either the source wallet datastructure or the destination wallet datastructure is a verified address wallet datastructure that corresponds to a smart contract;

determine, via the at least one processor, by the HSM, owner key identification parameters associated with an owner datastructure associated with the verified address wallet datastructure;

calculate, via the at least one processor, by the HSM, a contract address for the verified address wallet datastructure as a function of a deployment factory address, a salt value for the smart contract, contract code for the smart contract, and an owner address generated using the owner key identification parameters;

validate, via the at least one processor, by the HSM, a contract deployment signature associated with the verified address wallet datastructure;

calculate, via the at least one processor, by the HSM, a transaction hash for the transaction;

sign, via at least one processor, by the HSM, the transaction hash using a transaction signing private key associated with the owner datastructure to generate a transaction signature; and return, via at least one processor, the generated transaction signature.

507. The medium of embodiment 506, in which the instructions to validate the contract deployment signature associated with the verified address wallet datastructure are structured as instructions to also validate other contract deployment signatures associated with the verified address wallet datastructure, in which the other contract deployment signatures are associated with other owner datastructures in a set of owner datastructures associated with the smart contract.

508. The medium of embodiment 506, in which an owner private key used to generate the contract deployment signature and the transaction signing private key are the same key.

509. The medium of embodiment 506, in which the transaction hash is signed in accordance with a hashing algorithm utilized by the Ethereum protocol.

510. The medium of embodiment 506, in which the transaction signature is returned in Distinguished Encoding Rules format.

511. A verified address smart contract transaction signing processor-implemented system, comprising: means to store a component collection;

means to process processor-executable instructions from the component collection, the component collection storage structured with processor-executable instructions including:

obtain, via the at least one processor, by a hardware security module (HSM), a transaction signing request message datastructure associated with a transaction, in which the transaction signing request message datastructure is structured to specify a transaction amount, a source wallet datastructure, and a destination wallet datastructure, in which either the source wallet datastructure or the destination wallet datastructure is a verified address wallet datastructure that corresponds to a smart contract;

determine, via the at least one processor, by the HSM, owner key identification parameters associated with an owner datastructure associated with the verified address wallet datastructure;

calculate, via the at least one processor, by the HSM, a contract address for the verified address wallet datastructure as a function of a deployment factory address, a salt value for the smart contract, contract code for the smart contract, and an owner address generated using the owner key identification parameters;

validate, via the at least one processor, by the HSM, a contract deployment signature associated with the verified address wallet datastructure;

calculate, via the at least one processor, by the HSM, a transaction hash for the transaction;

sign, via at least one processor, by the HSM, the transaction hash using a transaction signing private key associated with the owner datastructure to generate a transaction signature; and return, via at least one processor, the generated transaction signature.

512. The system of embodiment 511, in which the instructions to validate the contract deployment signature associated with the verified address wallet datastructure are structured as instructions to also validate other contract deployment signatures associated with the verified address wallet datastructure, in which the other contract deployment signatures are associated with other owner datastructures in a set of owner datastructures associated with the smart contract.

513. The system of embodiment 511, in which an owner private key used to generate the contract deployment signature and the transaction signing private key are the same key.

514. The system of embodiment 511, in which the transaction hash is signed in accordance with a hashing algorithm utilized by the Ethereum protocol.

515. The system of embodiment 511, in which the transaction signature is returned in Distinguished Encoding Rules format.

516. A verified address smart contract transaction signing processor-implemented process, including processing processor-executable instructions via at least one processor from a component collection stored in at least one memory, the component collection storage structured with processor-executable instructions comprising:

obtain, via the at least one processor, by a hardware security module (HSM), a transaction signing request message datastructure associated with a transaction, in which the transaction signing request message datastructure is structured to specify a transaction amount, a source wallet datastructure, and a destination wallet datastructure, in which either the source wallet datastructure or the destination wallet datastructure is a verified address wallet datastructure that corresponds to a smart contract;

determine, via the at least one processor, by the HSM, owner key identification parameters associated with an owner datastructure associated with the verified address wallet datastructure;

calculate, via the at least one processor, by the HSM, a contract address for the verified address wallet datastructure as a function of a deployment factory address, a salt value for the smart contract, contract code for the smart contract, and an owner address generated using the owner key identification parameters;

validate, via the at least one processor, by the HSM, a contract deployment signature associated with the verified address wallet datastructure;

calculate, via the at least one processor, by the HSM, a transaction hash for the transaction;

sign, via at least one processor, by the HSM, the transaction hash using a transaction signing private key associated with the owner datastructure to generate a transaction signature; and return, via at least one processor, the generated transaction signature.

517. The process of embodiment 516, in which the instructions to validate the contract deployment signature associated with the verified address wallet datastructure are structured as instructions to also validate other contract deployment signatures associated with the verified address wallet datastructure, in which the other contract deployment signatures are associated with other owner datastructures in a set of owner datastructures associated with the smart contract.

518. The process of embodiment 516, in which an owner private key used to generate the contract deployment signature and the transaction signing private key are the same key.

519. The process of embodiment 516, in which the transaction hash is signed in accordance with a hashing algorithm utilized by the Ethereum protocol.

520. The process of embodiment 516, in which the transaction signature is returned in Distinguished Encoding Rules format.

In order to address various issues and advance the art, the entirety of this application for Address Verification, Seed Splitting and Firmware Extension for Secure Cryptocurrency Key Backup, Restore, and Transaction Signing Platform Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower", "upper", "horizontal", "vertical", "above", "below", "up", "down", "top" and "bottom" as well as derivatives thereof (e.g., "horizontally", "downwardly", "upwardly", etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached", "affixed", "connected", "coupled", "interconnected", etc. may refer to a relationship where structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, provisionals, re-issues, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a SFTSP individual and/or enterprise user, database configuration and/or relational model, data type, data transmission and/or network framework, library, syntax structure, and/or the like, various embodiments of the SFTSP, may be implemented that allow a great deal of flexibility and customization. For example, aspects of the SFTSP may be adapted for non-Bitcoin and/or non-Ethereum transactions. While various embodiments and discussions of the SFTSP have included information technology, however, it is to be understood that the embodiments described herein may be readily configured and/or customized for a wide variety of other applications and/or implementations.

What is claimed is:

1. A verified address smart contract deploying apparatus, comprising:

at least one memory;

a component collection stored in the at least one memory;

at least one processor disposed in communication with the at least one memory, the at least one processor executing processor-executable instructions from the component collection, the component collection storage structured with processor-executable instructions, comprising:

obtain, via the at least one processor, a contract deployment request message datastructure by a hardware security module (HSM) from a transaction signing server (TSS), in which the contract deployment request message datastructure is structured to specify a set of owner datastructures, a deployment factory address, and contract code for a smart contract;

determine, via the at least one processor, by the HSM, owner key identification parameters associated with an owner datastructure in the set of owner datastructures, in which the owner key identification parameters are structured to specify a keyset identifier and a keychain path;

determine, via the at least one processor, by the HSM, an owner public key associated with the owner datastructure using the owner key identification parameters;

generate, via the at least one processor, by the HSM, an owner address associated with the owner datastructure using the owner public key;

generate, via the at least one processor, by the HSM, a salt value for the smart contract;

calculate, via the at least one processor, by the HSM, a contract address for the smart contract as a function of the deployment factory address, the salt value, the contract code, and the owner address;

determine, via the at least one processor, by the HSM, an owner private key associated with the owner datastructure using the owner key identification parameters, in which the owner private key corresponds to the owner public key;

sign, via at least one processor, by the HSM, the contract address for the smart contract using the owner private key to generate a contract deployment signature; and provide, via at least one processor, by the HSM, a contract deployment data datastructure to the TSS, in which the contract deployment data datastructure is structured to specify the salt value, and the contract deployment signature.

2. The apparatus of claim 1, in which the deployment factory address is a blockchain address of a Contract Factory smart contract on the Ethereum blockchain.

3. The apparatus of claim 1, in which the contract code is structured as a bytecode.

4. The apparatus of claim 1, in which the owner key identification parameters are structured to specify a wallet type.

5. The apparatus of claim 1, in which the owner address is generated using a Bitcoin improvement proposal #32 based (Bip32-based) deterministic key derivation procedure.

6. The apparatus of claim 5, in which the owner address is calculated as the last 20 bytes of Keccak-256 hash of the owner public key.

7. The apparatus of claim 1, in which the salt value is structured as a one-time 32-byte salt value.

8. The apparatus of claim 1, in which the contract address is calculated as an Ethereum Improvement Protocol #1014 (EIP-1014) blockchain address.

9. The apparatus of claim 8, in which the contract address is calculated as the last 20 bytes of Keccak-256 hash of a concatenated list of: 0xFF byte, the deployment factory address, the salt value, and Keccak-256 hash of a concatenated list of: the contract code, and the owner address.

10. The apparatus of claim 1, in which the contract deployment data datastructure is structured to specify the owner address.

11. A verified address smart contract deploying processor-readable, non-transient medium, the medium storing a component collection, the component collection storage structured with processor-executable instructions comprising:

obtain, via at least one processor, a contract deployment request message datastructure by a hardware security module (HSM) from a transaction signing server (TSS), in which the contract deployment request message datastructure is structured to specify a set of owner datastructures, a deployment factory address, and contract code for a smart contract;

determine, via the at least one processor, by the HSM, owner key identification parameters associated with an owner datastructure in the set of owner datastructures, in which the owner key identification parameters are structured to specify a keyset identifier and a keychain path;

determine, via the at least one processor, by the HSM, an owner public key associated with the owner datastructure using the owner key identification parameters;

generate, via the at least one processor, by the HSM, an owner address associated with the owner datastructure using the owner public key;

generate, via the at least one processor, by the HSM, a salt value for the smart contract;

calculate, via the at least one processor, by the HSM, a contract address for the smart contract as a function of the deployment factory address, the salt value, the contract code, and the owner address;

determine, via the at least one processor, by the HSM, an owner private key associated with the owner datastructure using the owner key identification parameters, in which the owner private key corresponds to the owner public key;

sign, via at least one processor, by the HSM, the contract address for the smart contract using the owner private key to generate a contract deployment signature; and provide, via at least one processor, by the HSM, a contract deployment data datastructure to the TSS, in which the contract deployment data datastructure is structured to specify the salt value, and the contract deployment signature.

12. A verified address smart contract deploying processor-implemented system, comprising:

memory configured to store a component collection;

at least one processor implemented in hardware configured to process processor-executable instructions from the component collection, the component collection storage structured with processor-executable instructions including:

obtain, via the at least one processor, a contract deployment request message datastructure by a hardware security module (HSM) from a transaction signing server (TSS), in which the contract deployment request message datastructure is structured to specify a set of owner datastructures, a deployment factory address, and contract code for a smart contract;

determine, via the at least one processor, by the HSM, owner key identification parameters associated with an owner datastructure in the set of owner datastructures, in which the owner key identification parameters are structured to specify a keyset identifier and a keychain path;

determine, via the at least one processor, by the HSM, an owner public key associated with the owner datastructure using the owner key identification parameters;

generate, via the at least one processor, by the HSM, an owner address associated with the owner datastructure using the owner public key;

generate, via the at least one processor, by the HSM, a salt value for the smart contract;

calculate, via the at least one processor, by the HSM, a contract address for the smart contract as a function of the deployment factory address, the salt value, the contract code, and the owner address;

determine, via the at least one processor, by the HSM, an owner private key associated with the owner datastructure using the owner key identification parameters, in which the owner private key corresponds to the owner public key;

sign, via at least one processor, by the HSM, the contract address for the smart contract using the owner private key to generate a contract deployment signature; and provide, via at least one processor, by the HSM, a contract deployment data datastructure to the TSS, in which the contract deployment data datastructure is structured to specify the salt value, and the contract deployment signature.

13. A verified address smart contract deploying processor-implemented process, including processing processor-executable instructions via at least one processor from a component collection stored in at least one memory, the component collection storage structured with processor-executable instructions comprising:

obtain, via the at least one processor, a contract deployment request message datastructure by a hardware security module (HSM) from a transaction signing server (TSS), in which the contract deployment request message datastructure is structured to specify a set of owner datastructures, a deployment factory address, and contract code for a smart contract;

determine, via the at least one processor, by the HSM, owner key identification parameters associated with an owner datastructure in the set of owner datastructures, in which the owner key identification parameters are structured to specify a keyset identifier and a keychain path;

determine, via the at least one processor, by the HSM, an owner public key associated with the owner datastructure using the owner key identification parameters;

generate, via the at least one processor, by the HSM, an owner address associated with the owner datastructure using the owner public key;

generate, via the at least one processor, by the HSM, a salt value for the smart contract;

calculate, via the at least one processor, by the HSM, a contract address for the smart contract as a function of the deployment factory address, the salt value, the contract code, and the owner address;

determine, via the at least one processor, by the HSM, an owner private key associated with the owner datastructure using the owner key identification parameters, in which the owner private key corresponds to the owner public key;

sign, via at least one processor, by the HSM, the contract address for the smart contract using the owner private key to generate a contract deployment signature; and provide, via at least one processor, by the HSM, a contract deployment data datastructure to the TSS, in which the contract deployment data datastructure is structured to specify the salt value, and the contract deployment signature.

* * * * *